US007738922B2

(12) United States Patent
Hashimoto et al.

(10) Patent No.: US 7,738,922 B2
(45) Date of Patent: Jun. 15, 2010

(54) TERMINAL STATE CONTROL SYSTEM

(75) Inventors: Masanori Hashimoto, Yokohama (JP); Nao Miyazaki, Yokohama (JP); Yasuo Tezuka, Yokohama (JP); Hidekazu Kuniyoshi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 601 days.

(21) Appl. No.: 10/808,757

(22) Filed: Mar. 25, 2004

(65) Prior Publication Data
US 2005/0070283 A1 Mar. 31, 2005

(30) Foreign Application Priority Data
Sep. 26, 2003 (JP) ............... 2003-336250

(51) Int. Cl.
*H04M 1/00* (2006.01)
*H04M 1/66* (2006.01)
*H04W 4/00* (2009.01)
*H04W 40/00* (2009.01)
(52) U.S. Cl. .................... 455/560; 455/411; 455/435.1; 455/446
(58) Field of Classification Search ......... 455/436–440, 455/435.1, 411, 424, 432.1, 442, 443, 561, 455/446, 435.2, 450; 370/371
See application file for complete search history.

(56) References Cited

U.S. PATENT DOCUMENTS

| | | |
|---|---|---|
| 5,255,307 A | 10/1993 | Mizikovsky |
| 5,598,459 A | 1/1997 | Haartsen |
| 6,058,311 A * | 5/2000 | Tsukagoshi ............... 455/435.1 |
| 6,275,706 B1 * | 8/2001 | Rune ........................ 455/456.1 |

(Continued)

FOREIGN PATENT DOCUMENTS

EP 0 617 566 9/1994

(Continued)

OTHER PUBLICATIONS

TS.23.012, Location Management Procedures, Jun. 2000.

(Continued)

*Primary Examiner*—George Eng
*Assistant Examiner*—Nam Huynh
(74) *Attorney, Agent, or Firm*—Katten Muchin Rosenman LLP

(57) ABSTRACT

When a terminal enters a cell of a personal-use base station (NBTS) arranged in a certain location area, the terminal receives a location area identifier having a number that is different from an identifier of the location area, and transmits a location updating request with the reception of the location area identifier as a trigger. On receiving the location updating request, a VLR or an NRNC having a registration table, in which the ID of the personal-use base station and the ID of a terminal allowed to use the personal-use base station are registered, judges whether the terminal issued the location updating request is the terminal allowed to use the personal-use base station by referring to the registration table. If the terminal issued the location updating request corresponds to the terminal allowed to use the personal-use base station, the terminal is placed under a status where it is capable of performing communication in the cell, and if not, the terminal is placed under a status where it is incapable of performing communication in the cell.

14 Claims, 79 Drawing Sheets

U.S. PATENT DOCUMENTS

| | | | |
|---|---|---|---|
| 6,483,818 B1 * | 11/2002 | Ohno et al. | 370/328 |
| 6,490,455 B1 * | 12/2002 | Park et al. | 455/456.4 |
| 6,493,555 B2 * | 12/2002 | Saada et al. | 455/438 |
| 6,510,318 B1 * | 1/2003 | Minagawa | 455/435.2 |
| 6,826,414 B1 | 11/2004 | Reynolds et al. | |
| 7,099,694 B1 * | 8/2006 | Aramaki et al. | 455/561 |
| 2001/0005676 A1 * | 6/2001 | Masuda et al. | 455/433 |
| 2002/0111166 A1 | 8/2002 | Monroe | |
| 2002/0123348 A1 | 9/2002 | Willars et al. | |
| 2003/0040314 A1 * | 2/2003 | Hogan et al. | 455/435 |
| 2003/0114169 A1 * | 6/2003 | Okamura et al. | 455/456 |

FOREIGN PATENT DOCUMENTS

| | | |
|---|---|---|
| GB | 2315193 | 1/1998 |
| JP | 6-245255 | 9/1994 |
| JP | 8-237742 | 9/1996 |
| JP | 10-108245 | 4/1998 |
| JP | 10-257548 | 9/1998 |
| JP | 10-512119 | 11/1998 |
| JP | 11-508742 | 7/1999 |
| JP | 2000-004481 | 1/2000 |
| WO | 94-05128 | 3/1994 |
| WO | 96/21987 | 7/1996 |
| WO | 9858515 | 12/1998 |
| WO | 00/54537 | 9/2000 |

OTHER PUBLICATIONS

TS 23.122, NAS Functions Related to Mobile Station (MS) in Idle Mode, Dec. 2002.

TS 24.007, Mobile Radio Interface Signalling Layer 3; General Aspects Jun. 2002.

TS 24.008, Mobile Radio Interface Layer 3 Specification; Core Network Protocols-Stage 3, Dec. 2002.

TS 25.304, UE Procedures in Idle Mode and Procedures for Cell Reselection in Connected Mode, Dec. 2002.

TS 25.331, Radio Source Control (RRC); Protocol Specification Dec. 2002.

TS 25.413, UTRAN Iu Interface RANAP Signalling, Sep. 2003.

Notice of Reason for Rejection dated Mar. 25, 2008, from the corresponding Japanese Application.

Partial European Search Report dated Apr. 1, 2008, from the corresponding European Application.

European Search Report and Annex to the European Search Report dated Jun. 25, 2008, for corresponding European Patent Application EP 04 25 1967.

* cited by examiner

FIG. 1

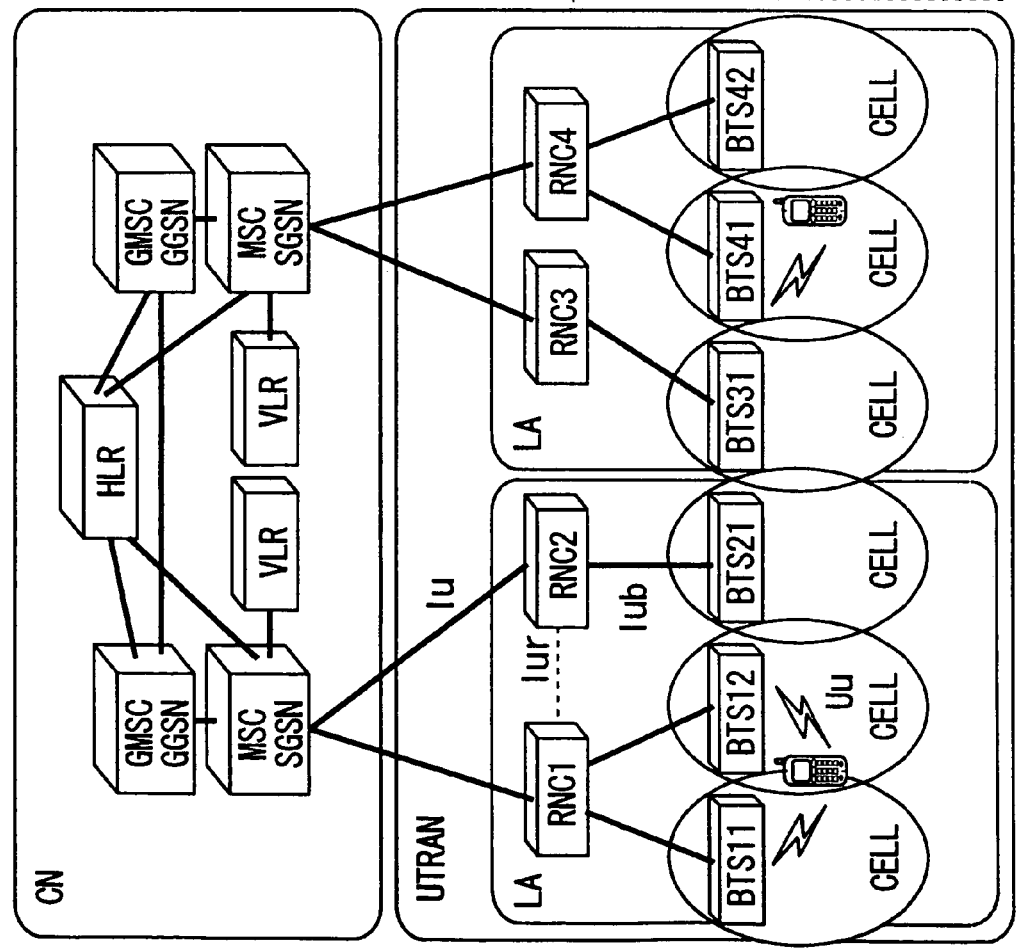

CN: CORE NETWORK HAVING FUNCTION OF PERFORMING SWITCHING PROCESSING
UTRAN: SUBSCRIBER ACCESS NETWORK CONTAINING WIRELESS PORTION
LA: LOCATION MANAGEMENT UNIT AT THE TIME WHEN TERMINAL DOES NOT PERFORM COMMUNICATION (CALLED "RA" IN THE CASE OF PACKET COMMUNICATION)
CELL: WIRELESS SERVICE AREA FORMED BY EACH BTS. CELL BECOMES LOCATION MANAGEMENT UNIT AT THE TIME WHEN TERMINAL PERFORMS COMMUNICATION
GMSC/MSC: SWITCHING APPARATUS FOR LINE CALL
GGSN/SGSN: SWITCHING APPARATUS FOR PACKET CALL
HLR: LOCATION MANAGEMENT REGISTER
VLR: VISITOR LOCATION MANAGEMENT REGISTER
RNCn: RAN (RADIO ACCESS NETWORK) CONTROL APPARATUS
BTSn: WIRELESS BASE STATION
Iu: INTERFACE BETWEEN CN AND RAN
Iur: INTERFACE BETWEEN RNCs
Iub: INTERFACE BETWEEN RNC AND BTS
Uu: INTERFACE BETWEEN BTS AND TERMINAL

| UPPER LAI No | BTS | LOWER LAI No |
|---|---|---|
| bb | NBTS1 | bx |
|  | NBTS2 | by |
|  | NBTS3 | bz |
|  |  |  |

FIG. 15A

| HLR | T11 |
|---|---|
| IMSI | VLR NUMBER |
| 1100 | 1 |
| 2100 | 1 |
| . | . |
| . | . |

| VLR1 | | T21 |
|---|---|---|
| IMSI | LAI | TMSI |
| 1100 | 10 | 0001 |
| 2100 | 10 | 0002 |
| . | . | . |
| . | . | . |

| VLR2 | | T31 |
|---|---|---|
| IMSI | LAI | TMSI |
| | | |
| | | |
| . | . | . |
| . | . | . |

CHANGE MADE AT ⟨3⟩        CHANGE MADE AT ⟨1⟩

| HLR | T12 |
|---|---|
| IMSI | VLR NUMBER |
| 1100 | 2 |
| 2100 | 1 |
| . | . |
| . | . |

| VLR1 | | T22 |
|---|---|---|
| IMSI | LAI | TMSI |
| 2100 | 10 | 0002 |
| | | |
| . | . | . |
| . | . | . |

| VLR2 | | T32 |
|---|---|---|
| IMSI | LAI | TMSI |
| 1100 | 20 | 0001 |
| | | |
| . | . | . |
| . | . | . |

NO CHANGE IS MADE AT ⟨2⟩

FIG. 15B

TERMINAL REGISTRATION TABLE ~3

| BTS | CELL-ID | IMSI | |
|---|---|---|---|
| NBTS1 | 1001 | 1100 | MULTIPLE IS POSSIBLE |
| NBTS2 | 1002 | 2100 | |
| NBTS3 | 1003 | | |
| | | | |

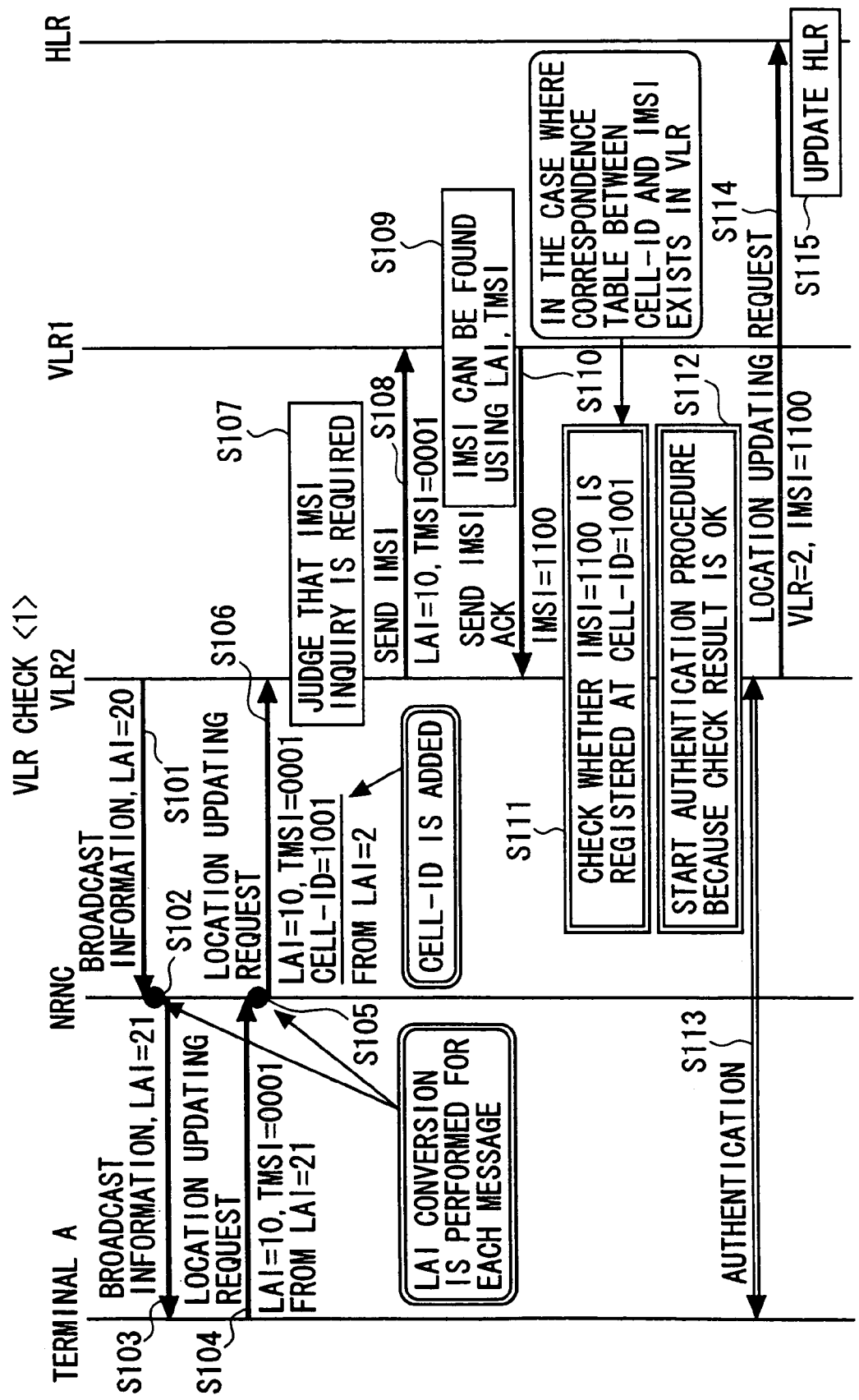

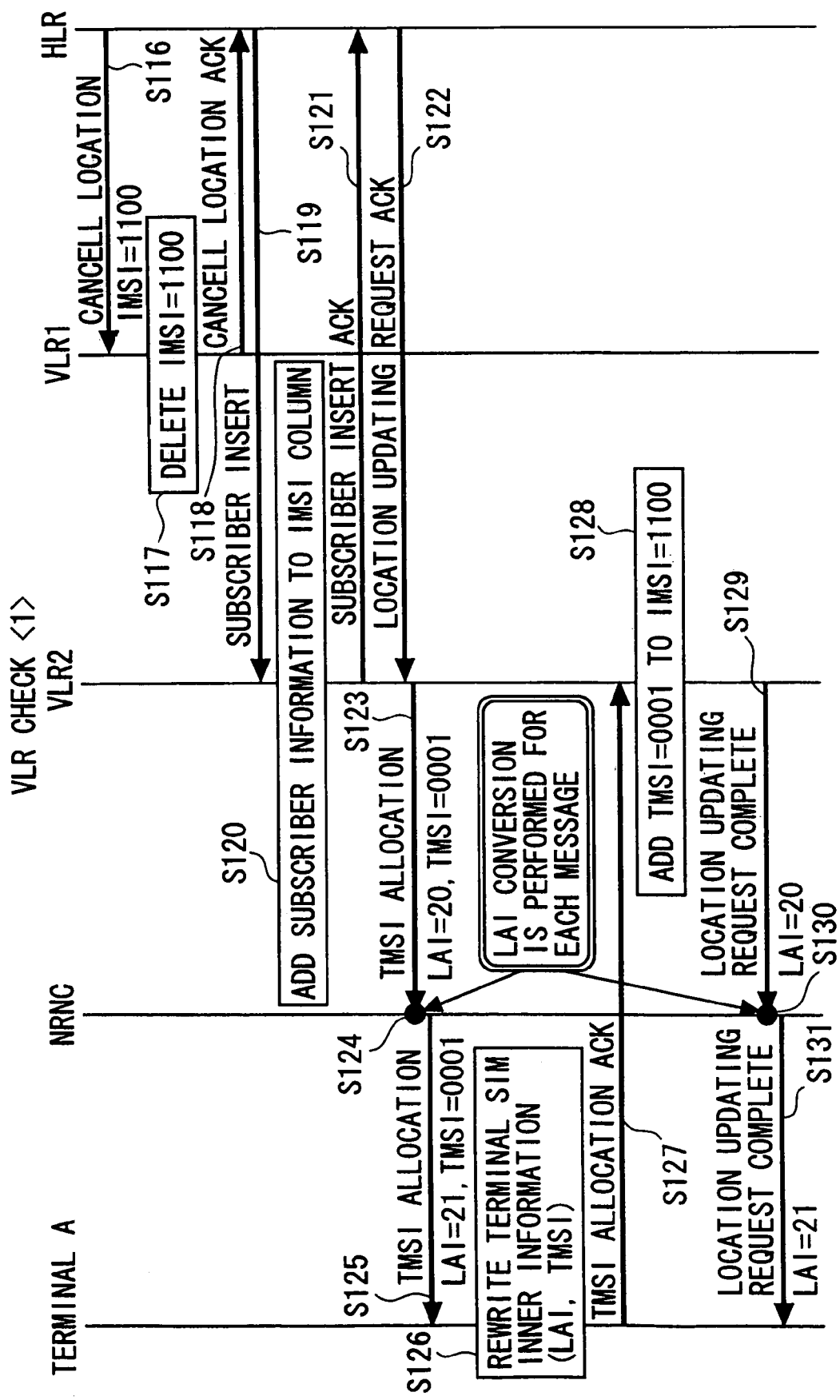

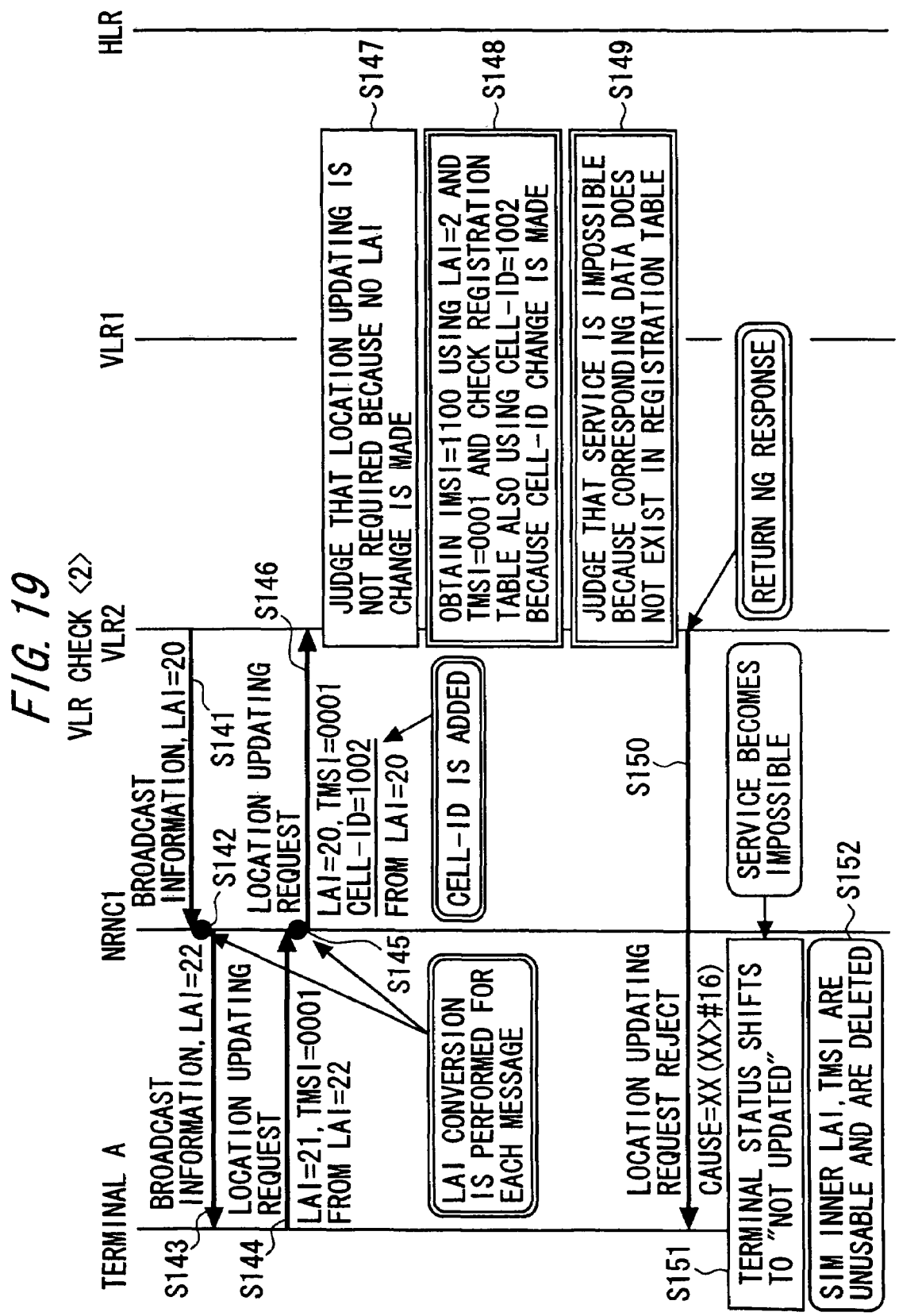

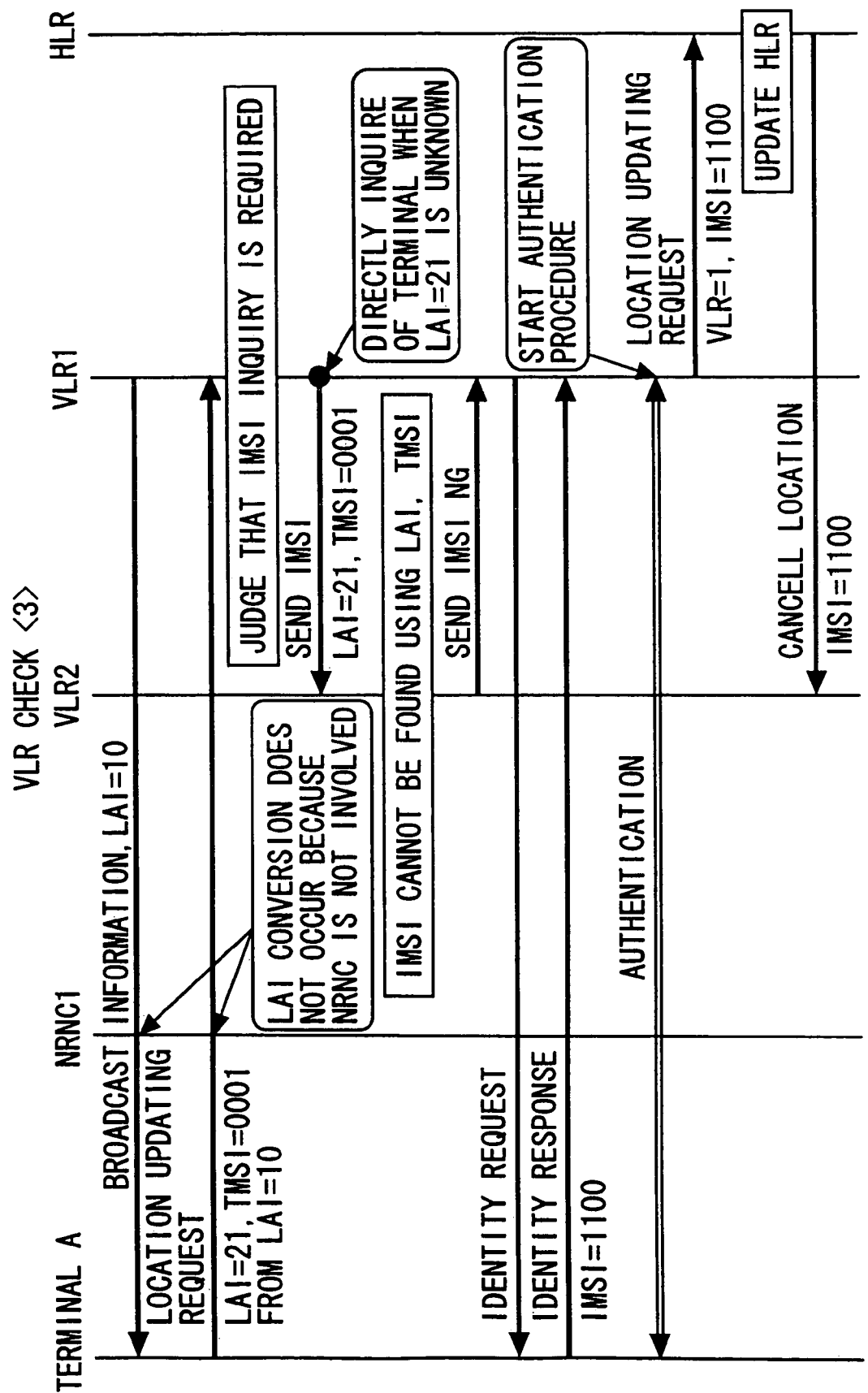

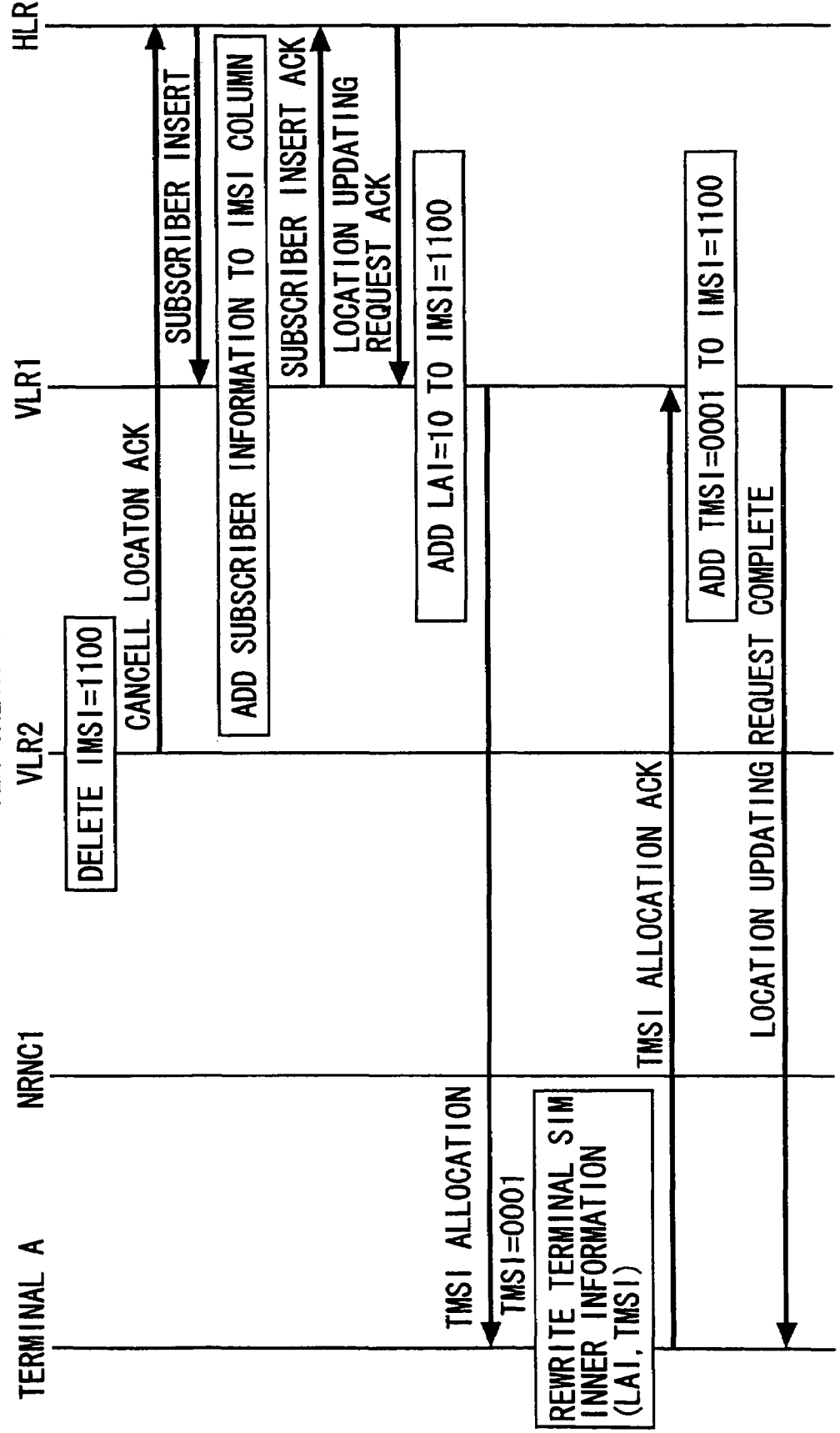

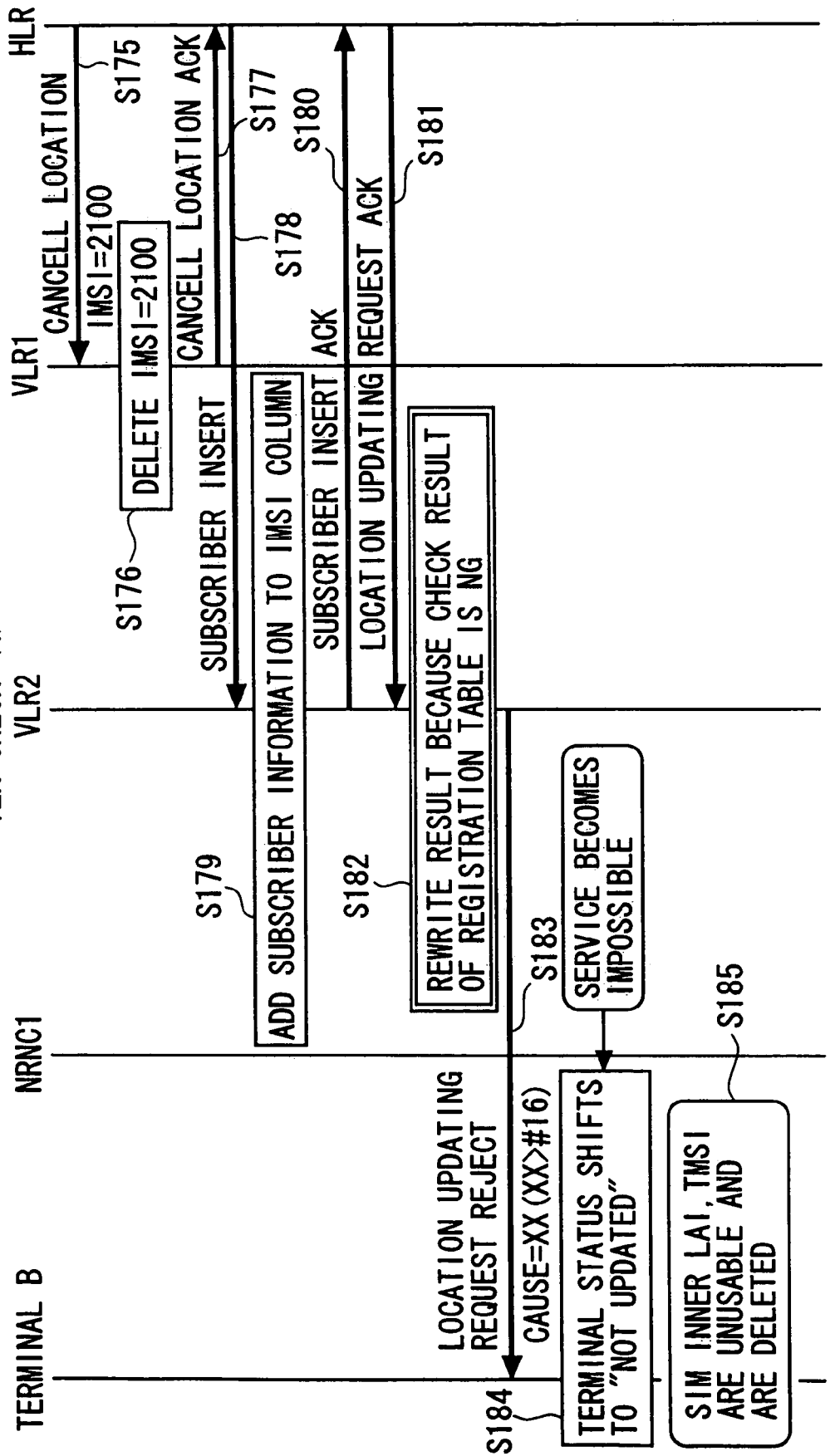

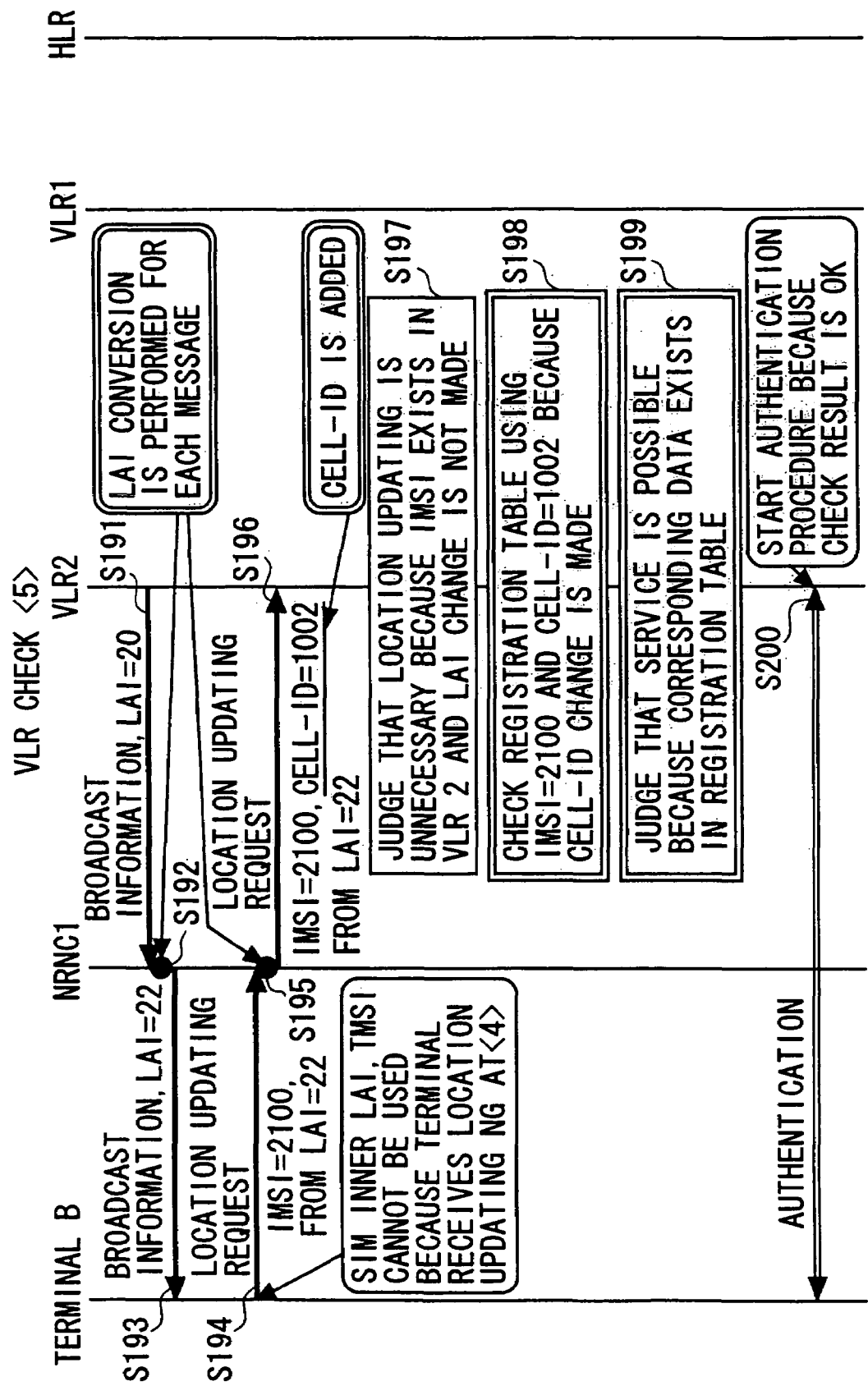

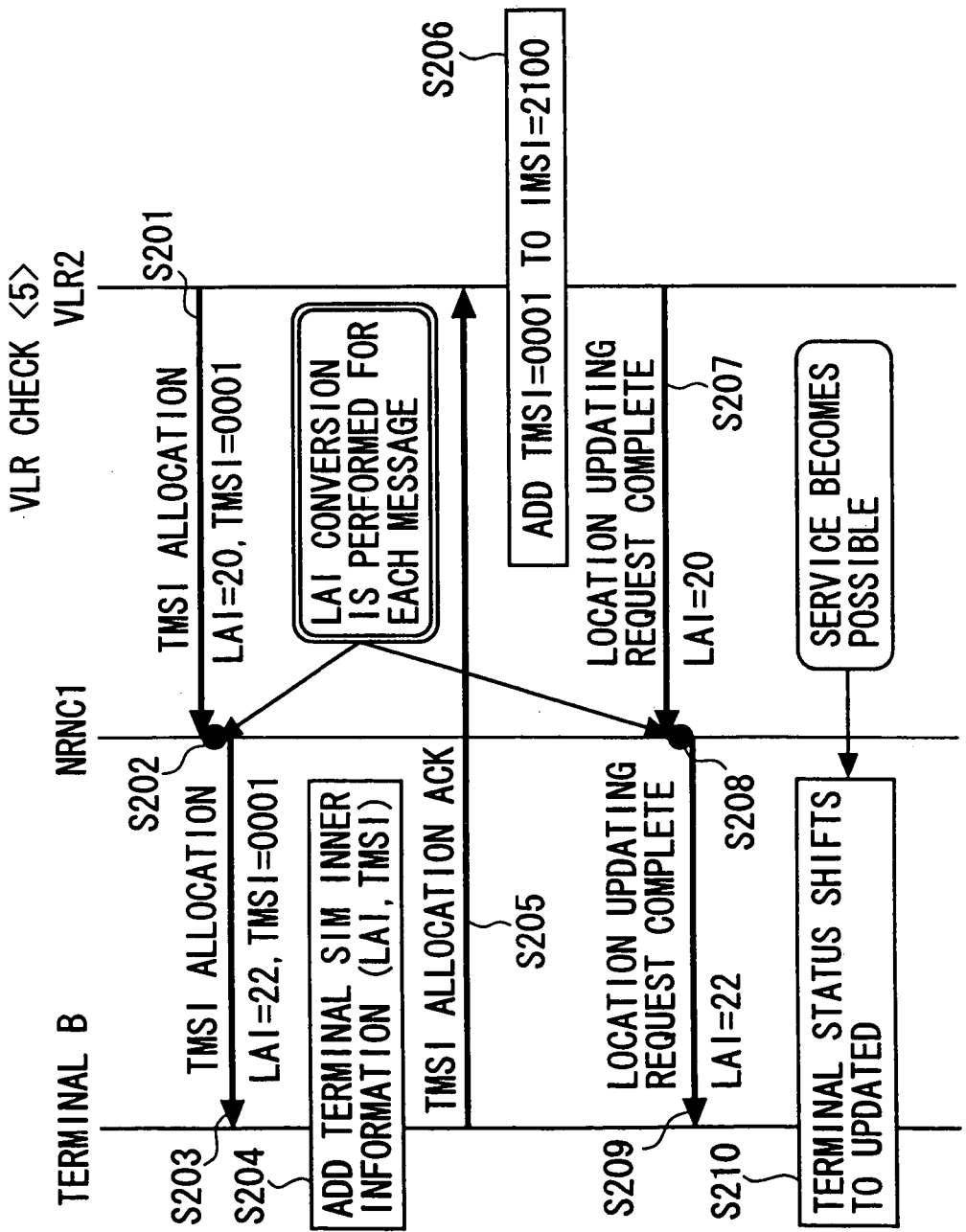

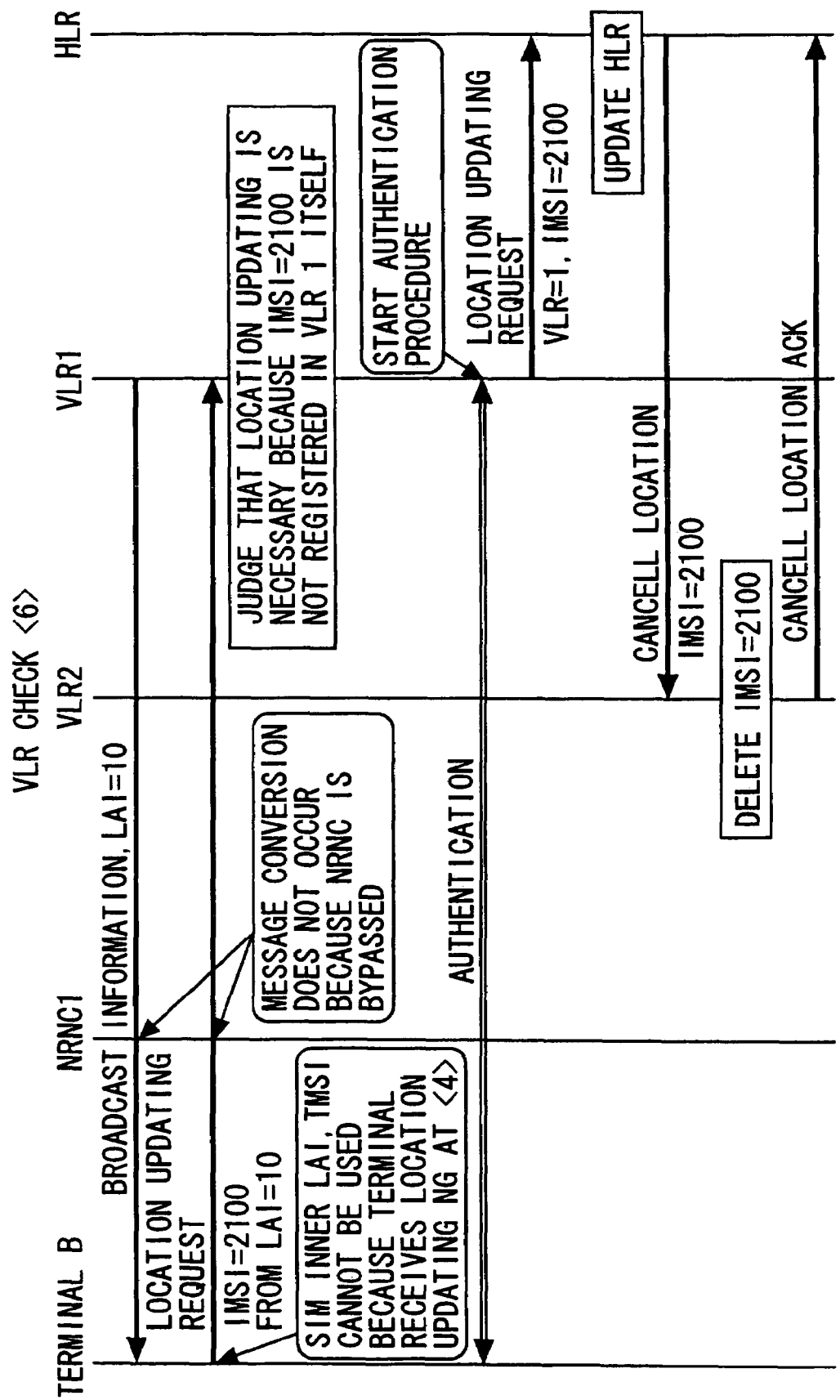

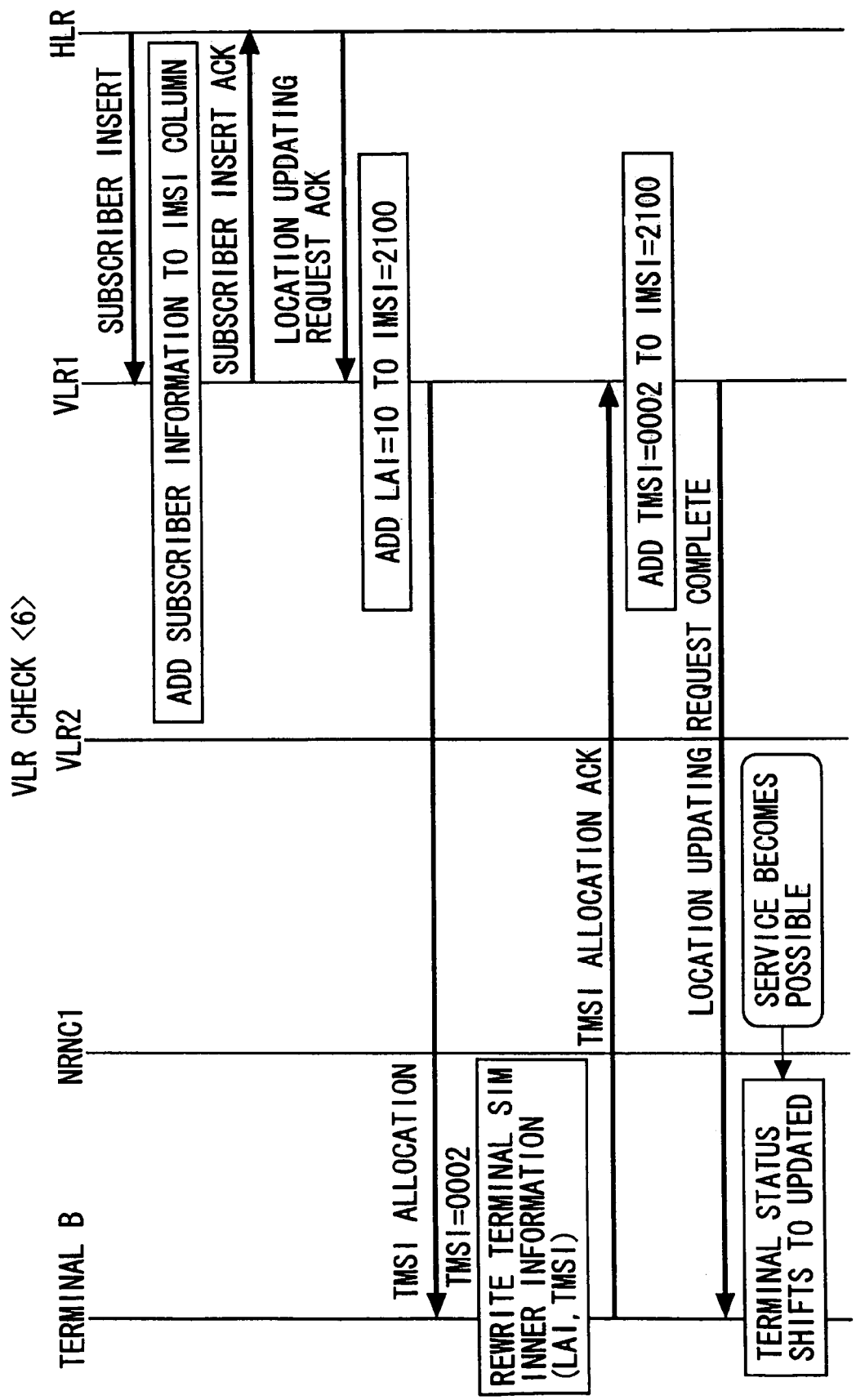

| UPPER LAI No | BTS | LOWER LAI No |
|---|---|---|
| 20 | NBTS1 | 21 |
|  | NBTS2 | 22 |
|  | NBTS3 | 23 |
|  |  |  |

FIG. 28A

| HLR | T11 |
|---|---|
| IMSI | VLR NUMBER |
| 1100 | 1 |
| 2100 | 1 |
| . | . |
| . | . |

| VLR1 | | T21 |
|---|---|---|
| IMSI | LAI | TMSI |
| 1100 | 1 | 0001 |
| 2100 | 1 | 0002 |
| . | . | . |
| . | . | . |

| VLR2 | | T31 |
|---|---|---|
| IMSI | LAI | TMSI |
| | | |
| | | |
| . | . | . |
| . | . | . |

⇧ CHANGE MADE AT ⟨3⟩        ⇩ CHANGE MADE AT ⟨1⟩

| HLR | T12 |
|---|---|
| IMSI | VLR NUMBER |
| 1100 | 2 |
| 2100 | 1 |
| . | . |
| . | . |

| VLR1 | | T22 |
|---|---|---|
| IMSI | LAI | TMSI |
| 2100 | 1 | 0002 |
| | | |
| . | . | . |
| . | . | . |

| VLR2 | | T32 |
|---|---|---|
| IMSI | LAI | TMSI |
| 1100 | 1 | 0001 |
| | | |
| . | . | . |
| . | . | . |

NO CHANGE IS MADE AT ⟨2⟩

FIG. 28B

TERMINAL REGISTRATION TABLE  6

| BTS | CELL-ID | IMSI | TMSI |
|---|---|---|---|
| NBTS1 | 1001 | 1100 | 0001 |
| NBTS2 | 1002 | 2100 | |
| NBTS3 | 1003 | | |
| | | | |

| HLR | T11 |
|---|---|
| IMSI | VLR NUMBER |
| 1100 | 1 |
| 2100 | 1 |
| . | . |
| . | . |

| VLR1 | | T21 |
|---|---|---|
| IMSI | LAI | TMSI |
| 1100 | 1 | 0001 |
| 2100 | 1 | 0002 |
| . | . | . |
| . | . | . |

| VLR2 | | T31 |
|---|---|---|
| IMSI | LAI | TMSI |
| | | |
| | | |
| . | . | . |
| . | . | . |

NO CHANGE IS MADE AT <4>/<6>

CHANGE MADE AT <5>

| HLR | T13 |
|---|---|
| IMSI | VLR NUMBER |
| 1100 | 2 |
| 2100 | 1 |
| . | . |
| . | . |

| VLR1 | | T23 |
|---|---|---|
| IMSI | LAI | TMSI |
| 1100 | 1 | 0001 |
| | | |
| . | . | . |
| . | . | . |

| VLR2 | | T33 |
|---|---|---|
| IMSI | LAI | TMSI |
| 2100 | 1 | 0001 |
| | | |
| . | . | . |
| . | . | . |

TERMINAL REGISTRATION TABLE 6

| BTS | CELL-ID | IMSI | TMSI |
|---|---|---|---|
| NBTS1 | 1001 | 1100 | |
| NBTS2 | 1002 | 2100 | 0001 |
| NBTS3 | 1003 | | |
| | | | |

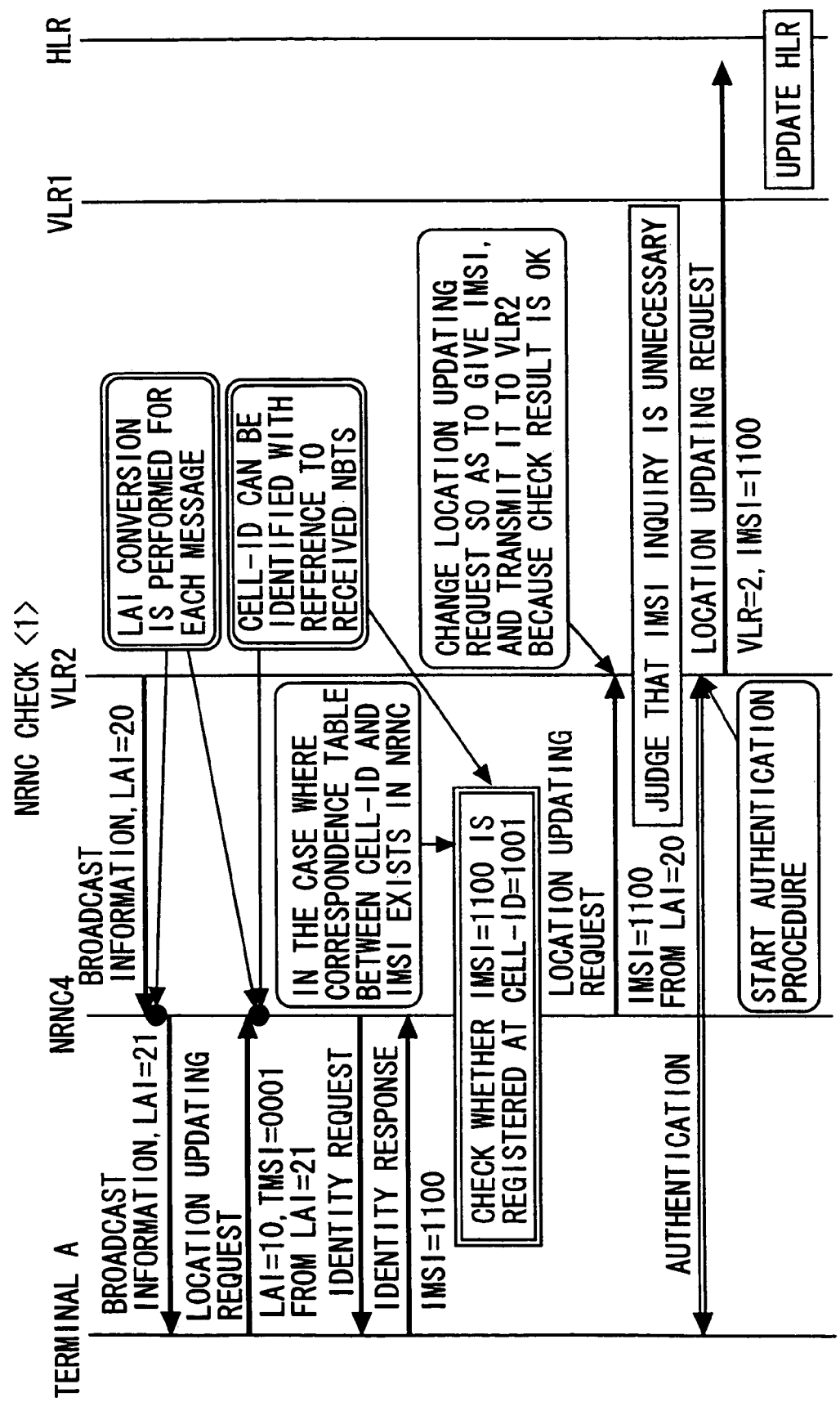

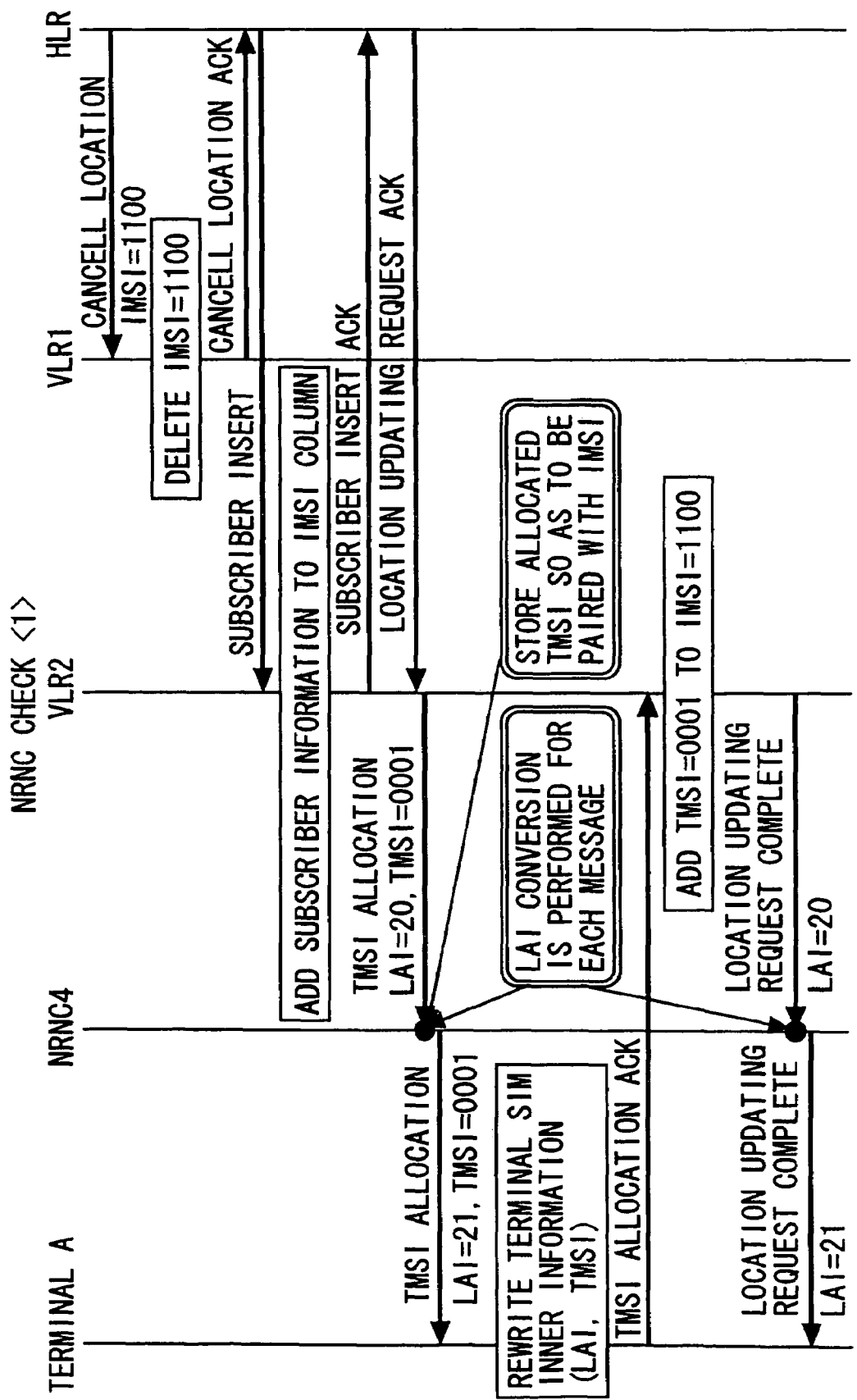

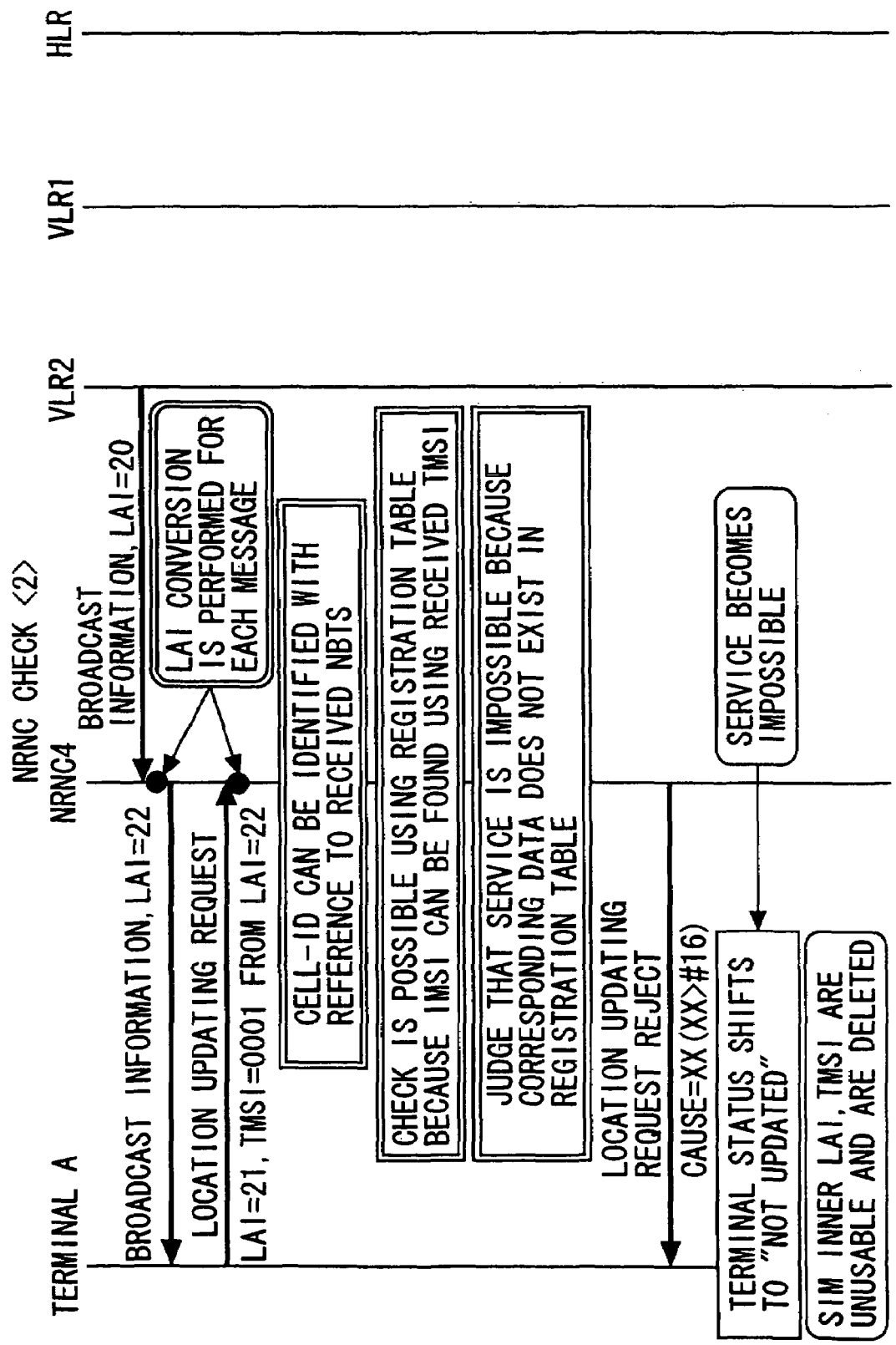

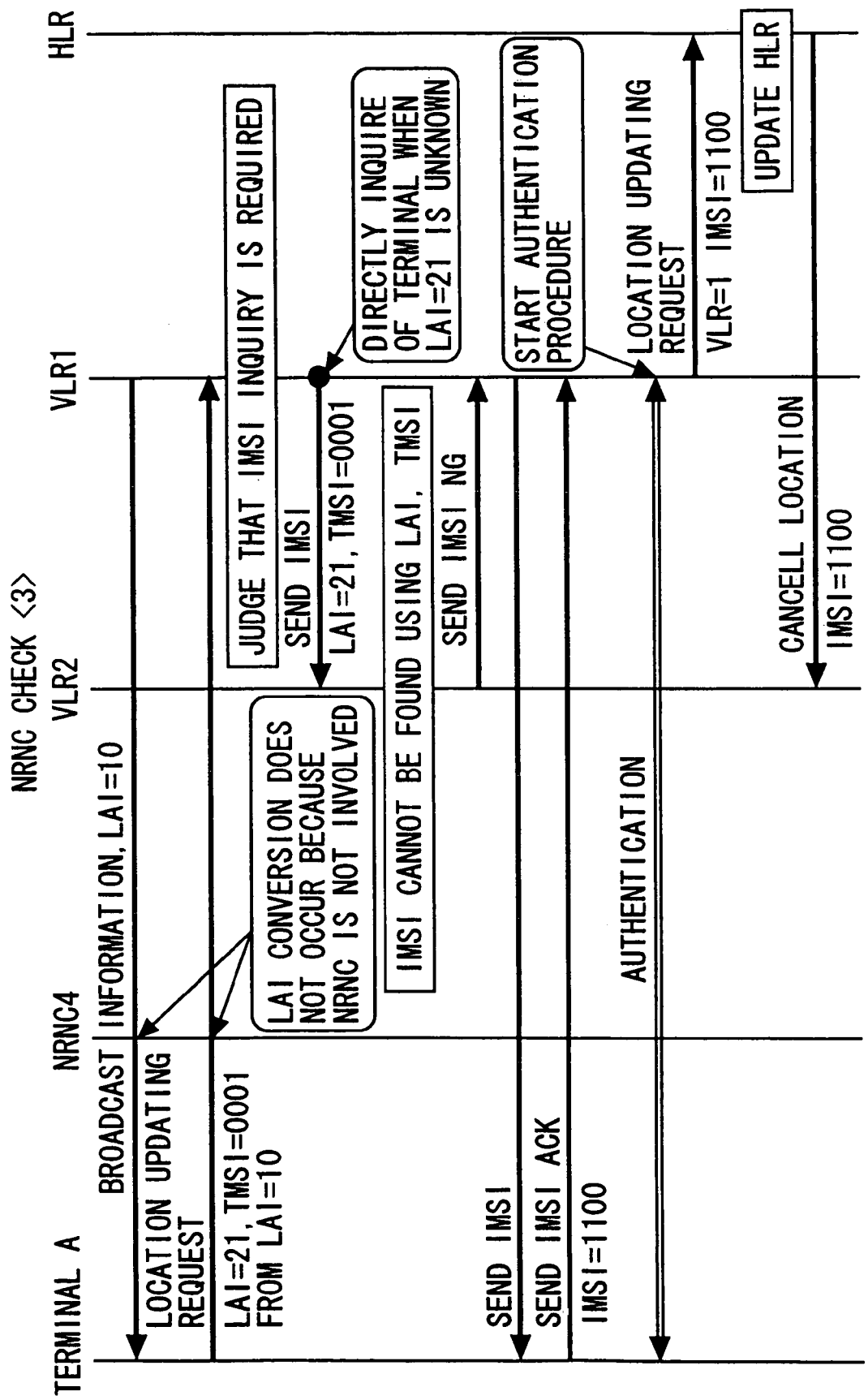

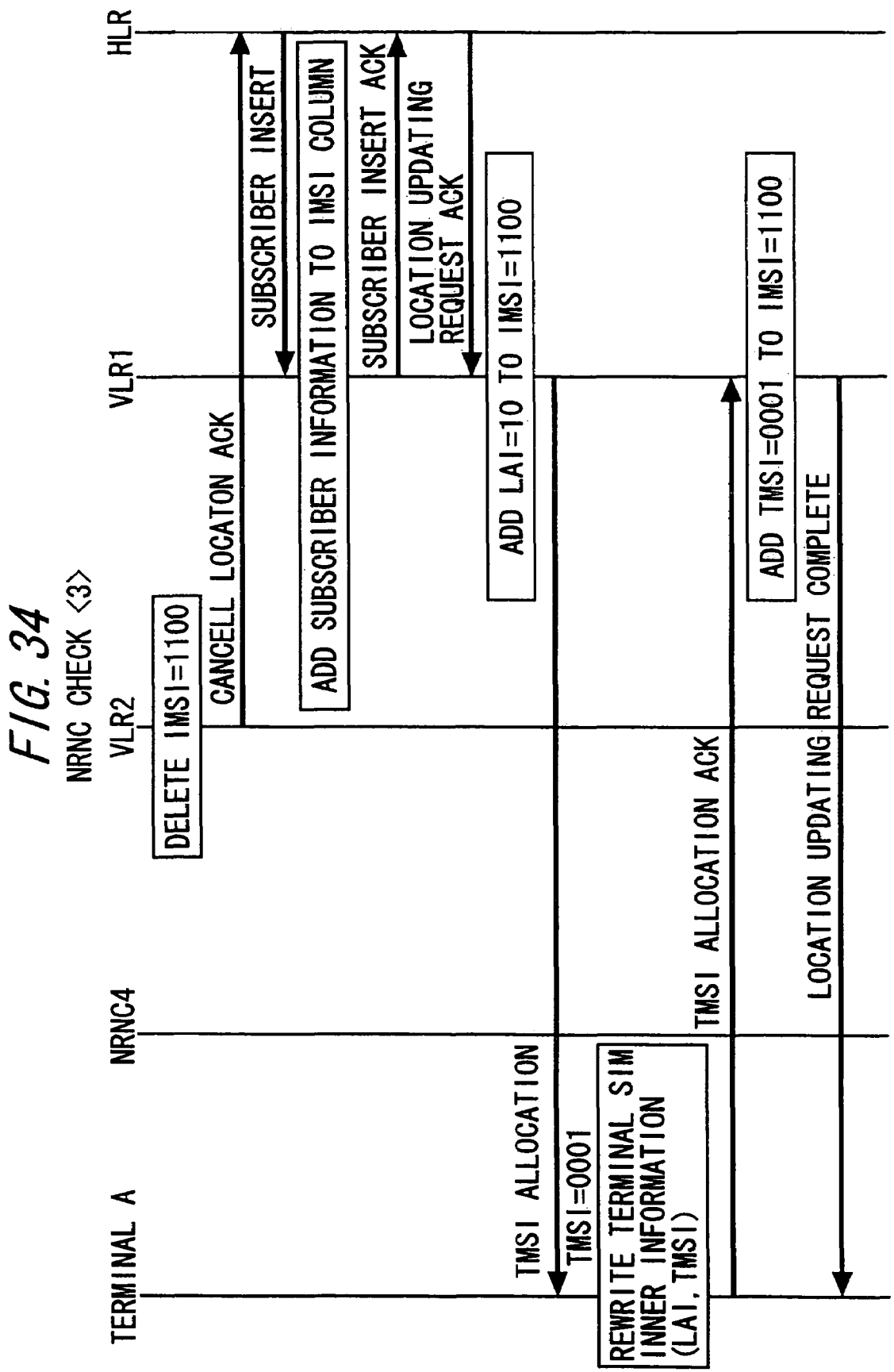

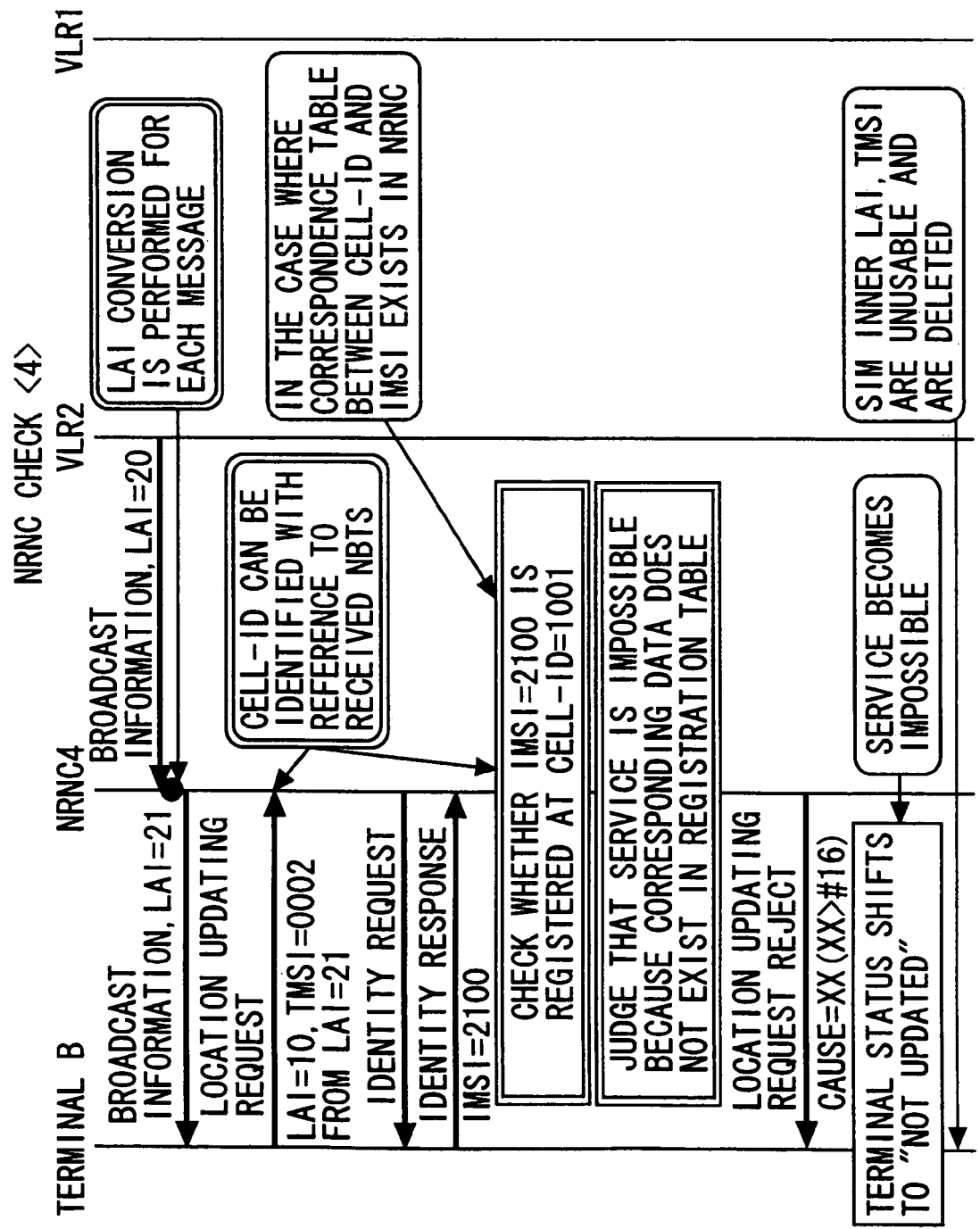

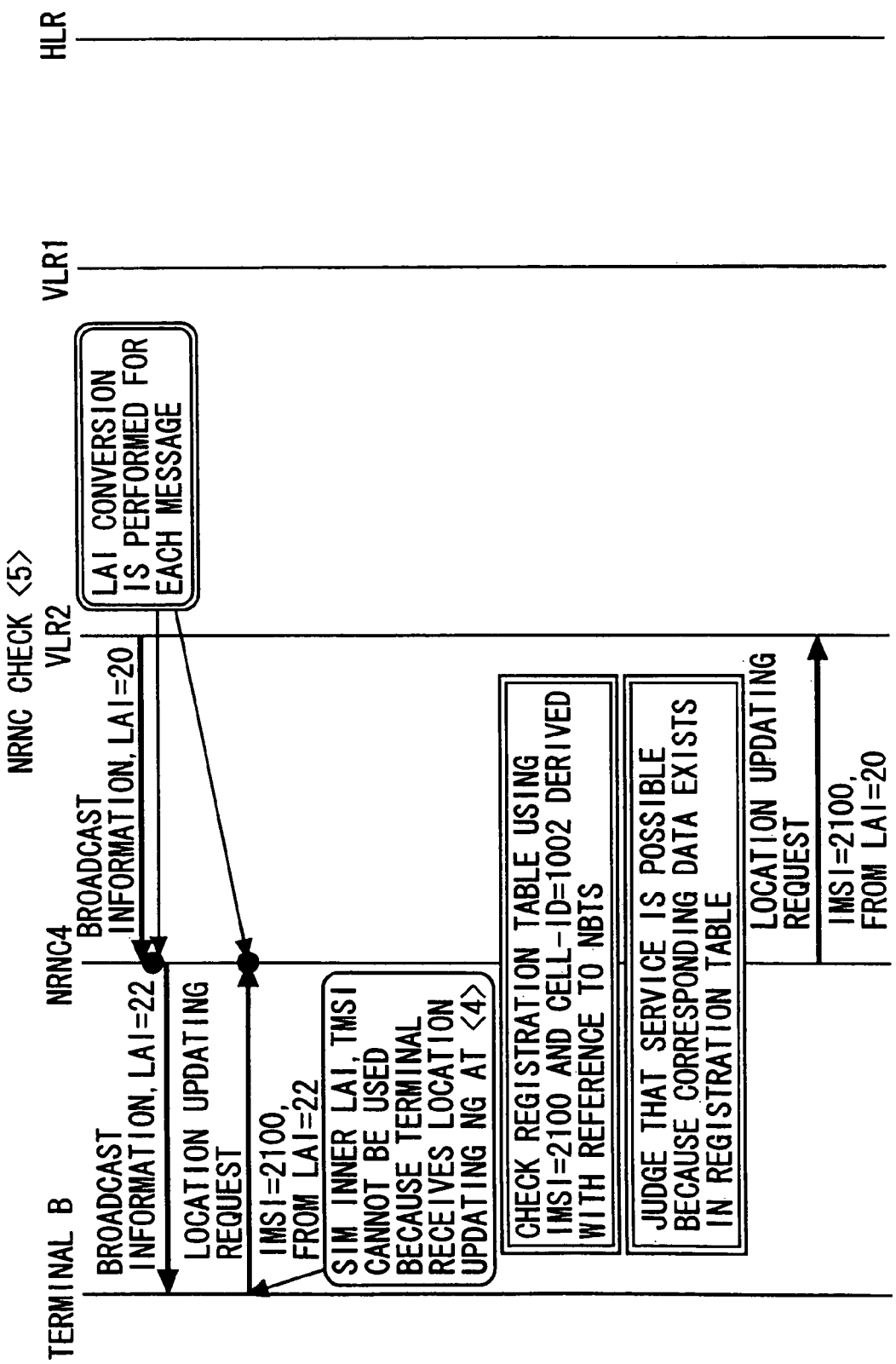

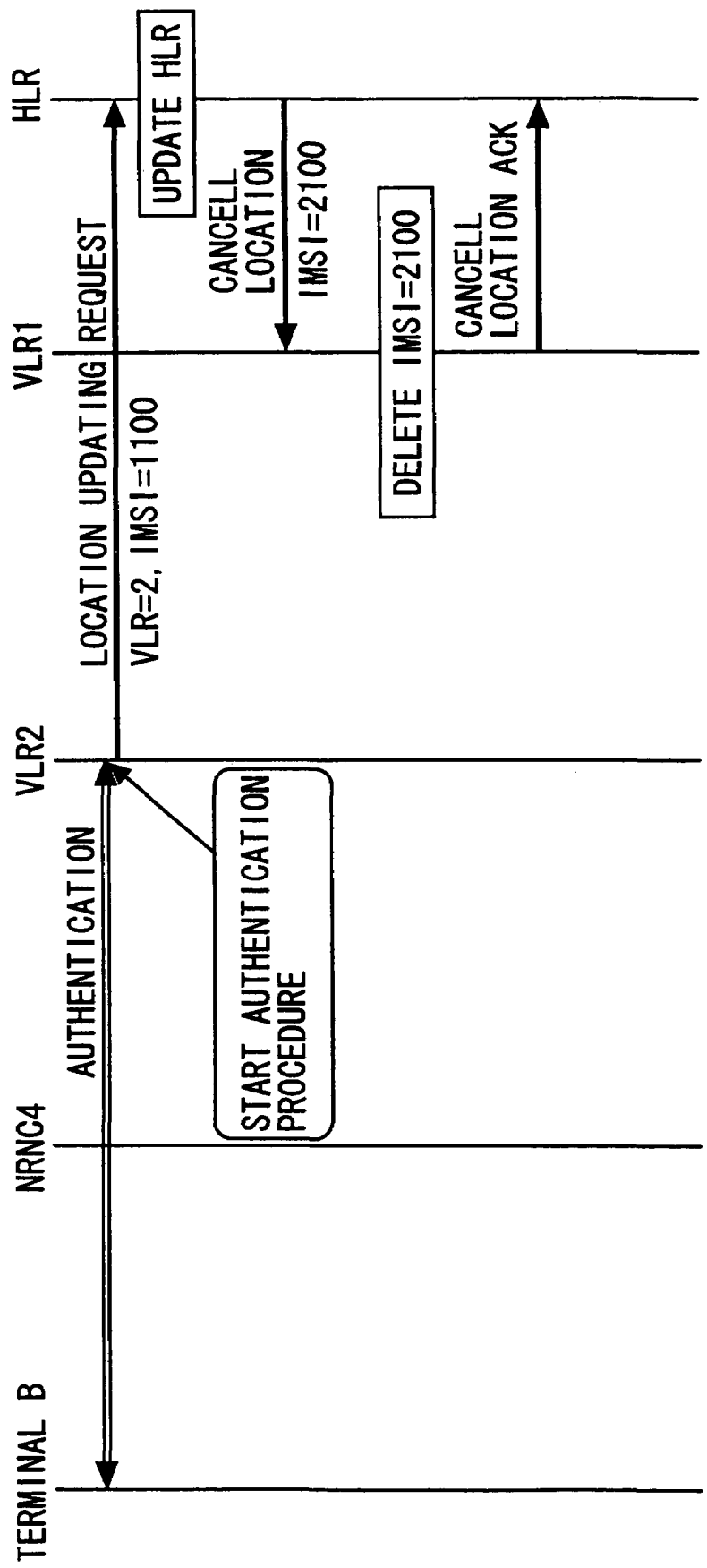

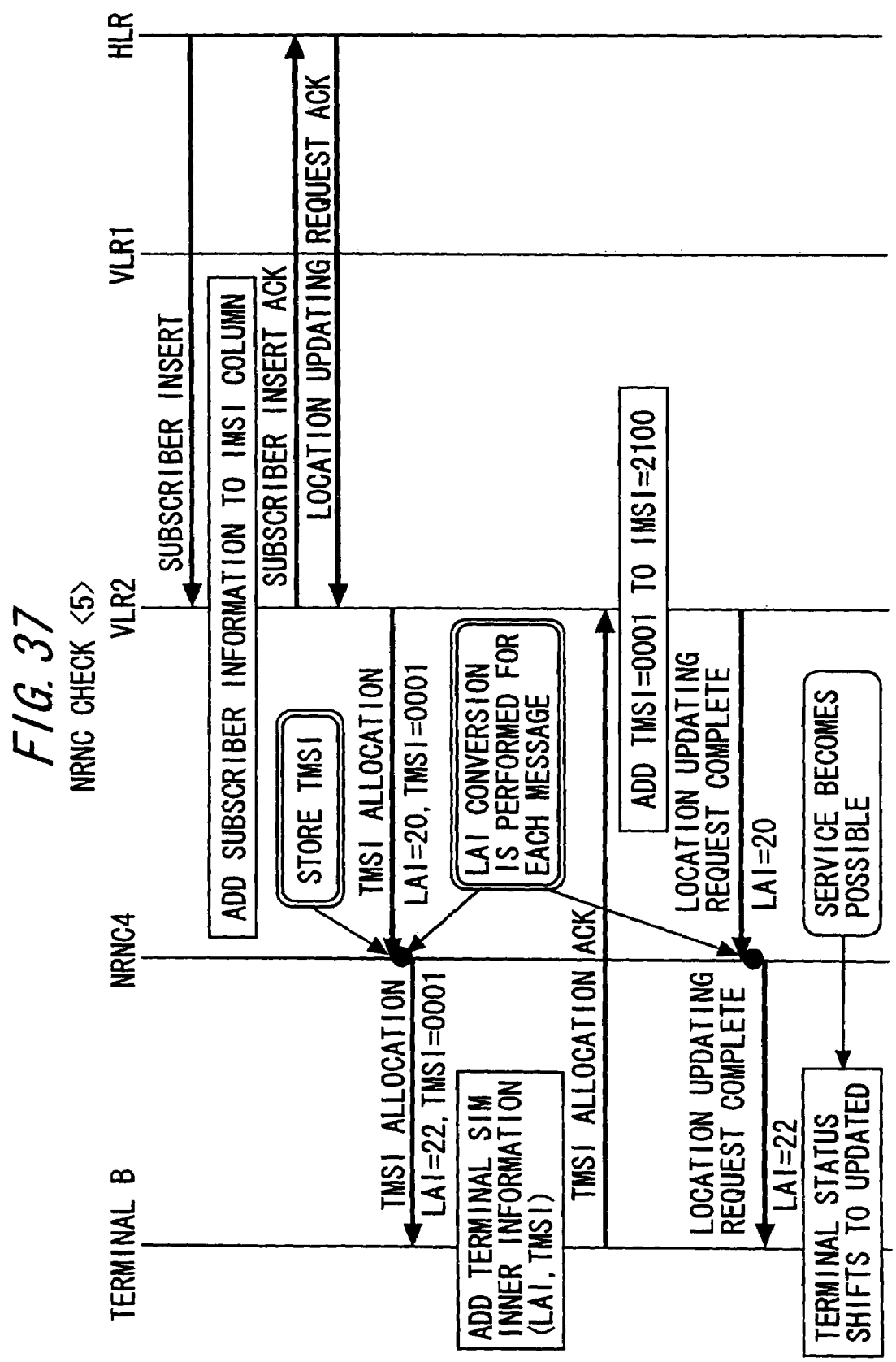

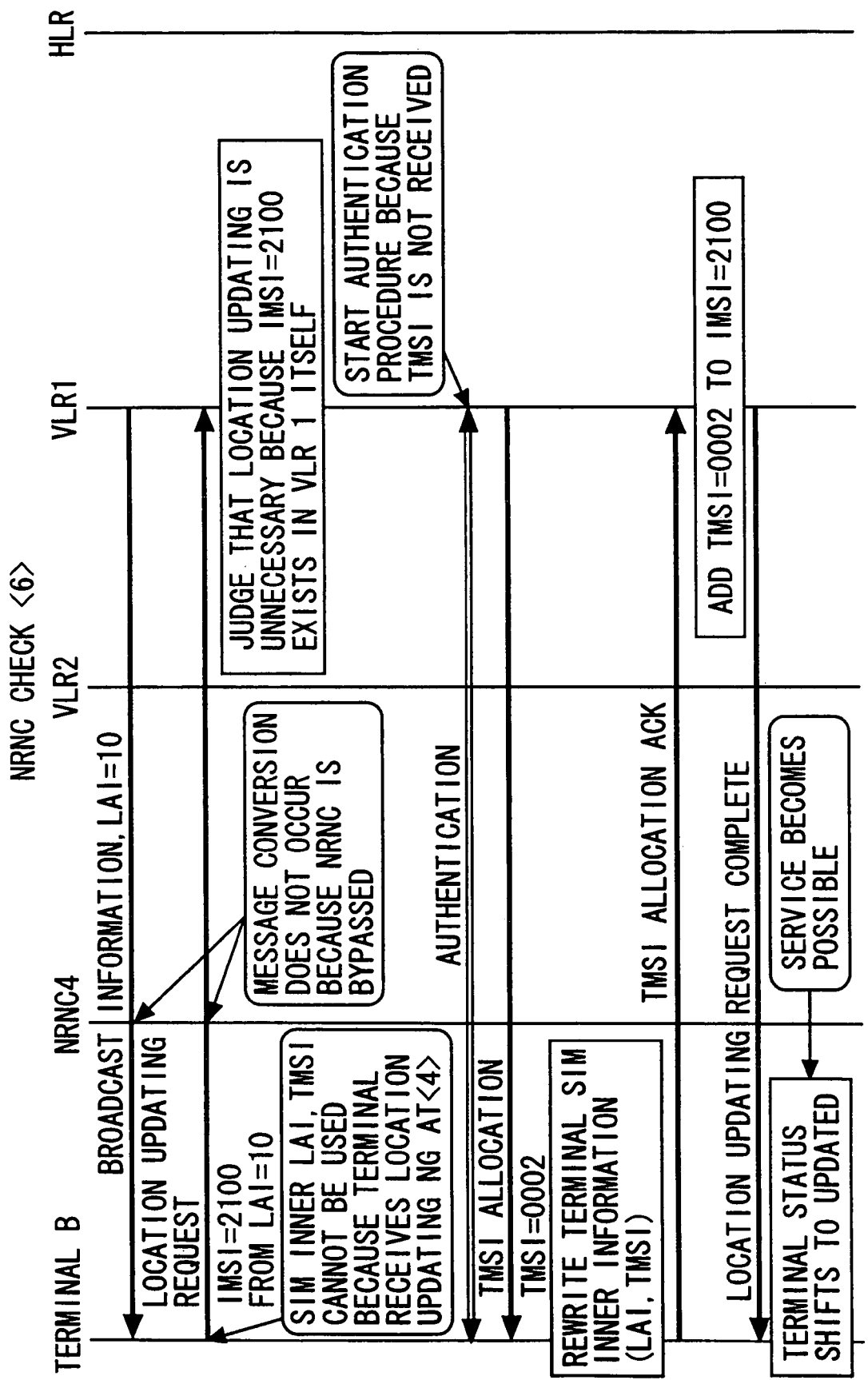

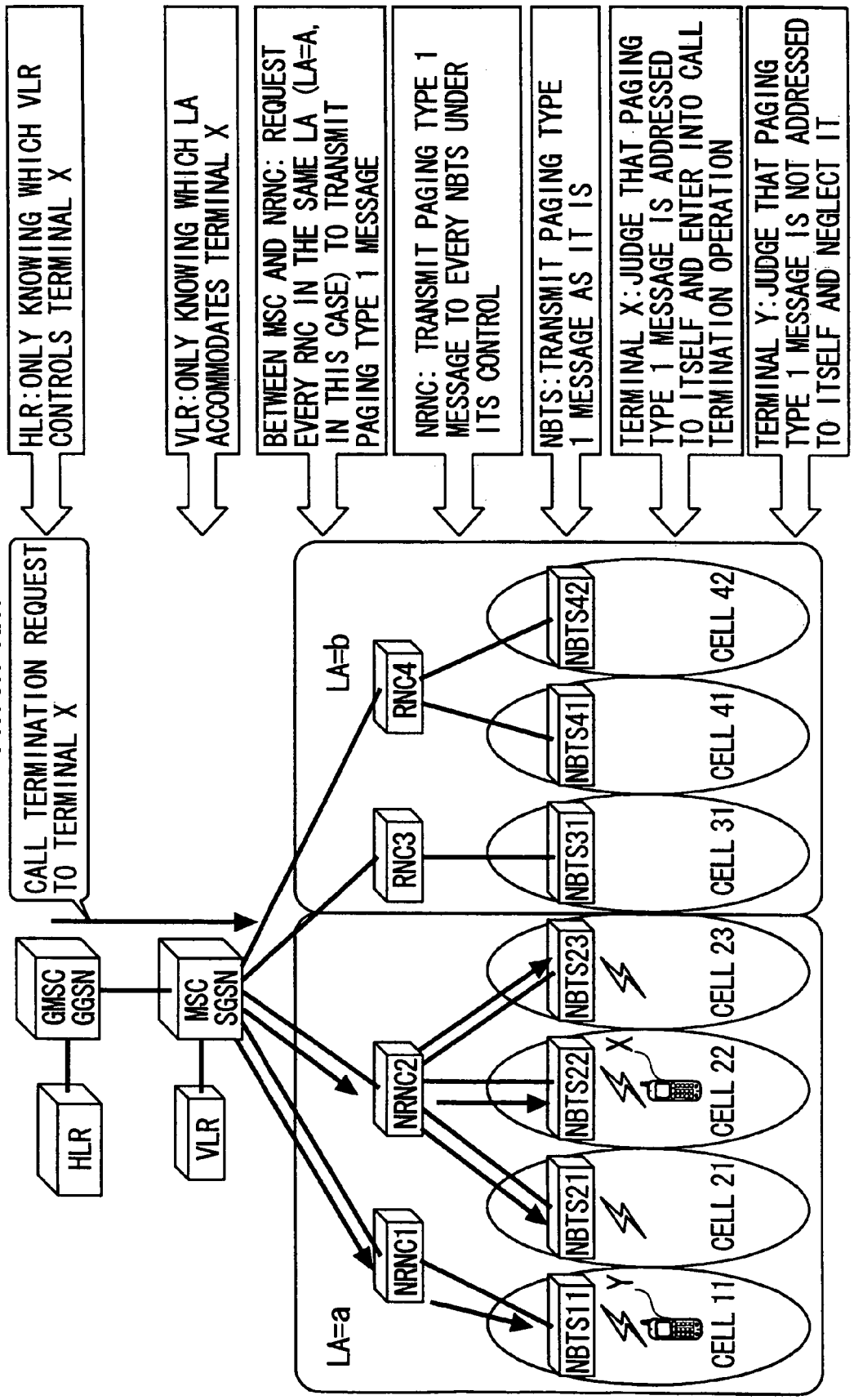

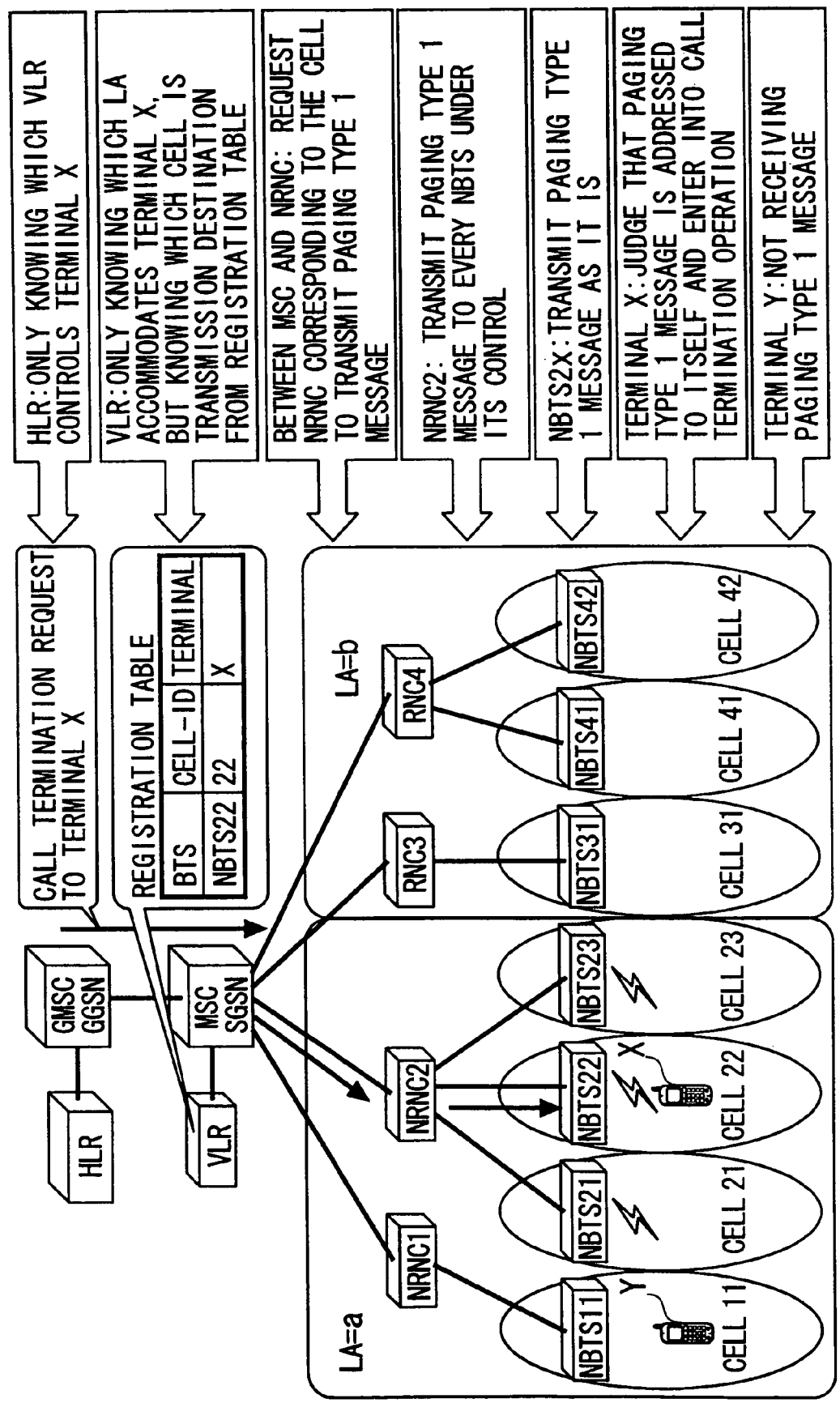

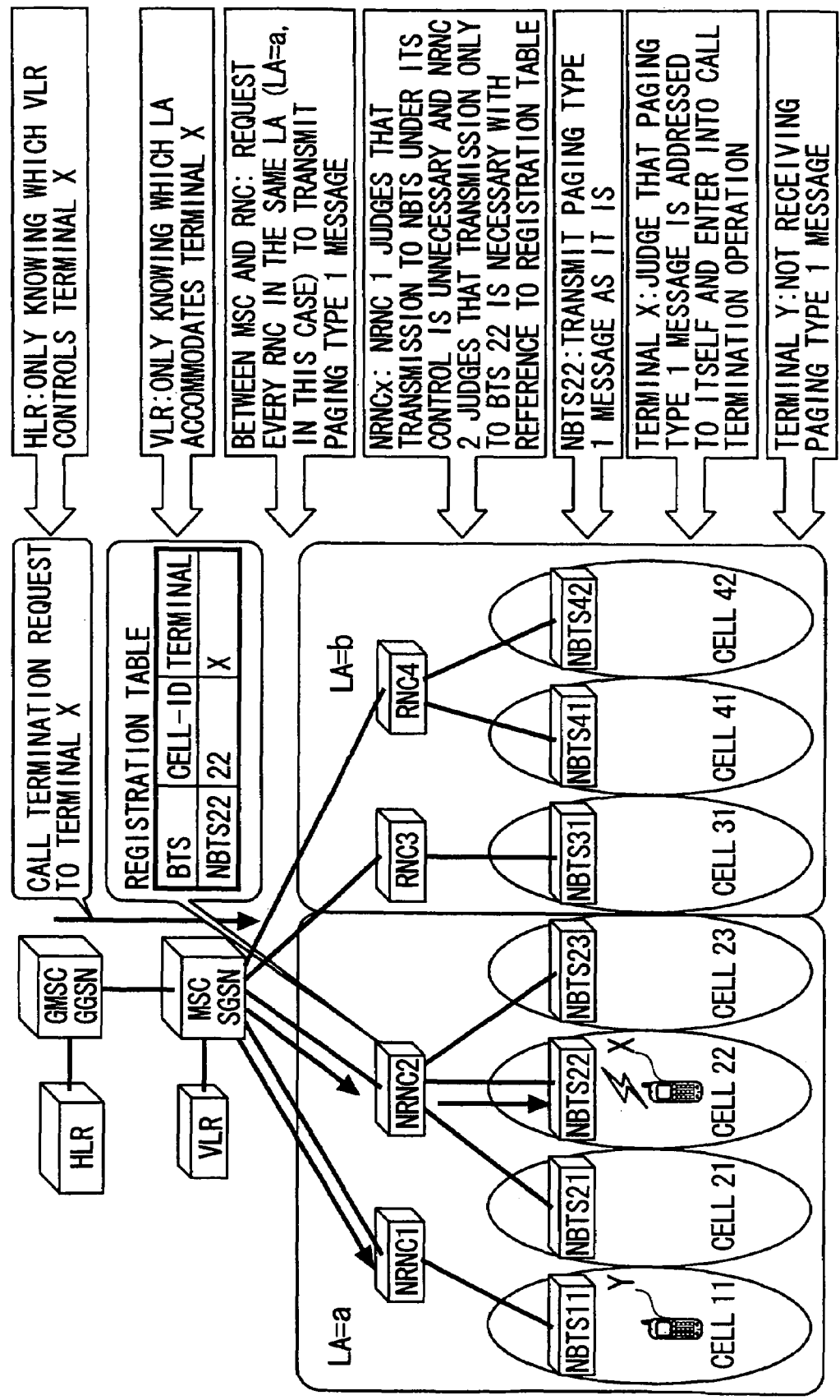

| BTS | CELL-ID | IMSI | |
|---|---|---|---|
| NBTS1 | 1001 | 1100 | (MULTIPLE IS POSSIBLE) |
| NBTS2 | 1002 | 2100 | |

EXISTING IN VLR 2

| BTS | CELL-ID | IMSI | |
|---|---|---|---|
| NBTS1 | 1001 | 1100 | (MULTIPLE IS POSSIBLE) |
| NBTS2 | 1002 | 2100 | |

EXISTING IN VLR 2

| BTS | CELL-ID | IMSI | |
|---|---|---|---|
| NBTS1 | 1001 | 1100 | (MULTIPLE IS POSSIBLE) |
| NBTS2 | 1002 | 2100 | |

EXISTING IN VLR 2

| BTS | CELL-ID | IMSI | |
|---|---|---|---|
| NBTS1 | 1001 | 1100 | (MULTIPLE IS POSSIBLE) |
| NBTS2 | 1002 | 2100 | |

EXISTING IN VLR 2

| BTS | CELL-ID | IMSI | |
|---|---|---|---|
| NBTS1 | 1001 | 1100 | (MULTIPLE IS POSSIBLE) |
| NBTS2 | 1002 | 2100 | |

EXISTING IN NRNC

| BTS | CELL-ID | IMSI | |
|---|---|---|---|
| NBTS1 | 1001 | 1100 | (MULTIPLE IS POSSIBLE) |
| NBTS2 | 1002 | 2100 | |

EXISTING IN NRNC

| BTS | CELL-ID | IMSI | |
|---|---|---|---|
| NBTS1 | 1001 | 1100 | (MULTIPLE IS POSSIBLE) |
| NBTS2 | 1002 | 2100 | |

EXISTING IN NRNC

| BTS | CELL-ID | IMSI | |
|---|---|---|---|
| NBTS1 | 1001 | 1100 | (MULTIPLE IS POSSIBLE) |
| NBTS2 | 1002 | 2100 | |

EXISTING IN NRNC

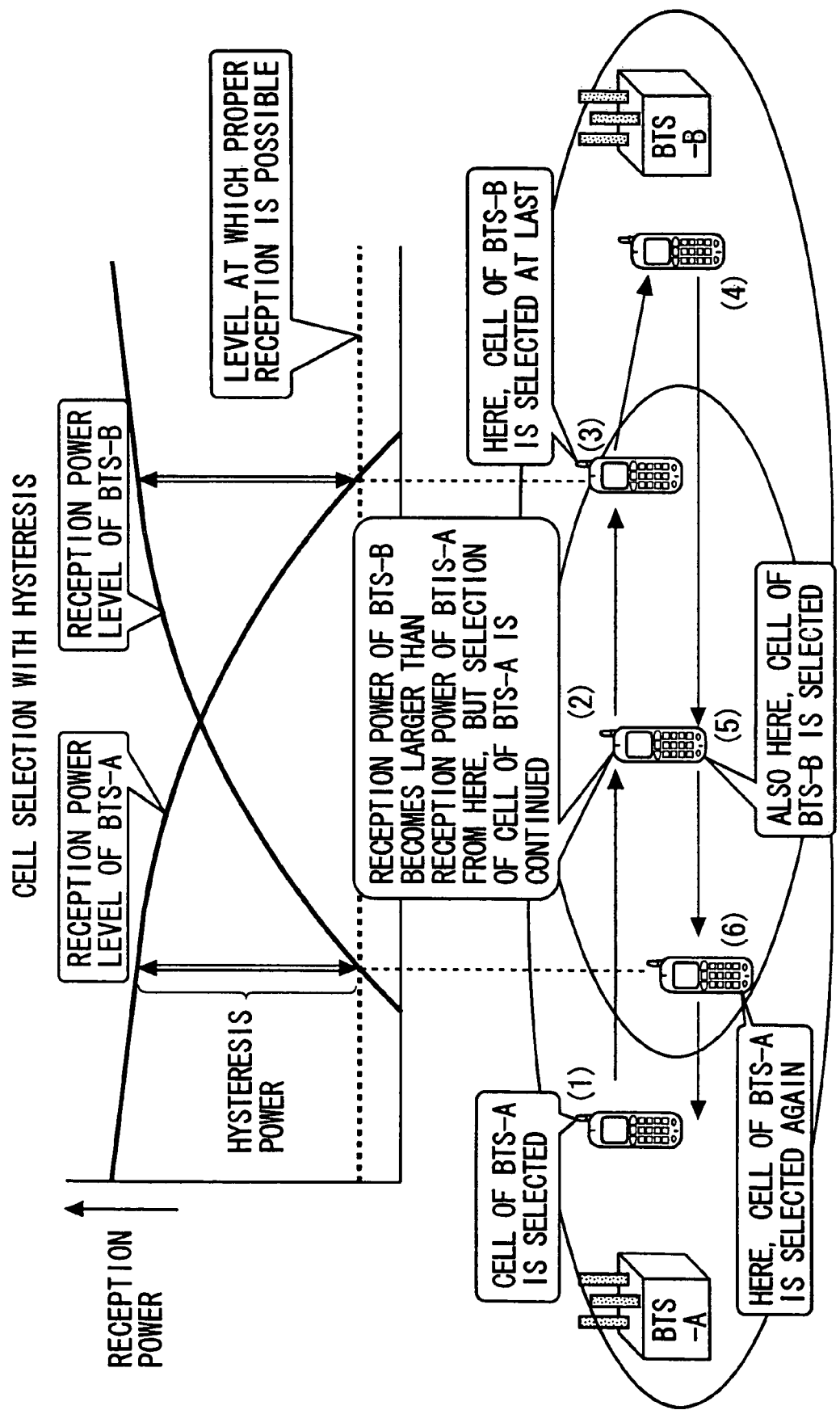

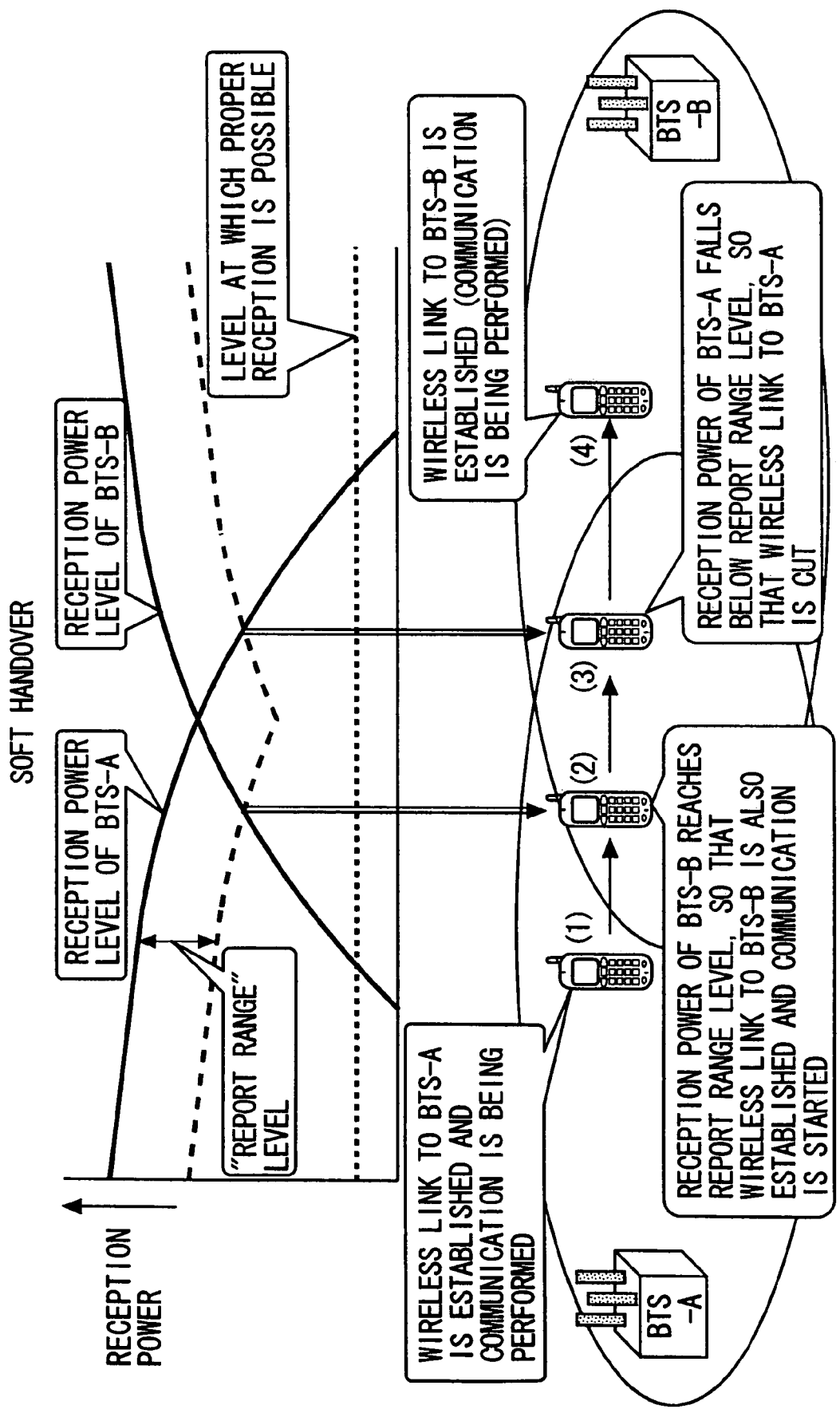

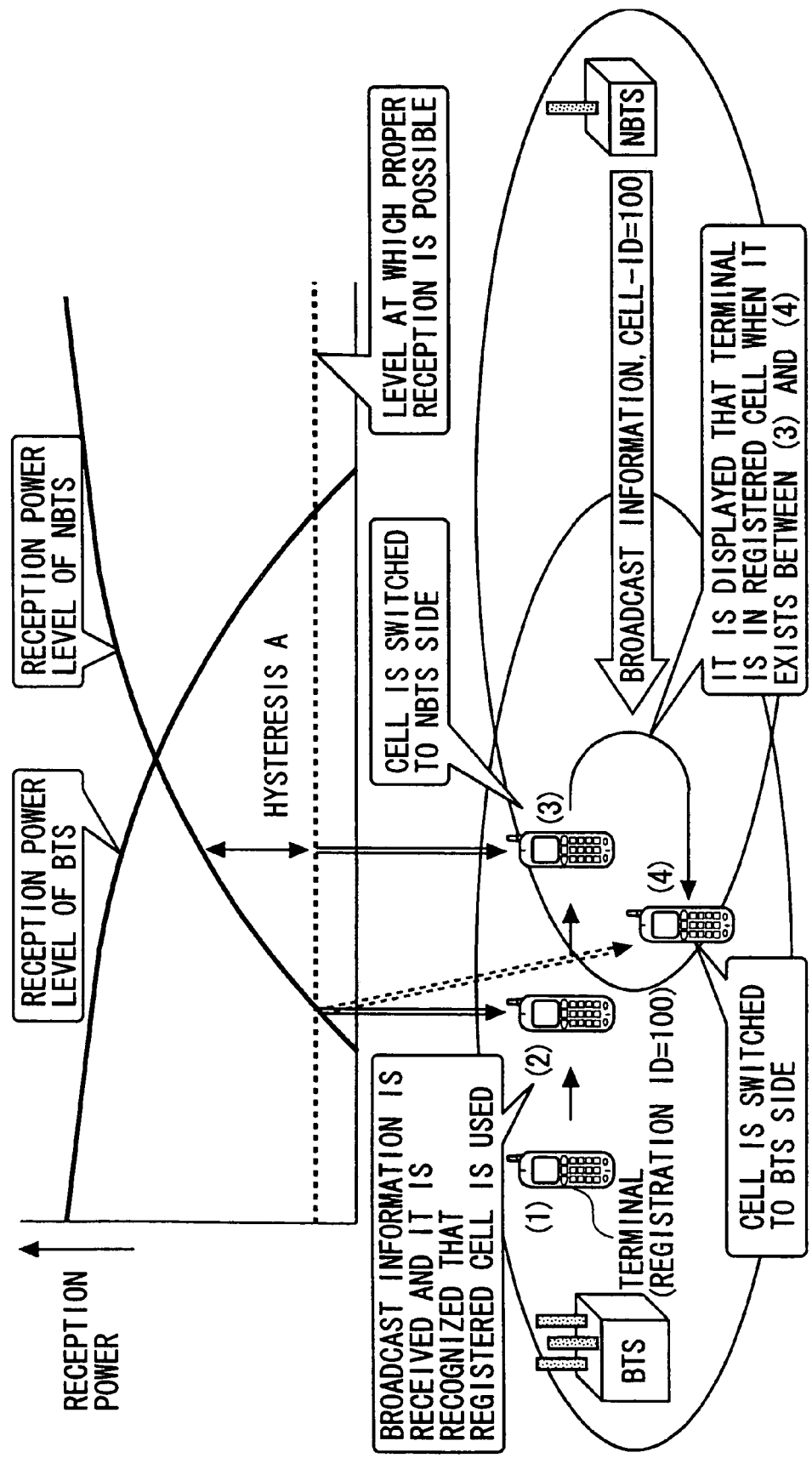

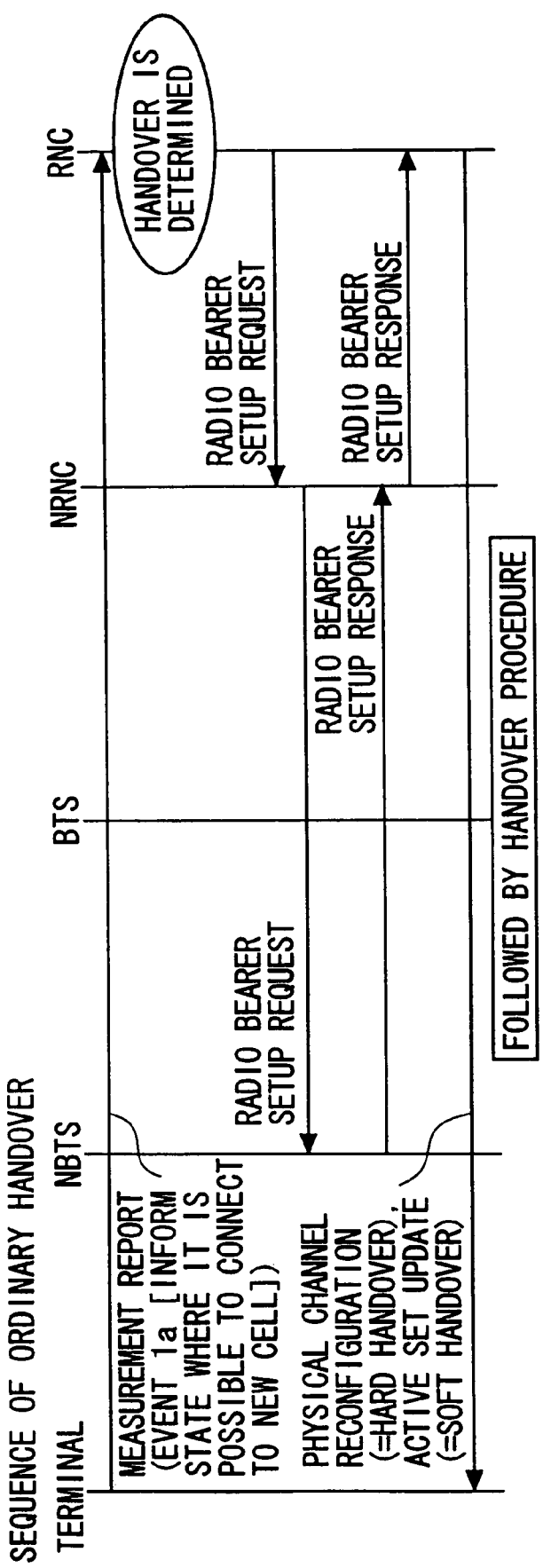
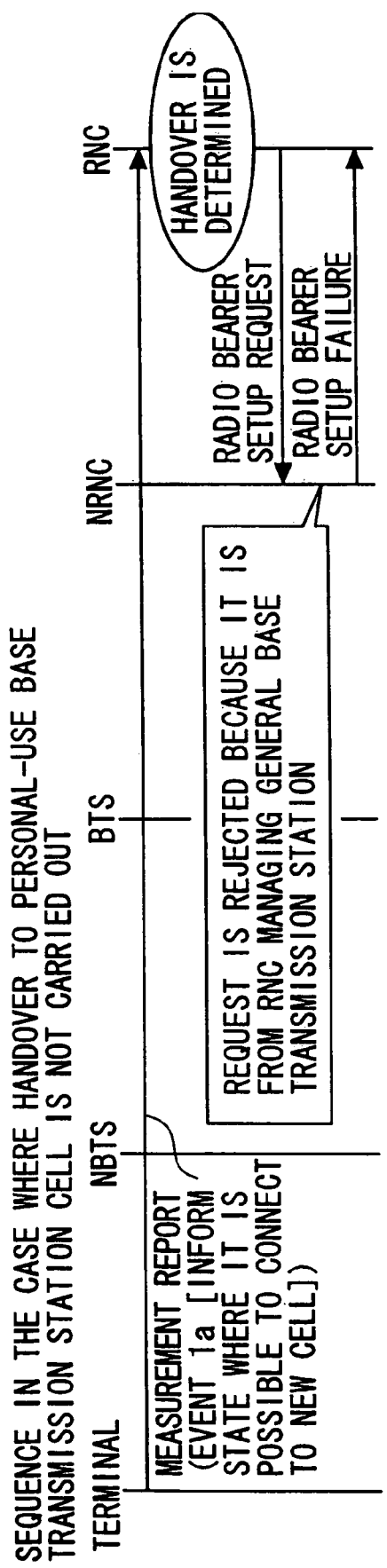

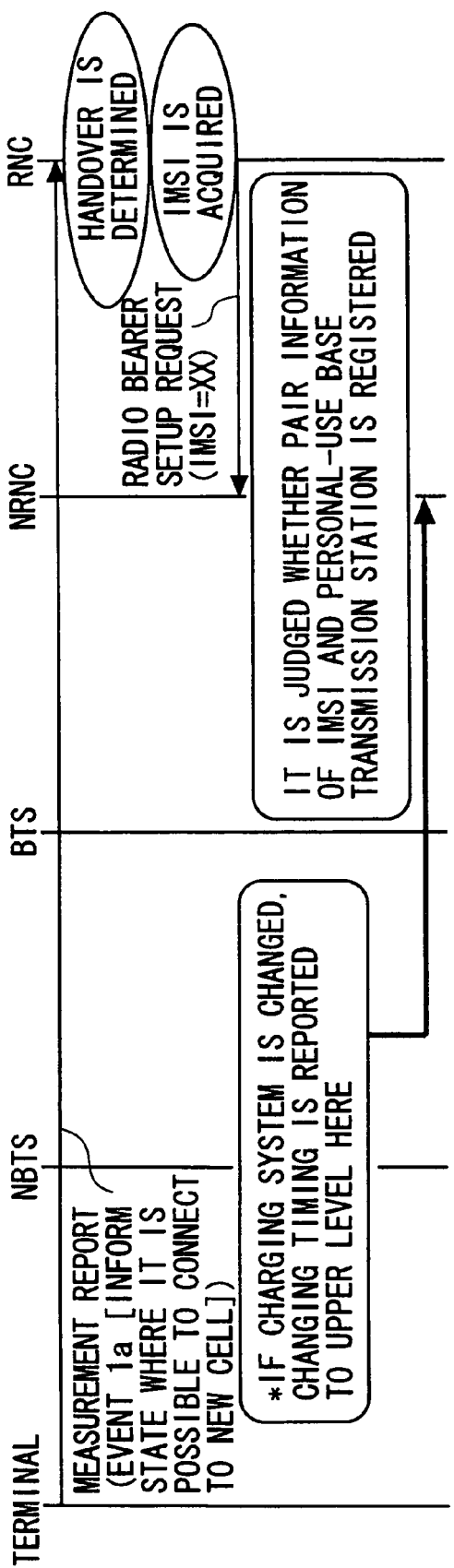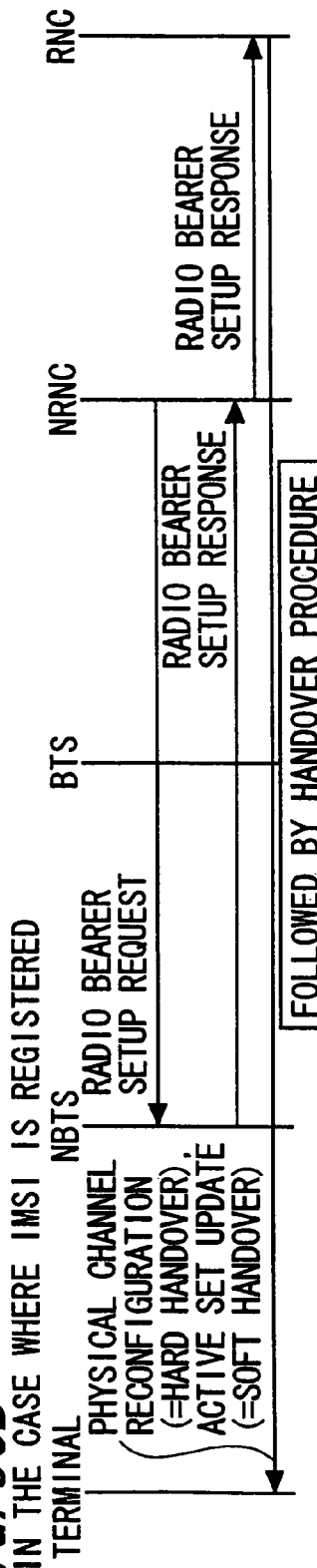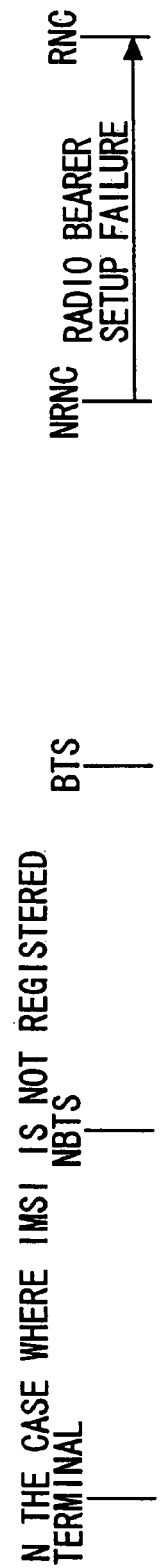

FIG. 58
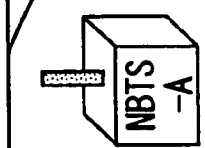
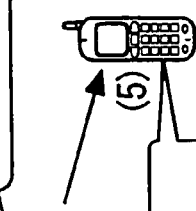
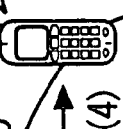
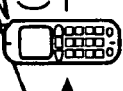

TERMINAL STATE CONTROL SYSTEM

BACKGROUND OF THE INVENTION

1. Field of the Invention

The present invention relates to a network system that performs state control of a mobile terminal.

2. Description of the Related Art

In a mobile telephone service, there exists a region that is set as a service area in a map but is out of reach of a radio wave, that is, an area called "blind zone". The blind zone exists because radio waves basically travel straight and therefore wireless radio waves from an entrance of a mobile telephone network called "wireless base station" do not reach a mobile terminal existing behind a building, inside a building, in a basement, or the like in usual cases.

In order to eliminate such a blind zone, several new types of wireless base stations have been developed. For instance, there is a system called "optical base station", where an optical line is laid down so as to extend from an existing base station to an area that becomes a blind zone because the area is too small to install therein a wireless base station, or because there is no space nearby for installing a base station, and some of the functions of a base station and an antenna are installed in that area, thereby setting the area as a service area. According to this system, it is possible to install an optical base station even in a small space where it was conventionally impossible to install a base station. Consequently, it becomes possible to eliminate a blind zone existing behind a building, inside a tunnel, or the like.

Also, as a system for eliminating a blind zone existing inside a building, an indoor-dedicated base station system called "in-mobile communication system (IMCS)" has been developed, and installation there of is under way. With this system, for instance, one antenna is installed on each floor of a building, thereby setting the whole floor as a service area. The IMCS is installed in highly public buildings, stations, event venues, and the like, thereby enabling provision of a service indoors.

Further, a base station system called "simple IMCS (also called "repeater") has been developed. With the simple IMCS, a proxy antenna is set up in an area in which a radio wave from a base station reaches, a line from the proxy antenna is routed to a blind zone such as a basement, and an antenna is set up in the blind zone. That is, the simple IMCS system is a system where signal amplification at a wireless level is performed in a bi-directional manner, and the system is effective in installing an antenna in a place in which it is difficult to route a line from a mobile telephone network.

With the simple IMCS, however, when the proxy antenna emits a strong radio wave, there is a possibility that other terminals in the same area may be adversely affected due to radio wave interferences, so that it is impossible to install many antennas in a narrow area. Also, under the regulations now in force (radio wave management law (denpa kanri hou)), only mobile telephone companies are allowed to install the simple IMCS.

As a blind zone other than those described above, there is an ordinary people's home (private house), in particular, a private house area (dedicated space) of a multiple dwelling house such as an apartment. Such a private house (home) area is a private space rather than a lowly public area. Therefore, it is of course impossible to install a base station of the IMCS or the simple IMCS described above only for the convenience of the mobile telephone companies. Also, even if an individual inversely desires installation of a private-house-use (personal-use or home-use) base station, it is impossible to personally purchase and install the base station under the current circumstances from the viewpoints of cost and space.

There are many cases where a base station system, such as the IMCS or the simple IMCS, is introduced not only because its installation place is a public space but also because the possessor or occupant (building owner, for instance) of a land or building that is the installation place hopes to improve the convenience of users of the land or building (apartment, for instance). Accordingly, the mobile telephone company pursues the expansion of installation of the base station system by requesting the possessor or occupant of the land or building to shoulder the cost of the installation of the base station system.

Based on a similar logic, an individual installs a private-house-use base station system in order to obtain a profit. Therefore, it is likely that the mobile telephone company requests him/her to bear the cost of the installation of the base station system in some manner. In this case, it is obvious that there is no merit of personally introducing the base station if the users living in the private house cannot exclusively use the private-house-use base station.

In other words, when an individual introduces a base station, if another person existing in a range where it is possible to receive a ratio wave from the base station is allowed to use the base station, such a situation arises that when the individual tries to perform communication using the base station, the line of the base station is already busy because the other person is using it, and therefore the individual cannot perform communication. He/she does not hope such a situation will arise at all.

Related art documents (non-patent documents 1-7) relating to the present invention include the following. The non-patent document 1 is "3GPP Release99 Technical Specification (Technical Specification: TS series), TS.23.012 Location management procedure." The non-patent document 2 is "3GPP Release99 Technical Specification (Technical Specification: TS series), TS.23.122 NAS functions related to Mobile Station (MS) in idle mode." The non-patent document 3 is "3GPP Release99 Technical Specification (Technical Specification: TS series), TS.24.007 Mobile radio interface signaling layer 3;General aspects." The non-patent document 4 is "3GPP Release99 Technical Specification (Technical Specification: TS series), TS.24.008 Mobile Radio Interface Layer 3 specification; Core Network Protocols-Stage." The non-patent document 5 is "3GPP Release99 Technical Specification (Technical Specification: TS series), TS.25.304 UE Procedures in Idle Mode and Procedures for Cell Reselection in Connected Mode." The non-patent document 6 is "3GPP Release99 Technical Specification (Technical Specification: TS series), TS.25.331 Radio Resource Control (RRC) Protocol Specification." The non-patent document 7 is "3GPP Release99 Technical Specification (Technical Specification: TS series), TS.25.413 UTRAN Iu Interface RANAP Signaling."

SUMMARY OF THE INVENTION

An object of the present invention is to provide a technique with which, as to a specific base station whose use is possible only by a terminal registered and allowed to use the specific base station, it becomes possible to allow only the registered terminal to use the specific base station and to prohibit the use of the specific base station by other terminals.

Further, another object of the present invention is to provide a technique with which it becomes possible for a user to know whether his/her terminal allowed to use a specific base station exists in a cell of the specific base station. Further, another object of the present invention is to provide a technique with which a terminal can perform as much communication as possible using a specific base station at which the terminal is registered.

Further, another object of the present invention is to provide a technique with which, as to a certain terminal, it becomes possible to distinguish with ease between communication using a specific base station at which the terminal is registered, and communication using another base station.

According to the present invention, the following constructions are employed in order to attain the above-mentioned objects.

That is, according to a first aspect of the present invention, there is provided a terminal status control system, including, as to a specific base station whose use is possible only by a terminal registered and allowed to use the specific base station:

a registration table in which information concerning a terminal that is allowed to use a specific base station is registered;

a judging unit judging whether a terminal that has entered a cell of the specific base station is the terminal registered in the registration table by referring to the registration table; and a control unit, if the terminal is the registered terminal, placing the terminal under a communicable status using the specific base station, and if not, placing the terminal under an incommunicable status using the specific base station.

According to the present invention, when a terminal enters a cell of a specific base station, if the terminal is allowed to use the specific base station, the terminal shifts to a status where it is capable of performing communication using the specific base station. On the other hand, if the terminal is not allowed to use the specific base station, the terminal shifts to a status where it is incapable of performing communication. As a result, it becomes possible to allow only a terminal registered for the specific base station to use the base station.

Preferably, according to the first aspect of the present invention, with reception of a location updating request transmitted from the terminal as a trigger, the judging unit judges whether the terminal is the registered terminal by acquiring base station specifying information for specifying the base station that received the location updating request from the terminal and identification information of the terminal, and judging whether the base station specifying information and the terminal identification information are registered in the registration table, and if the terminal is the registered terminal, the control unit approves the location updating request from the terminal, and if not, rejects the location updating request from the terminal.

Further, preferably, according to the first aspect of the present invention, the terminal is constructed so as to transmit the location updating request when a location area identifier received from a base station is changed due to an inter-cell movement, and the terminal status control system further includes:

a giving unit giving the specific base station location area identifiers for the specific base station that is different from a location area identifier broadcasted in cells adjacent to the cell of the specific base station as a location area identifier that the specific base station broadcasts in the cell thereof.

Further, preferably, according to the first aspect of the present invention, the giving unit is provided in a base station control apparatus that manages and controls the specific base station, and the base station control apparatus includes a conversion unit converting a location area identifier of a location area, to which the specific base station belongs, contained in broadcast information, which the base station control apparatus receives from a location management apparatus managing the location of each terminal existing in the location area, to which the specific base station belongs, and transfers to the specific base station, into the location area identifier for the specific base station.

Further, preferably, according to the first aspect of the present invention, after the terminal is placed by the control unit under the communicable status using the specific base station, when a call termination request to the terminal occurs, the location management apparatus receives an inquiry from a transfer unit of the call termination request concerning a location area corresponding to a transmission destination of the call termination request, acquires the base station specifying information of the specific base station from the registration table, and informs the transfer unit of the identification information of the specific base station along with a corresponding location area identifier, based on the acquired location area identifier and base station specifying information of the specific base station, the transfer unit transmits the call termination request only to the base station control apparatus that controls the specific base station, and on receiving the call termination request, the base station control apparatus transmits the call termination request to each base station that the base station control apparatus controls.

Further, preferably, according to the first aspect of the present invention, after the terminal is placed by the control unit under the communicable status using the specific base station, when a call termination request to the terminal is received, the base station control apparatus acquires the base station specifying information of the specific base station corresponding to the identification information of the terminal contained in the call termination request from the conversion table and transmits the call termination request only to the specific base station based on the acquired base station specifying information.

According to a second aspect of the present invention, there is provided a terminal, including:

a detection unit detecting entrance and exit into and from a cell of a specific base station that the terminal is allowed to use; and an informing unit informing a user of the terminal of the entrance and the exit into and from the cell of the specific base station.

Preferably, the terminal according the second aspect of the present invention further includes a second informing unit, when the terminal is currently performing communication, informing the user of the terminal of whether the communication is performed using the specific base station.

According to a third aspect of the present invention, there is provided a base station control apparatus that manages and controls a specific base station that is usable only by a terminal allowed to use the specific base station, including:

a unit receiving a message relating to a handover, whose handover destination is a cell of the specific base station, from another base station control apparatus; and a control unit uniformly rejecting processing relating to the handover based on the message from the another base station control apparatus.

According to a fourth aspect of the present invention, there is provided a base station control apparatus that manages and controls a specific base station that is usable only by a terminal allowed to use the specific base station, including:

a registration table in which information concerning the terminal allowed to use the specific base station is registered;

a judging unit, with respect to a handover request whose handover destination is a cell of the specific base station, judging whether a terminal issued the handover request is the terminal allowed to use the specific base station by referring to the registration table; and a control unit, if the terminal issued the handover request is the terminal allowed to use the specific base station, performing processing relating to the handover, and if not, rejecting the handover.

According to the present invention, it is possible to realize a handover control apparatus including: a judging unit, in response to a handover request from a terminal, judging whether a base station in a handover destination cell specified by the request is a base station whose use is allowed only to a specific terminal; and a handover control unit, if the base station at the handover destination corresponds to the base station whose use is allowed only to the specific terminal, rejecting the handover request, and if not, approving the handover request.

According to the present invention, it is possible to realize a handover control apparatus including: a judging unit, in response to a handover request from a terminal, judging whether a base station in a handover destination cell specified by the request is a base station whose use is allowed only to a specific terminal; a second judging unit judging, if the base station at the handover destination corresponds to the base station whose use is allowed only to the specific terminal, whether the terminal issued the handover request is a terminal that is allowed to use the base station; and a handover control unit, if the base station at the handover destination corresponds to the base station, whose use is allowed only to the specific terminal, and the terminal issued the handover request corresponds to the terminal that is allowed to use the base station, approving the handover request, and if not, rejecting the handover request. Further, the present invention can include methods realized by the terminal state control system or terminal According to the present invention, as to a specific base station whose use is possible only by a terminal registered and allowed to use the specific base station, it becomes possible to allow only the registered terminal to use the specific base station and to prohibit the use of the specific base station by other terminals.

Also, according to the present invention, it becomes possible for a user to know whether his/her terminal allowed to use a specific base station exists in a cell of the specific base station. Further, according to the present invention, it becomes possible to provide a technique with which a terminal can perform as much communication as possible using a specific base station at which the terminal is registered.

Also, according to the present invention, as to a certain terminal, it becomes possible to distinguish with ease between communication using a specific base station at which the terminal is registered, and communication using another base station.

BRIEF DESCRIPTION OF THE DRAWINGS

FIG. 1 shows a mobile telephone network model;

FIGS. 15A and 15B are each an explanatory diagram of the registration contents of each table possessed by the HLR and each VLR shown in FIG. 14, and the registration contents of the registration table provided in the VLR;

FIG. 17 is a sequence diagram showing a first operation example of the first embodiment mode (operation at the time of entrance from an outside cell (general cell) to an allowed cell);

FIG. 18 is also the sequence diagram showing the first operation example of the first embodiment mode (operation at the time of the entrance from the outside cell to the allowed cell);

FIG. 19 is a sequence diagram showing a second operation example of the first embodiment mode (operation at the time of entrance from an allowed cell to a prohibited cell);

FIG. 20 is a sequence diagram showing a third operation example of the first embodiment mode (operation at the time of exit from an allowed cell to an outside cell);

FIG. 21 is also the sequence diagram showing the third operation example of the first embodiment mode (operation at the time of the exit from the allowed cell to the outside cell);

FIG. 23 is also the sequence diagram showing the fourth operation example of the first embodiment mode (operation at the time of the entrance from the outside cell to the prohibited cell);

FIGS. 24A and 24B are sequence diagrams showing a fifth operation example of the first embodiment mode (operation at the time of entrance from a prohibited cell to an allowed cell);

FIG. 25 is a sequence diagram showing a sixth operation example of the first embodiment mode (operation at the time of entrance from a prohibited cell to an outside cell);

FIG. 26 is also the sequence diagram showing the sixth operation example of the first embodiment mode (operation at the time of the entrance from the prohibited cell to the outside cell);

FIGS. 28A and 28B are each an explanatory diagram of the registration contents of each VLR and the HLR and the registration contents of the registration table in the NRNC in Embodiment 2 of the first embodiment mode;

FIG. 30 is a sequence diagram showing a seventh operation example of the first embodiment mode (operation at the time of entrance from an outside cell to an allowed cell);

FIG. 31 is also the sequence diagram showing the seventh operation example of the first embodiment mode (operation at the time of the entrance from the outside cell to the allowed cell);

FIG. 32 is a sequence diagram showing an eighth operation example of the first embodiment mode (operation at the time of entrance from an allowed cell to a prohibited cell);

FIG. 33 is a sequence diagram showing a ninth operation example of the first embodiment mode (operation at the time of exit from an allowed cell to an outside cell);

FIG. 34 is also the sequence diagram showing the ninth operation example of the first embodiment mode (operation at the time of the exit from the allowed cell to the outside cell);

FIG. 35 is a sequence diagram showing a tenth operation example of the first embodiment mode (operation at the time of entrance from an outside cell to a prohibited cell);

FIGS. 36A and 36B are sequence diagrams showing an eleventh operation example of the first embodiment mode (operation at the time of entrance from a prohibited cell to an allowed cell);

FIG. 37 is also the sequence diagram showing the eleventh operation example of the first embodiment mode (operation at the time of the entrance from the prohibited cell to the allowed cell);

FIG. 38 is a sequence diagram showing a twelfth operation example of the first embodiment mode (operation at the time of exit from a prohibited cell to an outside cell);

FIG. 39 is an explanatory diagram of a call termination operation (PAGING operation serving as a trigger) under the current situations;

FIG. 40 is an explanatory diagram of a second embodiment mode of the present invention (PAGING operation in the case where the registration table is provided in the VLR);

FIG. 42 is still another explanatory diagram of the second embodiment mode of the present invention (PAGING operation in the case where the registration table is provided in the NRNC);

FIG. 52 shows an example of cell selection processing where consideration is given to hysteresis;

FIG. 53 is an explanatory diagram of a soft handover;

FIG. 54 is an explanatory diagram of a personal-use base station cell selection method used by a terminal;

FIG. 55A is a sequence diagram showing a procedure of an ordinary handover and FIG. 55B is a sequence diagram showing a procedure for uniformly prohibiting handovers to the cell of the personal-use base station;

FIGS. 56A, 56B and 56C are sequence diagrams showing a procedure for allowing only a terminal allowed to use the personal-use base station to perform a handover to the cell of the personal-use base station;

FIG. 58 illustrates operation timings in the case where a terminal in communication moves from a general cell to an allowed cell ((1) in FIG. 57);

DESCTIPTION OF THE PREFERRED EMBODIMENTS

Figure 2:
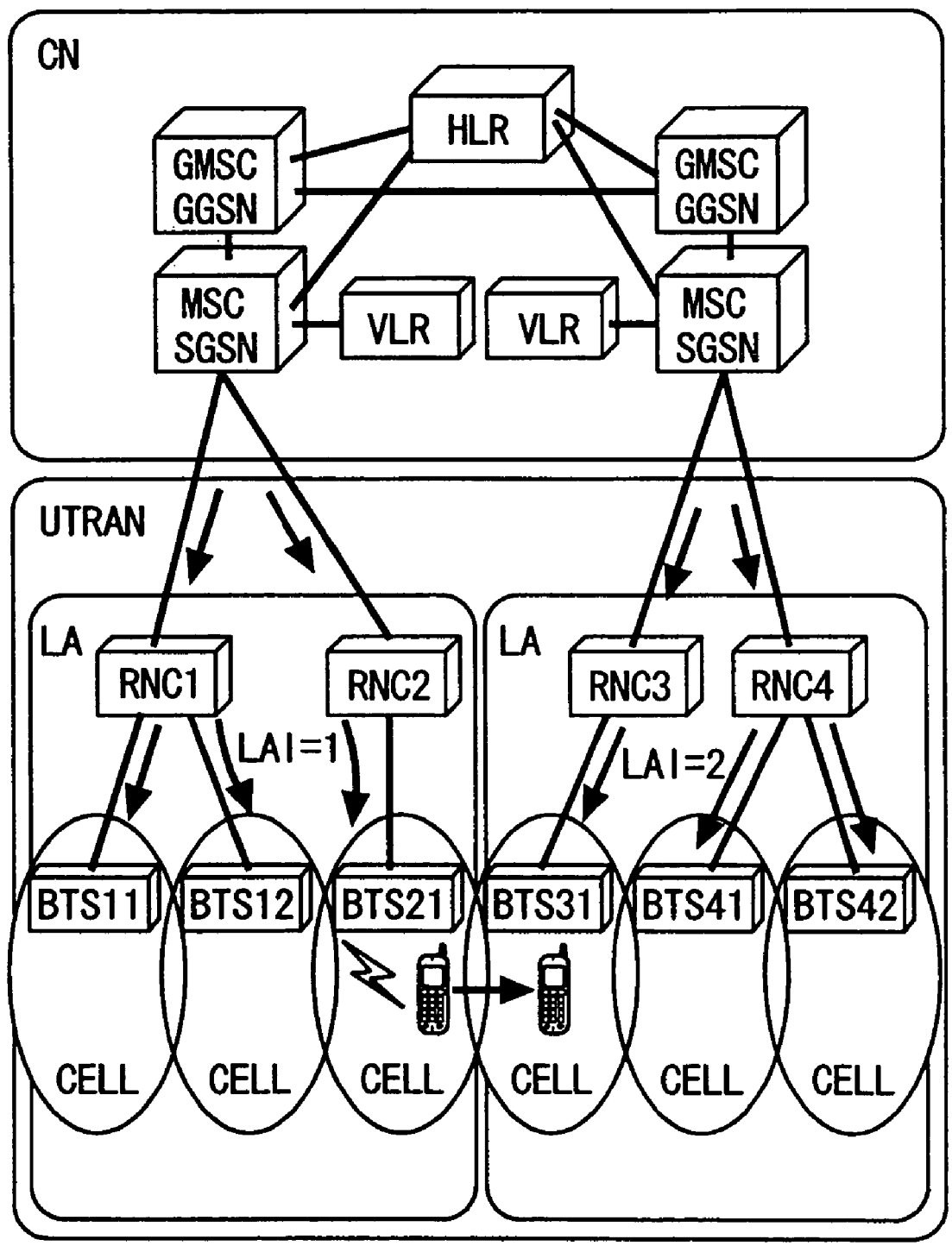
FIG. 2 shows system information (broadcast information) periodically broadcasted by the network in the whole network and a terminal that receives the information.

The best mode for carrying out the present invention will now be described with reference to the accompanying drawings. The constructions of embodiment modes are merely examples and there is no intention to limit the present invention to the constructions of the embodiment modes.

[Mobile Telephone Network System]

It is possible to attain the present invention by making modifications to an already-existing mobile telephone network system. In order to explain the points of the modifications, the outline of a current mobile telephone network system will be described.

FIG. 1 shows an example of a structure of a mobile telephone network called "third generation (3G)" (FOMA (registered trademark) service provided in Japan by NTT DoCoMo, Inc., for instance). As shown in FIG. 1, the mobile telephone network is broadly divided into a core network (CN) that performs switching processing and a subscriber access network called "UMTS (Universal) terrestrial radio area network (UTRAN)" containing a wireless portion.

The CN includes a switching apparatus for line calls ([Gateway] Mobile Switching Center (MSC/GMSC)) that performs line switching processing, and a switching apparatus for packet calls (serving/gateway GPRS support node (SGSN/GGSN) where GPRS is an abbreviation for "general packet radio service") that performs packet switching processing.

Also, in the CN, there is prepared only one location registration (location management) register called "home location register (HLR)" that performs location management of each terminal (mobile terminal (mobile station) such as a mobile telephone). In addition, in the CN, for each location area (LA) indicating a unit area of location registration of the terminal by the CN, there is provided a location management apparatus called "visitor location register (VLR)" that is a visitor location registration (location management) register, which performs location management of the terminal in the LA. The VLR alleviates the concentration of access to the HLR. One VLR is prepared for each LA and each group of LAs that should belong to the same predetermined management range.

On the other hand, it is possible to divide the UTRAN into units of LAs. In each LA, one or more wireless base station apparatuses called "base transmission stations (BTSS)" (hereinafter simply referred to as the "base stations") that each performs wireless communication with terminals, and one or more RAN (Radio Access Network) control apparatuses (base station control apparatuses) called "radio network controllers (RNCs)" that can accommodate one or more BTSs and manage and control the accommodated BTSs, are prepared. Each RNC is accommodated in its corresponding MSC/GMSC in the CN. Also, each range in an LA, in which each BTS is capable of communicating with terminals (region in which a wireless radio wave reaches favorably), is called a "cell".

With the construction described above, the terminal moves between cells in a service area in order to receive a service provided from a network side. As to such a movement of the terminal, there are a case where the terminal moves between cells in the same LA, and a case where the terminal moves between cells that respectively belong to different LAs (moves across LAs).

The CN is constructed so as to recognize the movement of the location of the terminal only when an LA in which the terminal is located is changed. On the other hand, when the terminal moves between cells in the same LA, this movement of the terminal is recognized and managed in the UTRAN. Note that such recognition and management in the UTRAN is performed only when the terminal performs communication. A status of the terminal at this time is called "connected mode" and a status thereof at the time when the terminal does not perform communication is called "idle mode". When the terminal is in the idle mode, only the location management in the LA by the CN is performed for the terminal.

Next, a procedure of terminal location registration/user authentication will be described. When a terminal is powered on, the terminal checks whether a communicable cell (BTS)

exists through received radio wave analysis. Each BTS constantly transmits a synchronization timing and scramble code information used in CDMA (code division multiplex access) over a synchronization signal channel.

The terminal establishes wireless synchronization by receiving the synchronization timing and the scramble code information, and creates a status where the terminal is capable of receiving data from the BTS. Next, the terminal participates in a network by transmitting a synchronization signal and sending a message to the BTS. Such participation of the terminal in the network is called "camping on a cell".

In usual cases, cells in a wireless network are provided so that a part of a cell overlaps its adjacent cell in order to cover the whole region. Therefore, in each overlapping area, the terminal is capable of receiving synchronization signals from multiple cells. Consequently, in the overlapping area, the terminal is capable of camping on multiple cells. In usual cases, however, the terminal is constructed so as to select one of the multiple cells in accordance with a certain logic (prescribed with consideration given to conditions such that it is possible to maximize a reception radio wave power or to minimize a transmission power on a terminal side, for instance).

Also, in order to inform the terminal of various parameters (such as the identification information (ID) of a cell called "Cell-ID", the ID of an LA called "location area identifier (LAI)", and various timer values) that are to be used by the terminal to perform communication using the network, the network (base station) periodically transmits system information called "broadcast information" over a channel called "BCCH" over which the terminal is capable of receiving the information even in the idle mode.

The terminal is capable of receiving the broadcast information in both of the idle mode and the connected mode. By receiving the system information in the broadcast information, the terminal knows that it has moved across LAs.

For instance, as shown in FIG. 2, when the terminal moves between an LA having an LAI=1 and an LA having an LAI=2 (between a cell of a BTS 21 and a cell of a BTS 31), the terminal shifts to a status where it receives the broadcast information from the BTS 31 instead of the BTS 21.

Here, the BTS 21 periodically transmits broadcast information containing the identification number of the LA to which it belongs, that is, the LAI=1. On the other hand, the BTS 31 periodically transmits broadcast information containing the identification number of the LA to which it belongs, that is, the LAI=2. Consequently, an LAI that the terminal is capable of obtaining from the broadcast information changes from the LAI=1 to the LAI=2. In this manner, the terminal recognizes that it has moved across LAs.

After being powered on, the terminal completes camping on a cell, and then requests the network side to perform location registration. The location registration is a procedure for allowing the terminal to participate in the network and to perform communication. In more detail, the terminal transmits a location registration request message containing a unique ID called "identity mobile station identifier (IMSI)" allocated to the terminal and requests the network side to register the IMSI.

On the network side, the IMSI contained in the location registration request transmitted from the terminal is registered in the HLR. In the HLR, there is registered information for identifying subscribers that are allowed to participate in the network (that is, subscribers who have signed up with the mobile telephone company running the network). When it is requested to register the location of the terminal in the HLR, the IMSI of the terminal is checked and it is confirmed whether the terminal is the subscriber's terminal and should be given permission for communication.

At this time, if the IMSI from the terminal matches none of the IMSIs of the subscribers' terminals, the location registration of the terminal is not performed and the terminal does not shift to a communicable status. Consequently, it is a necessary condition that location registration in the network is performed in order for the terminal to receive provision of a service using the network.

If the IMSI is used each time location registration or an actual call origination/termination procedure is performed, there is a possibility that a problem concerning security may occur. Therefore, the network is constructed such that instead of the IMSI, a temporary ID called "temporary mobile station identifier (TMSI)" is allocated to the terminal, and after the TMSI is allocated to the terminal, the TMSI is used in almost all procedures between the terminal and the network.

When the terminal is powered on and participates in the network for the first time, the network informs the terminal of the TMSI, which is then stored in an SIM (Subscriber Identity Module) card of the terminal. After that, the terminal performs communication with the network side using the TMSI.

The TMSI is uniquely allocated to each IMSI in units of LAs. Accordingly, when a TMSI is allocated to the IMSI of the terminal, the terminal performs communication with the network side afterward by the LAI of an LA in which the terminal exists, in addition to the TMSI.

That is, the network side identifies respective terminals using pairs of LAIs and TMSIs. This means that when the terminal moves across LAs, it is required to perform a procedure for re-allocating a TMSI to the IMSI of the terminal.

Here, the IMSI of the terminal does not change even if it moves across LAs, but it is unlikely that the same TMIS is allocated to the terminal each time the TMSI allocation is performed. Therefore, it is impossible to universally specify the terminal (IMSI) using one TMSI. Then, there is no guarantee that, in each of LAs, the same TMSI is allocated to a terminal having an IMSI between LAs, every time. Accordingly, even if tapping or tampering is performed by aiming at only communication having a specific TMSI, it is impossible to identify the terminal, which ensures security for the terminal.

On the other hand, the location information registered in the HLR is stored so as to be distributed across VLRs existing for respective MSCs. With a construction where access to the HLR is performed each time there occurs a situation where it is required to confirm the location of a terminal for a communication procedure, a load placed on the HLR is increased. In view of this problem, the VLRs are provided in units of MSCs (in units of LAs) and, when it is possible to execute a necessary procedure only by accessing a VLR (access to the HLR is not required), the procedure is processed only by performing the access to the VLR.

In more detail, once location registration of a terminal in a VLR is performed, the terminal becomes capable of performing communication procedures only with information registered in the VLR so long as the terminal is located in an LA in the management range of the VLR. In contrast to this, when the terminal moves to an LA managed by a different VLR, the TMSI of the terminal is not registered in the VLR of the different LA, so that access to the HLR. (location registration updating) is performed and new location information (containing a TMSI) of the terminal is registered in the VLR corresponding to the different LA.

Figure 3:
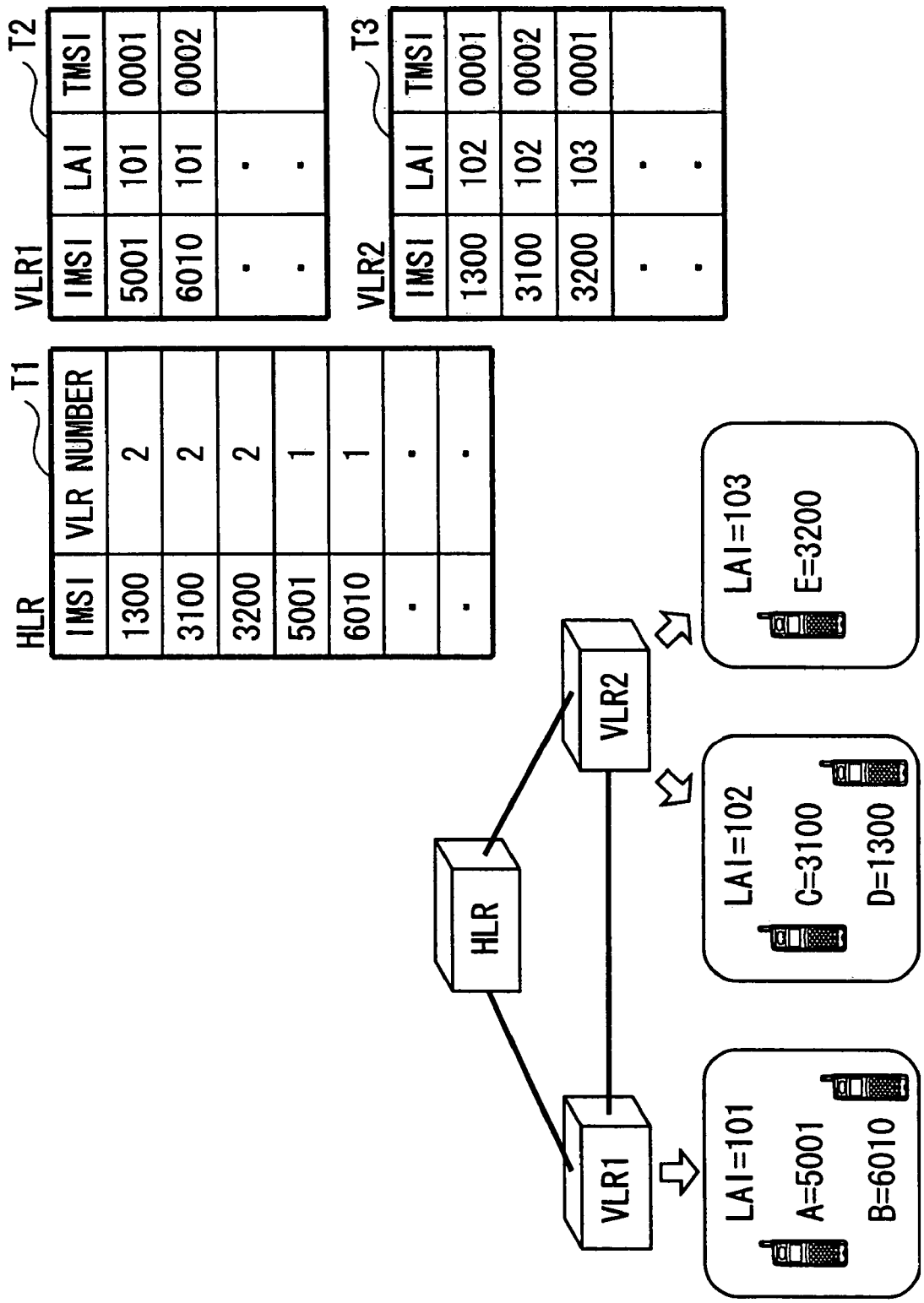
FIG. 3 shows an example of a structure of each table (management table) provided on a memory of each HLR/VLR that manages the current locations of terminals.
Figure 4:
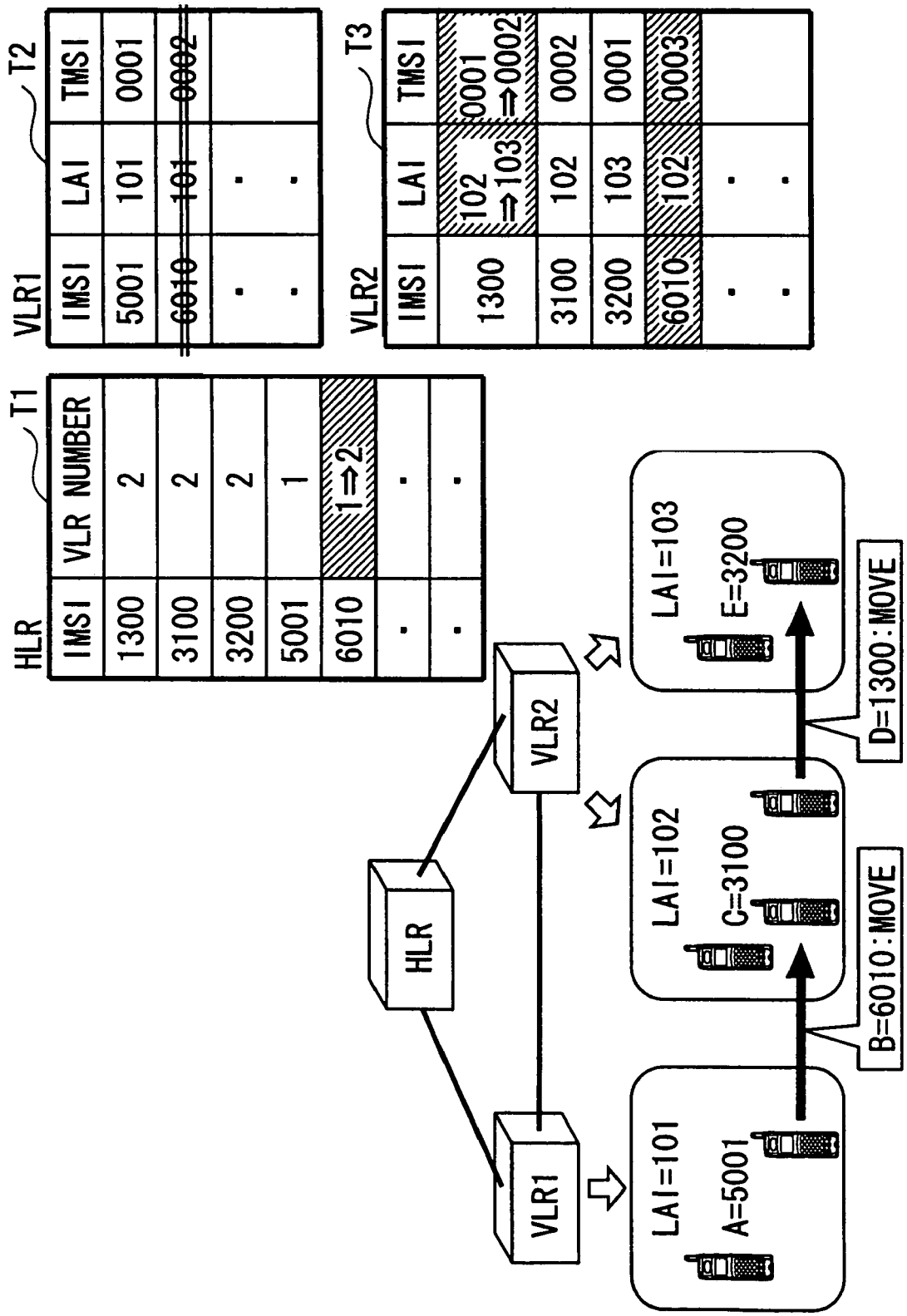
FIG. 4 shows an example of updating registration contents of the tables in the HLR/VLR based on movements of the terminals.

FIG. 3 shows a part of information stored in the HLR and each VLR. FIG. 4 shows the contents of processing for rewriting the HLR and the VLR due to movements of terminals.

Figure 5:
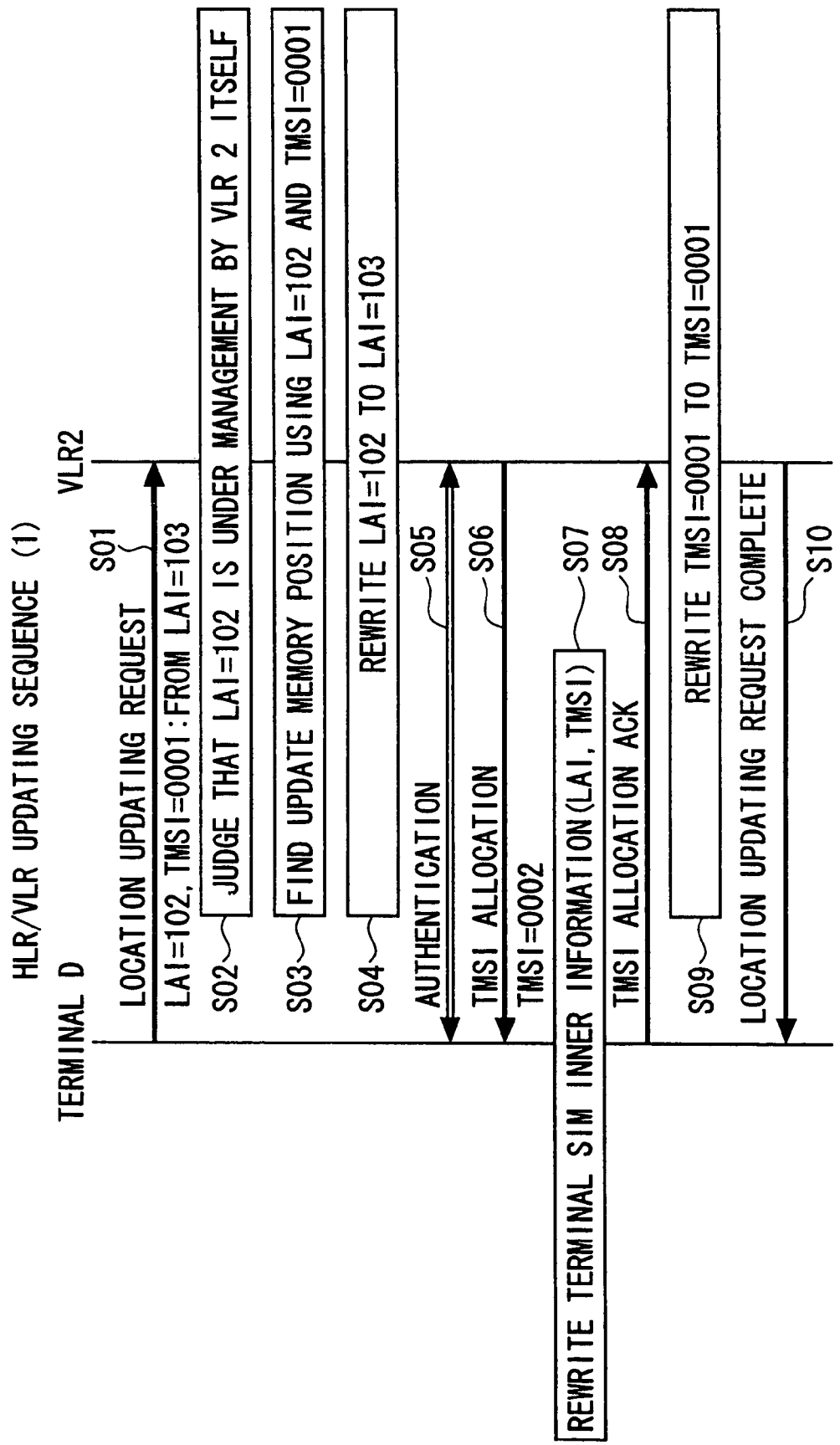
FIG. 5 is a sequence diagram showing a procedure in which the registration contents of the HLR/VLR are changed when the terminal moves.
Figure 6:
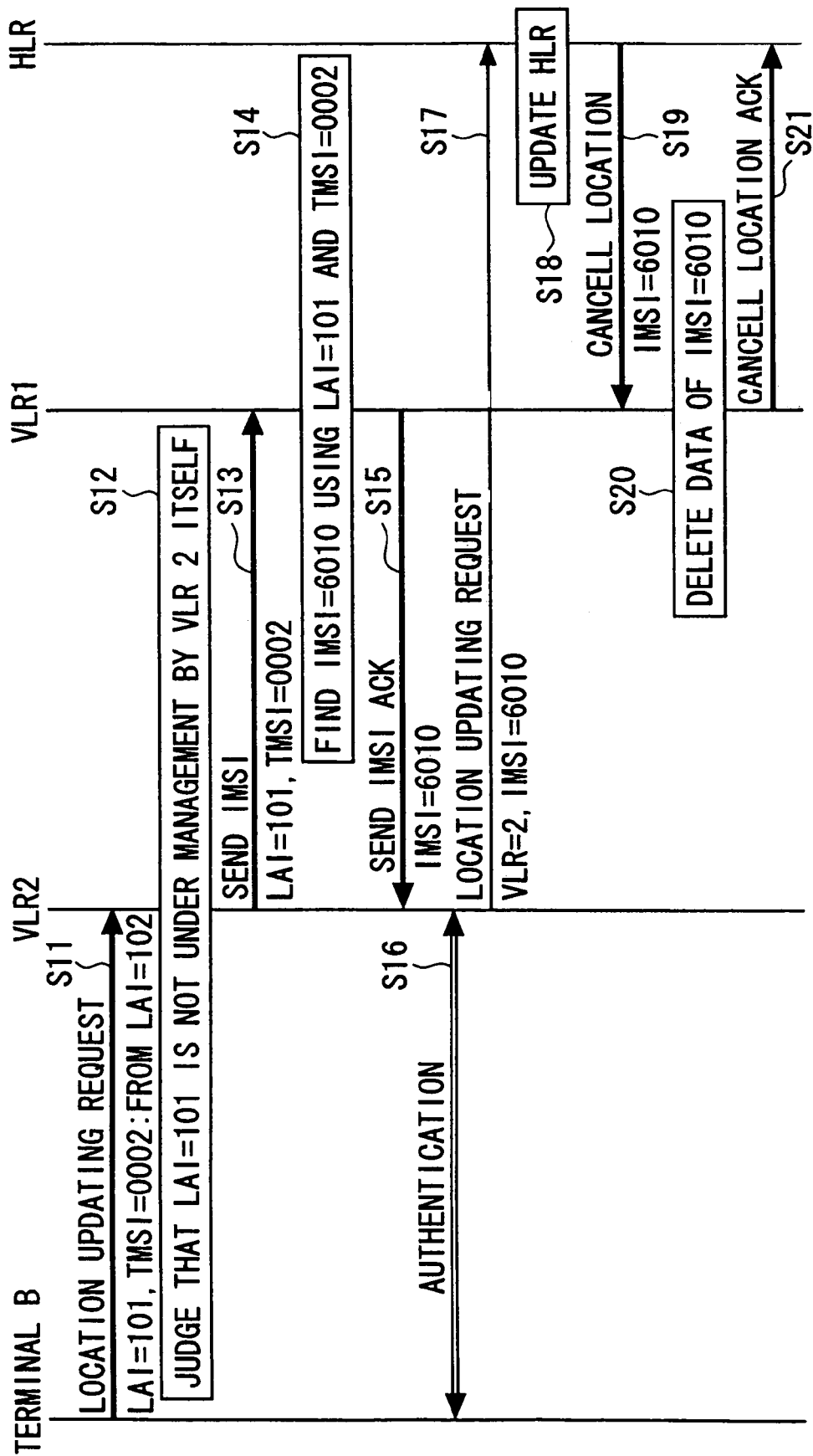
FIG. 6 is another sequence diagram showing a procedure in which the registration contents of the HLR/VLR are changed when the terminal moved.
Figure 7:
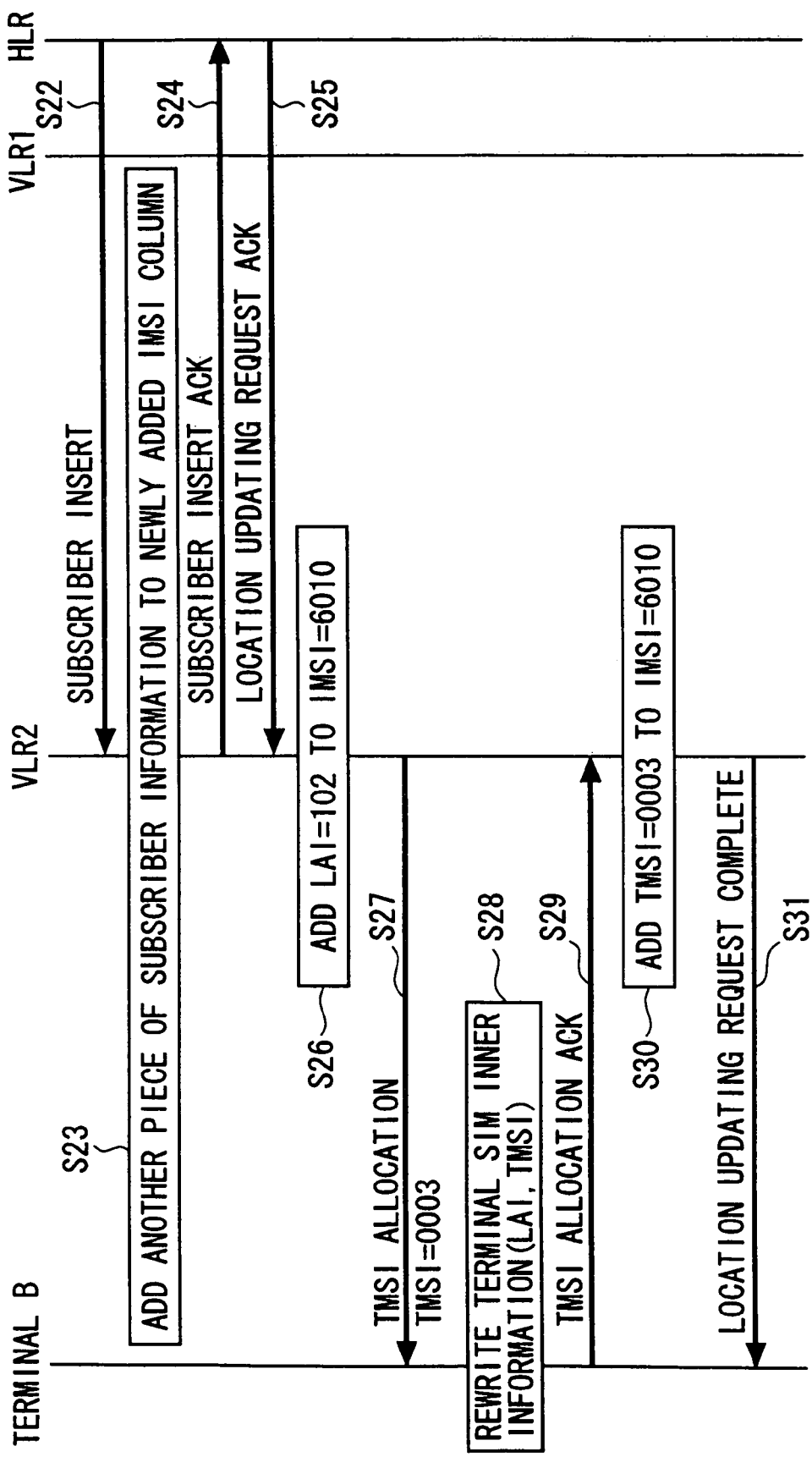
FIG. 7 is also the sequence diagram showing the procedure in which the registration contents of the HLR/VLR are changed when the terminal moved.

Further, FIGS. 5 to 7 are each a sequence diagram showing the rewriting processing procedure shown in FIG. 4.

The HLR stores a table having entries containing IMSIs and the identification numbers of VLRs in which the IMSIs are registered. On the other hand, each VLR stores a table having entries containing the IMSIs, LAIs of LAs in which the terminals having the IMSIs exist, and TMSIs allocated to the IMSIs. The tables are respectively created on memories possessed by the HLR and the VLRs.

In FIG. 3, there are illustrated a VLR 1 corresponding to an LA (LA 101) having an LAI=101 and a VLR 2 corresponding to each of LAs (LA 102 and LA 103) respectively having an LAI=102 and an LAI=103. A terminal A (IMSI=5100) and a terminal B (IMSI=6010) are located in the LA 101, a terminal C (IMSI=3100) and a terminal D (IMSI=1300) are located in the LA 102, and a terminal E (IMSI=3200) is located in the LA 103. In this case, the registration contents of respective tables T1, T2, and T3 possessed by the HLR, the VLR 1, and the VLR 2 become as shown in FIG. 3.

As shown in FIG. 4, a movement of the terminal D from the LA 102 to the LA 103 is a movement of the terminal D in the management range of the same VLR (VLR 2). Therefore, in the table T3 of the VLR 2, the LAI in an entry corresponding to the terminal D is rewritten from 102 to 103. Then, after terminal authentication processing is performed, re-allocation of a TMSI to the terminal D is performed. The terminal D is informed of the new information (LAI+TMSI) concerning the terminal D and conformity is established between the terminal D and the VLR 2 (network).

In more detail, as shown in FIG. 5, the terminal D transmits a location updating request message (LOCATION UPDATING REQUEST) to the VLR 2 (S01). This message contains the LAI=102 and a TMSI=0001, which are terminal identification information used in the LA before the movement, and information "From LAI=103" showing that the message has been transmitted from the LA 103.

The VLR 2 judges that the LAI=102 in the message specifies an LA under management by the VLR 2 itself (S02). Then, the VLR 2 refers to the table T3 using the LAI=102 and the TMSI=0001 in the message as a key and finds an entry position (update memory position) corresponding to the key (S03). After that, the VLR 2 rewrites the LAI in the found entry from 102 to 103 (S04).

Subsequently, after an authentication procedure (Authentication) between the terminal D and the VLR 2 is performed in S05, the VLR 2 transmits, to the terminal D, a message (TMSI ALLOCATION) for allocating a TMSI=0002 that should be used in the LA 103 (S06).

On receiving the message, the terminal D rewrites information (terminal SIM inner information, that is, the LAI and the TMSI) in an SIM card mounted in the terminal to the LAI=103 and the TMSI=0002 (S07). After that, the terminal D transmits a confirmation message (TMSI ALLOCATION ACK) corresponding to the allocation message to the VLR 2 (S08).

On receiving the confirmation message, the VLR 2 rewrites the TMSI in the corresponding entry from 0001 to 0002 re-allocated (S09). After that, the VLR 2 transmits, to the terminal D, a response message (LOCATION UPDATING REQUEST COMPLETE) indicating that the location registration processing has been completed in success (S10).

In contrast to this, at the time of a terminal movement across two VLRs (between LAs belonging to different management ranges) such as the movement of the terminal B from the LA 101 to the LA 102 shown in FIG. 4, it also becomes necessary to change the registration contents of the HLR.

That is, the VLR number in an entry corresponding to the terminal B in the table T1 of the HLR is changed to a VLR number after the movement.

At this time, the VLR 2 inquires of the VLR 1 about the IMSI of the terminal B because it does not know the IMSI. Then, the VLR 2 adds to the table T3 an entry containing the IMSI of the terminal B returned from the VLR 1, the LAI of the LA after the movement, and a TMSI allocated to the terminal B.

In more detail, as shown in FIGS. 6 and 7, when the terminal B moves to the LA 102, the terminal B transmits, to the VLR 2, a location updating request message that contains a pair of an LAI and a TMSI (LAI=101 and TMSI=0002) used in the LA 101 and "From LAI=102" indicating that the message has been transmitted from the LA 102 (S11).

The VLR 2 judges that the LA is not under management by the VLR 2 itself with reference to LAI=101 in the message (S12). Then, the VLR 2 specifies a VLR (VLR 1) that is an inquiry destination using the LAI in the message, and transmits, to the VLR 1, a message (SEND IMSI) for inquiring about the IMSI corresponding to the LAI and the TMSI (S13).

On receiving the inquiry message, the VLR 1 searches the table T2 using the LAI and the TMSI in the message, and finds a corresponding IMSI=6010 (S14). Then, the VLR 1 transmits a confirmation message (SEND IMSI ACK) containing the IMIS=6010 to the VLR 2 (S15).

Subsequently, an authentication procedure is performed between the terminal B and the VLR 2 (S16). After that, the VLR 2 transmits, to the HLR, a location updating request message that contains the VLR=2 and the IMSI=6010 (S17).

On receiving the message, the HLR searches the table T1 for an entry having an IMSI that is the same as the IMSI in the message, and rewrites the VLR number in the entry from 1 to 2 (S18) (also see FIG. 4). Then, the HLR transmits a message (CANCELL LOCATION) for requesting deletion of the IMSI=6010 to the VLR 1 (S19).

On receiving the message, the VLR 1 deletes a data entry having the IMSI=6010 from the table T2 (S20) and returns a confirmation message (CANCELL LOCATION ACK) to the HLR (S21).

Then, the HLR transmits, to the VLR 2, a message (SUBSCRIBER INSERT) for requesting addition of subscriber information (S22). The VLR 2 adds another piece of subscriber information in a newly added IMSI column (entry) (S23), and then returns a confirmation message (SUBSCRIBER INSERT ACK) to the HLR (S24). Then, the HLR returns a response message corresponding to the location updating request to the VLR 2 (S25).

Then, the VLR 2 adds the LAI=102 in an entry corresponding to the IMSI=6010 (S26) (also see FIG. 4). After that, the VLR 2 transmits, to the terminal B, a message (TMSI ALLOCATION) for allocating a TMSI=0003 that should be used in the LA 102 (S27).

On receiving the message, the terminal B rewrites the terminal SIM inner information (LAI and TMSI) to the LAI=102 and the TMSI=0003 (S28). After that, the terminal D transmits a confirmation message (TMSI ALLOCATION ACK) corresponding to the allocation message to the VLR 2 (S29).

On receiving the confirmation message, the VLR 2 rewrites the TMSI in the corresponding entry from 0002 to 0003 re-allocated (S30). After that, the VLR 2 transmits, to the terminal B, a message (LOCATION UPDATING REQUEST COMPLETE) indicating that the location updating processing has been completed (S31).

In the manner described above, if an LA in which a terminal is located is changed, location information of the terminal in the VLR, or in the HLR as well as the VLR, is updated and registered in accordance with the management circumstances of the LAs. If such location registration has ended in failure, it becomes impossible to specify the location of the terminal on the network side, and it becomes impossible for the network to provide the terminal with a service. This is because the location of the terminal is unknown, so that it becomes impossible to forward an incoming call to the terminal. Also, the position of the IMSI cannot be found by referring to an LAI and a TMSI from the terminal, so that call origination also becomes impossible.

The location registration request (location updating request) is performed under the following conditions:

(A) When an LA, in which a terminal currently exists, is changed (when the terminal detects that its camping-on cell is changed and an LAI in received broadcast information is changed);

(B) When a terminal is powered on and participates in a network;

(C) When a periodic timer has timed out (only in the idle mode).

Based on the condition (C), the terminal issues an updating request (location updating request) when a fixed time (timer value informed using system broadcast information) has elapsed from previous location updating processing. Note that the timer is started only when a proper response is returned in response to the previous location updating request or when location updating is rejected due to a specific reason.

Figure 8:
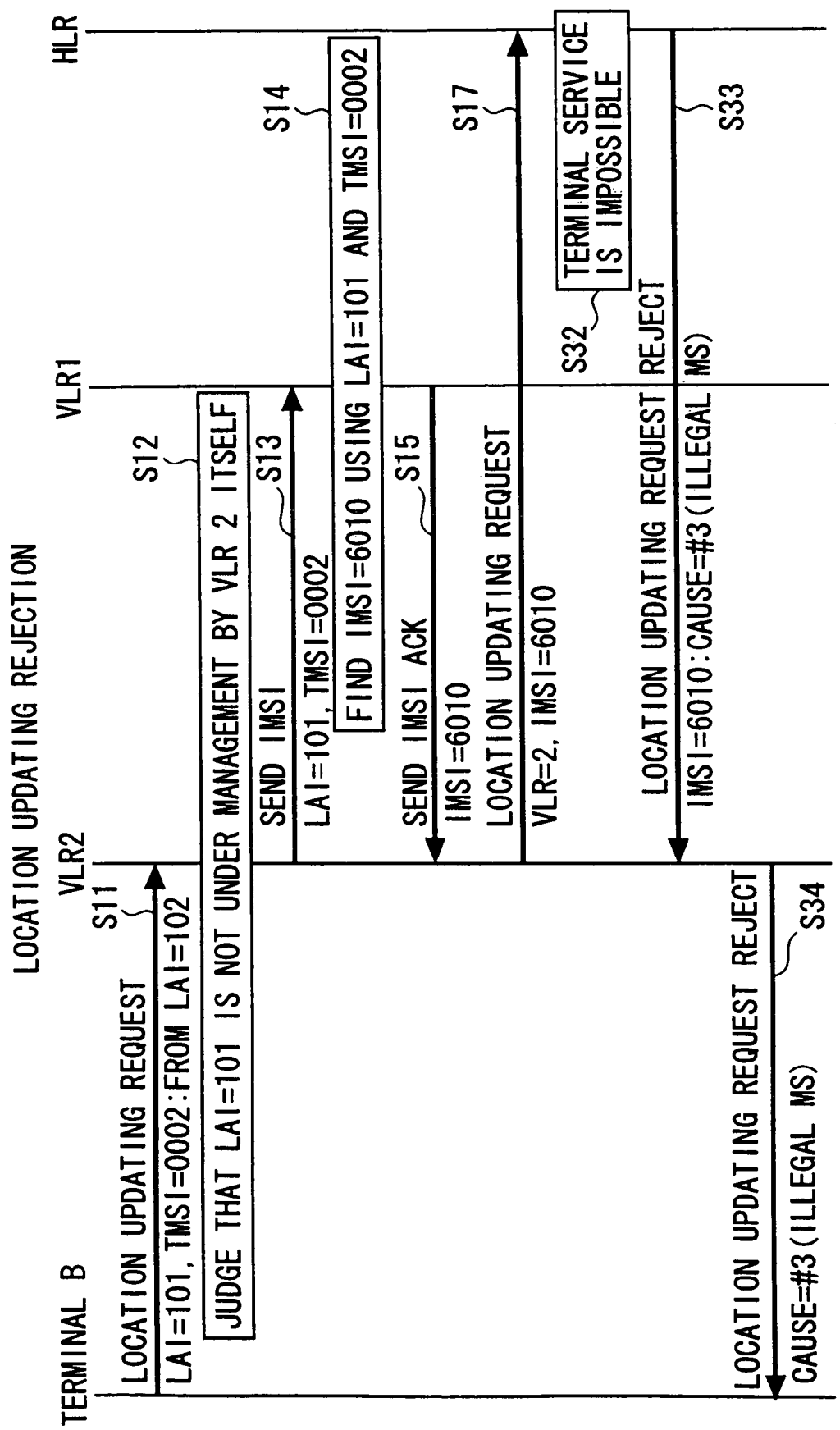
FIG. 8 is a sequence diagram in the case where location updating of a terminal is rejected.
Figure 9:
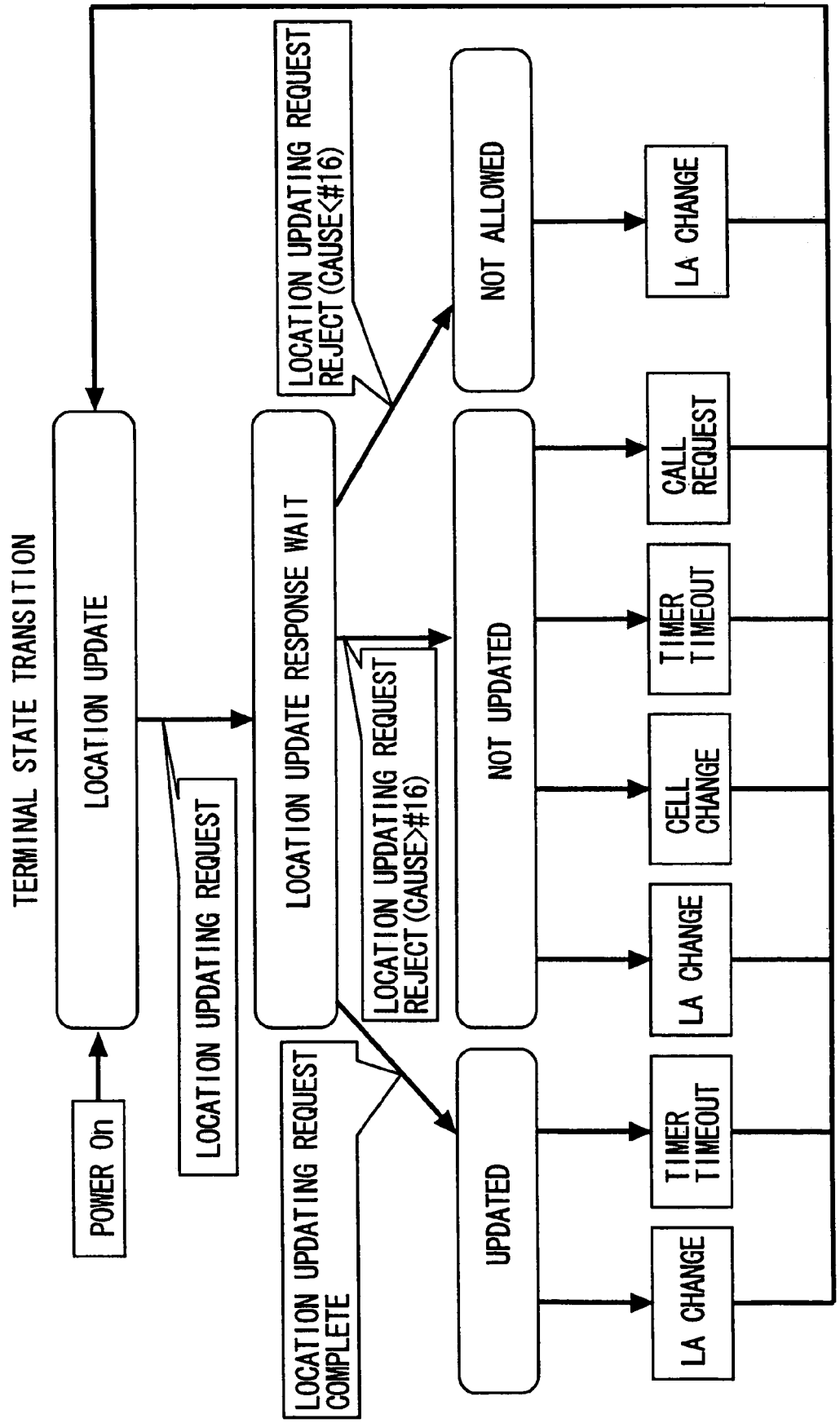
FIG. 9 is a terminal state transition diagram.

FIG. 8 shows an example of a sequence of location updating rejection and FIG. 9 is a state transition diagram of a terminal. In FIG. 8, there is shown processing in which, when the terminal B has moved to the LA 102 and transmits a location updating request to the VLR 2, the HLR judges that it is impossible to provide the terminal B with a service after the operations in S11 to S17 shown in FIG. 6 (S32). In this case, a message (LOCATION UPDATING REQUEST REJECT: Illegal MS (illegal terminal)) indicating that the location updating request from the VLR 2 is rejected is returned from the HLR to the VLR 2 (S33), and then a message indicating the location updating rejection is transmitted from the VLR 2 to the terminal (S34).

As shown in FIG. 9, after being powered on, the terminal becomes a location updating request status (LOCATION UPDATE) and issues a request for location updating (LOCATION UPDATING REQUEST). Then, the terminal shifts to a response waiting status (LOCATION UPDATE RESPONSE WAIT).

After that, if receiving a proper response (LOCATION UPDATING REQUEST COMPLETE), the terminal is placed under an updated status (UPDATED). This status is a status where the location updating has been completed in success and the latest location of the terminal is grasped on the network side. Under the updated status, the terminal is capable of performing communication.

A trigger used by the terminal under the updated status to further transmit a location updating request (to shift to the "LOCATION UPDATE" status) is only changing of an LA, in which the terminal exists, due to its movement or the like (it is possible for the terminal to know the changing of the LA through reception of broadcast information) or timeout of a timer that the terminal receives through the broadcast information.

The reasons why the location updating request from the terminal is rejected are broadly classified into two reasons. Depending on the rejection reasons, the terminal shifts to different statuses (an example of rejection of the location updating request is shown in FIG. 8).

One of the reasons for rejection is ascribable to the terminal side and is, for instance, the impossibility of the terminal to receive a service (prohibition of roaming) or the illegality of the terminal itself (such as the suspension of a service due to the nonpayment of a fee). Such a cause of rejection ascribable to the terminal side is expressed using a CAUSE number that is smaller than 16, and a location updating rejection message (LOCATION UPDATING REQUEST REJECT) containing such a CAUSE number is returned to the terminal.

When receiving such a rejection message, the terminal shifts to a not-allowed status (NOT ALLOWED). In order to get the terminal out of this status, there is no other way but to perform LA changing by moving the terminal or to perform location registration again by powering the terminal off and then on (timer is stopped and is not started as an updating cause).

The other reason for rejection is ascribable to the network side and is, for instance, congestion or a failure of the network. Such a rejection cause is expressed using a CAUSE number that is 16 or greater and a message (LOCATION UPDATING REQUEST REJECT) containing such a CAUSE number is returned to the terminal as a response message corresponding to the location registration request.

On receiving such a rejection message, the terminal shifts to an updating rejected status (NOT UPDATED). Under this status, location updating is requested by a request for an actual conversation (Call request) and a terminal inter-cell movement (Cell Change) (it is possible for the terminal to recognize its movement between cells by referring to system broadcast information) as well as LA updating (LA Change) due to a movement of the terminal and timeout of a timer (Timer Timeout).

<<First Embodiment Mode>>

In order to achieve the present invention by making modifications to the mobile telephone service system described above, problems described below needs to be solved.

[First Problem]

A private-household-use (personal-use or home-use) base station system according to the present invention needs to make a judgment as to whether the provision of a service should be allowed (OK or NG) for each terminal in units of cells (in units of base stations). In order to make such a judgment, a registration list (registration table), in which identifiers for distinguishing among base stations (base station IDs such as Cell-IDs or BTS numbers) and the identification information (IDs) of terminals that are allowed to use the base stations are registered, needs to be provided somewhere in the base station system. Also, it is required to solve the following problems concerning the registration table:

How to prescribe the existing place of the registration table on the network side and processing based on the registration contents of the registration table (what modifications should be made to the processing in the current system?);

How to register information that should be registered on the registration list;

How to solve problems that are expected to occur when the registration table and a structure relating to processing based on registration contents of the registration table are added to the current system.

As the existing place of the registration table, it is possible to propose the following two places. The two places are (A) the VLR and (B) the RNC. However, regardless of which one of the VLR and the RNC is adopted as the existing place of the registration table, problems described below will occur.

Figure 10:
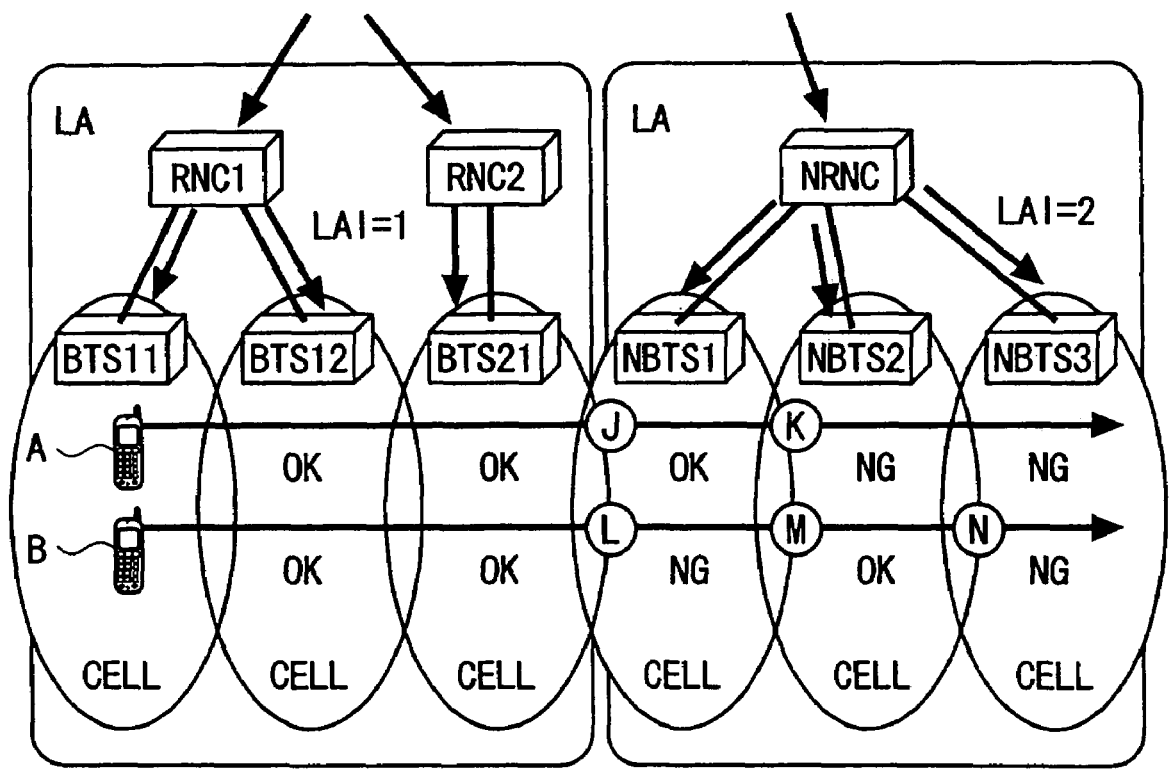
FIG. 10 is an explanatory diagram of problems that will arise when a service needs to be provided in units of cells in order to achieve a service using a personal-use base station system.

FIG. 10 shows an operation in the case where each of terminals A and B moves from an outside general area into the area of a private-household-use base station system. In FIG. 10, an NRNC is a new base station control apparatus that manages/controls each private-household-use base station NBTS x (x=1, 2, 3, . . . ).

Also, it is assumed that the terminal A is registered on the network side as a terminal that is capable of using only NBTS 1 among the multiple NBTSs (incapable of using other NBTSs) and that the terminal B is registered on the network side as a terminal that is capable of using only NBTS 2 among the multiple NBTSs.

Assuming that each of the terminals A and B moves from the left to the right on the paper plane of FIG. 10, each time the terminal moves between cells, a judgment about allowance/prohibition (OK/NG) of the use of a service in that area (that is, the use of the base station of the cell) needs to be made on the network side.

Here, when the terminal A enters the area (cell) of the NBTS 1 from the area (cell) of the BTS 21 (point "J" in the drawing), an LA change occurs (from LAI=1 to LAI=2). Accordingly, the terminal A issues a location updating request. If the terminal A receives a proper response (use is allowed) with respect to the location updating request, it becomes capable of receiving a communication service using the NBTS 1 (namely, terminal A is registered at the NBTS 1). At this time, the terminal A shifts to an "UPDATED" status.

However, when the terminal A moves to the next area of the NBTS 2 (point "K" in the drawing), no LAI change is made, so that the terminal A does not issue a location updating request. Accordingly, the terminal A remains in the "UPDATED" status and maintains a communicable status. In other words, it is impossible to set the provision of a service as NG in order to allow only the terminal B to use the NBTS 2.

Such a problem also occurs to the terminal B. That is, when the terminal B moves from the area of the BTS 21 to the area of the NBTS 1, the terminal B issues allocation updating request with an LA change as a trigger. At this time, if the network side returns a rejection message (CAUSE>#16) to the terminal B with respect to the location updating request, location registration of the terminal B in this area becomes NG and therefore it becomes possible to prevent the use of the NBTS 1 by the terminal B. As a result, the status of the terminal B becomes "NOT UPDATED".

After that, when the terminal B moves to the next cell of the NBTS 2, the terminal B recognizes a cell change and issues a location updating request. If a proper response to this request is returned to the terminal B, the status of the terminal B changes to "UPDATED" and the terminal B becomes capable of performing communication using the NBTS 2 (namely, the terminal B is registered at the NBTS 2).

However, when the terminal B moves to the next area of the NBTS 3, only a cell change is made, so that no location updating request is issued. Accordingly, it is impossible to set the provision of a service to the terminal B (use of the NBTS 3 by the terminal B) as NG. Also, cell information required to make an OK/NG judgment about the provision of a service in units of cells is not contained in the location updating request. Accordingly, means for solving these problems is required.

Also, as shown in FIG. 9, when a timer has timed out, a terminal shifts from "UPDATED" to "LOCATION UPDATE" and issues a location updating request. Accordingly, if the terminal moves to another cell and does not go out of the cell for a while, the timer will time out in due time and a location updating request is issued. Consequently, it is possible to return NG (updating request rejection).

However, the time counted by the timer is set somewhat long in order to save battery power consumed by the terminal, and it is impossible to respond to a cell change immediately. Also, if a terminal starts communication immediately after it moves to a cell in which the provision of a service is set NG, the timer is stopped due to this condition and the terminal is placed under a communication status. Consequently, an NG judgment cannot be made. As a result, it becomes impossible to prevent a situation where an unregistered terminal uses a base station.

Such a problem occurs because the location registration is performed in units of LAs, though it is required to make judgments in units of cells in order to realize the present invention. Therefore, means for causing the location registration to be performed in units of cells, that is, allocating an LAI to each cell is conceivable. Currently, however, the LAI is composed of 16 bits and the maximum number of LAIs available is around 65,000. Therefore, it is practically impossible to allocate an LAI to each private house.

[Second Problem]

Another problem arises because there are two kinds of IDs, the IMSIs and the TMSIs, as a candidate of terminal IDs that should be registered on the registration list. In usual cases, when creating a message containing a terminal ID, if both of an LAI and a TMSI are usable, a terminal uses the TMSI with a higher priority. On the other hand, when neither of the LAI and the TMSI are usable or when the TMSI is not possessed, the terminal uses the IMSI.

The LAI and TMSI allocated to the terminal are changed in accordance with its movement. Therefore, it is required to use the IMSI, with which it is possible to universally and clearly identify the terminal, as the terminal ID that should be registered on the registration list.

On the other hand, as described above, if it is possible to use the TMSI, the terminal transmits only a message in which the LAI and the TMSI are set. Consequently, it is impossible to obtain the IMSI from the message from the terminal at all times.

Therefore, it is impossible to always judge whether a terminal issued a location updating request has an IMSI registered in the registration table of an NBTS x. Accordingly, it is required to provide means for finding the IMSI using a TMSI in the message from the terminal.

[Solution to First Problem]

Figures 11A, 11B:
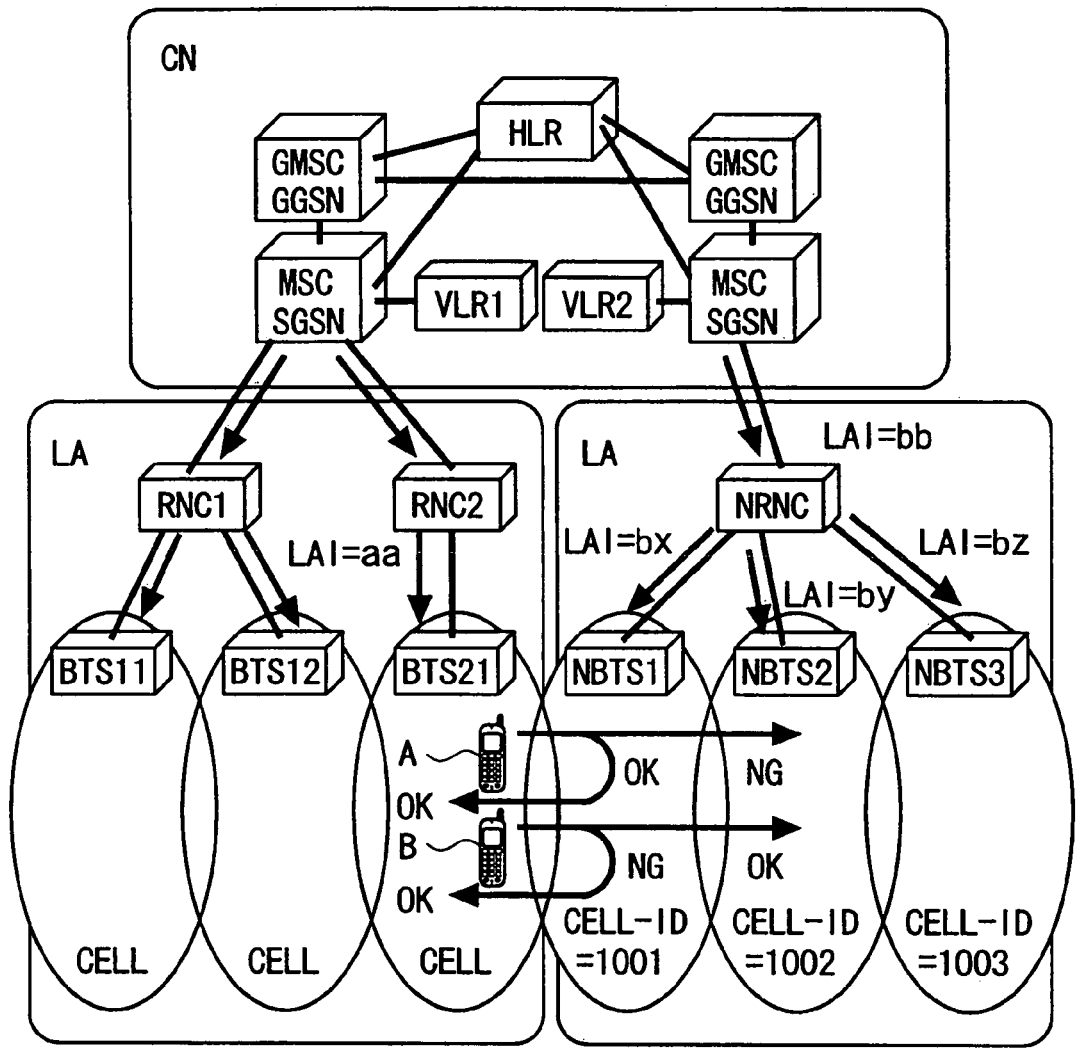
FIGS. 11A and 11B are conceptual diagrams of the layering of LAIs.

In order to solve the first problem, in embodiment modes of the present invention, LAIs are layered so as to have a hierarchical structure. FIGS. 11A and 11B are explanatory diagrams of solution means based on the layering of the LAIs.

In FIG. 11A, each of NBTSs (New BTS) is a private-household-use (private-use or home-use) base station, and an NRNC (New RNC) is a base station control apparatus that manages and controls the NBTSs. Each terminal is constructed so as to refer to an LAI in broadcast information periodically transmitted from the network and, when the terminal moves between cells, it recognizes the movement between LAs by referring to the LAI.

Accordingly, if different LAIs are used in respective cells, the terminal transmits a location updating request each time it moves between cells. As a result, it becomes possible to return a response suited to each cell (base station) from the network side to the terminal.

Otherwise, instead of this structure, if at least an LAI allocated (transmitted) to the cell of an NBTS is different from LAIs allocated (transmitted) to cells adjacent to this cell, when a terminal enters or exits the cell of the NBTS, it detects an LAI change and transmits a location updating request.

The NRNC is constructed so as to receive a system broadcast information issuance request and a part of information that should be contained in the broadcast information from the CN. On receiving the system broadcast information issuance request from the CN, the NRNC creates a system broadcast information message that contains the part of information received from the CN and predetermined information managed by the NRNC itself, and gives the message to the NBTSs (NBTSs 1 to 3, in FIG. 11) under its control. Then, each NBTS x broadcasts the system broadcast information in its cell.

The NRNC is provided with a conversion table between upper LAIs and lower LAIs shown in FIG. 11B. This conversion table is created on a memory possessed by the NRNC. The upper LAIs correspond to the LAIs in the current system and are the target of management in the CN. The lower LAIs are prepared for respective NBTSs under control by the NRNC and are (closed) LAIs that are effective only in the management ranges (cells) of the NBTSs. The conversion table stores the upper LAIs and the lower LAIs respectively allocated to the NBTSs under control by the NRNC.

In the example shown in FIG. 11B, lower LAIs "bx", "by", and "bz" respectively allocated to the NBTSs 1 to 3 under control by the NRNC belonging to the LA having a LAI=bb are registered in the conversion table of the NRNC.

When transmitting the system broadcast information to the NBTSs, the NRNC converts the upper LAI into the lower LAIs. As a result, it becomes possible to broadcast, in the cell of each NBTS x, system broadcast information having an LAI that is different from those of its adjacent cells. Accordingly, a terminal entering the cell of an NBTS x is surely given an LAI that is different from the LAI before the entering, and the terminal surely transmits a location updating request. Also, even when the terminal goes out of the cell of the NTBS x, the terminal receives a different LAI from its destination cell and issues a location updating request.

In the location registration request transmitted from the cell of the NBTS x to the NRNC via the NBTS x, a lower LAI is set as its LAI. The CN does not manage the lower LAI, so that it is impossible to transmit the location updating request to the CN as it is. Therefore, the NRNC converts the lower LAI back into the upper LAI by referring to the conversion table and transmits it to the CN. Accordingly, it becomes possible to send, to the CN, a location updating request that is the same as conventional ones.

As a result, the terminal A in FIG. 11A transmits a location updating request when it enters the cell of the NBTS 1 and also when it goes out of the cell. Consequently, when the terminal A enters the cell of the NBTS 1 from another cell, it receives a proper response with respect to a location updating request and shifts to a status where it is capable of performing communication using the NBTS 1.

In contrast to this, when the terminal A moved from the cell of the NBTS 1 to the cell of another NBTS x (unregistered cell), it receives an updating rejection response with respect to a location updating request. Consequently, the terminal A becomes incapable of using the NBTS x in the cell and is placed under an incommunicable status. In contrast to this, when the terminal moves from the cell of the NBTS 1 to the cell of a conventional BTS, it receives a proper response with respect to a location updating request and is placed under a status where it is capable of performing communication using the BTS. In FIG. 11A, the terminal A, when entered in the right side LA, is registered at the NBTS 1, and the terminal B, when entered in the right side LA, is registered at the NBTS 2.

<LAI Allocation Method>

Figure 12:
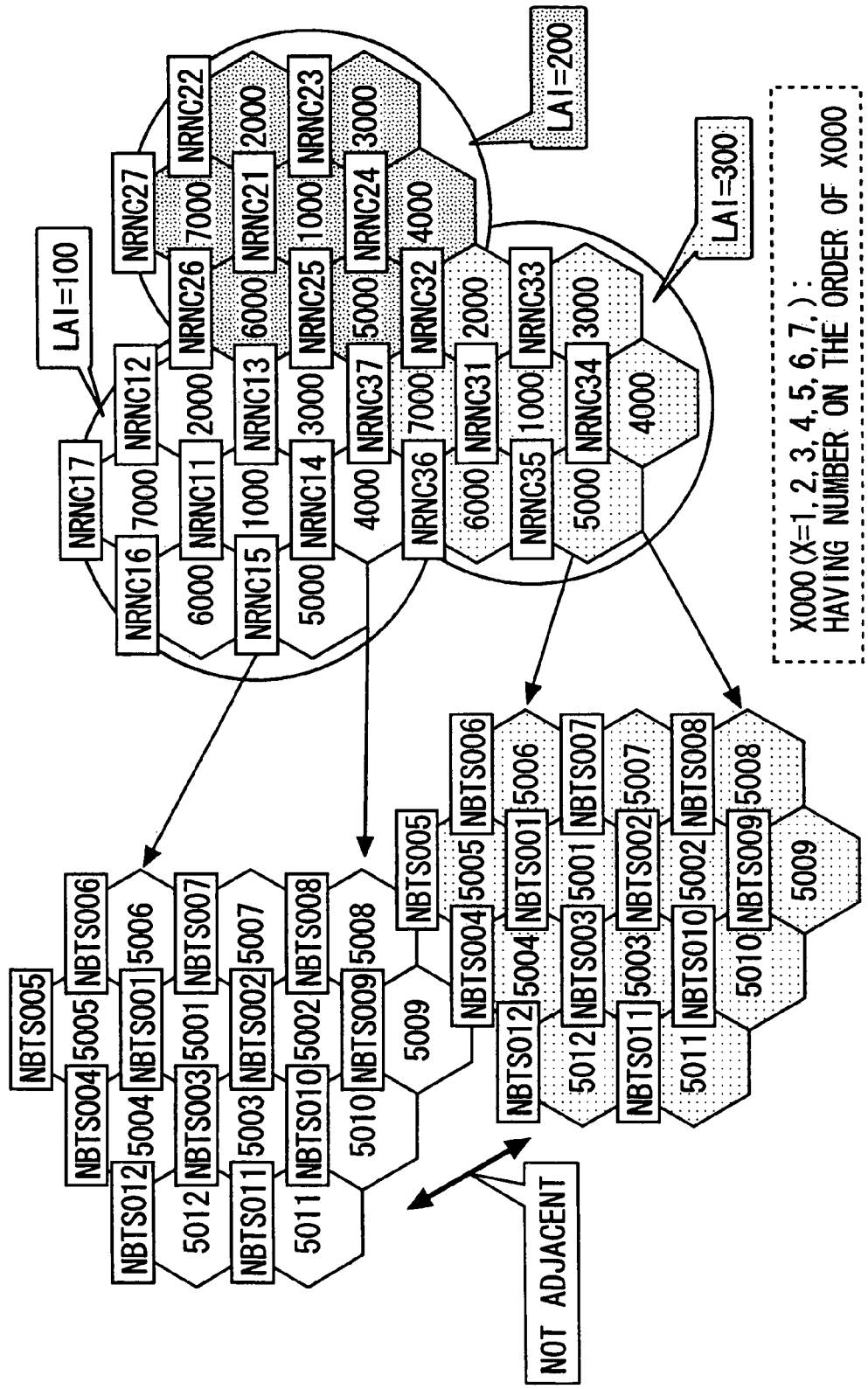
FIG. 12 is an explanatory diagram of an LAI allocation method.

The layered LAIs are allocated while considering the following points. FIG. 12 is an explanatory diagram of an LAI allocation method.

First, a group of lower LAIs to be allocated to the cells of private-house-use base stations (NBTSs) under control by one NRNC (maximum number of NBTSs that can be managed by the NRNC) is set as one group. The number of lower LAIs constituting one group may be arbitrarily set, though it is preferable that one group contains 1000 lower LAIs (such as LAIs from 1000 to 1999), for instance. At least four such groups are prepared (respectively containing LAIs on the order of 1000, LAIs on the order of 2000, LAIs on the order of 3000, and LAIs on the order of 4000, for instance).

Such multiple groups of lower LAIs are respectively allocated to NRNCs existing in the area of an LA identified by an upper LAI. At this time, groups of lower LAIs on the different orders are allocated to mutually adjacent NRNCs, thereby preventing a situation where groups of lower LAIs on the same order are allocated adjacent to each other. It is possible to realize such an allocation method by preparing four or more groups of lower LAIs and solving a mathematic four-color question (sugakuteki 4 syoku mondai). At this time, each NBTS under control by each NRNC is uniquely allocated one of the lower LAIs in a group allocated to the NRNC.

Then, the original LA (LA identified by the upper LAI) that unifies multiple NRNCs is constructed by unifying the multiple NRNCs so as not to contain NRNCs allocated the same grouped numbers (that is, the NRNCs under control include only NRNCs having mutually different grouped numbers).

In the example shown in FIG. 12, there are prepared seven lower LAIs groups that are respectively composed of LAIs on the order of 1000, LAIs on the order of 2000, LAIs on the order of 3000, LAIs on the order of 4000, LAIs on the order of 5000, LAIs on the order of 6000, and LAIs on the order of 7000 (collection of four or more such groups will be hereinafter referred to as the "upper group"). Then, these groups are respectively allocated to the multiple NRNCs so that groups of lower LAIs on the same order are not allocated adjacent to each other.

Then, original LAs (upper LAs) are each prescribed so as not to contain NRNCs allocated the same group, and these LAs are each allocated an upper LAI. In FIG. 12, there are prescribed three upper LAs that respectively have an LAI=100, an LAI=200, and an LAI=300 and each controls a group of seven NRNCs respectively allocated the lower LAI groups whose large group is formed by the upper LA.

With this allocation method, in the case shown in FIG. 12, groups of lower LAIs on the same order (LAIs on the order of 5000) are respectively allocated to the NRNC 15 and the NRNC 35, though the NRNC 15 and the NRNC 35 are not adjacent to each other and upper LAIs allocated to these NRNCs are different from each other.

Therefore, even if messages transmitted from terminals contain the same LAI and TMSI, the LAI is converted into different LAIs (LAI=100 and LAI=300) at the NRNC 15 and the NRNC 35.

Accordingly, it is possible to distinguish between these messages using the upper LAIs. Also, groups of lower LAIs on the same order are not allocated adjacent to each other, so that there will never occur a situation where when a terminal moves between NRNCs, the same LAI and TMSI are used before and after the movement. Accordingly, the terminal will never issue a location updating request containing the same LAI and TMSI as a result of such a movement.

Here, there may occur a case where a terminal performing communication using an LAI=5001 under control by the NRNC 15 is powered off and then is powered on in a cell having the same LAI=5001 under control by the NRNC 35. In this case, however, no problem arises because the terminal uses its IMSI when issuing a location registration updating request for the first time.

Also, there may be a case where when a radio wave from a terminal is blocked without powering off the terminal and then the blocking is released at a different place under control using the same LAI, a TMSI allocated in its previous place is used as it is at the time of location registration updating at the new place, and therefore a duplicate allocation state occurs in which another terminal in the same cell also use, the same TMSI. In this case, however, an authentication procedure executed at the time of the location updating results in NG, and therefore communication becomes impossible in the end. As a result, no problem arises.

[Solution to Second Problem]

Figure 13B:
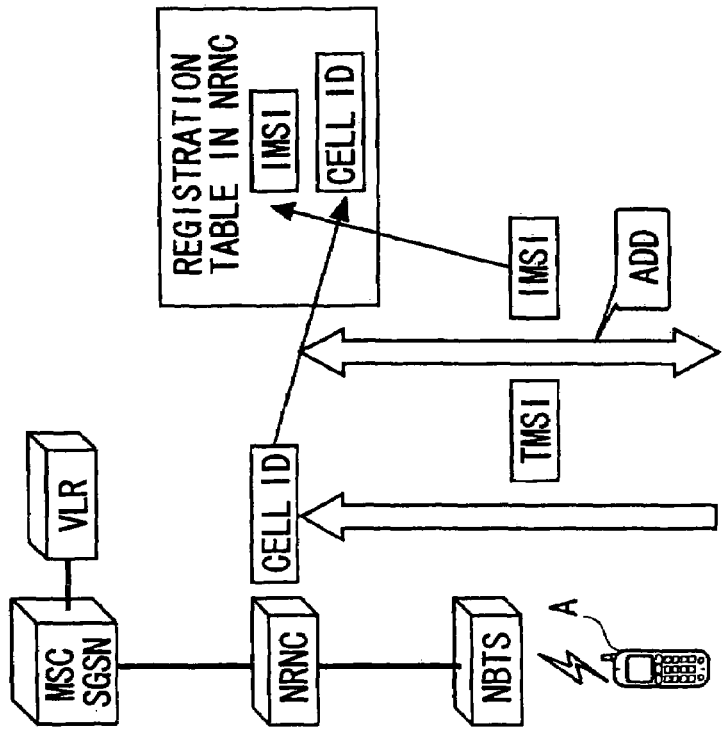
FIGS. 13A and 13B are each an explanatory diagram of the existing place of a registration table and a method for acquiring key information necessary when referring to the registration table.
Figure 13A:
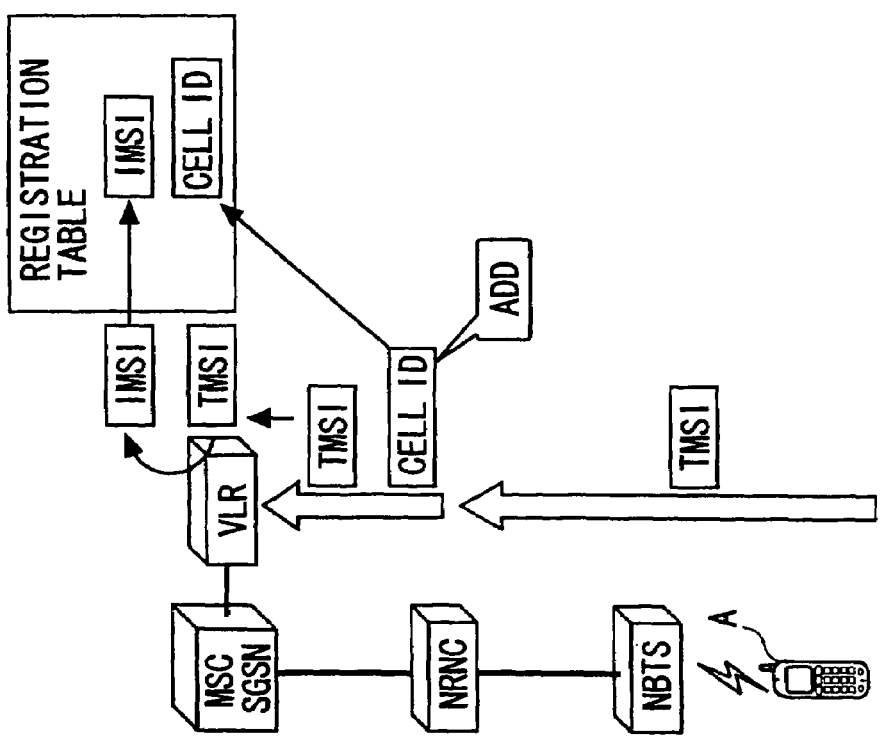

Next, a solution to the second problem (existing place of the registration list (registration table) and a structure relating to this) will be described. FIG. 13A shows processing in the case where the registration table is provided in a VLR. FIG. 13B shows processing in the case where the registration table is provided in an NRNC.

<Case Where Registration Table is Arranged in VLR>

First, by referring to FIG. 13A, a case where the registration table is placed in a VLR will be described. The registration table contains a correspondence (correspondence table) between the identification information (base station number or cell ID) of a private-house-use base station (NBTS x) (cell ID is used in this example), and an IMSI that is the identification information of at least one terminal that is allowed to use the base station. In the registration table, such a correspondence table is (statically) registered in advance, for instance.

As described above, when a TMSI is allocated to the IMSI, its correspondence (correspondence table) is registered in the VLR along with the IMSI (see FIGS. 4 and 5). Therefore, in the VLR, with respect to a TMSI contained in a message from a terminal, it is possible to find an IMSI (IMSI of the terminal that has issued the message) corresponding to the TMSI by referring to the correspondence table.

On the other hand, in the current system, the VLR does not have a mechanism for receiving information (cell ID) for identifying a base station (cell) from which the message issued by the terminal was sent. Therefore, the VLR is incapable of making a check using the registration table. In view of this problem, the NRNC is constructed so as to manage a base station (cell) from which a location updating request was transmitted (manages its cell ID).

Therefore, the NRNC adds the cell ID to the location registration request message that should be transmitted to the CN (VLR) and transmits it. The CN is constructed so as to transmit the TMSI and the cell ID to the VLR on the upper level of the NRNC via a MSC/SGSN.

With this structure, the VLR finds an IMSI using the TMSI and judges (checks) whether a pair of the IMSI and the cell ID is registered in the registration table. Then, if the pair is registered, the VLR returns a proper response message with respect to the location registration request and, if not, returns update rejection for setting the status of the terminal as "NOT UPDATED".

<Case Where Registration Table is Arranged in NRNC>

Next, by referring to FIG. 13B, a case where the registration table is arranged in the NRNC will be described. As the registration table, the same registration table as in the case of the arrangement in the VLR is arranged in the NRNC. As described above, the NRNC is capable of identifying a cell from which a message (location updating request, for instance) from a terminal was transmitted using a cell ID contained in the message (capable of obtaining the cell ID).

In the current system, when a terminal ID in a message is a TMSI, an RNC has no structure for finding an IMSI corresponding to the TMSI. Therefore, the NRNC is additionally provided with a structure for inquiring of the sender of a location updating request about its IMSI and acquiring the IMSI from a response message issued in response to the inquiry.

With this structure, the NRNC finds an IMSI using a TMSI and judges (checks) whether a pair of the IMSI and a cell ID is registered in the registration table. Then, if the pair is registered, the NRNC returns a proper response message with respect to the location registration request and, if not, returns updating rejection for setting the status of the terminal as "NOT UPDATED".

With such a structure, the terminal inquiry processing becomes necessary. However, unlike in the case where the registration table is placed in the VLR, it is not required to add the identification information of a base station (base station number or cell ID) to a message. Also, it becomes possible to construct a system without making any changes to apparatuses on the CN side. As the terminal inquiry processing, it is possible to apply already-existing inquiry processing (exchange of "IDENTITY REQUEST" and "IDENTITY RESPONSE" messages).

Embodiment 1

Figures 14A, 14B:
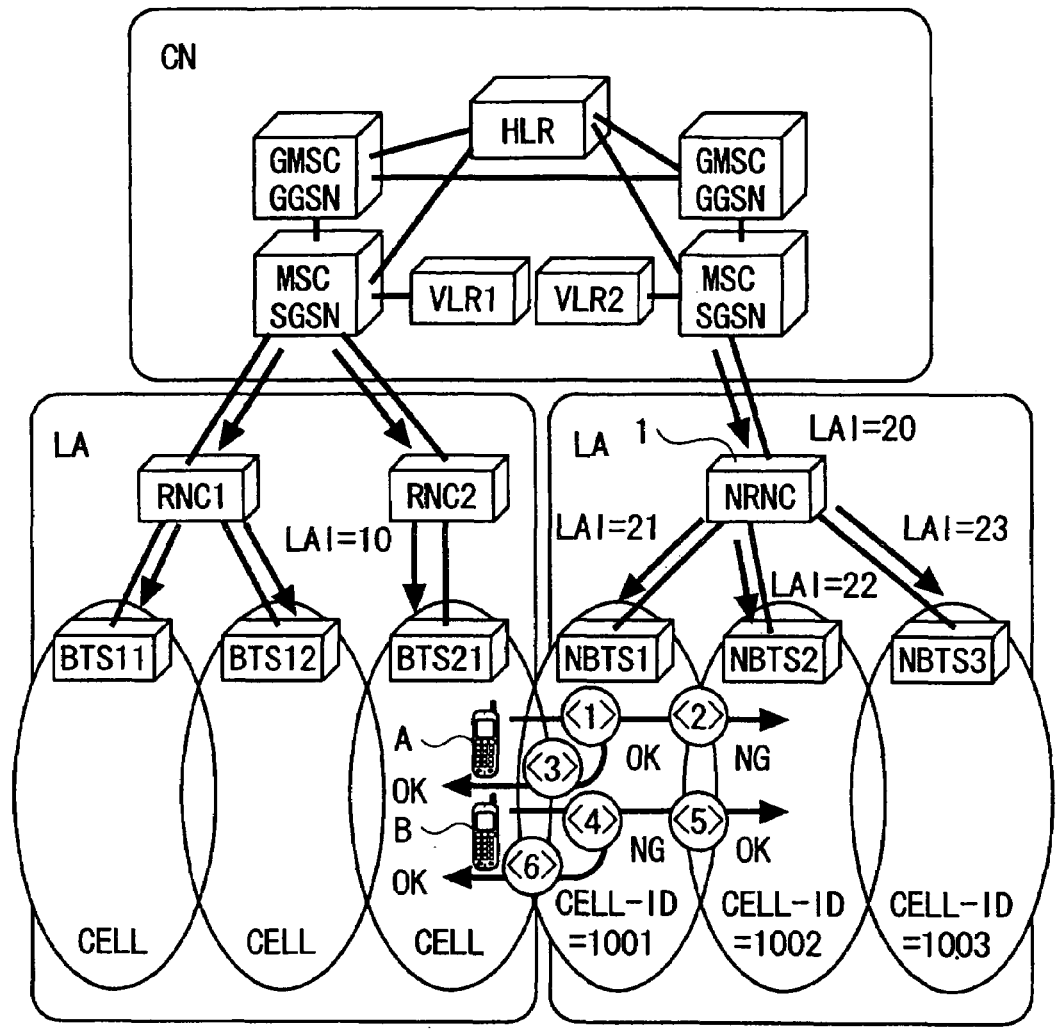
FIGS. 14A and 14B show an example of a network structure in Embodiment 1 of the first embodiment mode of the present invention (case where the registration table is provided in a VLR)

Next, as Embodiment 1 of the first embodiment mode of the present invention, processing (location registration) in the case where the registration table is arranged in a VLR will be described. FIGS. 14A and 14B show the layered LAIs in the first example, FIGS. 15A, 15B, 16A, and 16B each concretely show VLR/HLR registration contents in the first example, and FIGS. 17 to 26 are each a sequence diagram showing processing executed when a terminal A or B shown in FIG. 14 moves to any one of points <1> to <6> in FIG. 14 (corresponding to the points "J" to "N" in FIG. 10).

In FIG. 14A, as the first example, there is shown an access network (UTRAN) containing an LA allocated an LAI=10 and having a conventional system structure, and an LA allocated an LAI=20 and having a structure according to the present invention.

The LA having the LAI=20 contains a new RNC (NRNC) 1 serving as a base station control apparatus according to the present invention, and NBTSs 1 to 3 serving as new private-house-use base stations (NBTSs) accommodated in the NRNC (under control by the NRNC). The NRNC 1 corresponds to the "base station control apparatus that manages and controls a specific base station" according to the present invention, and each of the NBTSs 1 to 3 corresponds to the "specific base station" according to the present invention.

The cell of each of the NBTSs 1 to 3 is allocated one of cell IDs=1001, 1002, and 1003 and each cell (NBTS) is allocated one of lower LAIs "21", "22", and "23" each corresponding to the LAI=20.

The NRNC 1 is provided with a conversion table 2 between the upper LAI and the respective lower LAIs, and performs conversion processing between the upper LAI and the lower LAIs in messages as necessary. The NRNC may be constructed such that the conversion processing is realized through execution of a conversion processing program by a processor mounted in the NRNC, or may be constructed such that the conversion processing is realized by hardware (circuit chip) mounted in the NRNC. Alternatively, it is also possible to realize the conversion processing through combination of software and hardware. As described above, the NRNC 1 functions as an apparatus having the conversion unit and the conversion table according to the present invention.

Also, in FIG. 14, an HLR, a VLR 1 managing the LAI=10, and a VLR 2 managing the LAI=20 are contained in the CN. The VLR2 is provided with a registration table (registration list) 3 shown in FIG. 15B according to the present invention.

In the registration table 3, as a terminal that is allowed to use the NBTS 1, the IMSI of the terminal A (identification information unique to the terminal) is registered so as to be associated with the cell ID of the NBTS 1 (base station identification information), and as a terminal that is allowed to use the NBTS 2, the IMSI of the terminal B is registered so as to be associated with the cell ID of the NBTS 2. It is possible to register, in the registration table 3, the IMTSs of multiple terminals for one NBTS. As a result, it becomes possible to register respective terminals possessed by an individual and people related to him/her (for instance, members of his/her family like spouse, children, relatives living together) for one NBTS.

Also, on receiving a location updating request from a terminal that has entered the cell of an NBTS, the VLR 2 judges whether the IMSI of the terminal is registered for the NBTS using the registration table 3 (makes an OK/NG check). The VLR may be constructed such that such judgment processing is realized through execution of a program by a processor possessed by the VLR, or may be constructed such that the judgment processing is realized by hardware (circuit chip) mounted in the VLR. Alternatively, it is also possible to achieve the judgment processing through combination of software and hardware. The VLR 2 corresponds to the "location management apparatus" according to the present invention, and functions as an apparatus having the registration table, the judging unit, and the control unit.

It should be noted here that it is sufficient that the registration table is provided only for the VLR that controls the NRN. The HLR is not required to have the registration table. However, it is required to secure a registration route through which it is possible to register the correspondence between an NBTS and an IMSI in the registration table of the VLR in response to a request from a subscriber.

Now, operation examples in the case where the terminal A or B shown in FIG. 14A moves to the points <1> to <6> will be described. Note that each block surrounded by a rectangular box with a double line in each sequence diagram to be explained in the first example represents novel processing according to the present invention.

<First Operation Example>

When the terminal A shown in FIG. 14A moves from the cell of the BTS 21 to the cell of the NBTS 1 (when the terminal A enters from an outside BTS into an NBTS that provides a service only for registered terminals and the terminal A is registered for the NBTS 1: <1> in FIG. 14A), the sequences shown in FIGS. 17 and 18 are executed and a change of HLR/VLR location registration contents shown in FIG. 15A occurs.

In more detail, as shown in FIG. 17, the NBTSs 1 to 3 under control by the NRNC 1 each periodically transmits system broadcast information where the upper LAI has been rewritten into the lower LAIs at the NRNC 1 (S101, S102, and S103 in FIG. 17, for instance).

Accordingly, when the terminal A moves from the cell of the BTS 21 to the cell of the NBTS 1 and detects an LA change, it transmits a location updating request (LOCATION UPDATING REQUEST) to the network side by following the state transition shown in FIG. 9 (S104).

On receiving the location updating request via the NBTS 1, the NRNC 1 converts the lower LAI contained in the message into the upper LAI (=20), and adds the cell ID (=1001) of the NBTS 1 to the message (S105). After that, the NRNC 1 transmits the location updating request having been subjected to the LAI conversion and the cell ID addition to the CN (S106).

On receiving the location updating request, the VLR 2 judges that an inquiry of the VLR 1 about an IMSI is necessary (S107) and transmits an IMSI inquiry message (SEND IMSI) (S108).

The VLR 1 searches a table T21 (FIG. 15A) and finds an IMSI=1100 using the LAI (=10) and the TMSI (=0001) contained in the inquiry (S109). Then, the VLR 1 returns the found IMSI=1100 to the VLR 2 (S110).

The VLR 2 checks whether the IMSI=1100 is registered in the registration table 3 so as to be associated with the cell ID=1001 contained in the location updating request (Sill). In this example, a pair of the cell ID and the IMSI is registered in the registration table 3, so that the VLR 2 starts an authentication procedure for the terminal A.

After that, operations (steps) in S113 to S131 shown in FIGS. 17 and 18 are executed. Note that in S113 to S131, the same location updating procedure as conventional ones is executed except that LAI conversion processing based on the conversion table 2 is executed in S124 and S130. Therefore, the detailed description of the operations in S113 to S131 will be omitted.

As a result of the execution of the procedure shown in FIGS. 17 and 18, the location registration contents of the HLR, the VLR 1, and the VLR 2 concerning the terminals A and B are changed from contents of tables T11, T21, and T31 to tables T12, T22, and T32 (FIG. 15A).

According to the first operation example, when a terminal enters the cell of an NBTS at which it is registered, the terminal is placed under a status where it is capable of performing communication using the NBTS (capable of using a service (call termination and call origination)).

<Second Operation Example>

Next, as a second operation example, an operation in the case where the terminal A moves from a cell for which it is registered to a cell for which it is not registered (for instance, in the case where the terminal A moves from the cell of the NBTS 1 to the cell of the NBTS 2 in FIG. 14A: <2> in FIG. 14A) will be described. FIG. 19 is a sequence diagram showing the second operation example.

As shown in FIG. 19, the terminal A receives system broadcast information transmitted from the VLR 2 and containing the lower LAI=22 converted at the NRNC 1 via the NBTS 2 (S141, S142, and S143). As a result, at this time, the terminal A recognizes an LAI change and generates a location updating request message and transmits it to the network side (S144).

As a result of the same processing as in the first operation example, an LAI in the location updating request is converted at the NRNC 1, and a cell ID=1002 of the cell of the NBTS 2 is added to the location updating request (S145). After that, the location updating request is transmitted to the CN (S146).

In response to the location updating request, the CN side (VLR 2) judges that location updating is unnecessary because no LAI change has been made (S147). However, the cell ID in the location updating request has been changed (from 1001 to 1002).

Therefore, the VLR 2 acquires an IMSI=1100 corresponding to the LAI=20 and a TMSI=0001 from the table T32 (FIG. 15A) and checks whether a pair of the IMSI=1100 and the cell ID=1002 is registered in the registration table 3 (FIG. 15B) (S148).

In this case, such a pair is not registered, that is, a check result becomes NG, so that the VLR 2 judges that the terminal is incapable of using a service (S149), and returns a "REJECT" response (updating rejection) as an NG response using "CAUSE>#16" with respect to the "LOCATION UPDATING REQUEST" (S150).

As a result, the terminal A is placed under a "NOT UPDATED" status (FIG. 9) and the use of a service is stopped (S151). That is, the terminal A is placed under a status where it is incapable of using a service using the NBTS 2. Note that when the terminal shifts to the "NOT UPDATED" status, it deletes the LAI and the TMSI in its SIM as unusable (or gives a deletion mark) and uses its IMSI in the next location updating request.

As to the confirmation of the registration state of the cell ID and the IMSI in the registration table in S148 during the processing described above, the cell ID may be stored in the VLR as location information and, when a received cell ID differs from the stored cell ID, the registration check may be performed. Alternatively, a structure where the cell ID is not specifically stored in the VLR is also possible. In this case, each time a location updating request is received, the registration check is performed.

It should be noted here that in some cases, the registration contents of the HLR and the VLRs are not changed by the execution of the sequence shown in FIG. 19, and the storage contents of the tables T12, T22, and T32 are maintained (FIG. 15A).

According to the second operation example, when a terminal moves from a cell in which it is registered to a cell in which only other terminals are registered, the terminal is placed under a status where it is incapable of using a service in the cell. This means that a terminal not registered in the cell is excluded from the use of the service (base station) in the cell.

<Third Operation Example>

Next, as a third operation example, an operation in the case where the terminal A moves from a cell for which it is registered to a cell for which it is not registered (a cell based on the conventional system structure: for instance, in the case where the terminal A moves from the cell of the NBTS 1 to the cell of the BTS 21 in FIG. 14A: <3> in FIG. 14A) will be described.

As shown in FIGS. 20 and 21, when the terminal A moves to the cell of the BTS 21, it receives system broadcast information transmitted from the VLR 1 via the RNC 2 and the BTS 21. Then, the terminal A recognizes an LAI change and transmits a location updating request. In this case, the system broadcast information and the location updating request do not go through the NRNC in the access network, so that no LAI conversion is performed.

The VLR 1 does not know the LAI=21 in the location updating request, so that it judges that it needs to inquire of the VLR 2 about the IMSI of the terminal A and sends an inquiry message (SEND IMSI). However, the LAI=21 contained in the location updating request is not registered in the VLR 2 (VLR 2 does not know the LAI, either). Therefore, an inquiry NG message (SEND IMSI NG) is returned from the VLR 2 to the VLR 1.

In this case, the VLR 1 transmits a message (IDENTITY REQUEST) to the terminal A in order to directly inquire about the IMSI. In response to this message, the terminal A returns a response message (IDENTITY RESPONSE) containing the IMSI to the VLR 1.

The VLR 1 acquires an appropriate IMSI in this manner, so that it becomes possible to proceed to the following steps. After that, the same operations as conventional ones shown in FIG. 7 are executed. Note that as a result of execution of the procedure shown in FIGS. 20 and 21, the registration contents of the HLR and the VLRs are updated from the tables T12, T22, and T32 to the tables T11, T21, and T31 (FIG. 15A).

As described above, according to the third operation example, when a terminal moves from a cell in which it is registered to a cell based on a conventional system structure, the terminal is capable of shifting to a status in which communication is possible using the base station of the cell.

<Fourth Operation Example>

Figure 22:
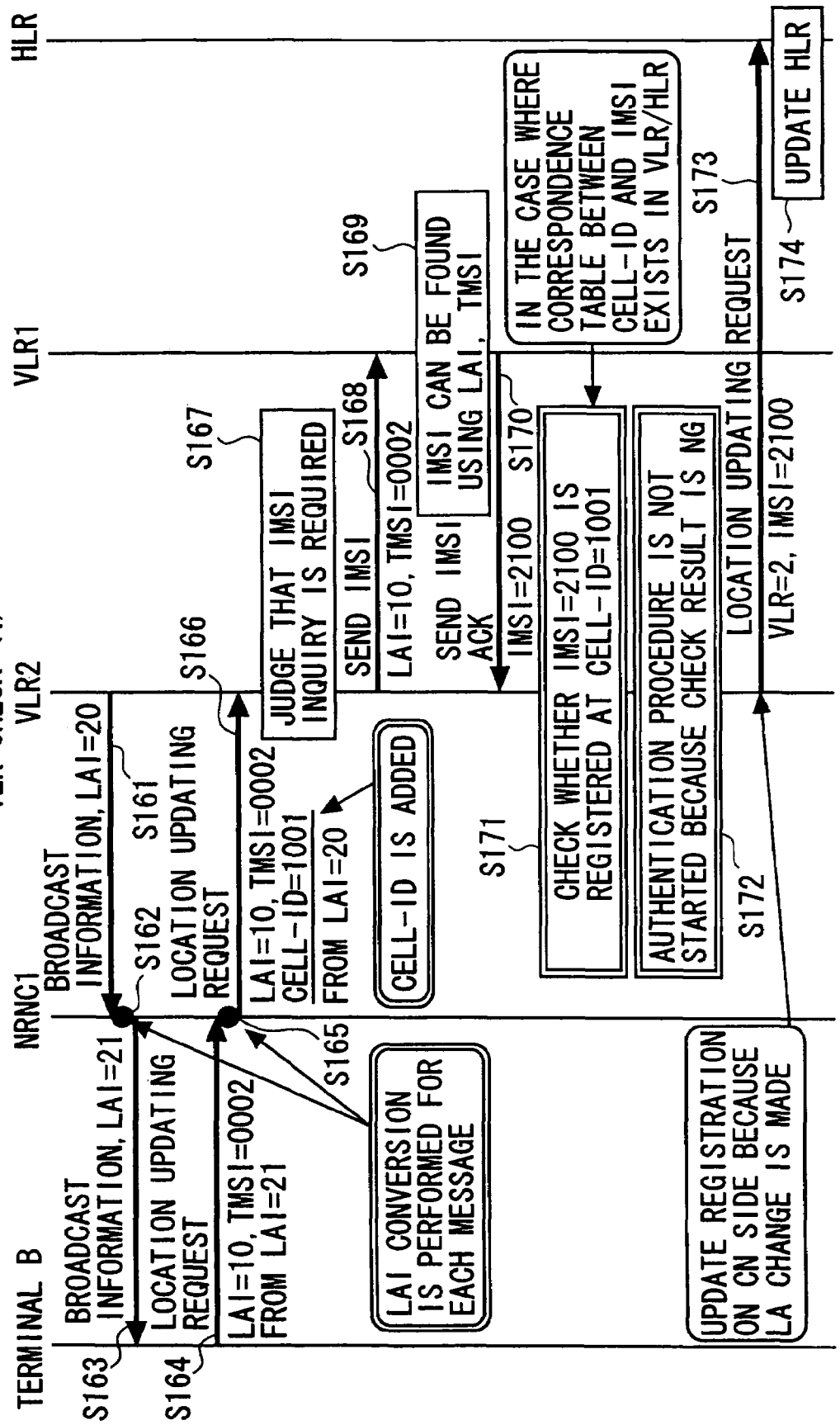
FIG. 22 is a sequence diagram showing a fourth operation example of the first embodiment mode (operation at the time of entrance from an outside cell to a prohibited cell)

Next, as a fourth operation example, an operation in the case where the terminal B moves from a cell based on a conventional system structure to a cell in which only other terminals are registered (for instance, in the case where the terminal B moves from the cell of the BTS 21 to the cell of the NBTS 1 in FIG. 14A: <4> in FIG. 14A) will be described. FIGS. 22 and 23 are each a sequence diagram showing the fourth operation example.

As shown in FIGS. 22 and 23, when the terminal B enters the cell (cell ID=1001) of the NBTS 1, the same operations as in S101 to S106 in the first operation example are executed (S161 to S166) and a location updating request is transmitted to the VLR 2.

The LAI=20 is not registered in a table T31. (FIG. 16A) of the VLR 2, so that the VLR 2 judges that an IMSI inquiry needs to be made (S167). After that, the same operations and processing as in S108 to S111 in the first operation example are executed (S168 to S171).

Here, in S171, the IMSI=2100 of the terminal B is not registered so as to be associated with the cell ID=1001 in the registration table 3. Consequently, a check result becomes NG and the VLR 2 does not start an authentication procedure for the terminal B (S172).

However, the LA in which the terminal B exists has been changed, so that the operations and processing in S173 to S181 are executed in order to update location registration of the terminal B on the CN side. These operations are the same as the operations and processing in S114 to S122 in the first operation example.

Figures 16A, 16B:
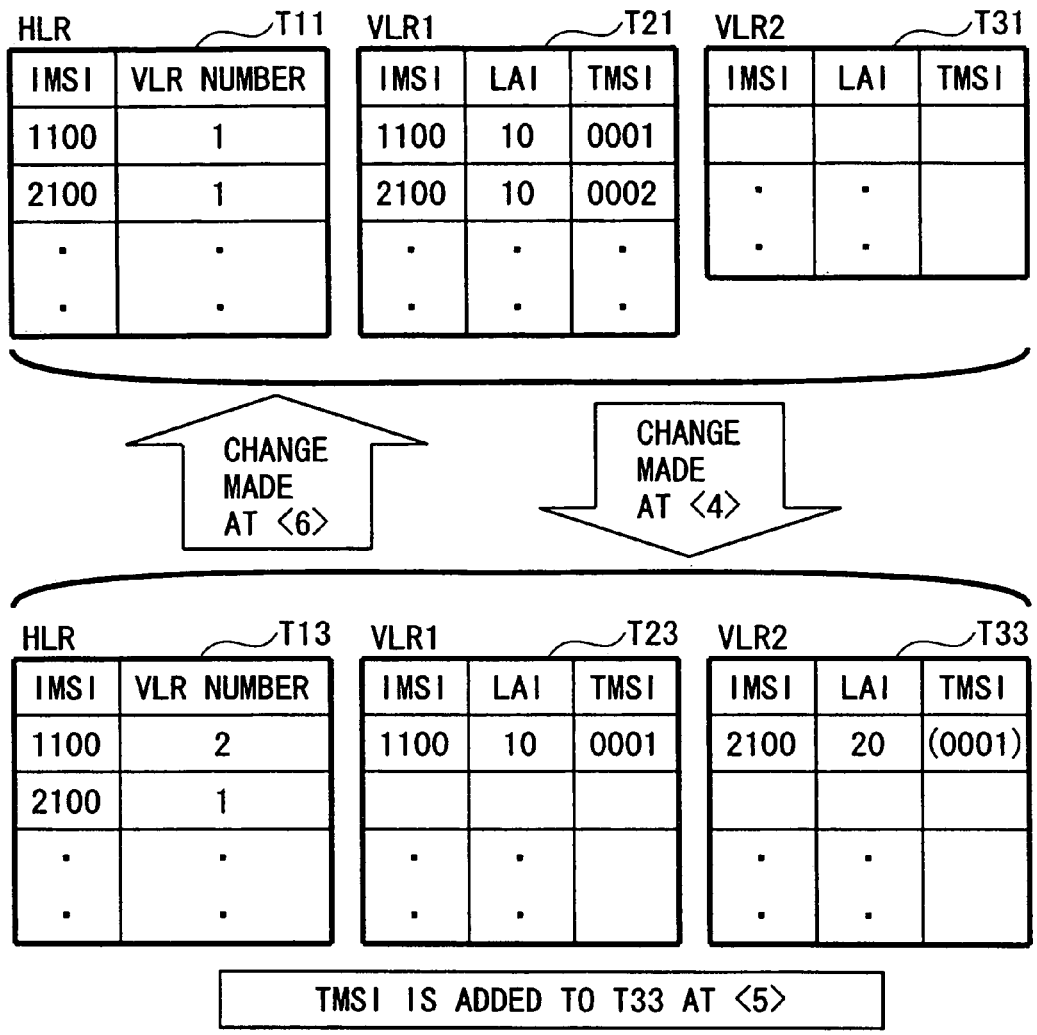
FIGS. 16A and 16B are each another explanatory diagram of the registration contents of each table possessed by the HLR and each VLR shown in FIG. 14, and the registration contents of the registration table provided in the VLR.

As a result of S173 to S181, the registration contents of the HLR and the VLRs are changed from contents of tables T11, T21, and T31 to tables T13, T23, and T33 in FIG. 16A (though no TMSI is registered in the table T33).

In S182, the VLR 2 rewrites a message in accordance with the NG check result concerning the registration table 3, and transmits "LOCATION UPDATING REQUEST REJECT" to the terminal B (S183). It is possible to execute this processing by rewriting a proper response (LOCATION UPDATING REQUEST COMPLETE) that should be originally transmitted to an updating request rejection (LOCATION UPDATING REQUEST REJECT).

As a result, the status of the terminal B shifts to "NOT UPDATED" (S184) and the terminal B is placed under a status where it is incapable of using a service. Note that the LAI and the TMSI in the SIM of the terminal B are deleted as unusable (S185).

According to the fourth operation example, when a terminal moves from a conventional cell to a cell in which only other terminals are registered, the use of a service (NBTS) by the terminal is excluded as a result of a check of the registration table. However, when the inter-cell movement accompanies a movement between LAs, location registration of the terminal is updated on the CN side like in the conventional case.

<Fifth Operation Example>

Next, as a fifth operation example, an operation in the case where the terminal B moves from a cell for which only other terminals are registered to a cell for which the terminal B is registered (for instance, in the case where the terminal B moves from the cell of the NBTS 1 to the cell of the NBTS 2 in FIG. 14A: <5> in FIG. 14A) will be described. FIG. 24 is a sequence diagram showing the fifth operation example.

As shown in FIG. 24, when the terminal B enters the cell (cell ID=1002) of the NBTS 2, it recognizes an LAI change with reference to system broadcast information (LAI=22) reaching itself through operations in S191 toS193, and transmits a location updating request (S194).

At this time, there is obtained a state where as a result of the operation in S185, no LAI and TMIS are stored in the SIM of the terminal B, so that the terminal B generates a location updating request containing an IMSI (=2100) stored in the SIM and transmits it. After being subjected to LAI conversion and cell ID addition at the NRNC 1, this location updating request is transmitted to the CN (VLR 2) (S195 and S196).

The VLR 2 refers to the table T33 using the IMSI contained in the location updating request and confirms that the IMSI=2100 is registered. The VLR 2 also judges that location updating in the CN is unnecessary because the LAI=20 is not changed (S197).

On the other hand, the cell ID contained in the location updating request has been changed, so that the VLR 2 refers to the registration table 3 using the IMSI=2100 and the cell ID=1002 as a key, and checks whether a corresponding correspondence table is registered (S198).

In this case, the IMSI and the cell ID are registered in the registration table 3, so that the VLR 2 judges that the terminal B is capable of using a service (NBTS 2) (S199) and executes an authentication procedure (S200).

When the authentication procedure is completed, the VLR 2 transmits a TMSI allocation message (TMSI ALLOCATION) to the terminal B (S201). After being subjected to LAI conversion (from 20 to 22) at the NRNC (S202), this message is received by the terminal B (S203).

In response to the received message, the terminal B additionally registers the LAI and the TMSI contained in the allocation message in the SIM (S204) and then returns a proper allocation response message (TMSI ALLOCATION ACK) to the VLR 2 (S205).

On receiving the allocation response message, the VLR 2 additionally registers the TMSI=0001 allocated to the IMSI=2100 in the table T33 (S206). After that, a proper response message (LOCATION UPDATING COMPLETE) is transmitted to the terminal B with respect to the location updating request (S207, S208, and S209), and the terminal B shifts to an "UPDATED" status. As a result, the terminal B returns to a service (NBTS 2) usable status.

According to the fifth operation example, even if a terminal is placed under a service unusable status in a cell that can be used only by other terminals, the terminal is capable of returning to a status in which communication is possible in a cell in which it is registered, with its movement to the cell as a trigger.

<Sixth Operation Example>

Next, as a sixth operation example, an operation in the case where the terminal B moves from a cell for which only other terminals are registered to a cell based on a conventional system structure (for instance, in the case where the terminal B moves from the cell of the NBTS 1 to the cell of the BTS 21 in FIG. 14A: <6> in FIG. 14A) will be described.

As shown in FIGS. 25 and 26, when the terminal B moves to the cell of the BTS 21, it receives system broadcast information from the VLR 1. The terminal B recognizes an LA change, generates a location updating request, and transmits it. At this time, location updating at the NBTS 1 has been rejected, so that no LAI and TMSI are stored in the SIM of the terminal B. Consequently, the terminal B transmits a location updating request in which its IMSI=2100 is set.

This location updating request is received by the VLR 1. In response to the received request, the VLR 1 refers to the table T23 (FIG. 16A) and judges that location updating in the CN is necessary because the IMSI=2100 is not registered. Then, the VLR 1 executes an authentication procedure with the terminal B and, when this authentication procedure is completed, transmits a location updating request to the HLR.

In response to the location updating request, the HLR updates its table. That is, the HLR updates the table T13 to the table T11. After that, the HLR transmits a request to delete the IMSI=2100 to the VLR 2. The VLR 2 deletes an entry corresponding to the IMSI=2100 from the table T33 (FIG. 16A) and returns a confirmation message to the HLR.

On receiving the confirmation message, the HLR transmits a subscriber information addition request (SUBSCRIBER INSERT) to the VLR 1. On receiving this addition request, the VLR 1 additionally registers the IMSI=2100 in the table T23 and then transmits a confirmation message (SUBSCRIBER INSERT ACK) to the HLR with respect to the addition request.

In response to the confirmation message, the HLR transmits a confirmation message to the VLR 1 with respect to the location updating request. On receiving the confirmation message, the VLR 1 stores the LAI=10 in the table T23 so as to be associated with the IMSI=2100. After that, the VLR 1 transmits, to the terminal B, a request to register an allocated TMSI=0002.

On receiving this request, the terminal B writes the LAI=10 and the TMSI=0002 into the SIM and returns a confirmation message. In response to the confirmation message, the VLR 1 adds the TMIS=0002 in the table T23 so as to be associated with the IMSI=2100. As a result, the table T23 is changed into the table T21 in FIG. 16A.

Then, the VLR 1 transmits a proper response message to the terminal B with respect to the location updating request. As a result, the terminal B shifts to an "UPDATED" status and is placed under a status where the use of a communication service using the BTS 21 is possible.

According to the sixth operation example, when a terminal moves from a cell whose use is allowed only to registered terminals to a cell in which such limitation is not imposed, the terminal is capable of returning to a status where the use of a communication service using the cell is possible.

As described above, according to the first example, it is possible to solve the first and second problems by adding a function (of performing LAI conversion between an upper LAI and a lower LAI and adding a cell ID to a location updating request) to the NRNC, and by adding a function (of providing the registration table in the VLR, checking against the registration table at the time of reception of a location updating request, and returning a response in which a check result is reflected) to the CN (VLR).

[Embodiment 2]

Figures 27A, 27B:
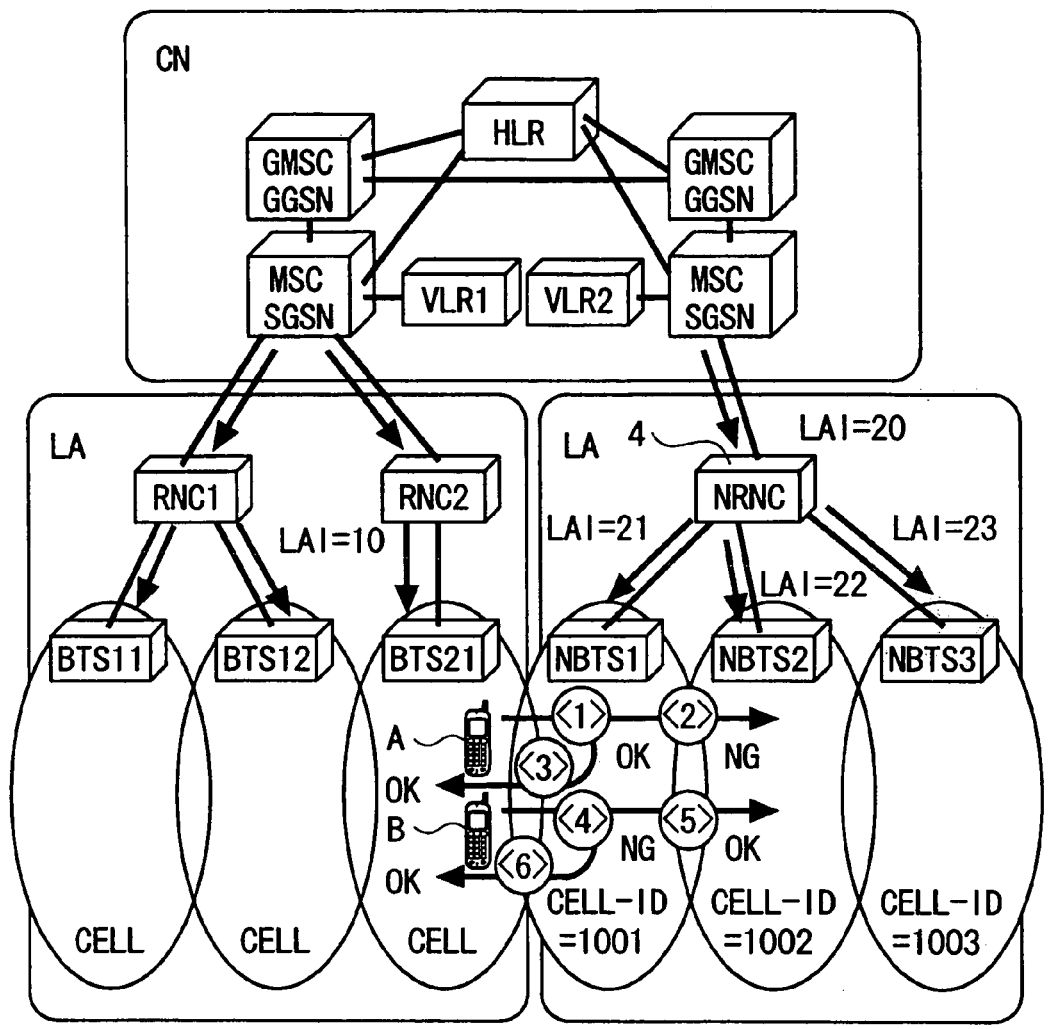
FIGS. 27A and 27B show an example of a network structure in Embodiment 2 of the first embodiment mode (case where the registration table is provided in an NRNC)
Figures 29A, 29B:
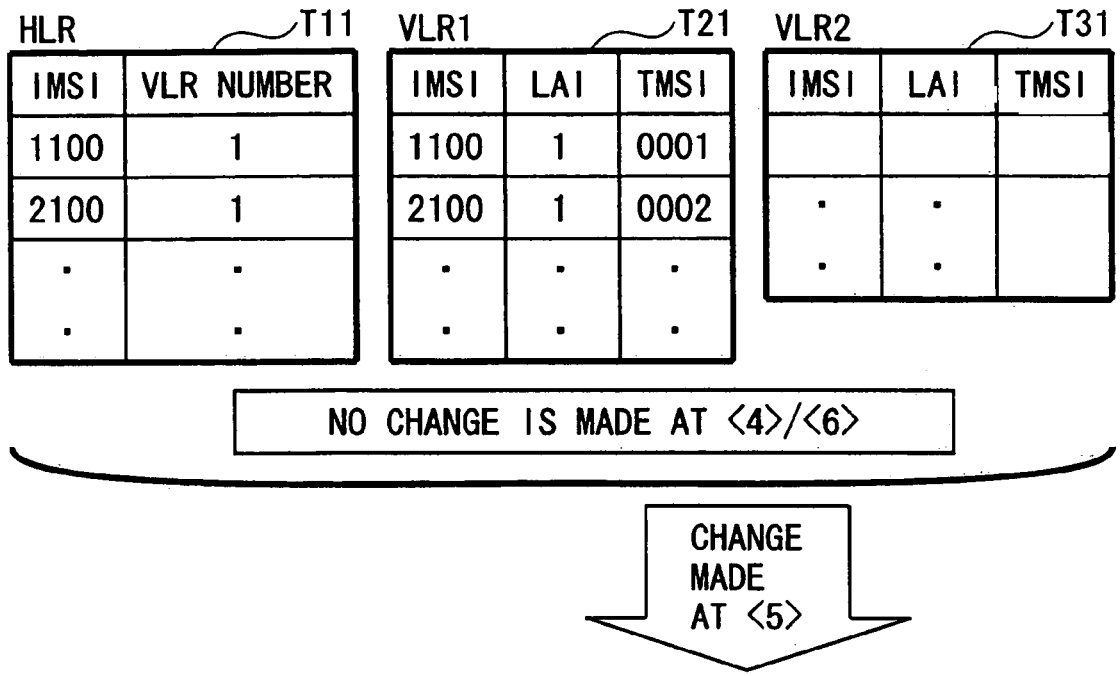
FIGS. 29A and 29B are each another explanatory diagram of the registration contents of each VLR and the HLR and the registration contents of the registration table in the NRNC in Embodiment 2 of the first embodiment mode.

Next, as Embodiment 2 in the first embodiment mode of the present invention, processing (location registration) in the case where the registration table is arranged in the NRNC will be described. FIGS. 27A and 27B show a network structure in Embodiment 2, FIGS. 28A, 28B, 29A, and 29B each concretely show the VLR/HLR registration contents in Embodiment 2 and the registration table provided for the NRNC, and FIGS. 30 to 38 are each a sequence diagram showing processing executed in the case where the terminal A or B shown in FIG. 27A exists at each one of points <1> to <6> shown in FIG. 27A (corresponding to the points "J" to "N" in FIG. 10).

The network of Embodiment 2 shown in FIG. 27A has the same structure as the network of Embodiment 1 shown in FIG. 14A. In Embodiment 2, however, the network structure is changed so that an NRNC 4 is provided with a conversion table 5 and has a registration table 6 (FIGS. 14B, 28B and 29B) in place of the VLR 2. Accordingly, the construction of the VLR 2, that is, the network structure of the CN is the same as the conventional structure shown in FIG. 10. The allocation state of BTS numbers, LAIs, cell IDs, and terminal IMSIs is the same as that in Embodiment 1.

The NRNC 4 has a function of, when a terminal enters the cell of an NBTS x, receiving a location updating request from the terminal and making a judgment as to whether the IMSI of the terminal is registered for the NBTS using the registration table 6 (OK/NG check). Therefore, the NRNC 4 has a function of inquiring of the terminal about an IMSI corresponding to a TMSI contained in the request.

It is possible to realize these functions through execution of a program by a processor possessed by the NRNC 4. Alternatively, it is possible to realize the judgment processing with hardware (circuit chip) mounted in the NRNC 4. Still alternatively, it is possible to achieve it through combination of software and hardware.

Now, operation examples in the case where the terminal A or B shown in FIG. 27A moved to the points <1> to <6> in FIG. 27A will be separately described as seventh to twelfth operation examples. Note that in sequence diagrams illustrating the seventh to twelfth operation examples, each block surrounded by a rectangular box with a double line represents the novel processing according to the present invention.

<Seventh Operation Example>

FIGS. 30 and 31 are each a sequence diagram illustrating the seventh operation example and shows a procedure and processing in the case where a terminal enters from a cell based on a conventional system structure (cell whose use is not limited) into a cell whose use is allowed only to registered terminals (for instance, in the case where the terminal A shown in FIG. 27A enters from the cell of the BTS 21 into the cell of the NBTS 1), and the terminal A is registered for the NBTS 1. The seventh operation example corresponds to the first operation example.

The NBTSs 1 to 3 under control by the NRNC 4 transmit system broadcast information in which their LAIs have been rewritten into lower LAIs at the NRNC 4. Each piece of system broadcast information is broadcasted in its corresponding cell.

Accordingly, when entering the cell of the NBTS 1, the terminal A detects an LA change and transmits a location updating request (LOCATION UPDATING REQUEST) to the network side in accordance with the state transition in FIG. 9. These operations are the same as those in the first operation example of Embodiment 1.

On receiving the location updating request from the terminal A, the NRNC 4 performs the following processing instead of immediate transmission of the message to the CN side. That is, the NRNC 4 recognizes that the location updating request from the terminal A was forwarded by the NBTS 1 and obtains the cell ID (identification information) of the NBTS 1 using a physical interface.

On the other hand, the NRNC4 identifies the terminal with reference to a pair of an LAI and a TMSI in the location registration request and transmits an IMSI inquiry message (IDENTITY REQUEST) to the terminal A in order to acquire the IMSI from the terminal A.

In response to the IMSI inquiry message, the terminal A reads the IMSI from its SIM, generates a response message (IDENTITY RESPONSE) containing the IMSI, and returns the message to the NRNC 4. The NRNC 4 acquires the IMSI of the terminal A in this manner. Then, the NRNC 4 refers to the registration table 6 using the IMSI and the cell ID as a key and judges whether a pair of the IMSI and the cell ID is registered in the registration table 6.

In this case, such a pair of the IMSI and the cell ID is registered, so that a check result becomes OK. Then, the NRNC 4 rewrites the lower LAI in the location updating request, whose transmission was withheld, into an upper LAI using the conversion table 5 and transmits it to the CN side (VLR 2).

At this time, the TMSI in the location updating request is changed to the IMSI. As a result, it becomes possible to omit IMSI inquiry processing at the VLR 2. Also, unlike in Embodiment 1, it is not required to add the cell ID to the location updating request.

On the VLR/HLR side, ordinary (already-existing) processing is performed and, on receiving a message "LOCATION UPDATING OK" from the HLR, the VLR 2 starts "TMSI ALLOCATION" processing for the terminal A. The NRNC 4 recognizes this situation and acquires a TMSI corresponding to the IMSI. As a result, it becomes unnecessary for the NRNC 4 to inquire of the terminal A about the IMSI each time a location updating request is issued thereafter.

After that, the same operations and processing as in S125 to S131 in FIG. 18 are executed and the location updating is completed. At this point in time, the terminal A is placed under a status where the use of a service using the NBTS 1 is possible.

<Eighth Operation Example>

Next, as an eighth operation example, an operation in the case where the terminal A moves from a cell for which it is registered to a cell for which it is not registered (for instance, in the case where the terminal A moves from the cell of the NBTS 1 to the cell of the NBTS 2 in FIG. 27: <2> in FIG. 27) will be described. FIG. 32 is a sequence diagram showing a procedure and processing in the eighth operation example. The eighth operation example corresponds to the second operation example.

As shown in FIG. 32, the terminal A receives system broadcast information containing an LAI that is different from the LAI=21 of the NBTS 1. Then, the terminal A transmits a location updating request. The TMSI and the IMSI of the terminal A are stored in NRNC 4 as a pair as a result of the processing shown in FIG. 31. Therefore, the NRNC 4 is capable of deriving the IMSI using the TMSI contained in the location updating request.

Also, the NRNC 4 is capable of finding a cell ID with reference to the NBTS that has received this location updating request. The NRNC 4 searches the registration table 6 using the IMSI and the cell ID obtained in this manner and judges whether a pair of the IMSI and the cell ID is registered.

In this case, however, such a pair of the IMSI and the cell ID is not registered in the registration table 6. Therefore, the NRNC 4 judges that the use of a service by the terminal A is impossible, and immediately transmits an updating rejection message (LOCATION UPDATING REQUEST REJECT) to the terminal A using "CAUSE>#16" with respect to the location updating request. As a result, the terminal A shifts to a status where a service is impossible, that is, the use of the NBTS 2 is impossible. Also, the LAI and the TMSI in the SIM are deleted.

It should be noted here that according to the procedure shown in FIG. 32, the location updating request is not transmitted to the CN side in the end. However, when viewed from the CN side, the LA, in which the terminal A exists, is not changed, so that no problem arises.

<Ninth Operation Example>

Next, as a ninth operation example, an operation in the case where the terminal A moves from a cell for which it is registered to a cell for which it is not registered (for instance, in the case where the terminal A moves from the cell of the NBTS 1 to the cell of the BTS 21 in FIG. 27: <3> in FIG. 27) will be described.

FIGS. 33 and 34 are each a sequence diagram showing a ninth operation example. The procedure and processing in this ninth operation example are completely the same as those in the third operation example shown in FIGS. 20 and 21, so that the description thereof will be omitted.

<Tenth Operation Example>

Next, as a tenth operation example, an operation in the case where the terminal B moves from a cell based on a conventional system structure to a cell in which only terminals other than the terminal B are registered (for instance, in the case where the terminal B moves from the cell of the BTS 21 to the cell of the NBTS 1 in FIG. 27A: <4> in FIG. 27A) will be described. FIG. 35 is a sequence diagram showing the tenth operation example. The tenth operation example corresponds to the fourth operation example.

As can be seen from FIG. 35, this tenth operation example differs from the seventh operation example (case of the terminal A) in that the terminal B is not registered for the NBTS 1. Like in the seventh operation example, the NRNC 4 acquires the IMSI of the terminal B by transmitting "IDENTITY REQUEST" to the terminal B and checks whether a pair of the IMSI and the cell ID of the NBTS 1 are registered in the registration table 6.

In this case, the terminal B is not registered for the NBTS 1, so that the NRNC 4 judges that a check result is NG. Consequently, the NRNC 4 does not transmit a location update request to the CN side but immediately transmits an updating rejection message with respect to the location updating request, thereby setting the terminal B under a service impossible status.

Accordingly, on the CN side, the location updating request is not received, so that the registration contents of the HLR and each VLR are not changed and the LA location registration of the terminal B is not changed from the original location. In this regard, the tenth operation example differs from the fourth operation example in which the registration table 3 is provided in the VLR 2.

<Eleventh Operation Example>

Next, as an eleventh operation example, an operation in the case where the terminal B moves from a cell for which only other terminals are registered to a cell for which the terminal A is registered (for instance, in the case where the terminal B moves from the cell of the NBTS 1 to the cell of the NBTS 2 in FIG. 27: <5> in FIG. 27) will be described. FIGS. 36 and 37 are sequence diagrams showing the Eleventh operation example.

As shown in FIGS. 36 and 37, on receiving system broadcast information, the terminal B recognizes an LAI change and transmits a location updating request. In this case, the terminal B is not allocated a TMSI because the location updating in the cell of the NBTS 1 was judged as NG. Therefore, its IMSI is set in the location updating request.

On receiving the location updating request in which the IMSI is set, the NRNC 4 checks the registration table 6 using the IMSI=2100 and the cell ID=1002 derived from the NBTS 2. In this case, a pair of the IMSI and the cell ID is found in the registration table 6, so that the NRNC 4 judges that the terminal B is capable of using a service and transmits the location updating request to the CN side.

Processing thereafter is the same as the procedure and processing based on an ordinary location updating request, so that the description thereof will be omitted. Note that with respect to a "TMSI ALLOCATION" message from the VLR 2 shown in FIG. 37, the NRNC 4 performs processing for acquiring a TMSI contained in this message and adding it to the registration table 6.

Then, a "LOCATION UPDATING REQUEST COMPLETE" message is finally transmitted to the terminal B, and the terminal B is placed under a status where the use of a service using the NBTS 2 is allowed.

<Twelfth Operation Example>

Next, as a twelfth operation example, an operation in the case where the terminal B moves from a cell for which only other terminals are registered to a cell based on a conventional system structure (for instance, in the case where the terminal B moves from the cell of the NBTS 1 to the cell of the BTS 21 in FIG. 27A: <6> in FIG. 27A) will be described. FIG. 38 is a sequence diagram showing the twelfth operation example. The twelfth operation example corresponds to the sixth operation example.

In FIG. 38, the terminal B recognizes an LA change based on an LAI=10 in system broadcast information from the BTS 21, and transmits a location updating request. The VLR 1 receives this location updating request.

At this time, as described in the tenth operation example (<4> in FIG. 27A), when the terminal B enters the cell of the NBTS 1, the CN side did not receive the location updating request from the terminal B, so that the location registration of the terminal B in the CN was not updated. Therefore, when viewed from the VLR 1 side, it seems that the location of the terminal B is not changed, so that location registration updating processing is not performed in the CN.

However, the IMSI of the terminal B is set in the location updating request, so that TMSI re-allocation processing is performed. As a result, a TMSI=0002 is allocated to the IMSI=2100. In this manner, it is possible for the terminal B to return to a service possible status.

As described above, with the method with which the terminal registration table is placed in the NRNC instead of the VLR, the NRNC needs to additionally perform the operation for acquiring an IMSI from a terminal. However, there is no need at all to make changes to the processing and procedure at the CN, and it becomes unnecessary to arrange the registration table on the CN side. Therefore, it becomes unnecessary to make changes to an already-existing system in order to carry out the present invention, and this is a major benefit of Embodiment 2.

[Action/Effect of the First Embodiment Mode]

According to the first embodiment mode, it becomes possible to attain the following actions (operations) and effects.

(1) By layering LAIs, a terminal is caused to issue a location registration request each time it moves between cells. As a result, it becomes possible to make a location updating judgment suited for a current situation on the network side. (2) By arranging the registration table in a VLR and causing an NRNC to add an ID identifying a cell to a location registration request message and send it, it becomes possible to make an allowance/prohibition check as to the use of a service (NBTS) using the registration table. (3) By arranging the registration table in an NRNC and additionally performing processing for inquiring of a terminal issued a message using a TMSI about its IMSI, it becomes possible for the NRNC alone to check the registration table.

As a result of the actions and effects described above, it becomes possible to prevent a situation where the meaning of the introduction of a private-house-use (home-use) base station system by an individual is impaired. As a result, it becomes possible to promote the introduction of a home-use base station system (NBTS) by an individual.

<<Second Embodiment Mode>>

Next, a second embodiment mode of the present invention will be described. First, explanation will be given of another problem of the current mobile telephone network system to be solved in the second embodiment mode. The problem relates to an operation at the time of call termination.

Under the current circumstances, a call termination request to a terminal in the idle mode is made by transmitting a message (PAGING TYPE 1 message) from the network side to the terminal, and the terminal starts a call termination operation with the reception of this message as a trigger.

As described above, however, the terminal in the idle mode is merely managed in units of LAs on the network side. Therefore, it is only possible to identify an LA, to which the call termination request should be transmitted, on the network side. Therefore, as shown in FIG. 39, the call termination request has conventionally been transmitted to every RNC and BTS in the LA, in which the terminal that is the destination of the call termination request (PAGING TYPE 1 message) exists, in a multicast manner.

Consequently, the PAGING TYPE 1 message is received by every terminal in the LA and the terminal makes a judgment as to whether the message is addressed to itself. Then, the terminal that judges that the message is addressed to itself proceeds to a call termination operation (in more detail, a procedure for establishing a link to a UTRAN). On the other hand, other terminals discard this message.

The procedure and processing described above place a heavy load on the network. Also, the other terminals receive an unnecessary message, so that their power consumption is increased by the operation for receiving the message. As the second embodiment mode of the present invention, means for solving the problems described above by making modifications to the current system will be described. Note that it is possible to achieve the second embodiment mode by adding it to the first embodiment mode. Therefore, the description of the same constructions as in the first embodiment mode will be omitted and each construction differing from that in the first embodiment mode will be mainly described.

In the first embodiment mode, a case where a registration table is arranged in a VLR is described. In this case, it is possible to apply a method for alleviating the excess load described above. In the first embodiment mode, in order to judge whether a terminal is a terminal registered for a home-use wireless base station, there is used a technique with which a VLR is provided with a registration table in which pairs (pair information) of terminal IDs (identification information unique to respective terminals: IMSIs) and base station IDs (base station identification information: cell IDs) are registered.

Under a state where a terminal exists in an LA belonging to the management range of a VLR (location registration has been done), when a call termination request is issued to the terminal, it has conventionally been required to identify the LA in which the terminal exists, and transmit a call termination request (PAGING TYPE 1 message) to every base station control apparatus belonging to this LA.

However, if the registration table is provided in the VLR, it becomes unnecessary to transmit the PAGING TYPE 1 message to every NRNC in the LA. That is, by finding a terminal to which the message should be sent using the registration table, extracting a base station corresponding to the terminal, and transmitting the PAGING TYPE 1 message only to an NRNC that manages/controls the base station, it becomes possible to request the terminal to terminate a call while narrowing the transmission destination of the message. This is because the terminal is capable of performing communication only in the range of a base station in the LA for which the terminal is registered, and is incapable of performing communication in the ranges of other base stations, so that it is not required to send the message to the other base stations.

FIG. 40 is an explanatory diagram of the outline of the second embodiment mode. In the example shown in FIG. 40, using the registration table provided in the VLR, it can be found that a base station with which a terminal x is communicable is only an NBTS 22 (Cell-ID 22) under control by an NRNC 2.

Here, the VLR (MSC/SGSN) knows that the NBTS 22 is under control by the NRNC 2 from another table (not shown) Therefore, based on the registration table, a PAGING TYPE 1 message is transmitted only to the NRNC 2.

After receiving the PAGING TYPE 1 message, the NRNC that manages the base station transmits the message to every base station under its control like in a conventional case. In FIG. 40, the PAGING TYPE 1 message is transmitted to each of NBTSs 21, 22, and 23 under control by the NRNC 2.

However, the terminal exists in only one of the cells of the NBTSs, so that the transmission to the base stations other than the target base station is wasteful processing. However, when compared with the current system, it is possible to alleviate a load by a certain degree because the message is not transmitted to non-target RNCs and NRNCs and base stations under their control. Also, it becomes possible to reduce the power consumption of terminals.

Here, when the terminal x is located in the cell of the NBTS 21 or the NBTS 23 under control by the same NRNC2, it receives the PAGING TYPE 1 message. However, by providing a step for setting authentication after link establishment as impossible in a call termination operation performed afterward, it becomes possible to prevent a situation where the terminal x performs communication using an NBTS for which the terminal x is not registered.

Figure 41:
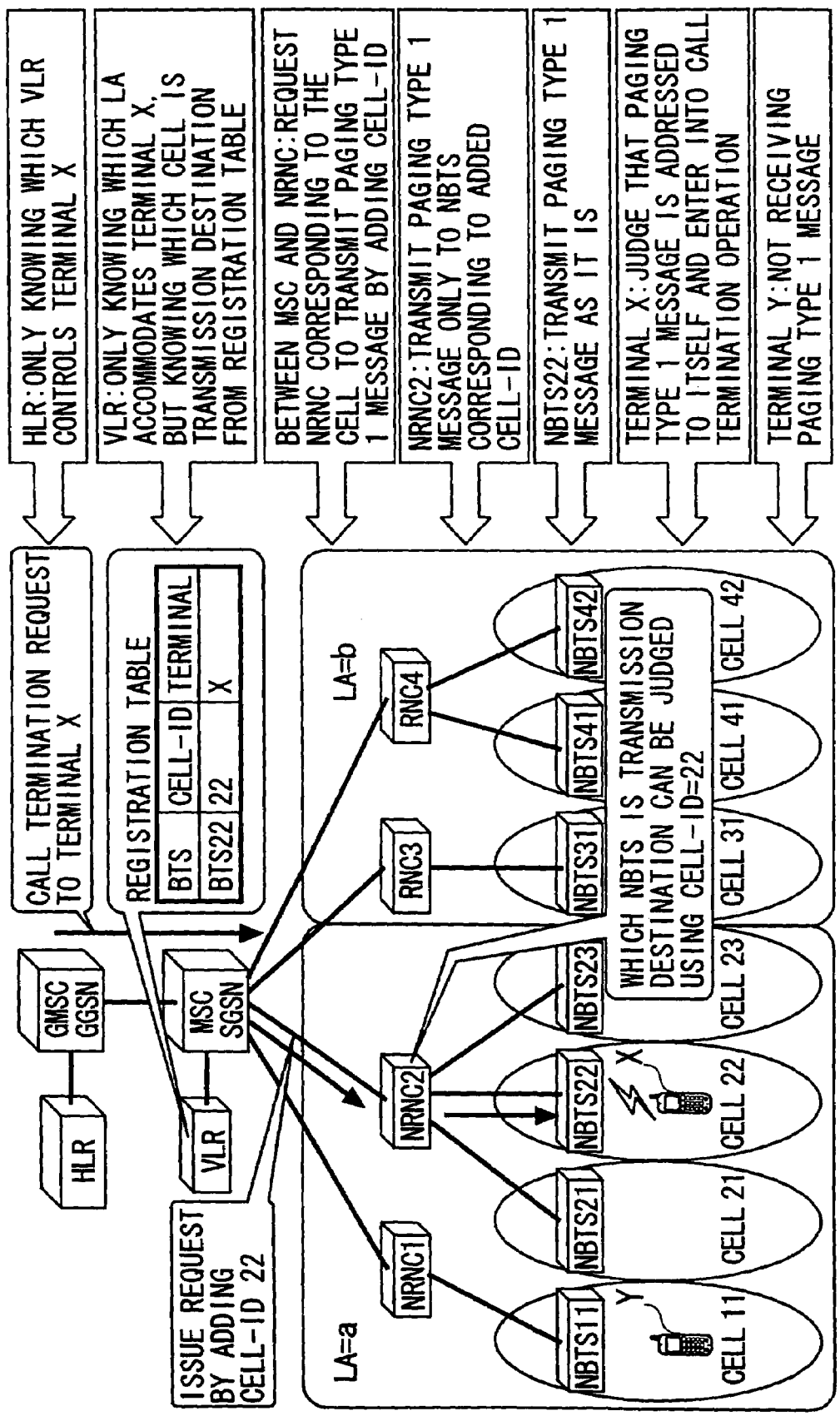
FIG. 41 is another explanatory diagram of the second embodiment mode of the present invention (PAGING operation in the case where the registration table is provided in the VLR)

Also, as shown in FIG. 41, before a PAGING TYPE 1 message is sent from the CN side to a terminal, a corresponding base station ID (cell ID) may be retrieved from the registration table and given to the message. In this case, on receiving the PAGING TYPE 1 message given the base station ID, an NRNC transmits the message only to a base station corresponding to the cell ID. As a result, it becomes possible to transmit the call termination request to the target terminal in a completely wasteless manner.

With the technique shown in FIG. 41, the cell ID is added to the PAGING TYPE 1 message at a VLR (or an MSC (corresponding to the transfer unit)). As a result, it becomes possible for the NRNC to determine an NBTS to which the received PAGING TYPE 1 should be sent.

With this construction, a base station to which the PAGING TYPE 1 message is to be transmitted becomes only the NBTS 22 for which the terminal x is registered. As a result, there is no need for BTSs and RNCs other than the NBTS 22 that should perform a call termination operation, to perform processing with respect to this PAGING TYPE 1 message. As a result, it becomes possible to alleviate a load placed on the network. Also, it becomes possible to reduce the power consumption of terminals under control by these BTSs.

Further, as shown in FIG. 42, when the registration table is arranged on the NRNC side, a PAGING TYPE 1 message is transmitted to every NRNC in a corresponding LA in the same manner as under the current circumstances. Then, using terminal information (IMSI) in the PAGING TYPE 1 message sent to the NRNC, a corresponding base station ID (cell ID) is retrieved from the registration table. In the case of an NRNC whose registration table does not contain the terminal information, even if the terminal exists under its control, it should be impossible for the terminal to perform communication, so that it is unnecessary to transmit the message.

The PAGING TYPE 1 message is transmitted only to the base station corresponding to the retrieved base station ID. With this technique, it becomes possible to alleviate a load placed on the network by the transfer of the call termination request message. Also, it becomes possible to reduce the power consumption of terminals.

In FIG. 42, each NRNC is provided with a registration table showing terminals registered for NBTSs under its control. Therefore, when each NRNC receives a PAGING TYPE 1 message, an NRNC controlling an NBTS for which the target terminal is registered transmits the message only to the NBTS.

Also, when the NRNC receives a call termination request message addressed to a terminal that is not registered in its registration table, it is obvious that even if this NRNC transmits the message to NBTSs under its control, call termination is impossible. Consequently, it is unnecessary for the NRNC to transmit the message. The NRNC is capable of making such a judgment using the registration table.

Embodiment 1

As Embodiment 1 of the second embodiment mode, a call termination operation in the case where a registration table is arranged in a VLR will be described with reference to FIGS. 43 to 46. Note that in FIGS. 43 to 46, steps and operations that are the same as conventional ones are each indicated using an arrow with a thick line and each novel step and operation according to the present invention is denoted using an arrow with a double line.

<First Operation Example>

Figures 43A, 43B:
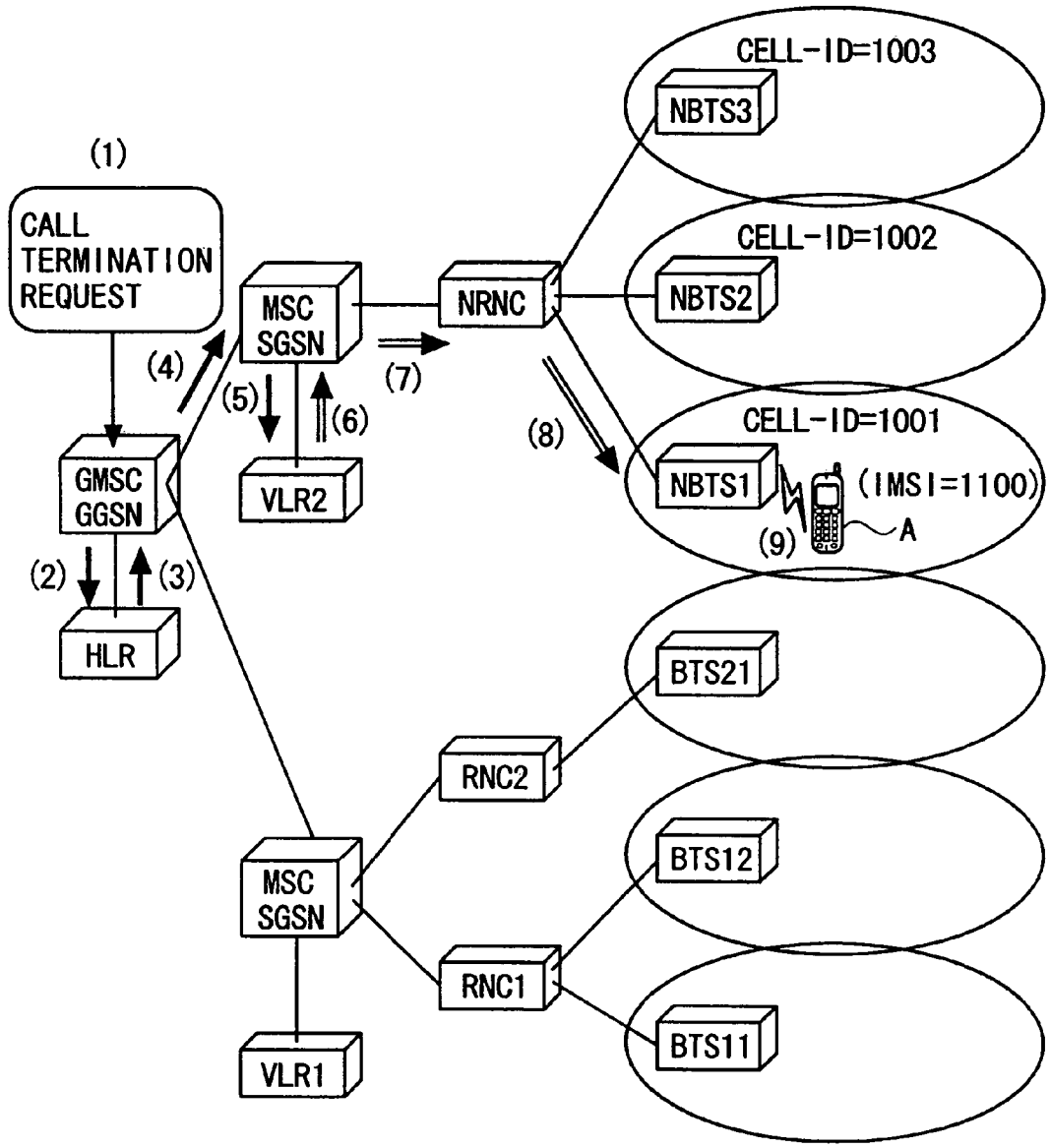
FIGS. 43A and 43B are each an explanatory diagram of a concrete example of the PAGING operation in the second embodiment mode (transfer of a call termination request after a terminal moves from an outside cell to an allowed cell)

FIGS. 43A and 43B are each an explanatory diagram of a first operation example and shows a state in the case where after a terminal A enters an area of an NBTS 1 and the operation in the first operation example of the first embodiment mode (see FIGS. 17 and 18) is performed, a call termination request is issued to the terminal A.

When a call termination request occurs in the network ((1) in FIG. 43A), a GMSC/GGSN inquires of an HLR about a VLR in which the terminal A exists ((2) in FIG. 43A). In response to this inquiry, the HLR refers to a table and replies that the location of the terminal A is managed by the VLR 2 ((3) in FIG. 43A). In this manner, the VLR in which the terminal A exists is confirmed.

Then, the GMSC/GGSN transfers the call termination request to an MSC managing the VLR 2 ((4) in FIG. 43A). The MSC (transfer unit) inquires of the VLR 2 about the LA in which the terminal A exists, the presence or absence of a registration table, and a registration cell ID ((5) in FIG. 43A).

In response to this inquiry, the VLR 2 informs the MSC of the LAI of the LA, in which the terminal A exists. At the same time, the VLR 2 informs the MSC of the cell ID corresponding to the terminal A by referring to the registration table (FIG. 43B) ((6) in FIG. 43A). Based on the response from the VLR 2, the MSC adds the cell ID to a "PAGING REQUEST" and transmits it only to an NRNC controlling and managing the NBTS 1 having the cell ID ((7) in FIG. 43A).

On receiving the "PAGING REQUEST", the NRNC judges that the NBTS 1 is the NBTS to which the PAGING TYPE 1 message should be transmitted, with reference to the cell ID=1001 added to the PAGING REQUEST, and transmits the PAGING TYPE 1 message only to the NBTS 1 ((8) in FIG. 43A).

The NBTS 1 broadcasts the PAGING TYPE 1 message in the area of the NBTS 1, and the terminal A receives this message and starts a call termination operation ((9) in FIG. 43A).

<Second Operation Example>

Figures 44A, 44B:
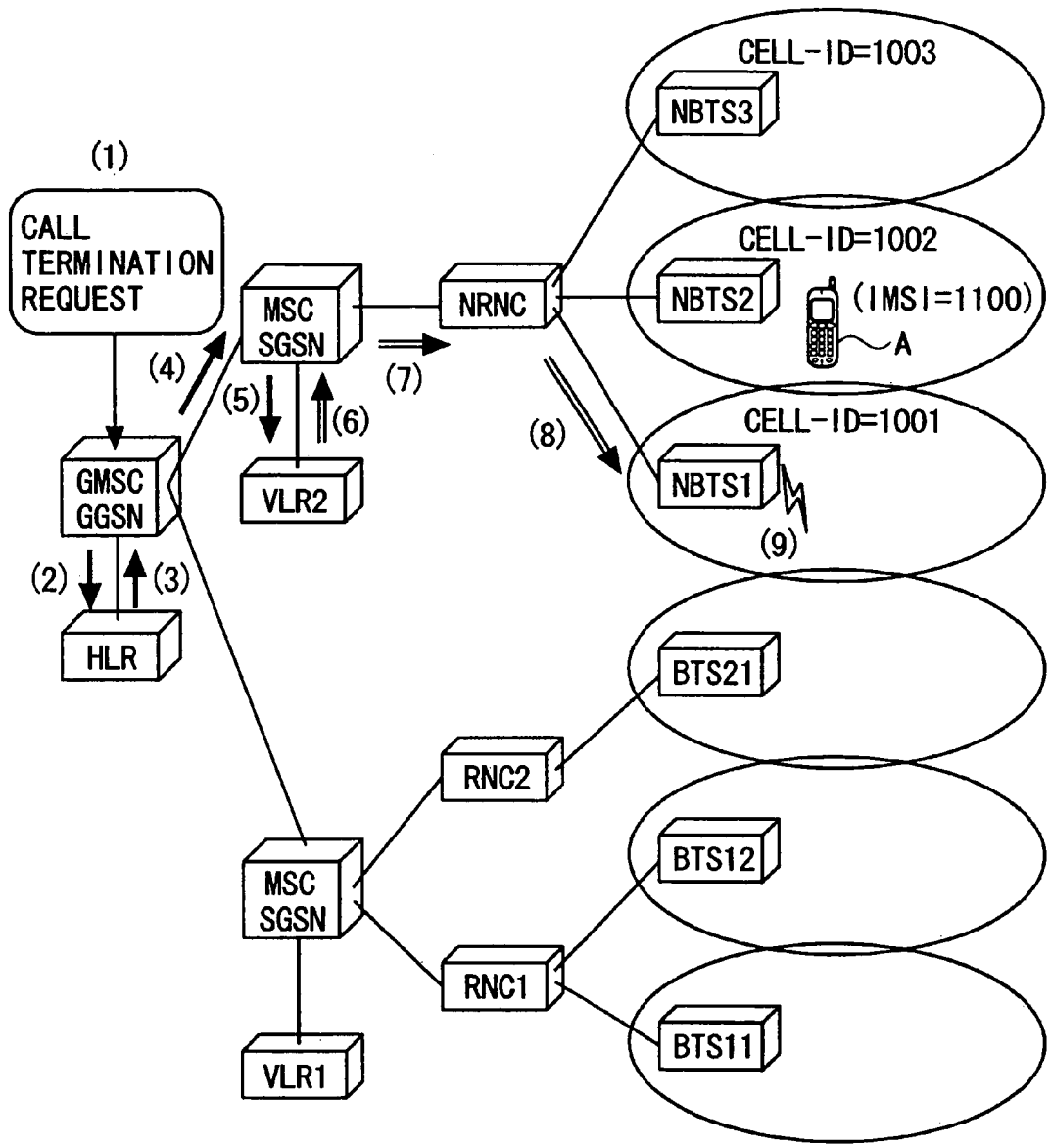
FIGS. 44A and 44B are each an explanatory diagram of another concrete example of the PAGING operation in the second embodiment mode (transfer of a call termination request after a terminal enters from an allowed cell into a prohibited cell)

FIGS. 44A and 44B are each an explanatory diagram of a second operation example of the second embodiment mode and shows a state in the case where after the terminal A enters an area of an NBTS 2 and the operation in the second operation example of the first embodiment mode (see FIG. 19) is performed, a call termination request is issued to the terminal A.

As described in the first embodiment mode, as a result of the operation in the second operation example, the terminal A is placed under an incommunicable status in the cell of the NBTS 2. In this case, when a call termination request to the terminal A occurs ((1) in FIG. 44A), operations that are the same as those in the first operation example ((2) to (8) in FIG. 43A) are performed ((2) to (8) in FIG. 44A).

Accordingly, a PAGING TYPE 1 message is transmitted only to the cell of the NBTS 1. Therefore, the terminal A located in the cell of the NBTS 2 is incapable of receiving this message and does not start a call termination operation. In this manner, a load placed on the network is alleviated and a situation is prevented where the terminal A uses a service using the NBTS 2.

<Third Operation Example>

Figures 45A, 45B:
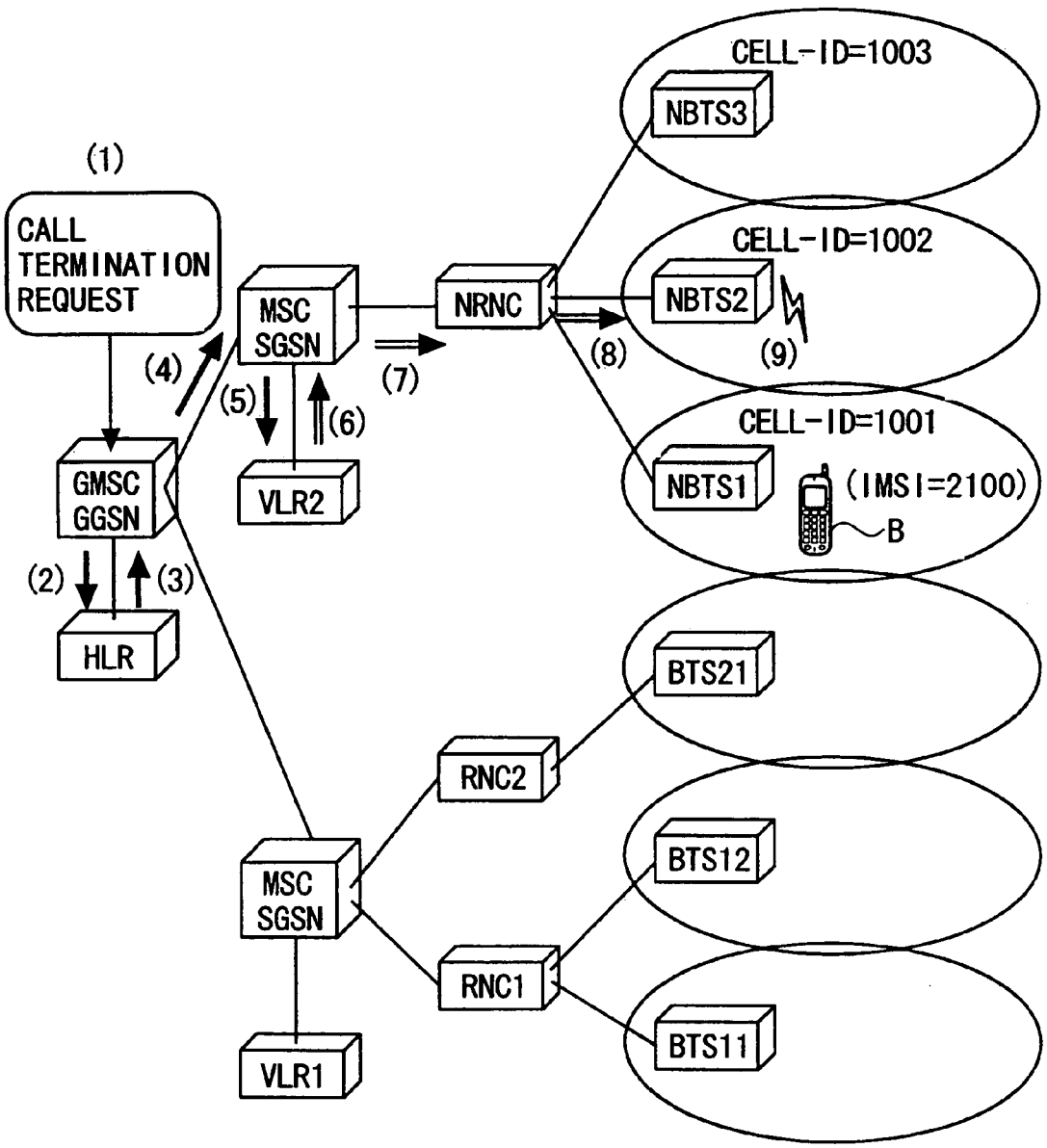
FIGS. 45A and 45B are each an explanatory diagram of still another concrete example of the PAGING operation in the second embodiment mode (transfer of a call termination request after a terminal enters from an outside cell into a prohibited cell)

FIGS. 45A and 45B are each an explanatory diagram of a third operation example of the second embodiment mode and shows a state in the case where after the terminal B enters an area of an NBTS 1 and the operation in the fourth operation example of the first embodiment mode (see FIGS. 22 and 23) is performed, a call termination request is issued to the terminal B.

As described in the fourth operation example of the first embodiment mode, in the area of the NBTS 1, the terminal B is placed under an incommunicable status. However, its entrance into this LA is registered at the CN (location updating). Consequently, when a call termination request occurs, operations that are the same as the operations (2) to (7) in FIG. 43A are performed ((2) to (7) in FIG. 45A), and then the NRNC transmits a PAGING TYPE 1 message only to the NBTS 2 corresponding to the cell ID=1002 associated with the ID of the terminal B in the registration table ((8) in FIG. 45A). Then, the NBTS 2 broadcasts this message only in the cell of the NBTS 2 ((9) in FIG. 45A).

In this case, the terminal B exists in the area of the NBTS 1, so that it is incapable of receiving the PAGING TYPE 1 message. Consequently, the terminal B does not start a call termination operation. In this manner, a load placed on the network is alleviated and a situation is prevented where the terminal B uses a service using the NBTS 1.

<Fourth Operation Example>

Figures 46A, 46B:
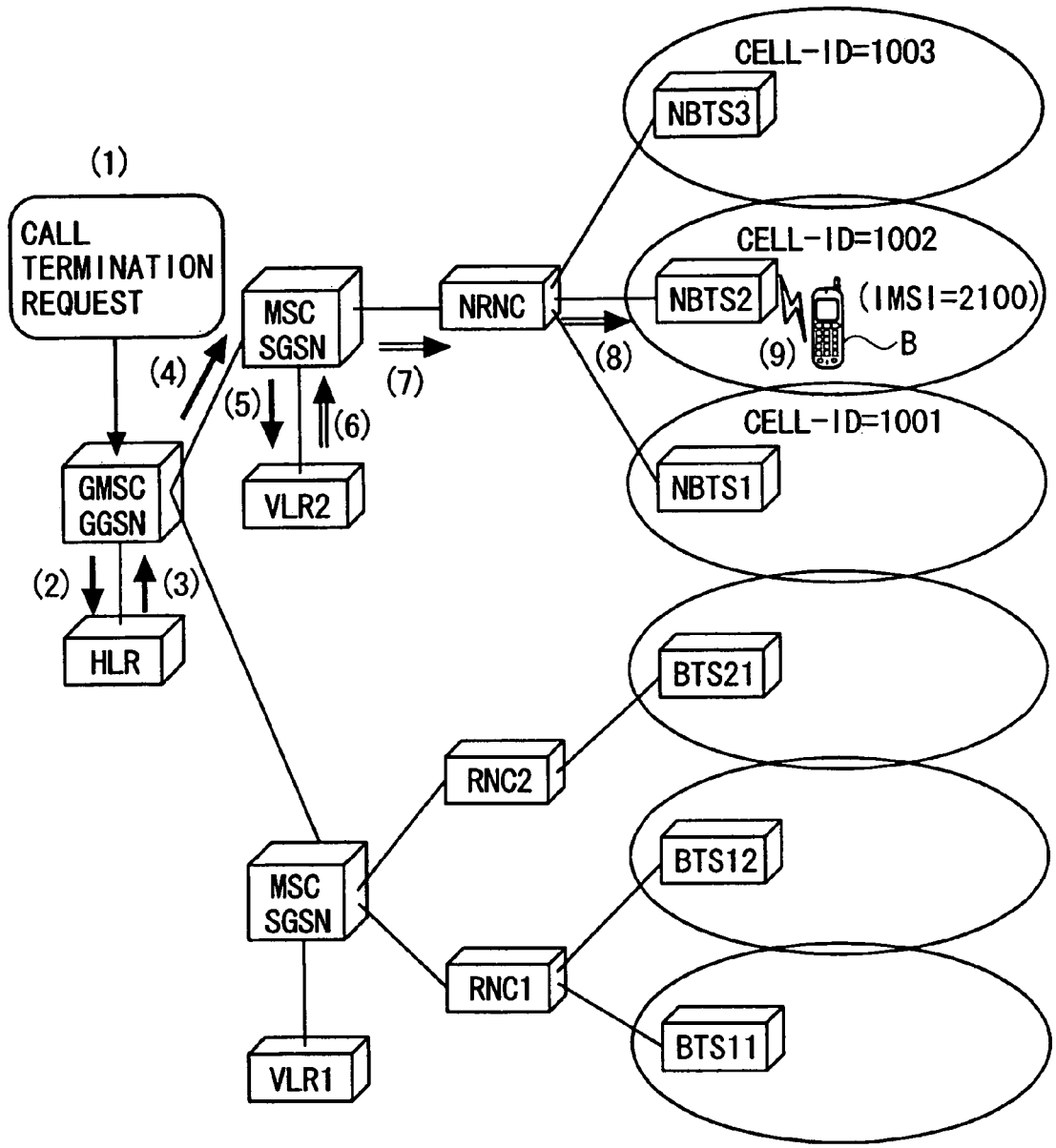
FIGS. 46A and 46B are each an explanatory diagram of another concrete example of the PAGING operation in the second embodiment mode (transfer of a call termination request after a terminal enters from a prohibited cell into an allowed cell)

FIGS. 46A and 46B are each an explanatory diagram of a fourth operation example of the second embodiment mode and shows a state in the case where after the terminal B enters an area of an NBTS 2 and the operation in the fifth operation example of the first embodiment mode (see FIG. 24) is performed, a call termination request is issued to the terminal B.

As shown in FIG. 46A, with respect to a call termination request to the terminal B, operations that are the same as the operations (2) to (8) in the third operation example are performed ((2) to (8) in FIG. 46A) and the NBTS 2 broadcasts the PAGING TYPE 1 message received from the NRNC in its cell.

In this case, the terminal B is capable of receiving the message and starts a call termination operation. Consequently, the terminal B is capable of using a service using the NBTS 2 for which it is registered.

<Action and Effect of Embodiment 1 of Second Embodiment Mode>

According to the first to fourth operation examples of the second embodiment mode, it becomes possible to minimize a transmission range of a PAGING TYPE 1 message. That is, it becomes possible to avoid a situation where the PAGING TYPE 1 message is transmitted to non-target NBTSs under control by an NRNC corresponding to the message and other NRNCs. Therefore, it becomes possible to alleviate a load placed on the network.

Also, it becomes possible to reduce the power consumption of terminals by the reception of an unnecessary PAGING TYPE message. Further, even if such processing relating to a call termination request is performed, no influence is exerted on the status of terminals (communication OK/NG status) based on the operation in Embodiment 1 of the first embodiment mode.

Embodiment 2

As Embodiment 2 of the second embodiment mode, a call termination operation in the case where a registration table is arranged in an the NRNC will be described with reference to FIGS. 47 to 50.

<Fifth Operation Example>

Figures 47A, 47B:
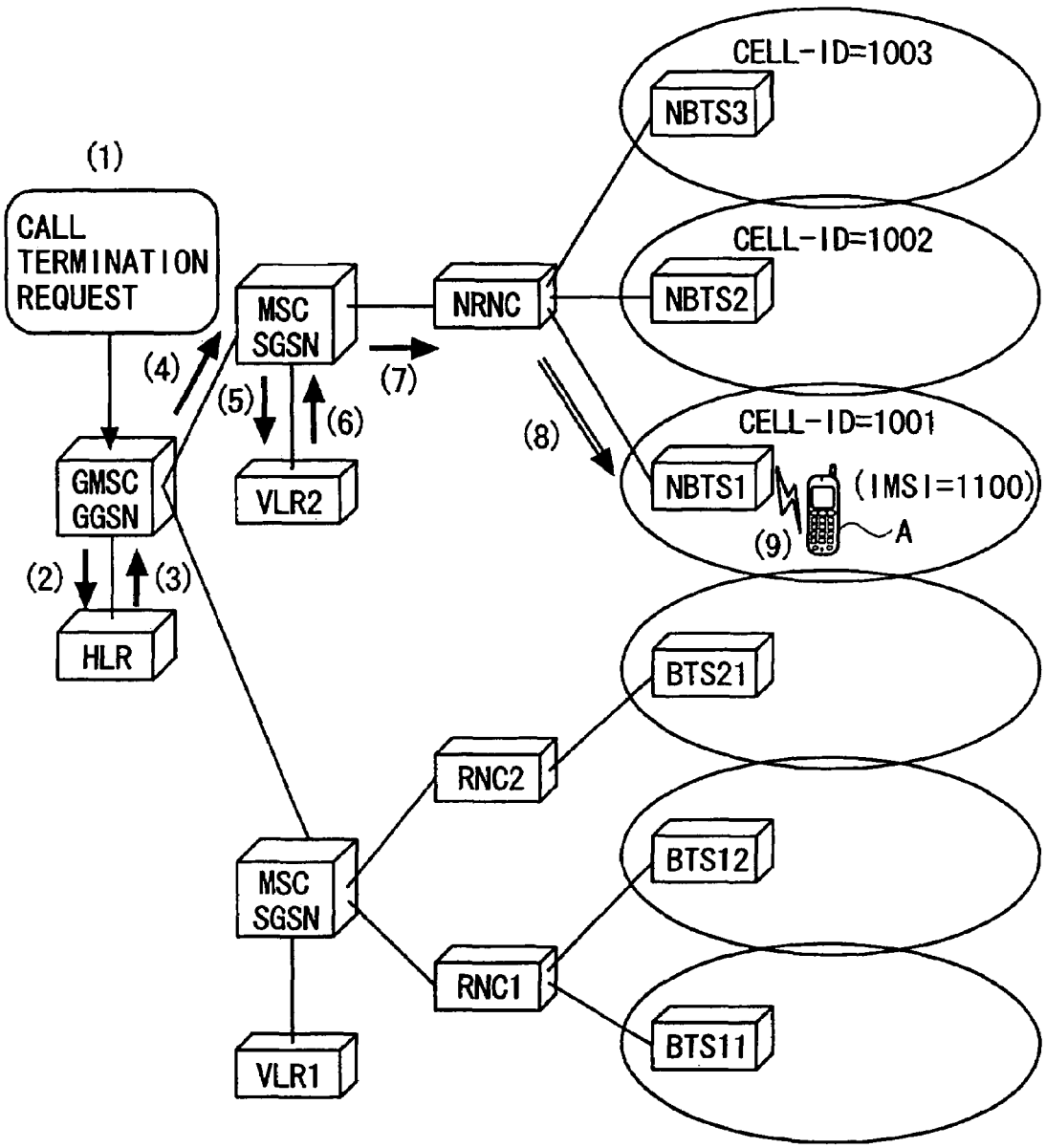
FIGS. 47A and 47B are each an explanatory diagram of another concrete example of the PAGING operation in the second embodiment mode (transfer of a call termination request after a terminal enters from an outside cell into an allowed cell)

FIGS. 47A and 47B are each an explanatory diagram of a fifth operation example of the second embodiment mode and shows a state in the case where after the terminal A enters an area (cell) of an NBTS 1 and the operation in the fifth operation example of the first embodiment mode (see FIGS. 30 and 31) is performed, a call termination request is issued to the terminal A.

When a call termination request to the terminal A occurs in the network ((1) in FIG. 47A), a GMSC/GGSN inquires of an HLR about a VLR in which the terminal A exists ((2) in FIG. 47A). In response to this inquiry, the HLR refers to a table (management table) and replies that the location of the terminal A is managed by a VLR 2 ((3) in FIG. 47A). In this manner, the VLR in which the terminal A exists is confirmed.

Then, the GMSC/GGSN transfers the call termination request to an MSC (transfer unit) managing the VLR 2 ((4) in FIG. 47A). The MSC inquires of the VLR 2 about an LA in which the terminal A exists ((5) in FIG. 47A).

In response to this inquiry, the VLR 2 informs the MSC of the LA in which the terminal A exists ((6) in FIG. 47A). Based on the response from the VLR 2, the MSC transmits a "PAGING REQUEST" to every NRNC positioned in the LA in which the terminal A exists ((7) in FIG. 47A). Note that when only one NRNC belongs to the LA, the PAGING REQUEST is transmitted only to the NRNC.

On receiving the PAGING REQUEST, the NRNC refers to the registration table (FIG. 47B) using the terminal ID (IMSI) in the message and retrieves a corresponding cell ID. Then, the NRNC judges that the NBTS 1 is the NBTS to which the PAGING TYPE 1 message should be transmitted with reference to the cell ID=1001 retrieved from the registration table, and transmits the PAGING TYPE 1 message only to the NBTS 1 ((8) in FIG. 47A).

The NBTS 1 broadcasts the PAGING TYPE 1 message in an NBTS 1 area (cell of itself). The terminal A receives this PAGING TYPE 1 message and starts a call termination operation (FIG. 47A; (9)).

<Sixth Operation Example>

Figures 48A, 48B:
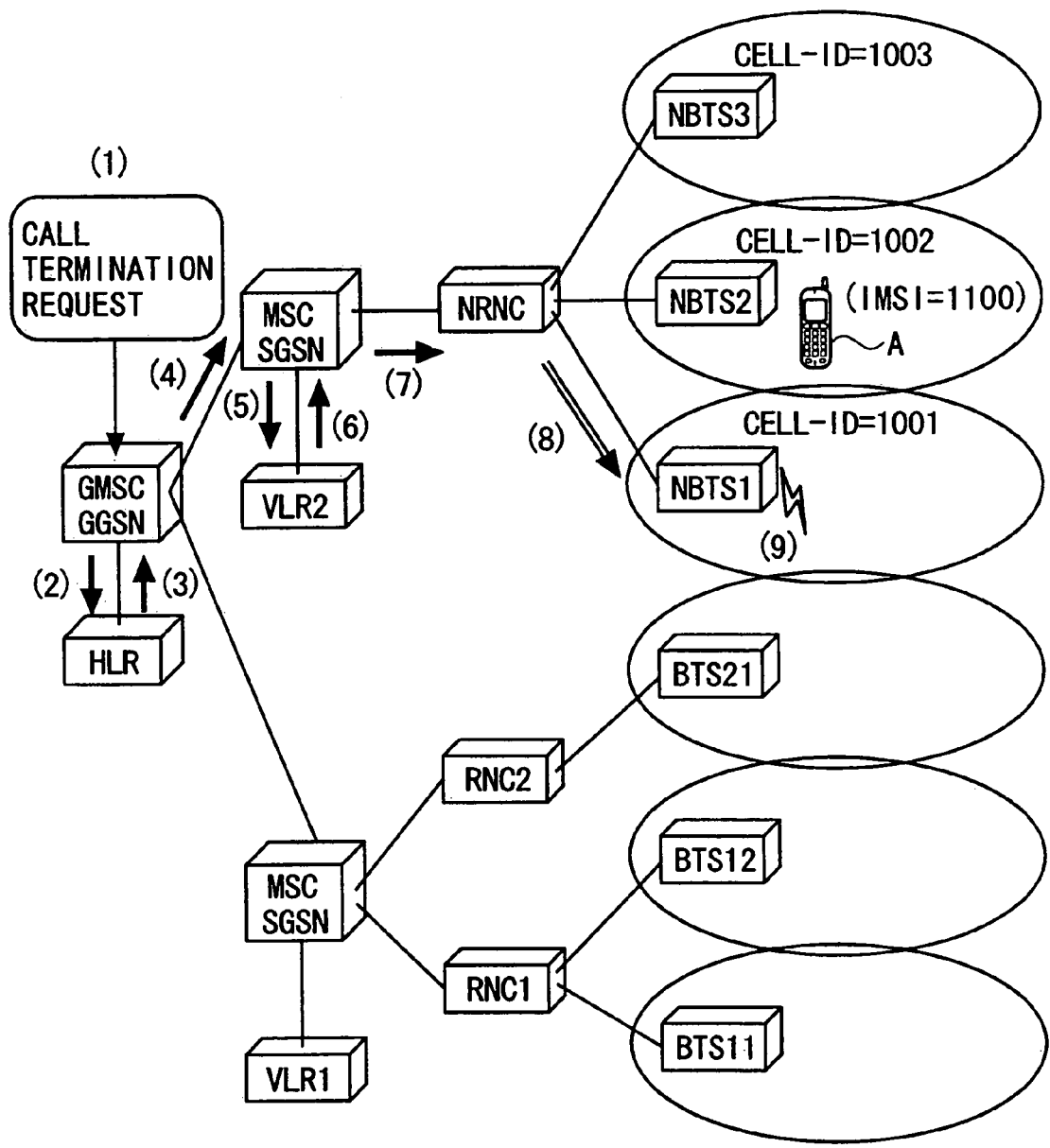
FIGS. 48A and 48B are each an explanatory diagram of another concrete example of the PAGING operation in the second embodiment mode (transfer of a call termination request after a terminal enters from an allowed cell into a prohibited cell)

FIGS. 48A and 48B each shows a processing in the case where after the terminal A enters an area of an NBTS 2 and the operation in the sixth operation example of the first embodiment mode (see FIG. 32) is performed, a call termination request is issued to the terminal A.

As described in the sixth operation example of the first embodiment mode, the terminal A is placed under an incommunicable status in the area (cell) of the NBTS 2. In this situation where the terminal A is located in this area, if a call termination request occurs, operations that are the same as the operations (2) to (8) in FIG. 47A are performed as shown in FIG. 48A ((2) to (8) in FIG. 48A).

As a result, a PAGING TYPE 1 message is broadcasted only by the NBTS 1. Consequently, the terminal A cannot receive the PAGING TYPE 1 message and does not start a call termination operation.

<Seventh Operation Example>

Figures 49A, 49B:
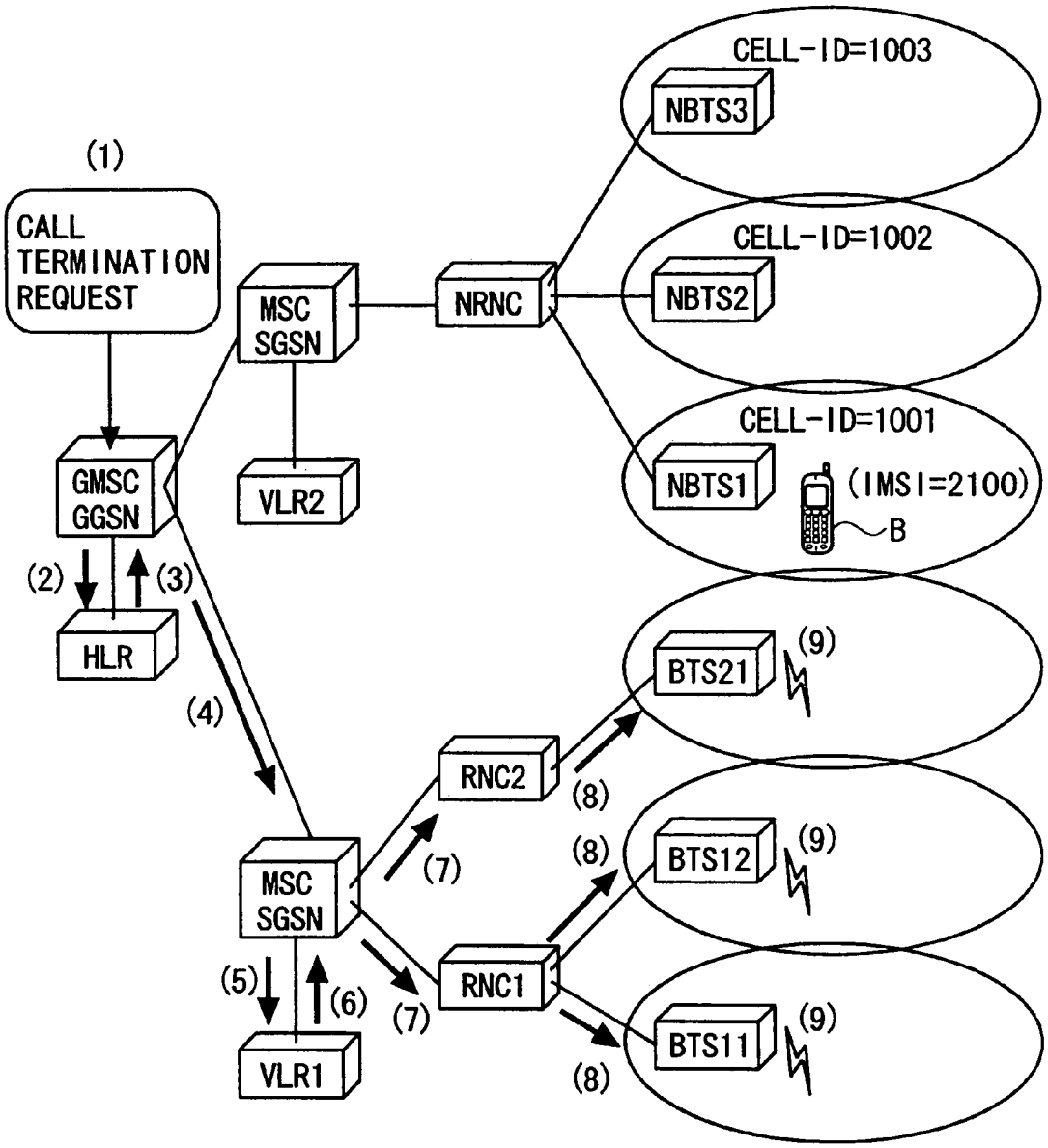
FIGS. 49A and 49B are each an explanatory diagram of another concrete example of the PAGING operation in the second embodiment mode (transfer of a call termination request after a terminal enters from an outside cell into a prohibited cell)

FIGS. 49A and 49B each shows a processing in the case where after the terminal B enters an area of an NBTS 2 and the operation in the tenth operation example of the first embodiment mode (see FIG. 35) is performed, a call termination request is issued to the terminal B.

As described in the tenth operation example of the first embodiment mode, the terminal B is placed under an incommunicable status. Also, no location registration request is transmitted to the upper level (CN), so that the CN recognizes that the terminal B is under control by the original VLR 1. In this regard, the seventh operation example differs from FIG. 43.

The RNCs under control by the VLR 1 do not each have a registration table and a function of identifying an NBTS using the registration table, so that a call termination operation that is the same as conventional ones is performed ((2) to (8) in FIG. 49A). Consequently, the PAGING TYPE 1 message is transmitted to every RNC under control by the VLR 1 and every BTS under control by the RNC. Needless to say, however, the terminal B cannot receive the PAGING TYPE 1 message and does not start a call termination operation.

<Eighth Operation Example>

Figures 50A, 50B:
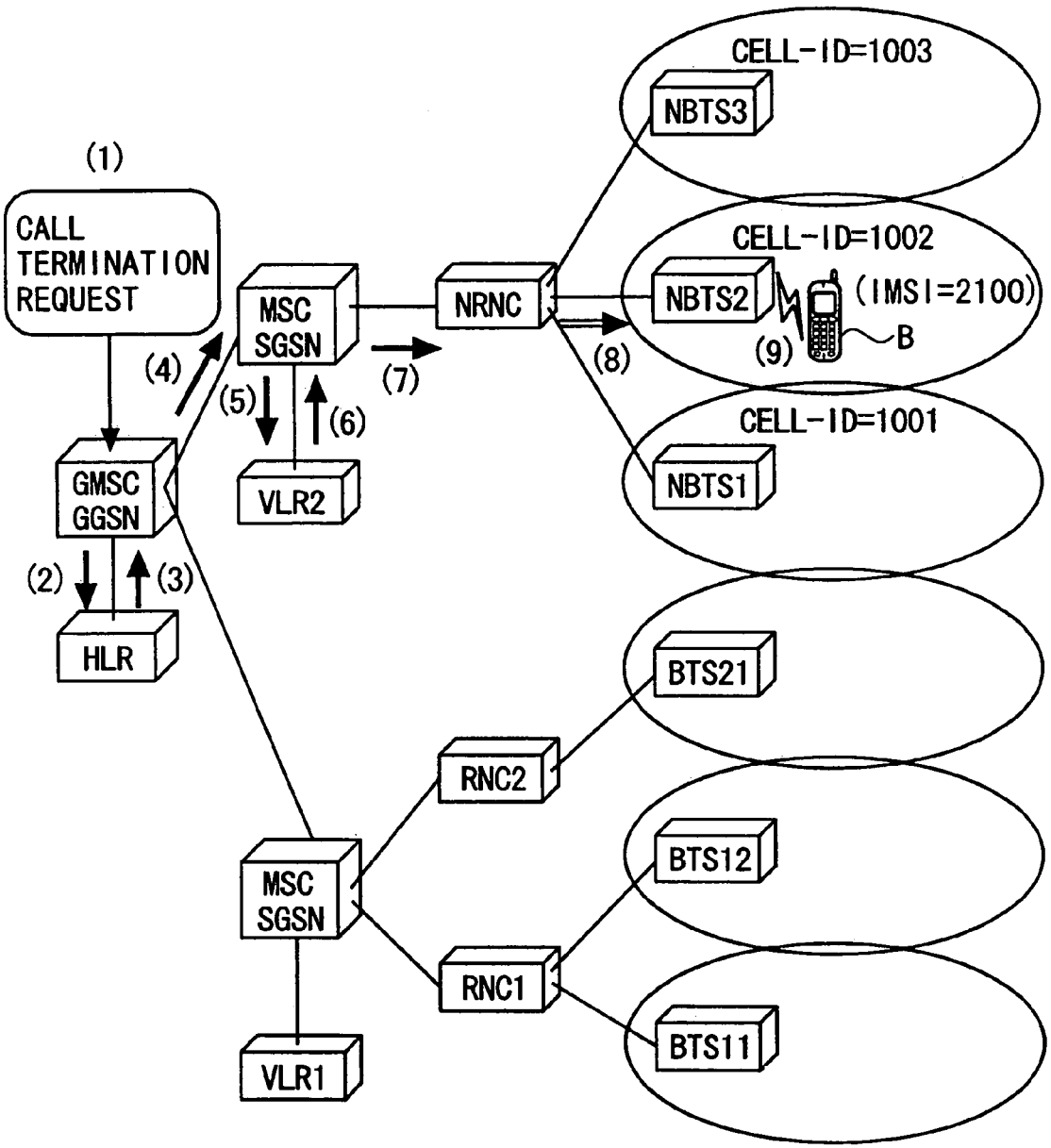
FIGS. 50A and 50B are each an explanatory diagram of another concrete example of the PAGING operation in the second embodiment mode (transfer of a call termination request after a terminal enters from a prohibited cell into an allowed cell)

FIGS. 50A and 50B each shows a processing in the case where after the terminal B enters an area of an NBTS 2 and the operation in the eleventh operation example of the first embodiment mode (see FIGS. 36 and 37) is performed, a call termination request is issued to the terminal B.

In this case, location registration of the terminal B has been completed in success, so that it is recognized that the terminal B exists under control by the VLR 2 on the CN side. Consequently, a PAGING REQUEST is transmitted to the NRNC ((2) to (7) in FIG. 50A).

The NRNC retrieves the Cell-ID=1002 from the registration table (see FIG. 50B) using the ID (IMSI) of the terminal B. Based on the cell ID, the NRNC transmits the PAGING TYPE 1 message only to the NBTS 2 ((8) in FIG. 50A). The terminal B receives this PAGING TYPE 1 message and starts a call termination operation.

[Action and Effect of Embodiment 2 of Second Embodiment Mode]

According to Embodiment 2 of the second embodiment mode, it becomes possible to minimize the transmission range of a PAGING TYPE 1 message (call termination request message) by an NRNC as compared with conventional cases (it becomes unnecessary to transmit the message to NBTSs other than the NBTS identified by a cell ID). As a result, it becomes possible to alleviate a load placed on the network.

In addition, it becomes possible to suppress the power consumption of terminals due to the reception of an unnecessary PAGING TYPE 1 message. Also, even if the structure according to Embodiment 2 of the second embodiment mode is added to Embodiment 2 of the first embodiment mode, no influence is exerted on the operation in Embodiment 2 of the first embodiment mode. Further, unlike in Embodiment 1 of the second embodiment mode, it is sufficient that changes are made only to the NRNC.

[Effect of Second Embodiment Mode]

According to the second embodiment mode, it is possible to obtain the following effects. (1) The registration table is used for a judgment about the transmission destination of a call termination message, so that it becomes possible to reduce the processing for transmitting unnecessary call termination messages and to alleviate loads placed on the apparatuses on the core network side, the base station management apparatuses, and the lines therebetween. (2) Information showing a base station, via which a call termination message should be transmitted to a destination, is added to the message, so that it becomes possible to eliminate the processing for transmitting unnecessary call termination messages from a base station management apparatus to base stations other than the destination base station and to alleviate loads placed on the base station management apparatus, the base stations, and the lines therebetween. (3) The registration table is used for a judgment about a transmission destination base station at a base station management apparatus, so that it becomes possible to eliminate the processing for transmitting unnecessary call termination messages from the base station management apparatus to other base stations and to alleviate loads placed on the base station management apparatus, the base stations, and the lines therebetween.

<<Third Embodiment Mode>>

Next, a third embodiment mode of the present invention will be described. First, problems to be solved in the third embodiment mode will be described.

As a service that is profitable to an individual who installed a private-house-use (personal-use or home-use) base station, differentiation based on charges is conceivable in addition to line preferential (exclusive) use. That is, a service is conceivable in which when the individual performs communication using the base station that he/she installed, the charge for the communication is discounted as compared with communication using a general base station. In this case, the following functions are required:

(1) A function of letting the individual who installed the home-use base station know whether his/her terminal exists in an area in which communication is possible using the home-use base station;

(2) A function of informing, when the terminal enters/exits the area of the home-use base station, the terminal user (individual) about the entrance/exit;

(3) A function of distinguishing between a case where the individual performs communication using the base station and a case where he/she performs communication using a general base station on the network side and applying different charging systems thereto.

Even if a conventional base station system is merely miniaturized and is made installable in a private house, the functions described above are not attained. Therefore, it is impossible to provide such a differentiated service. What means should be specifically applied in order to realize such functions in an actual mobile telephone network system is the point of the third embodiment mode of the present invention.

In the current mobile telephone network system, in order to inform terminals of various parameters used in the network, such as cell IDs, IDs of LAs, and various timer values, system information called "broadcast information" is periodically transmitted over a channel called "BCCH" over which the terminals are capable of receiving the information even if they are in the idle mode. The terminals are set so as to know their movements between LAs or cells by receiving the broadcast information regardless of whether they are in the idle mode or the connected mode.

Figure 51:
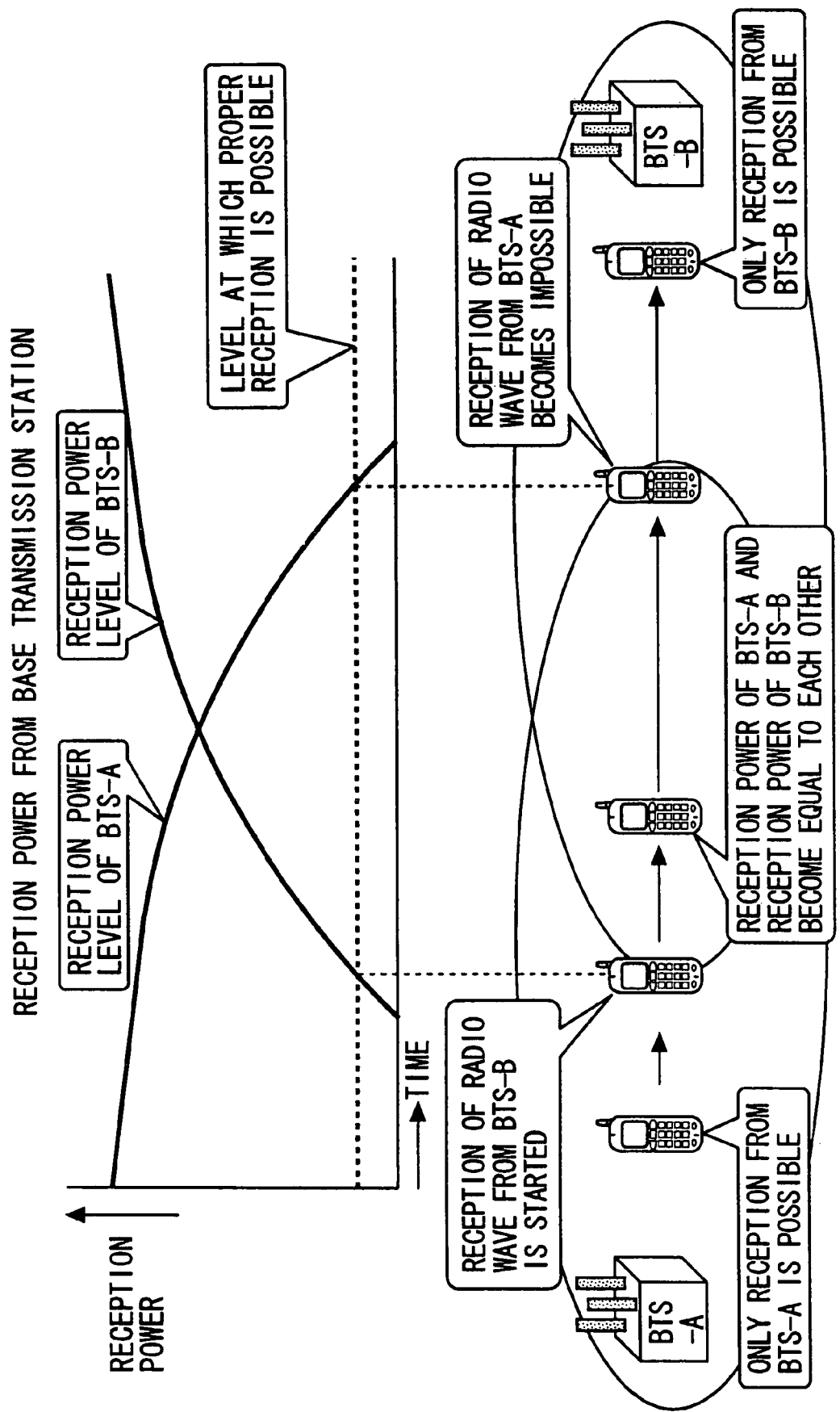
FIG. 51 is an explanatory diagram of reception powers from base stations and their cell ranges (cell selection processing)

Cell selection by a terminal will be described in detail. FIG. 51 is an explanatory diagram of the cell selection. Which cell is to be selected by the terminal is determined by receiving a first common pilot channel broadcasted in the cell and measuring its reception level.

A case where the terminal is moving from a base station A (BTS-A) to a base station B (BTS-B) will be considered. If it is assumed that the base station A and the base station B have the same transmission power, the reception power levels at each point between the base stations A and B change in the manner indicated by the graph in FIG. 51.

As a matter of course, if the terminal exists close to the base station A, the reception power level is higher from the base station A than from the base station B. However, as the terminal gets closer to the base station B (gets away from the base station A), the reception power level from the base station A decreases and the reception power level from the base station B increases. When the terminal exists at a midpoint between these base stations, their reception power levels become equal to each other and the reception power level of the base station B inversely becomes higher than that of the base station A when the terminal moves toward the base station B from the midpoint.

When the terminal performs actual communication, it selects a base station with reference to the reception power levels at its current location (in more detail, selects a frequency and a scramble code group), determines a target cell (target base station), and performs communication. At this time, the terminal is constructed so as to select a cell in which the terminal A has the most favorable reception state. In the example shown in FIG. 51, the base station A is selected in a section from the midpoint to the left side, and the base station B is selected in a section from the midpoint to the right side.

In reality, however, in order to avoid a cell selection oscillation state (repetitive selection of the base stations A and B with short cycles) at the midpoint where the reception powers become equal, an idea of "hysteresis (history)" is employed.

FIG. 52 is an explanatory diagram of cell selection employing the hysteresis. In FIG. 52, when the terminal exists at the point (1), the reception power level of the BTS-A is maximum, so that the BTS-A (cell of the BTS-A) is selected.

When the terminal moves rightward on the paper plane of FIG. 52 and reaches the point (2), the reception power level of the BTS-B becomes equal to the reception power level of the BTS-A. When the terminal further moves rightward from the point (2), the BTS-B (cell of the BTS-B) should be selected.

In reality, however, the relation of magnitude between the reception power levels is judged under a state where a hysteresis power is added to the power of the original BTS-A as an offset value. Therefore, at the point (2), no change is made to the cell selection. A cell selection change will be made at the point (3) at which a hysteresis power difference occurs. At this point (3), the BTS-B is selected for the first time.

Once the BTS-B is selected, the hysteresis power is added to the BTS-B this time, so that unless the terminal moves leftward from the point (4) to the point (6) on the paper plane, a selection change to the BTS-A will not be made. In this manner, the frequent occurrence of cell selection is prevented.

The cell selection technique described above is similarly used in a terminal under a communication status. However, an idea of "handover" is added to the cell selection in the case of the terminal in communication. The handover is a method with which switching between wireless links is performed during communication so that the communication is continued.

In a PDC system for second-generation mobile telephones, respective base stations transmit radio waves having different frequencies. Therefore, when a terminal moves to an adjacent cell, it performs an operation where a wireless link to an original base station is first cut and then a wireless link to a destination base station is established without delay, thereby continuing communication. Such an operation is also performed for a movement to an adjacent cell having a different frequency in a W-CDMA system for third-generation mobile telephones. This system is called "hard handover".

In the W-CDMA system, however, different scramble codes are prepared for radio waves having the same frequency and it is possible to deal with them as different cells. In this case, the terminal is capable of receiving radio waves from multiple base stations allocated the same frequency at the same time. Therefore, it becomes possible to simultaneously establish wireless links to different base stations. A handover based on this technique is called "soft handover".

FIG. 53 illustrates an example case of the soft handover (for ease of explanation, the idea of hysteresis is omitted, that is, the hysteresis is set at "0" in this drawing). In order to perform the soft handover, a certain range from a current maximum reception power level is set as a threshold value with reference to which the establishment/releasing of a wireless link is performed. This threshold value is called "report range". In the drawing, the threshold value serving as the report range becomes the level indicated by a dotted line.

In FIG. 53, when the reception power level of the BTS-B exceeds the report range level as a result of a rightward movement of the terminal, the terminal enters a procedure for establishing a wireless link to the BTS-B while maintaining a wireless link to the BTS-A.

As a result, between the points (2) and (3) in FIG. 53, two wireless links to the BTS-A and the BTS-B are established at the same time. Accordingly, communication data from the terminal is transmitted to both of these BTSs. It is possible to synthesize two pieces of communication data received by the BTSs into one piece of data at an apparatus at the upper level of the base stations.

Needless to say, two pieces of data from the network side are transmitted to the terminal from both the BTSs. These two pieces of data from the BTSs have the same frequency but use different scramble codes, so that the terminal is capable of distinguishing between them. It is possible to synthesize the data received through the two links inside the terminal and deal with it as a single piece of data.

A state where such multiple links are established is called a "macro-diversity state". When the terminal further moves rightward from the point (3) and the reception power of the BTS-A falls below the report range level, the terminal enters a procedure for releasing the link to the BTS-A. It is of course possible to continue communication because the link to the BTS-B has been established.

In the case of the hard handover, when a cell change is made, a wireless link is cut without establishing a new wireless link, so that communication is cut for a very short period of time. In contrast to this, in the case of the soft handover, one or more links exist at all times, so that such communication cut does not occur. This is a significant feature of the soft handover.

By the way, in the case of a personal-use or home-use base station system to be realized by the present invention (note that it is possible to apply the base station system to a small condominium for a shared use, a small-scale office, or the like by some what increasing the output of the base station), it is conceived that the personal-use or home-use base station (as representative names of the user and application purpose of such a base station, terms "individual" and "personal-use" will be used in some cases) is installed inside a house or at a place, at which the base station is capable of covering a small range, with an individual shouldering some cost relating to the installation (in some cases, the cost is shared by several households or is borne by a small-scale office as a company, for instance). Accordingly, in addition to a merit that the individual (or persons concerned who shouldered the cost required for the introduction of the base station) is capable of exclusively using the base station, it is conceived that there occurs a demand for a discount on charges for communication performed using the base station as compared with charges for communication performed using general base stations.

Actually, the installation of the persona-use base station brings about a merit also to a mobile telephone company. That is, the intensive use of the personal-use base station increases communication chances and therefore a communication fee income is increased. Also, the usage ratio of general base stations is decreased, so that it becomes possible to solve the shortage of wireless resources.

However, even if the exclusive use of the base station is achieved by merely registering each terminal that is allowed to use the base station in the current base station system and identifying its user, it is hard to provide the differentiated service based on charges due to the following reasons.

(1) There is no means for letting a user know whether he/she is performing communication using the personal-use base station or a general base station.

(2) It is impossible to guarantee that the personal-use base station is usable merely because the user is at home.

(3) There is no means for, when the user moves between the personal-use base station and a general base station during communication, letting him/her know which one of the base stations is now used for the communication and from when the use of the base station was started.

In order to solve these problems, the following functions are required as a system:

(A) A function of, when a terminal enters an area in which it is capable of performing communication using the personal-use base station, informing the user of the entrance (when the terminal exits the area, also informing the user of the exit) by outputting a sound from the terminal, displaying an indicator on a screen of the terminal, or the like;

(B) A function of, if the user wishes to perform communication using the base station (personal-use base station) with which communication is possible at a discounted rate, connecting the terminal to the personal-use base station with highest priority (that is, if the personal-use base station is among selectable cells, the cell of the personal-use base station is selected with highest priority regardless of its reception power (here, the terminal needs to be registered for the personal-use base station in advance)).

Further, as to a terminal that is not registered for a personal-use base station, it is required to prohibit its communication in the cell of that personal-use base station. In usual cases, however, on the network side, the unique ID of the terminal is recognized only at the time of call termination and call origination and is not recognized at the time of a movement between cells during communication (handover).

Accordingly, there is required means for uniformly prohibiting handovers from general base stations to the personal-use base station and avoiding the use of the wireless resource of the personal-use base station by outsiders due to the entrance of terminals in communication. Means for realizing these functions is a solution to the problems and is a point of the present invention. A concrete solution will be described below. In order to achieve these functions, first, the terminal is provided with a function of registering the cell ID of the personal-use base station in the terminal, comparing the cell ID in the terminal with a cell ID received through broadcast information, and, when the cell IDs are the same, judging that the terminal is in the area of the persona-use base station for which it is registered. In addition, the terminal is also provided with the following functions utilizing this function.

(i) The terminal is given a display function and, when entrance to a personal area under a non-communication status is detected, it is displayed with a mark, message, or the like. In the case of area entrance under a communication status, the entrance is informed to the user by outputting an informing sound such as a chime. When the terminal exits the area, this exit is informed by erasing the displayed mark or message. Also, when the terminal is currently performing communication, the exit is informed using a chime or the like. In this case, a sound or tone that is different from that used at the time of entrance should be used. Such a function will be hereinafter referred to as the "personal area entrance/exit informing function".

(ii) A predetermined hysteresis level A is prepared for the personal-use base station and, when the reception level of a radio wave from the personal-use base station becomes "a receivable minimum level+the hysteresis level A", the personal-use base station is selected as a use cell regardless of the reception levels of radio waves from other base stations. When the reception level of the personal-use base station falls below the receivable minimum level, the terminal enters an operation for selecting the cell of another base station. Such a function will be hereinafter referred to as the "personal cell preferentially selecting function".

FIG. 54 is an explanatory diagram of (i) the personal area entrance/exit function and (ii) the personal cell preferentially selecting function. In FIG. 54, at the point (1), the terminal selects the BTS on the left side. After that, when the terminal moves rightward and starts the reception of a radio wave from the NBTS (personal-use base station) ((2) in FIG. 54), it analyzes its broadcast information, matches the cell ID contained in the broadcast information against the cell ID registered in the terminal (cell ID of the personal-use base station), and recognizes that the base station is the personal-use base station that is usable by the terminal.

When the terminal further moves rightward and the reception power level of the NBTS becomes "the minimum level+ the hysteresis A" ((3) in FIG. 54), the terminal operates so as to select the cell of the personal-use base station (radio wave from the NBTS). At this point in time, an indicator indicating that the terminal has entered the area of the personal-use base station (hereinafter referred to as the "personal area existing indicator") is displayed on the display unit (display screen) of the terminal. At this time, if the terminal is performing communication, a sound indicating the entrance into the personal area is outputted from the terminal.

After that, when the terminal moves leftward and the reception power falls below the minimum level ((4) in FIG. 54), the cell selection returns to the BTS. At this time, the personal area existing indicator displayed on the display unit of the terminal is erased, thereby informing the exit from the personal area. At this time, if the terminal is performing communication, a sound indicating the exit from the personal area is outputted from the terminal.

FIGS. 55A and 55B are each an explanatory diagram of a method for prohibiting a handover to the cell of the personal-use base station. FIG. 55A shows a sequence of an ordinary handover and FIG. 55B shows a sequence in the case where a handover to the cell of the personal-use base station is not carried out.

The RNC receives a measurement report of a reception power level from a terminal and determines the execution of a handover to another cell. The RNC transmits a message "RADIO BEARER SETUP REQUEST" to an NRNC managing the cell that is the handover target, and requests the NRNC to secure a resource for a wireless link for the handover.

When the handover is carried out, a wireless link is actually secured, a message "RADIO BEARER SETUP RESPONSE" is returned, and a handover sequence is started (conventionally, every base station and RNC operate in this manner).

In contrast to this, when handovers to abase station under control by an NRNC are uniformly prohibited, a setup failure message (RADIO BEARER SETUP FAILURE) is returned with respect to a setup request from another RNC, thereby informing the RNC issued the setup request that the handover is impossible. By uniformly returning the setup failure message with respect to setup requests from other base station control apparatuses in this manner, the NRNC rejects every handover to the cell of the NBTS under control by the NRNC.

If the terminal does not receive "PHYSICAL CHANNEL RECONFIGURATION" (in the case of a hard handover) or "ACTIVE SET UPDATE" (in the case of a soft handover) to be returned from the network side at the time of start of a handover, it is impossible to start handover processing. Therefore, with the processing described above, it becomes possible to prohibit handover processing to the personal-use base station by outsiders (unregistered terminals).

It should be noted here that as a result of the processing, it becomes impossible to perform a handover between the cell of the personal-use base station for which the terminal is registered, and the cell of a general base station. If this handover is permitted, however, accounting processing becomes complicated (it becomes necessary to inform the core network of every handover, whose processing is closed within the UTRAN, for the sake of accounting), so that it is preferable that such inter-cell handovers are not allowed from the viewpoint of a charge service.

By making modifications and changes to the terminal and the NRNC so that the functions and procedures described above are realized, it becomes possible to perform unregistered terminal excluding control for a target personal-use base station. If modifications and changes are further made to RNCs that are already-existing apparatuses, it becomes possible to carry out handovers between the cell of the personal-use base station and general cells only for registered terminals. FIGS. 56A, 56B and 56C show sequences for allowing only the registered terminals to perform handovers to the allowed cell (cell of the personal-use base station).

In FIG. 56, on receiving a message requesting a handover (MEASUREMENT REPORT) from the terminal, an RNC acquires an IMSI that is the unique ID of the terminal that is the sender of the communication information (measurement report). In usual cases, this IMSI is informed to the network side and is authenticated at a stage where a communication call is set. Therefore, by recording correspondences between communication and IMSIs in the RNC, the acquisition of the IMSI becomes possible. The RNC adds the IMSI to a setup request message (RADIO BEARER SETUP REQUEST) and transmits it to an NRNC that is a handover destination.

The NRNC is provided with a registration table in which the ID of the personal-use base station (cell ID, for instance) described in the first embodiment mode and the ID (IMSI) of each terminal registered for the personal-use base station are registered in advance.

On receiving the setup request message, the NRNC checks whether pair information of the IMSI contained in the message and the ID (cell ID) of the personal-use base station, to which the message should be sent, is registered in the registration table, thereby judging whether the terminal should be allowed to use the personal-use base station that is the handover destination.

If the result of this check is OK (pair information is registered), the NRNC transmits the setup request message (RADIO BEARER SETUP REQUEST) to the personal-use base station (NBTS) and the handover procedure is continued. As a result, the handover to the cell of the personal-use base station will be ultimately carried out.

In contrast to this, if the pair information is not registered in the registration table, the NRNC judges that the terminal is not allowed to use the personal-use base station, and further judges that the handover is impossible. As a result, the NRNC returns a message "RADIO BEARER SETUP FAILURE" to the RNC and rejects the handover.

With this construction, a handover to the personal-use base station is carried out only for the allowed terminals. Note that in this construction, a handover between the personal-use base station and a general base station is possible only for the registered terminals. At this time, if a differentiated service based on charges is required, after a judgment using the registration table is made, the entrance/exit of a terminal into/from the personal-use base station area is informed to the CN side.

It should be note here that though FIG. 56 shows a sequence of a hard handover, the soft handover illustrated in FIG. 53 is also applicable to such a movement between a general cell and the cell of the personal-use base station. Also, even if the RNC in FIG. 56 is replaced with an NRNC, the same procedure is executed.

Also, FIG. 56 illustrates a case where the cell (base station) before the handover and the cell (base station) that is the handover destination are under control by different base station control apparatuses (NRNCs). In contrast to this, if a handover is carried out between cells of two NBTSs under control by the same NRNC, the following procedure is executed.

On receiving a handover request from a terminal as "MEASUREMENT REPORT", the NRNC acquires the IMSI of the terminal. As a method for acquiring the IMSI, it is possible to use the technique described above, with which IMSIs to be used in procedures of call settings are acquired in advance, or a technique, with which an inquiry about the IMSI is issued to the terminal, is applicable. Then, the NRNC refers to the registration table and judges whether pair information of the IMSI and the base station ID (cell ID) of the handover destination cell is registered. At this time, if the pair information is registered, the NRNC transmits a proper response (PHYSICAL CHANNEL RECONFIGURATION or ACTIVE SET UPDATE) with respect to the handover request. On the other hand, if the pair information is not registered, the NRNC neglects the handover request, thereby rejecting the handover.

Embodiments

Figure 57:
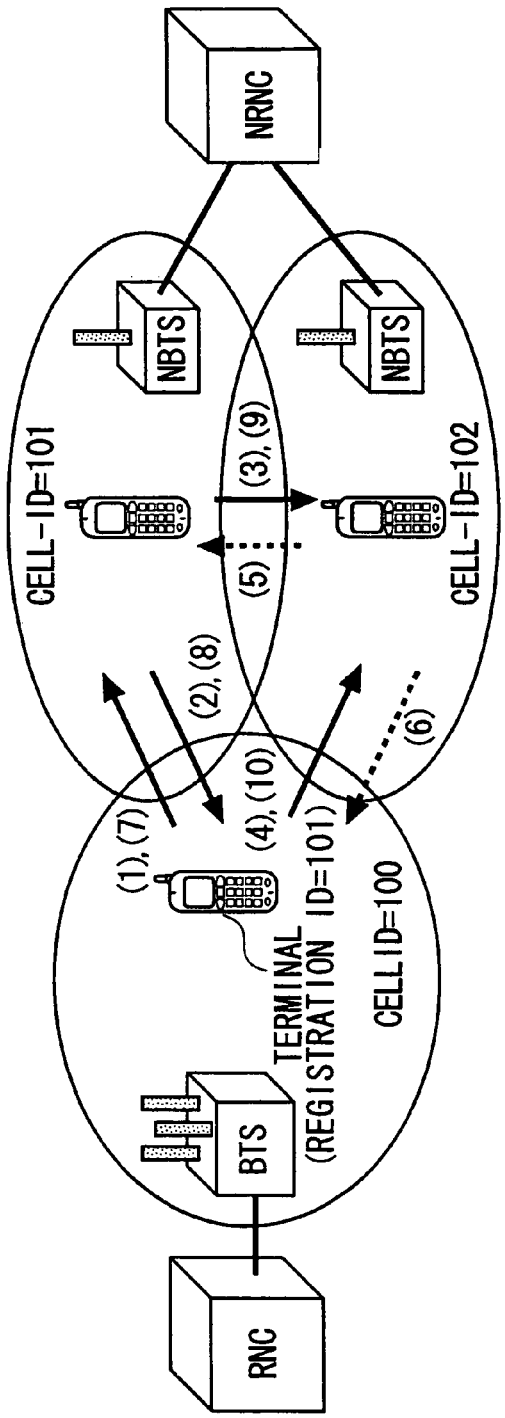
FIG. 57 is an explanatory diagram of definitions of inter-cell movements of a terminal in a third embodiment mode.

Next, as embodiments of the third embodiment mode, operations in the case where a registered terminal moves between a general base station cell and a personal-use base station cell will be described in detail. FIG. 57 is an explanatory diagram of the meaning of cells between which the terminal moves, and the positional relations between the cells. FIGS. 58 to 73 each show the details of operation examples in each of the movements prescribed in FIG. 57.

In each movement prescribed in FIG. 57, if the terminal is not currently performing communication, it merely performs displaying of its entrance into/exit from an allowed cell (personal-use base station cell whose use is allowed to the terminal) on the display unit. Also, processing relating to communication activation to be performed with the entrance into/exit from the allowed cell as a trigger has already been described in the first embodiment mode. Therefore, in the following examples, only operations to be performed when the terminal in communication moves between the cells will be explained.

The terminal cannot perform communication in a prohibited cell, so that the movements (5) and (6) shown in FIG. 57 from the prohibited cell (private-use base station cell whose use by the terminal is not allowed) to another cell under a state where communication is being performed are impossible. Consequently, the description concerning the movements (5) and (6) will be omitted.

<Operation Example in the Case of Movement [1]>

Figure 59:
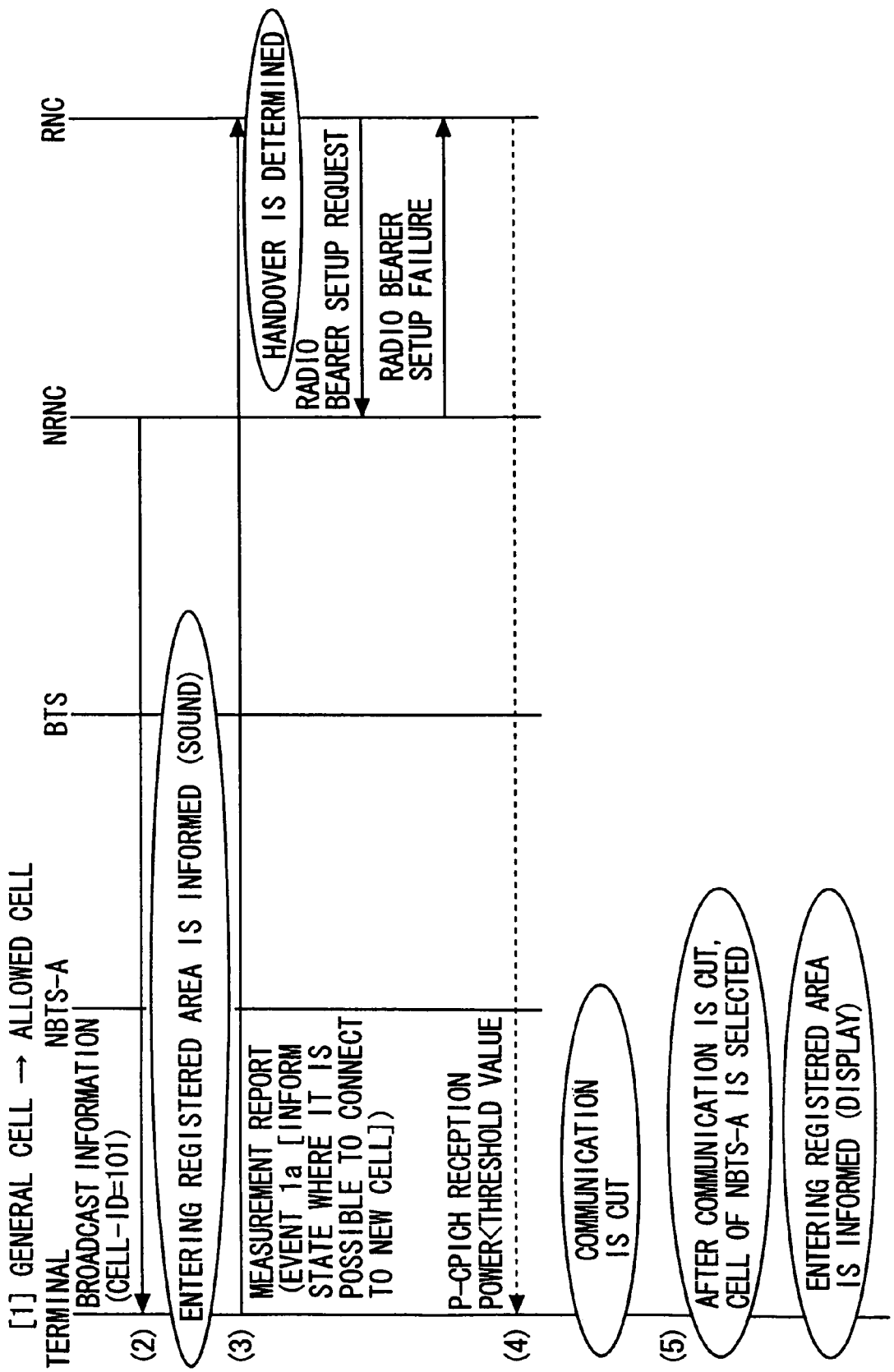
FIG. 59 is a sequence diagram showing an operation in the case where the terminal in communication moves from the general cell to the allowed cell ((1) in FIG. 57)

FIGS. 58 and 59 respectively show operation timings and a sequence in the case where a terminal in communication moved from a general cell (conventional base station cell (BTS)) to an allowed cell (NBTS-A) (corresponding to the movement (1) in FIG. 57). Note that "(2) to (5)" in FIG. 58 respectively coincide with "(2) to (5)" in FIG. 59.

In FIGS. 58 and 59, it is assumed that the terminal starts communication at the point (1). When the terminal moves rightward on the paper plane and reaches the point (2), the reception power level from the NBTS-A exceeds the threshold value (minimum level at which proper reception is possible) and the terminal becomes capable of receiving broadcast information containing the cell ID (Cell-ID-101) of the NBTS-A.

On receiving the broadcast information, the terminal recognizes that the cell of the NBTS-A is an allowed cell, for which the terminal is registered, with reference to the cell ID contained in the broadcast information. As a result, processing concerning cell capturing is changed and, at the point in time when the reception power level reaches a level of "the threshold value+the hysteresis A", a request for activating the allowed cell is generated. This activation request is sent to an RNC managing a BTS currently used as a measurement report (MEASUREMENT REPORT) ((3) in FIGS. 58 and 59).

The RNC decodes a handover request contained in the measurement report and transmits a setup request (RADIO BEARER SETUP REQUEST) to an NRNC that manages the Cell-ID=101 (NBTS-A). In this operation example, however, handovers to the allowed cell are entirely prohibited, so that the NRNC returns a setup failure message (RADIO BEARER SETUP FAILURE) with respect to the setup request, and rejects the handover.

Accordingly, the terminal cannot carry out the handover and continues communication until the reception power level of the BTS falls below a lower limit (below a properly receivable level). If the terminal exits the cell of the BTS, the communication is cut.

By the way, if the reception power level falls to a predetermined reception power level at which communication is barely possible, the terminal issues a warning sound that is the same as that issued at a radio wave area limit in the current system, thereby calling the user's attention. Also, when the terminal selects the cell of the NBTS-A, it outputs a sound indicating its entrance into the area of the NBTS-A (sound that is different from the warning sound described above) thereby informing the user of the entrance into the personal area (also referred to as the "registration area").

Also, in this operation example, when communication is ended (in either the case where the communication is cut because the radio wave falls below the lower limit or the case where the user intentionally cuts the communication), the terminal immediately selects the allowed cell and displays a personal area existing indication (such as an image, a text, or a symbol) indicating that the terminal is currently in the personal area on the display screen of the terminal. This personal area existing indication is continuously displayed so long as the terminal is located inside the personal area.

<Operation Example in the Case of Movement [2]>

Figure 60:
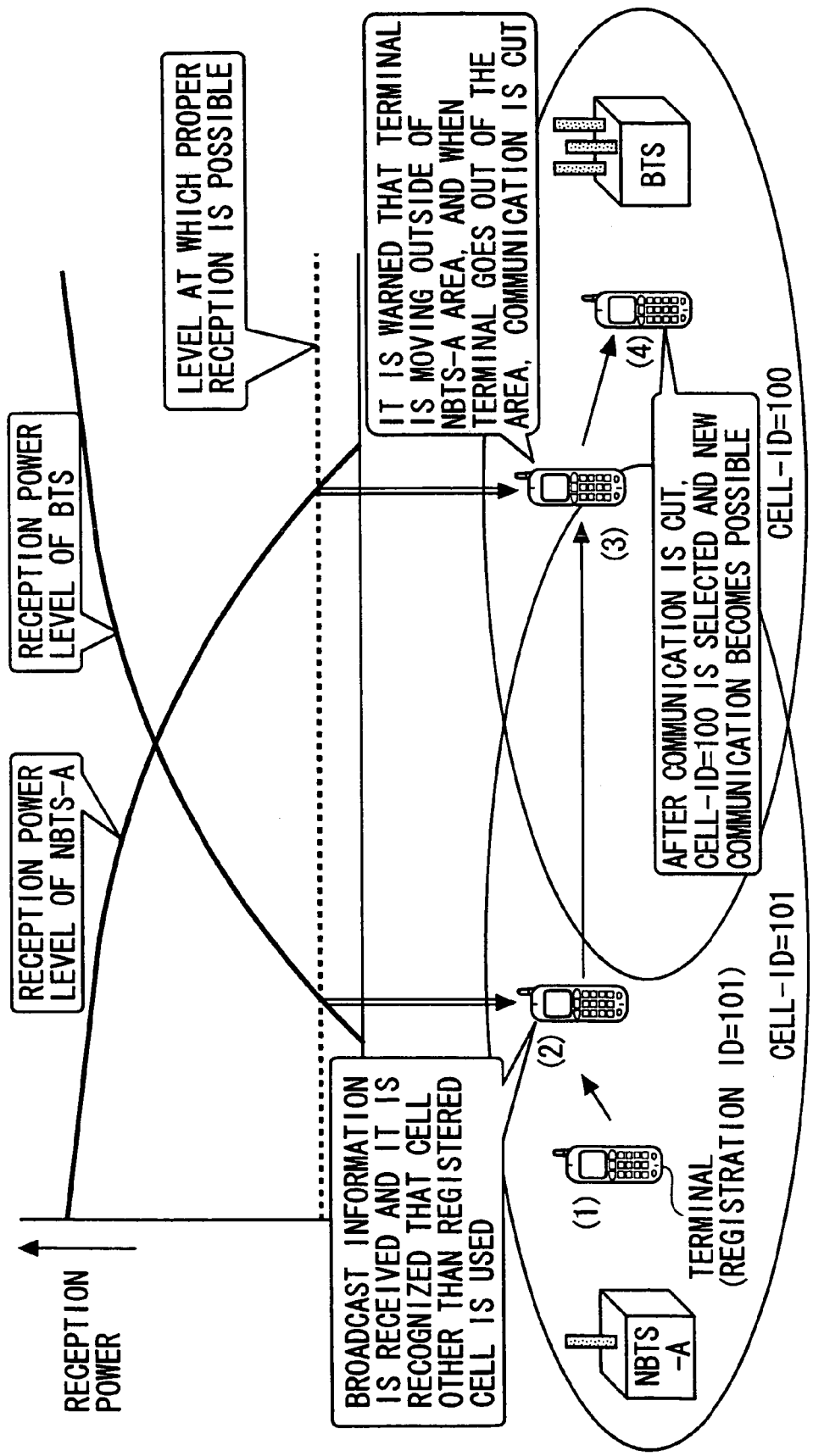
FIG. 60 illustrates operation timings in the case where a terminal in communication moves from an allowed cell to a general cell ((2) in FIG. 57)
Figure 61:
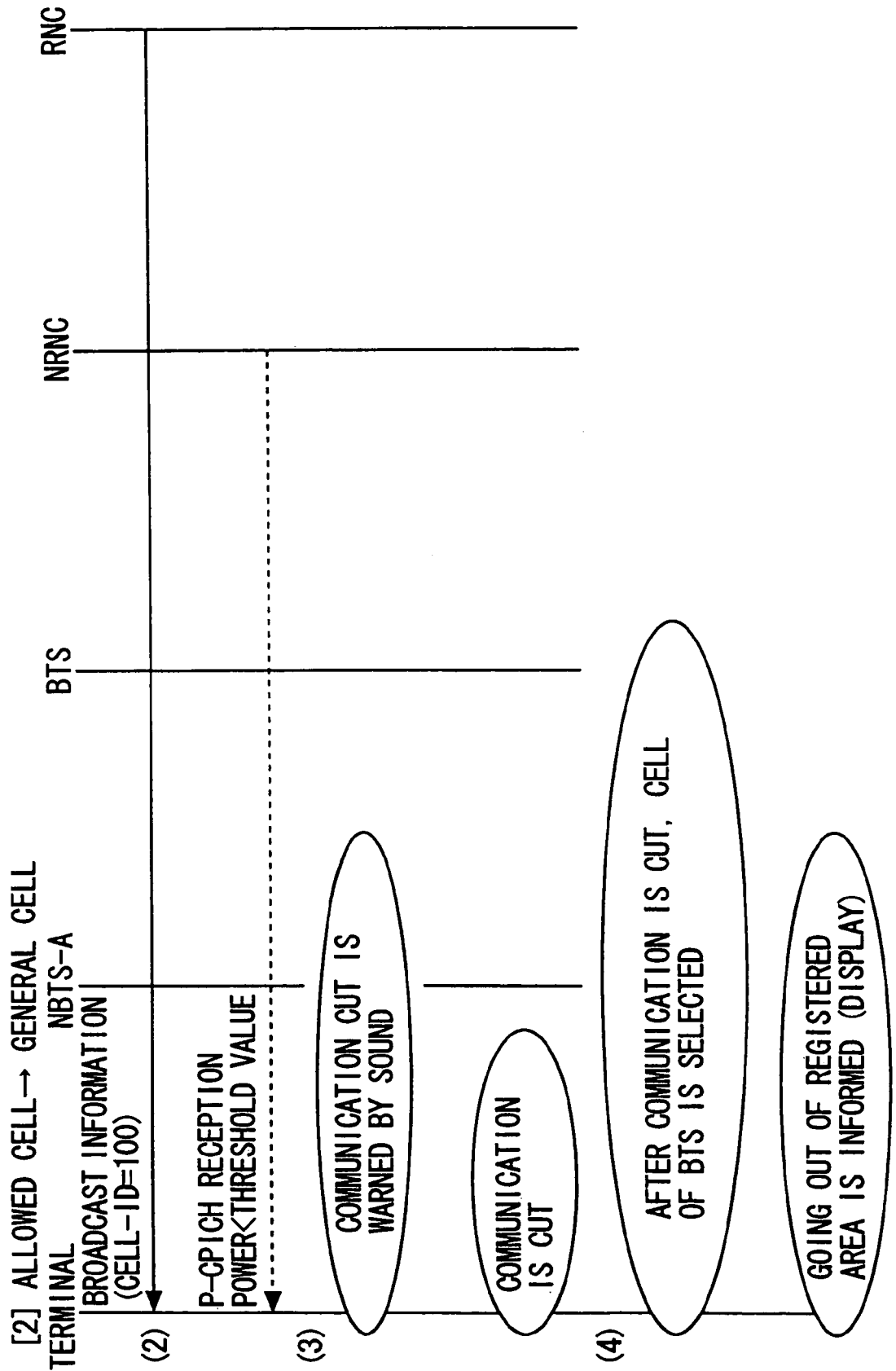
FIG. 61 is a sequence diagram showing an operation in the case where the terminal in communication moves from the allowed cell to the general cell ((2) in FIG. 57)

FIGS. 60 and 61 respectively show operation timings and a sequence in the case where a terminal in communication moves from an allowed cell (NBTS-A) to a general cell (BTS) (corresponding to the movement (2) in FIG. 57). Note that "(2) to (4)" in FIG. 60 respectively coincide with "(2) to (4)" in FIG. 61.

Like in FIGS. 58 and 59, a terminal is currently performing communication and starts the reception of broadcast information of a general cell ((2) in FIGS. 60 and 61). However, an allowed cell preferential logic (personal cell preferentially selecting function) works, so that a cell re-selection operation, such as a handover, is not performed.

As a result, the selection of the allowed cell is continued until the reception power level from the allowed cell falls below the properly receivable level ((3) in FIGS. 60 and 61). If the communication is continued until this point, the terminal outputs the same warning sound as in the case of a movement to the outside of a service area at the point (3), thereby calling the user's attention.

When the terminal moves further away from the NBTS-A (rightward in FIG. 60) from the point (3), the communication is cut. Then, the terminal selects the general cell. At this time, the terminal informs the user that the terminal has exited the registration area. In more detail, the terminal erases the personal area existing indicator.

<Operation Example in the Case of Movement [3]>

Figure 62:
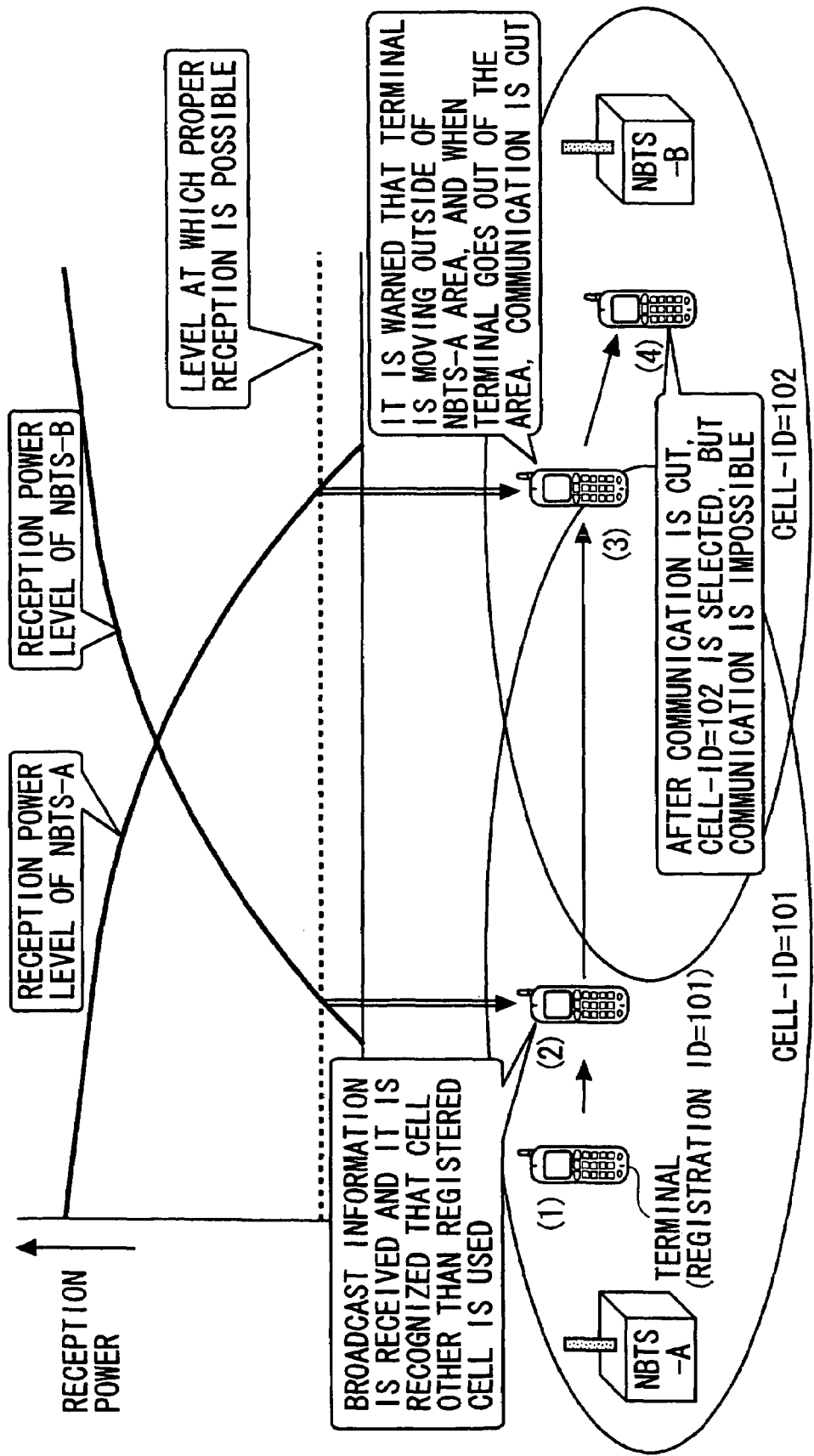
FIG. 62 illustrates operation timings in the case where a terminal in communication moves from an allowed cell to a prohibited cell ((3) in FIG. 57)
Figure 63:
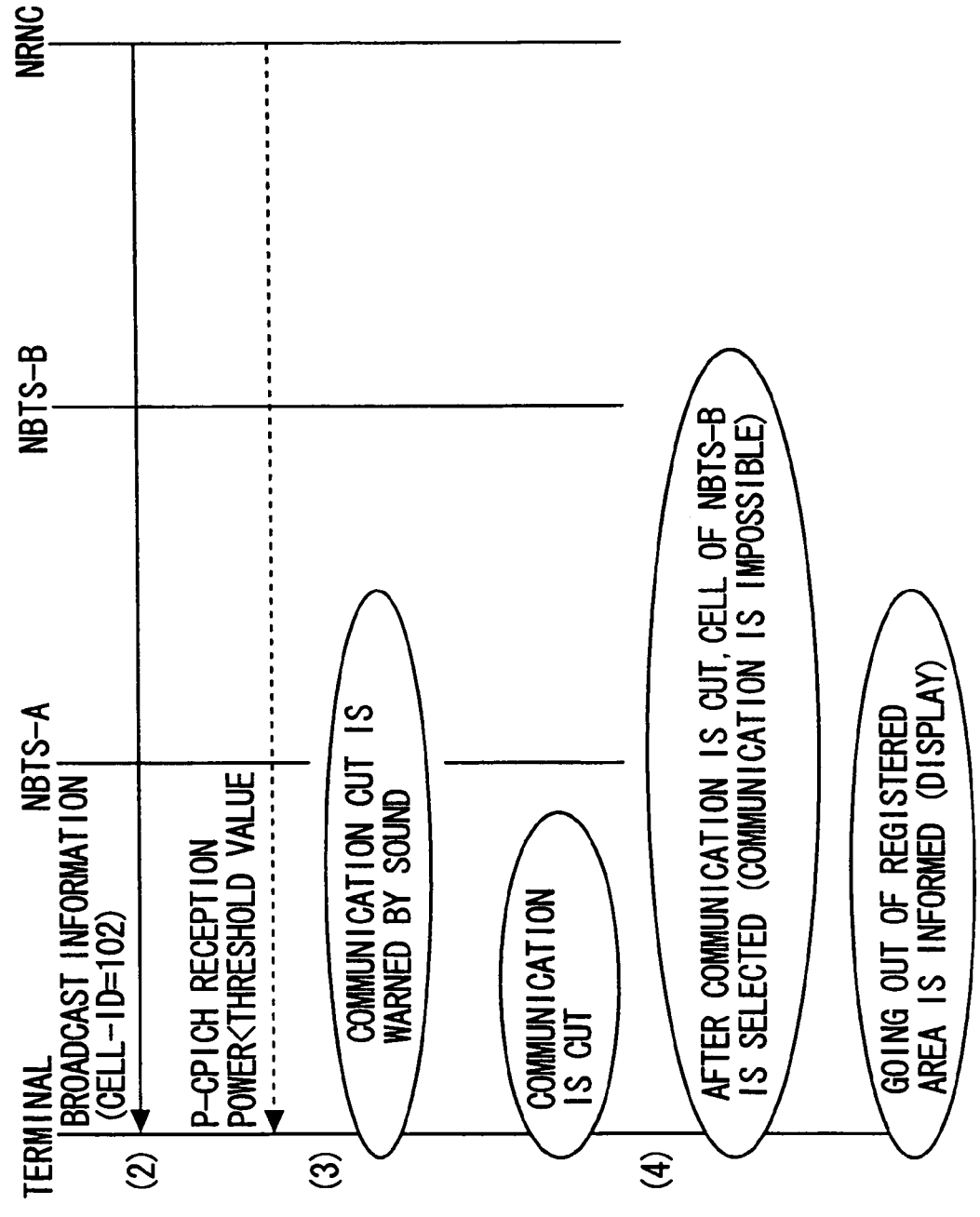
FIG. 63 is a sequence diagram showing an operation in the case where the terminal in communication moves from the allowed cell to the prohibited cell ((3) in FIG. 57)

FIGS. 62 and 63 respectively show operation timings and a sequence in the case where a terminal in communication moves from an allowed cell (NBTS-A) to a prohibited cell (NBTS-B) (corresponding to the movement (3) in FIG. 57). Note that "(2) to (4)" in FIG. 62 respectively coincide with "(2) to (4)" in FIG. 63.

This operation example is basically the same as that in the case of the movement to a general cell described above (operation example in the case of the movement (2)). However, the terminal is not allowed to perform communication in a prohibited cell, so that when the terminal exits the range of an allowed cell and is located in the prohibited cell ((4) in FIG. 64), the terminal is placed under an incommunicable status. In this case, the terminal displays an indication that communication is impossible (referred to as the "incommunicable indicator" in some cases) as well as the personal area existing indicator. In this regard, this operation example differs from the operation example in the case of the movement (2).

<Operation Example in the Case of Movement [4]>

Figure 64:
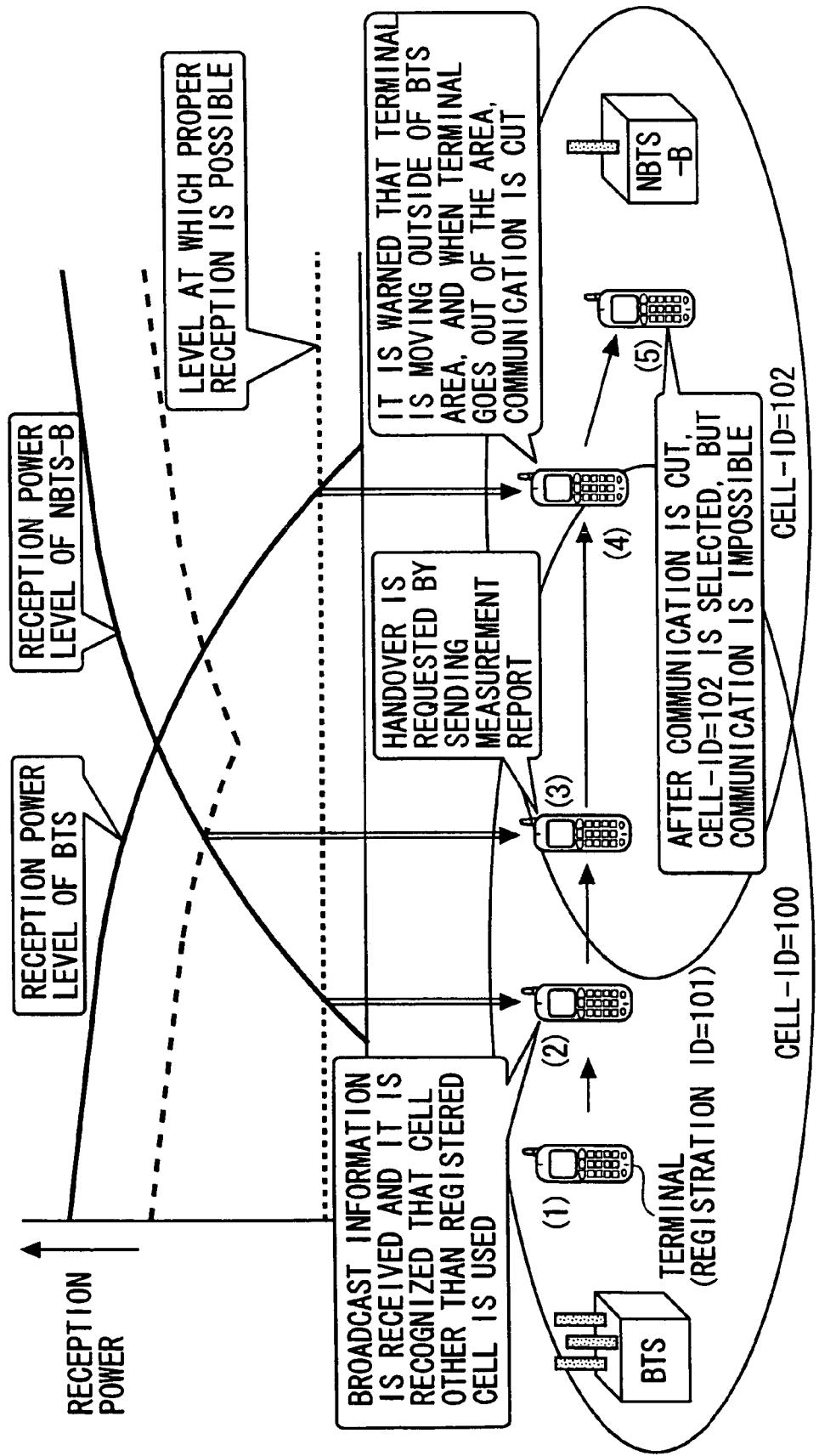
FIG. 64 illustrates operation timings in the case where a terminal in communication moves from a general cell to a prohibited cell ((4) in FIG. 57)
Figure 65:
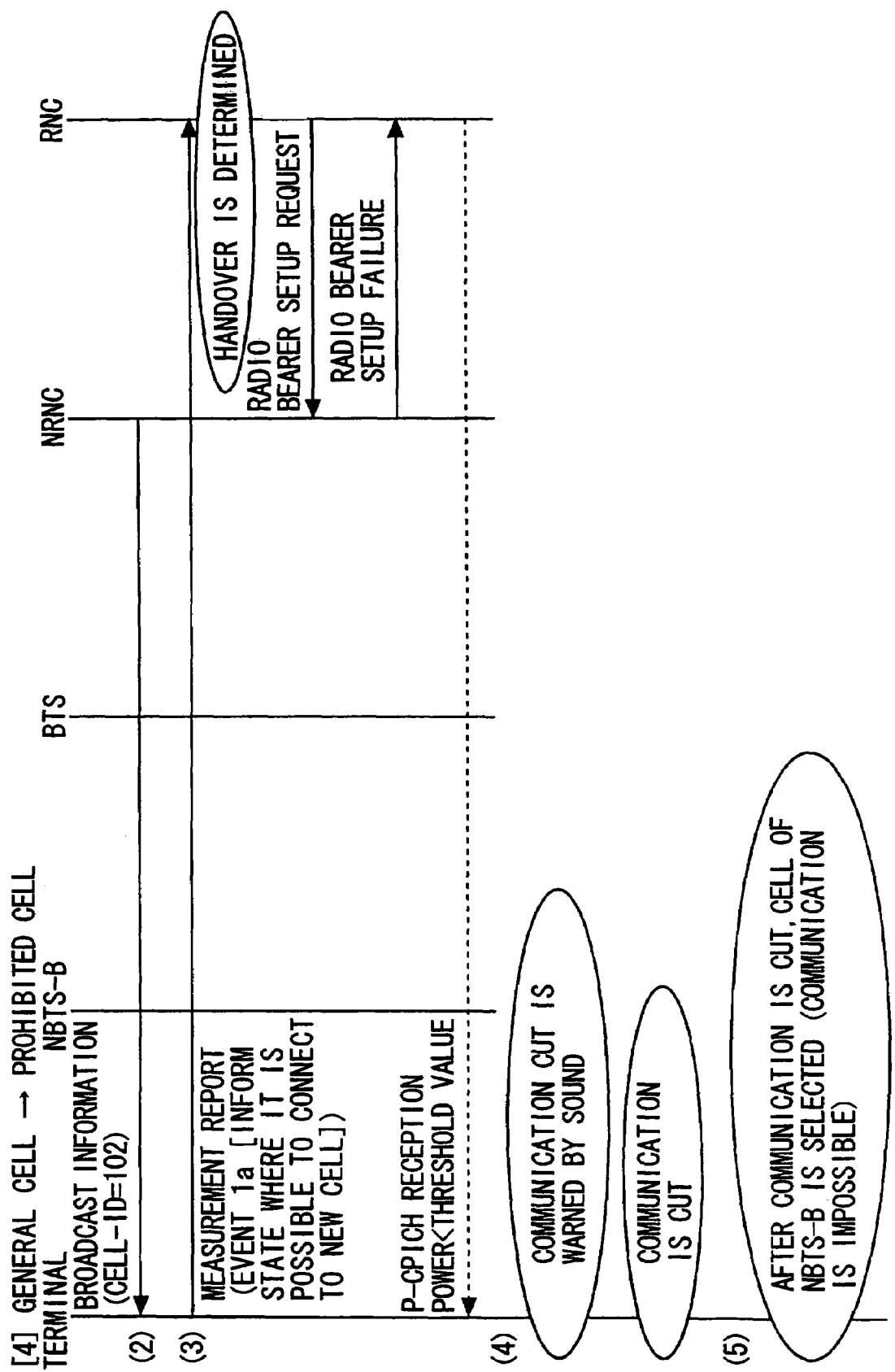
FIG. 65 is a sequence diagram showing an operation in the case where the terminal in communication moves from the general cell to the prohibited cell ((4) in FIG. 57)

FIGS. 64 and 65 respectively show operation timings and a sequence in the case where a terminal in communication moves from a general cell (BTS) to a prohibited cell (NBTS-B) (corresponding to the movement (4) in FIG. 57). Note that "(2) to (5)" in FIG. 64 respectively coincide with "(2) to (5)" in FIG. 65.

The terminal starts the reception of broadcast information from the prohibited cell at the point (2) in the drawing. The cell ID contained in the broadcast information is a cell ID not registered in the terminal. Therefore, the terminal recognizes that the cell ID is not the ID of an allowed cell (also referred to as the "registration cell"). However, the terminal is incapable of distinguishing whether it is the cell ID of a general cell or the cell ID of a prohibited cell.

Consequently, the terminal performs a handover operation that is the same as conventional ones. That is, the terminal makes a handover level judgment using the report range as a threshold value and issues a handover request to the network side as "MEASUREMENT REPORT" at the point (3) in the drawing. This request is sent from an RNC to an NRNC.

Handovers under control by the NRNC, that is, between the cell of the NBTS and the cell of the BTS are uniformly prohibited, so that the handover is rejected and cannot be carried out. After that, the same processing as in the operation example in the case of the movement (1) (FIGS. 58 and 59) is performed and, when the terminal exits the area of the general cell, the communication is cut. Also, under a state where the prohibited cell is selected, the terminal is placed under an incommunicable status.

<Operation Example in the Case of Movement [7]>

Figure 66:
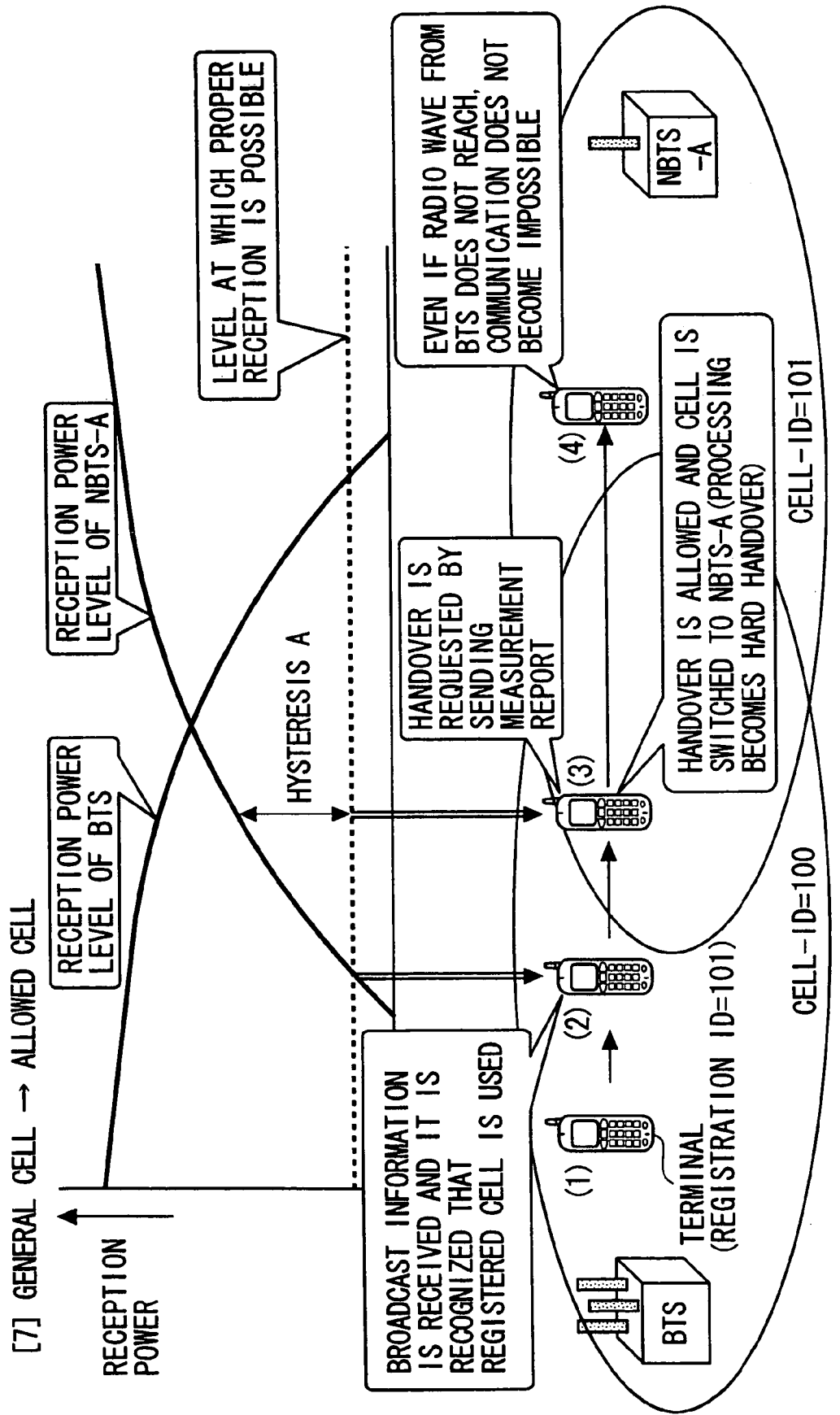
FIG. 66 illustrates operation timings in the case where a terminal in communication moves from a general cell to an allowed cell ((7) in FIG. 57)
Figure 67:
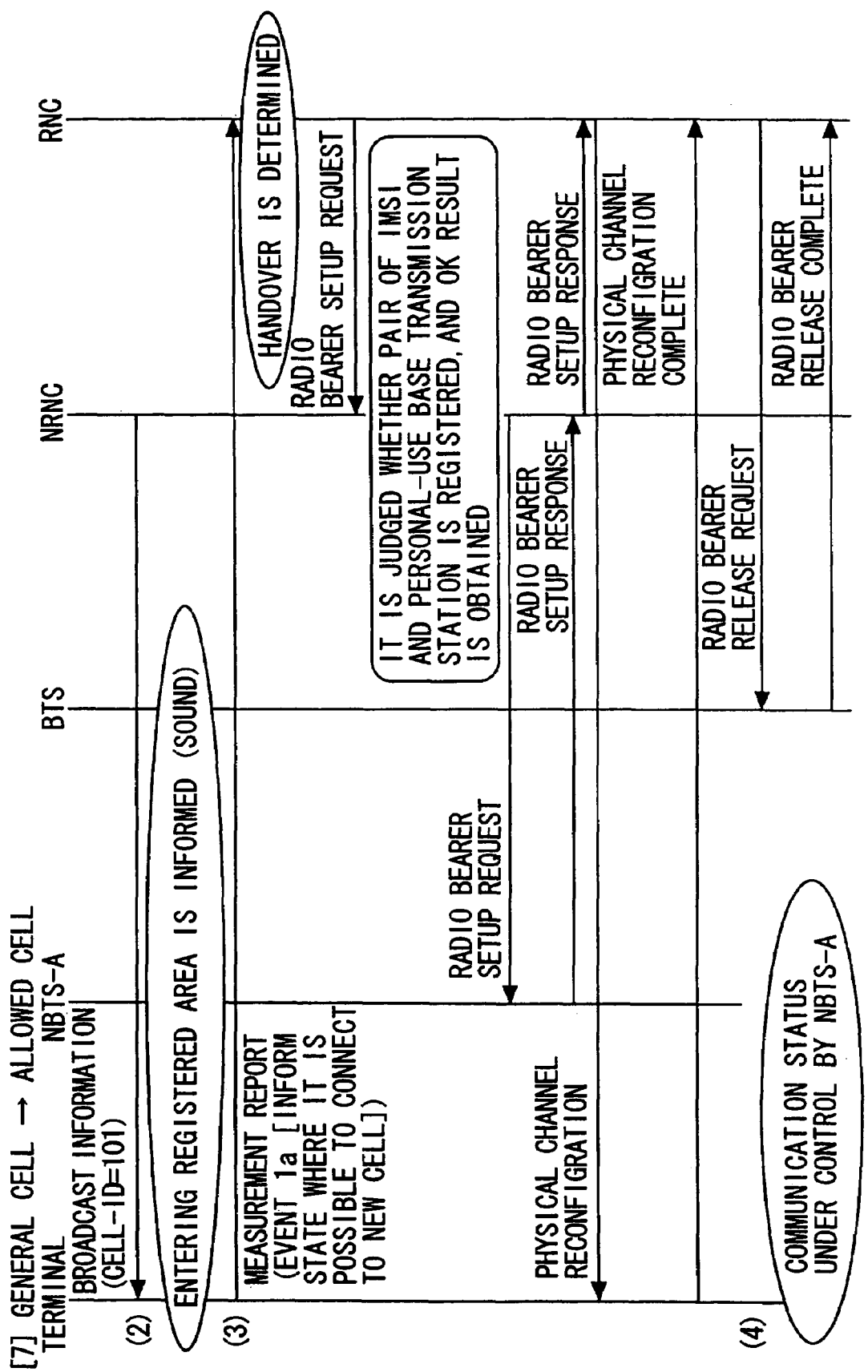
FIG. 67 is a sequence diagram showing an operation in the case where the terminal in communication moves from the general cell to the allowed cell ((7) in FIG. 57)

FIGS. 66 and 67 respectively show operation timings and a sequence in the case where a terminal in communication moves from a general cell (BTS) to an allowed cell (NBTS-A) (corresponding to the movement (7) in FIG. 57) in a system where a handover execution judgment is made at a base station control apparatus. Note that "(2) to (4)" in FIG. 66 respectively coincide with "(2) to (4)" in FIG. 67. Also, FIGS. 66 and 67 each show an example where an inter-cell hard handover is carried out.

In FIG. 66, it is assumed that the terminal starts communication at the point (1). After that, when the terminal moves and reaches the point (2), the reception power level from the NBTS-A exceeds a threshold value (minimum receivable level) and the terminal becomes capable of receiving broadcast information having a cell ID=101 from the NBTS-A.

The terminal compares the cell ID in the broadcast information with a cell ID of a personal-use base station held therein, and recognizes that the cell of the NBTS-A is an allowed cell. As a result, the terminal changes processing concerning cell capturing and, at the point in time when the reception power level from the NBTS-A reaches a level of "the threshold value+the predetermined hysteresis A" ((3) in FIG. 66), issues a request for activating the allowed cell (handover request) This request is sent to a corresponding RNC as a measurement report (MEASUREMENT REPORT).

The RNC decodes a handover request contained in the measurement report and acquires the IMSI of the terminal from call setting information concerning communication of the terminal stored in the RNC. Then, the RNC adds the IMSI to a setup request (RADIO BEARER SETUP REQUEST) and transmits it to an NRNC that manages the Cell-ID=101 (NBTS-A).

On receiving this request, the NRNC judges whether pair information of the base station ID (cell ID) of the handover destination designated by the setup request and the IMSI is registered in a registration table (provided in a VLR or in the NRNC in the CN).

In this example, the NRNC recognizes that the pair information is registered in the registration table with reference to the result of a judgment made by itself or by receiving a judgment result from the CN side. As a result, the NRNC judges that a handover is possible (authenticates the handover request), executes the remaining handover sequence, and carries out the handover.

As a result, the terminal newly establishes a wireless link to the NBTS-A, cuts a wireless link to the original BTS, and ends the handover processing. In this manner, the terminal shifts to a communication status under control by the NBTS-A while continuing communication.

<Operation Example in the Case of Movement [8]>

Figure 68:
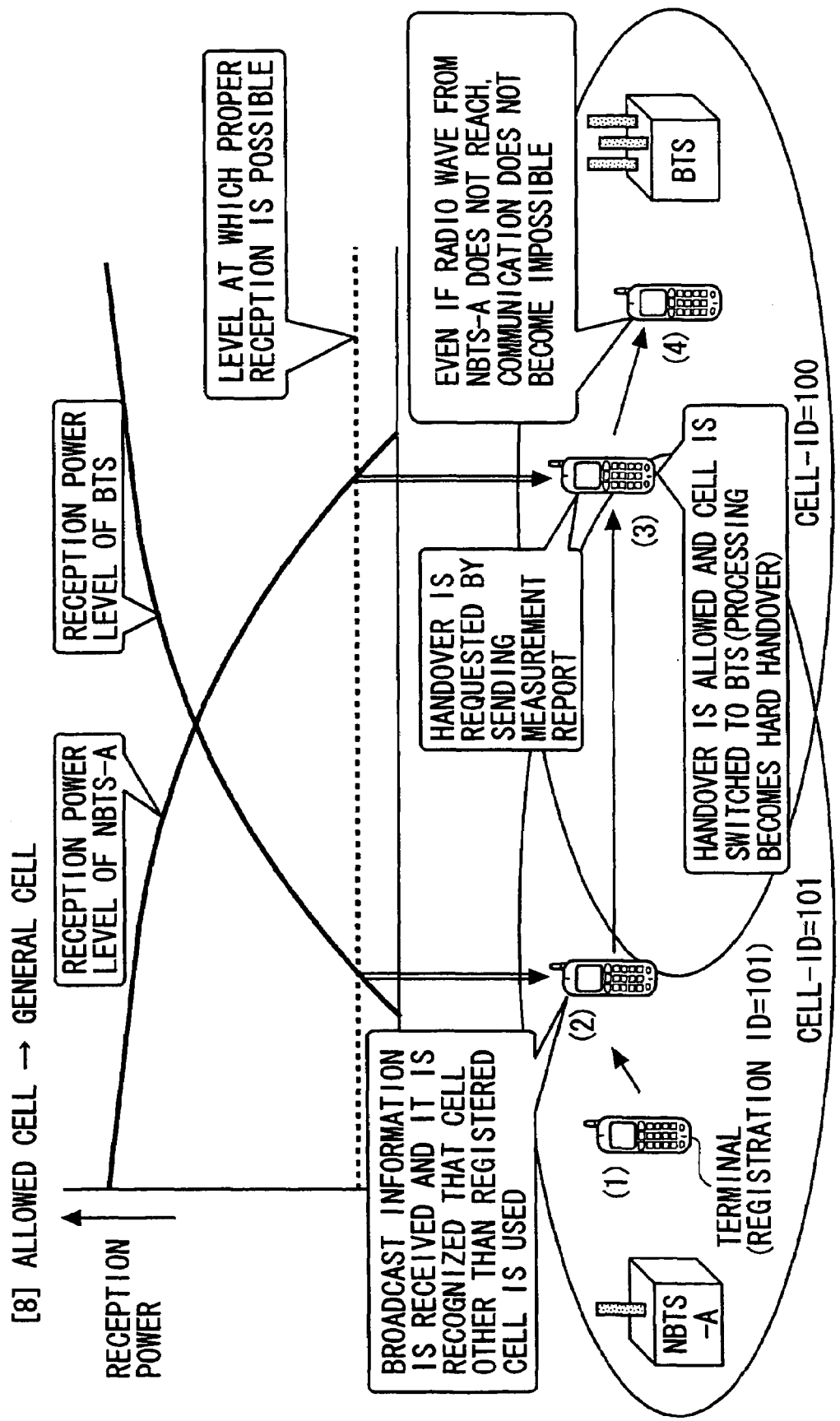
FIG. 68 illustrates operation timings in the case where, under a state where handover judgment processing is executed, a terminal in communication moves from an allowed cell to a general cell ((8) in FIG. 57)
Figure 69:
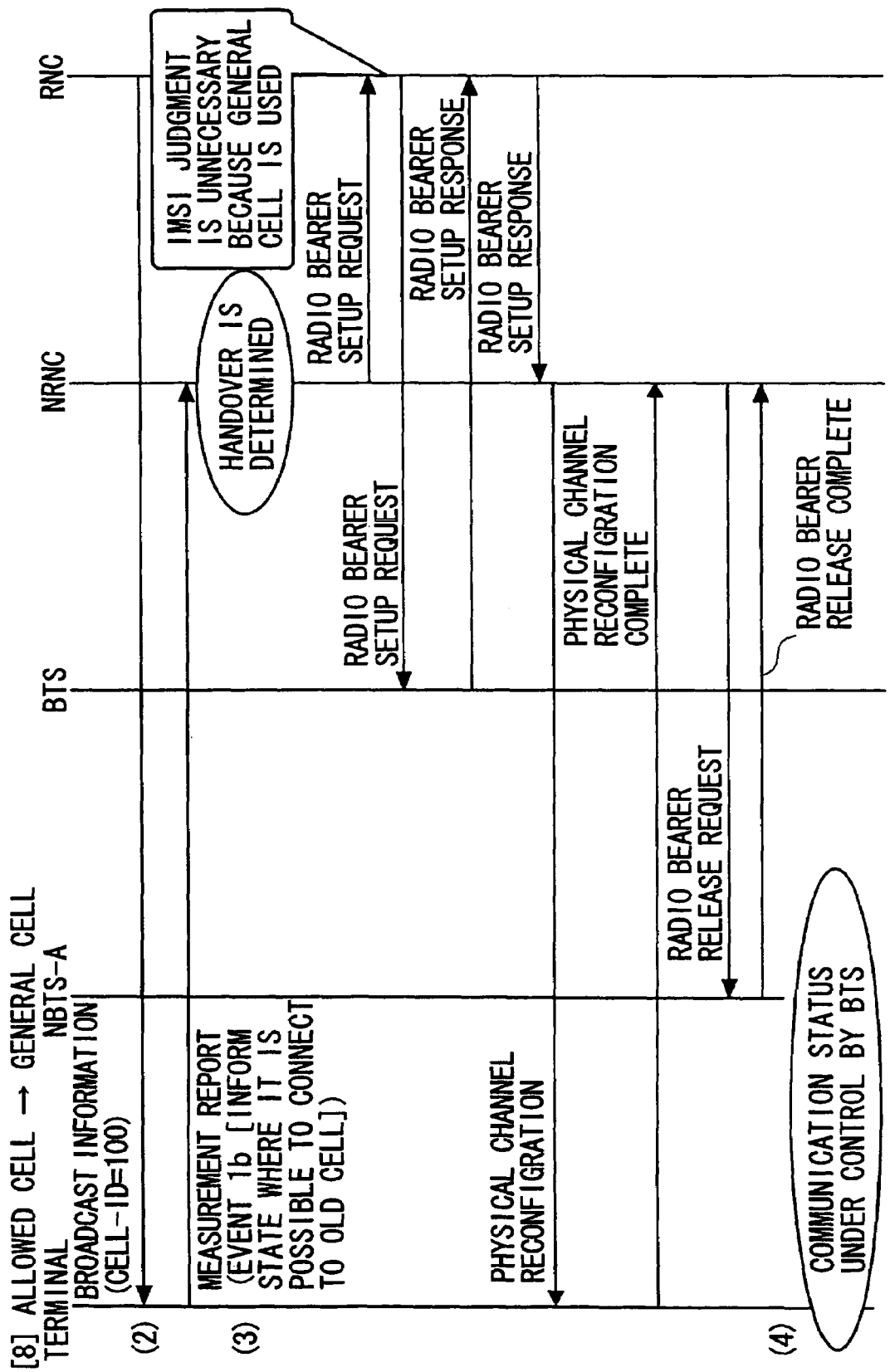
FIG. 69 is a sequence diagram showing an operation in the case where, under the state where the handover judgment processing is executed, the terminal in communication moves from the allowed cell to the general cell ((8) in FIG. 57)

FIGS. 68 and 69 respectively show operation timings and a sequence in the case where a terminal in communication moves from an allowed cell (NBTS-A) to a general cell (BTS) (corresponding to the movement (8) in FIG. 57) in a system where a handover execution judgment is made at a base station control apparatus. Note that "(2) to (4)" in FIG. 68 respectively coincide with "(2) to (4)" in FIG. 69. Also, FIGS. 68 and 69 each show an example where an inter-cell hard handover is carried out.

Like in the operation example in the case of the movement (7) (FIGS. 66 and 67), the terminal starts the reception of broadcast information of a general cell at the point (2) in FIG. 68. However, the allowed cell preferential logic (private cell preferentially selecting function) works, so that a cell re-selection operation, such as a handover, is not performed. As a result, the terminal transmits a handover request to an NRNC as "MEASUREMENT REPORT" at last at the point in time when the radio wave from the allowed cell is reduced to a level at which proper reception is barely possible.

The handover destination is a general cell, so that the NRNC performs handover processing as usual. Consequently, at the point in time when the terminal exits the receivable area of the allowed cell, the terminal performs switching between links and is placed under a status where a link to a general base station is established.

<Operation Example in the Case of Movement [9]>

Figure 70:
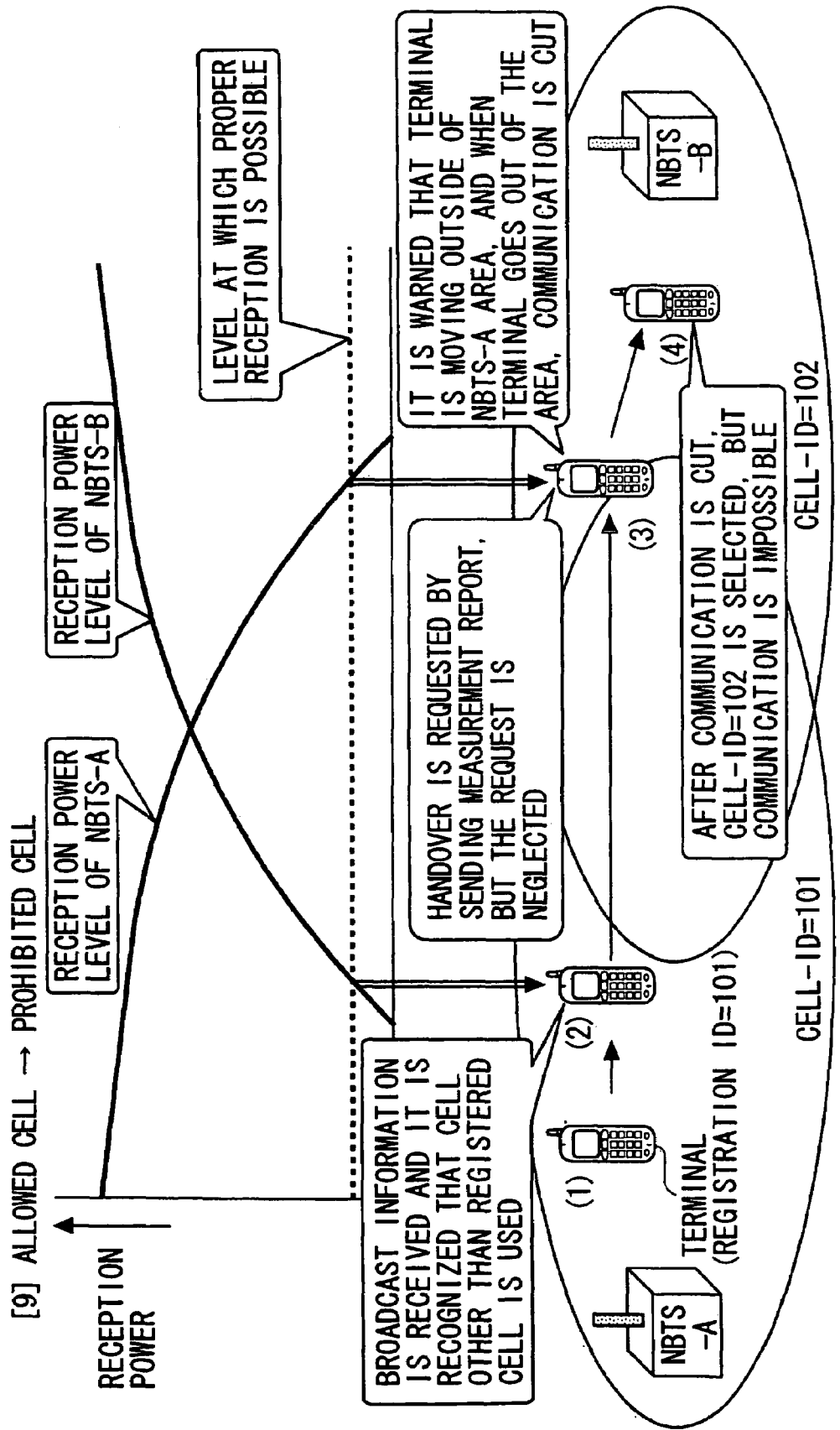
FIG. 70 illustrates operation timings in the case where, under a state where handover judgment processing is executed, a terminal in communication moves from an allowed cell to a prohibited cell ((9) in FIG. 57)
Figure 71:
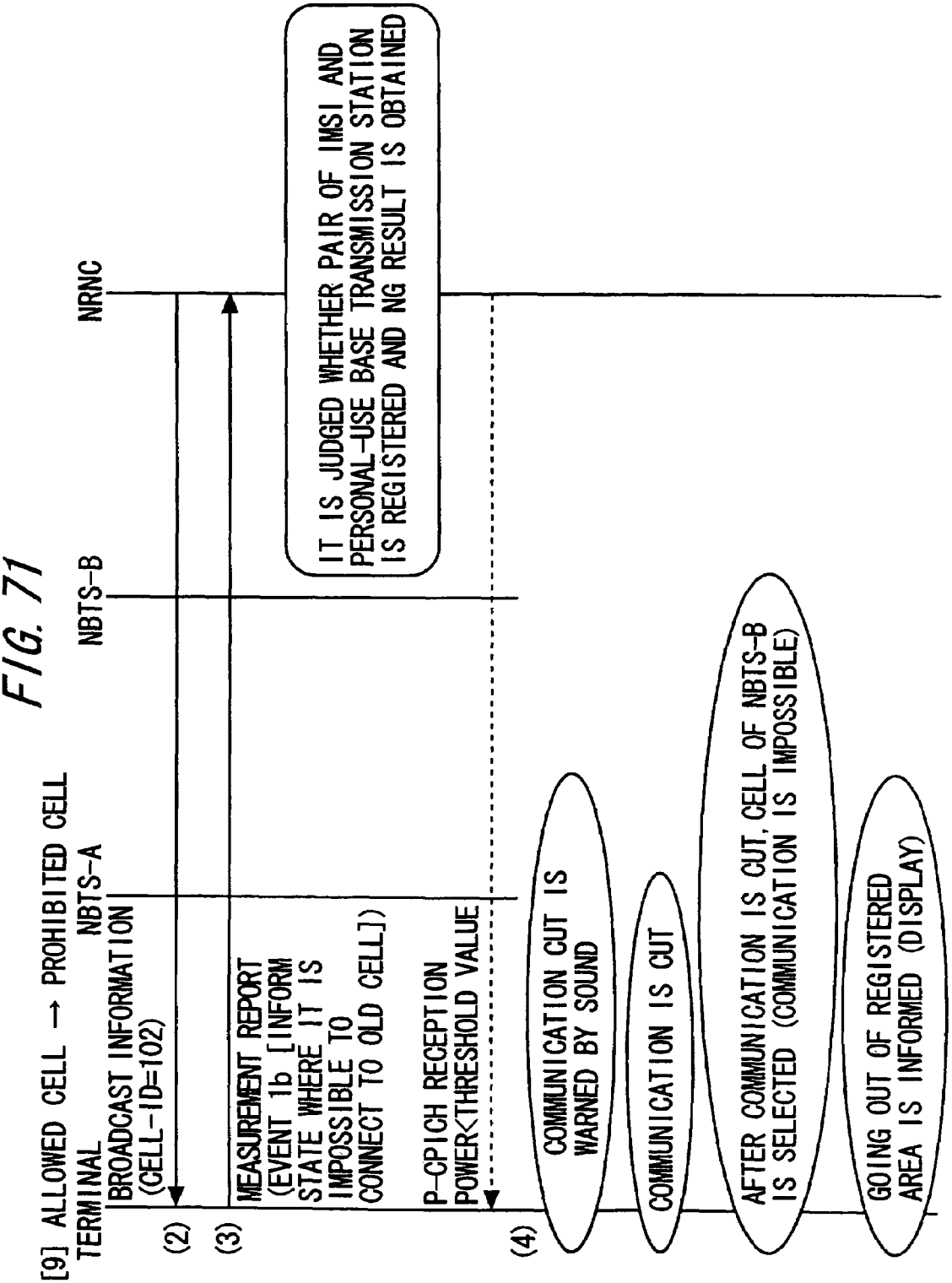
FIG. 71 is a sequence diagram showing an operation in the case where, under the state where the handover judgment processing is executed, the terminal in communication moves from the allowed cell to the prohibited cell ((9) in FIG. 57)

FIGS. 70 and 71 respectively show operation timings and a sequence in the case where a terminal in communication moves from an allowed cell (NBTS-A) to a prohibited cell (NBTS-B) (corresponding to the movement (9) in FIG. 57) in a system where a handover execution judgment is made at a base station control apparatus. Note that "(2) to (4)" in FIG. 70 respectively coincide with "(2) to (4)" in FIG. 71.

As shown in FIG. 71, a measurement report is transmitted from the terminal at the same timing as in the operation example in the case of the movement (8) shown in FIG. 69 ((3) in FIG. 71). An NRNC receiving this handover request is capable of recognizing that the handover destination is a prohibited cell whose use by the terminal is prohibited, by performing judgment processing using a registration table (IMSI has been acquired because it is in the same NRNC). Accordingly, the NRNC judges that the handover is impossible and neglects this handover request.

Consequently, at the point (3), the same warning sound as in the case where the terminal is moving to the outside of a service area is outputted in order to call the user's attention and, when the terminal moves outward from that point (moves to the point (4), for instance), the communication is cut.

<Operation Example in the Case of Movement [10]>

Figure 72:
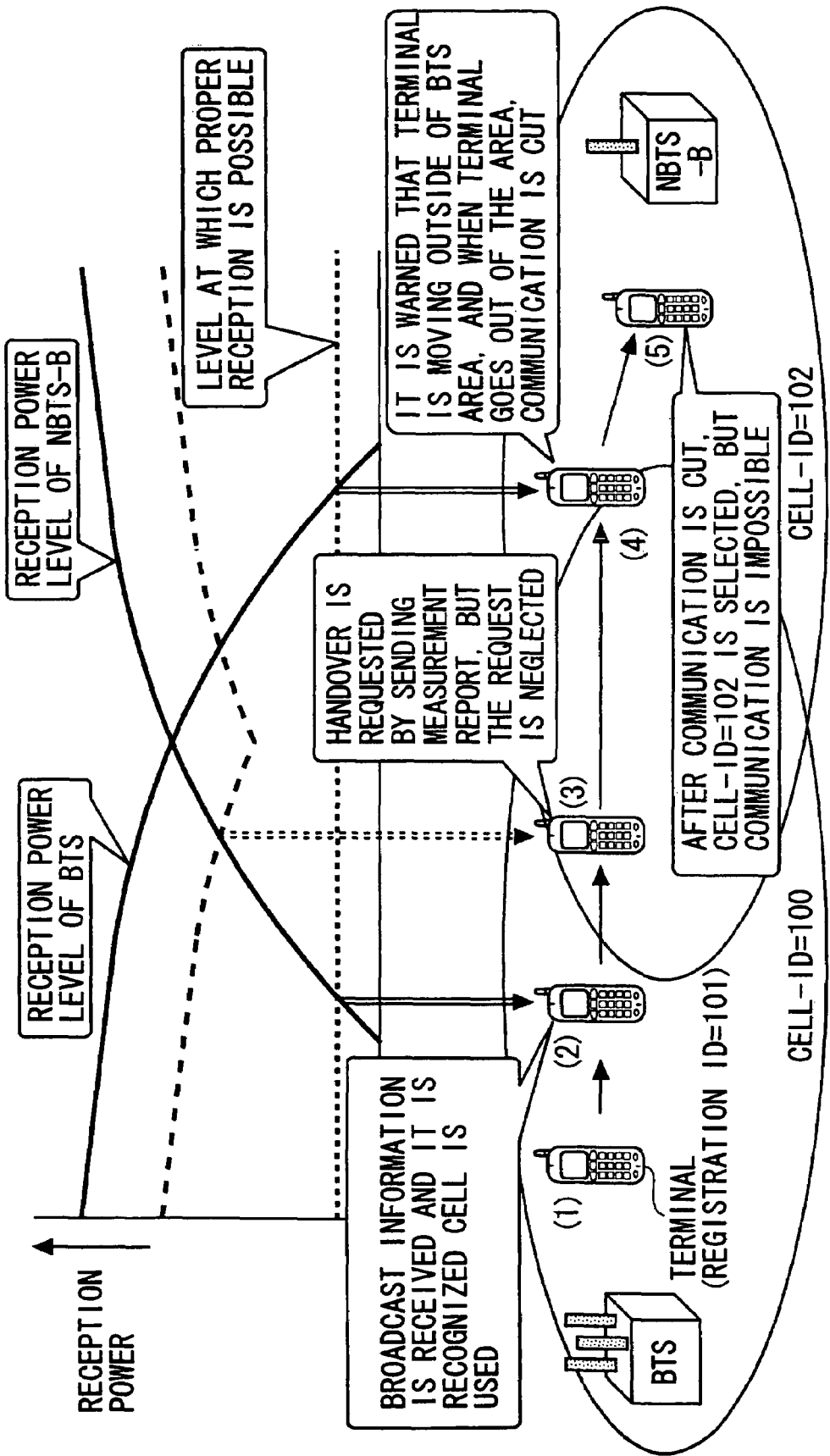
FIG. 72 illustrates operation timings in the case where, under a state where handover judgment processing is executed, a terminal in communication moves from a general cell to a prohibited cell ((10) in FIG. 57)
Figure 73:
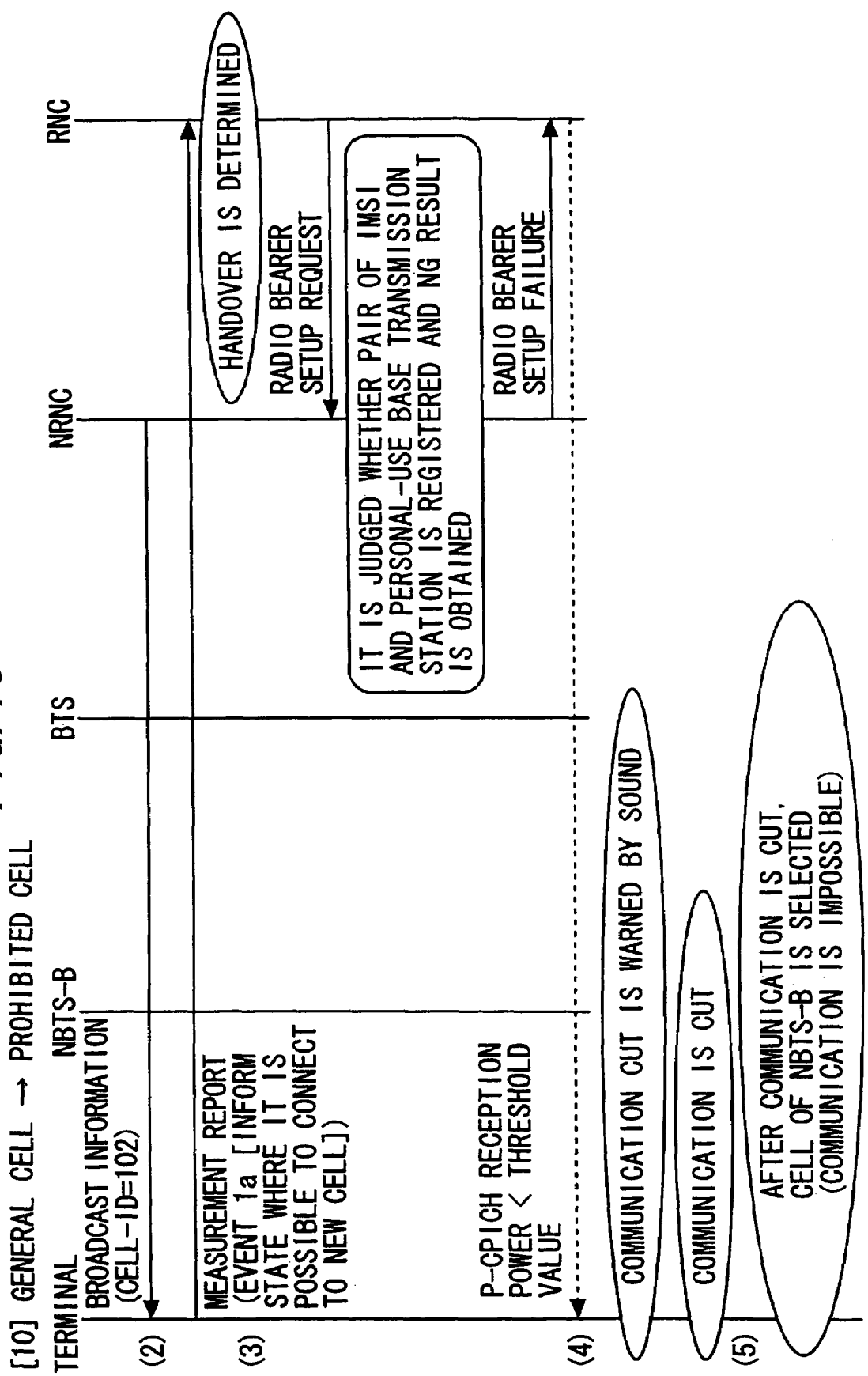
FIG. 73 is a sequence diagram showing an operation in the case where, under the state where the handover judgment processing is executed, the terminal in communication moves from the general cell to the prohibited cell ((10) in FIG. 57)

FIGS. 72 and 73 respectively show operation timings and a sequence in the case where a terminal in communication moves from a general cell (BTS) to a prohibited cell (NBTS-B) (corresponding to the movement (10) in FIG. 57) in a system where a handover execution judgment is made at a base station control apparatus. Note that "(2) to (5)" in FIG. 72 respectively coincide with "(2) to (5)" in FIG. 73.

The terminal receives broadcast information from the prohibited cell at the point (2). However, the terminal cannot distinguish whether the cell is a general cell or a prohibited cell because a cell ID contained in the broadcast information is a cell ID that is not registered in the terminal. Consequently, the same operation as conventional ones is performed and a handover level judgment is made using the report range as a threshold value. As the point in time when the terminal moves to the point (3), a handover request is sent to the network side as a measurement report.

Then, an RNC performs the same processing as in the operation example in the case of the movement (7). That is, the RNC acquires an IMSI, adds the IMSI to a message "RADIO BEARER SETUP REQUEST", and sends it to an NRNC. The NRNC judges whether pair information of the IMSI and the cell ID is registered in a registration table and obtains an NG result. In accordance with this result, the NRNC transmits a message "RADIO BEARER SETUP FAILURE" to the RNC and informs that the handover is impossible.

In this manner, the handover request from the terminal is neglected and communication is set possible only in a range in which the radio wave from the general cell can be received.

<Construction and Operation of Terminal>

Figure 74:
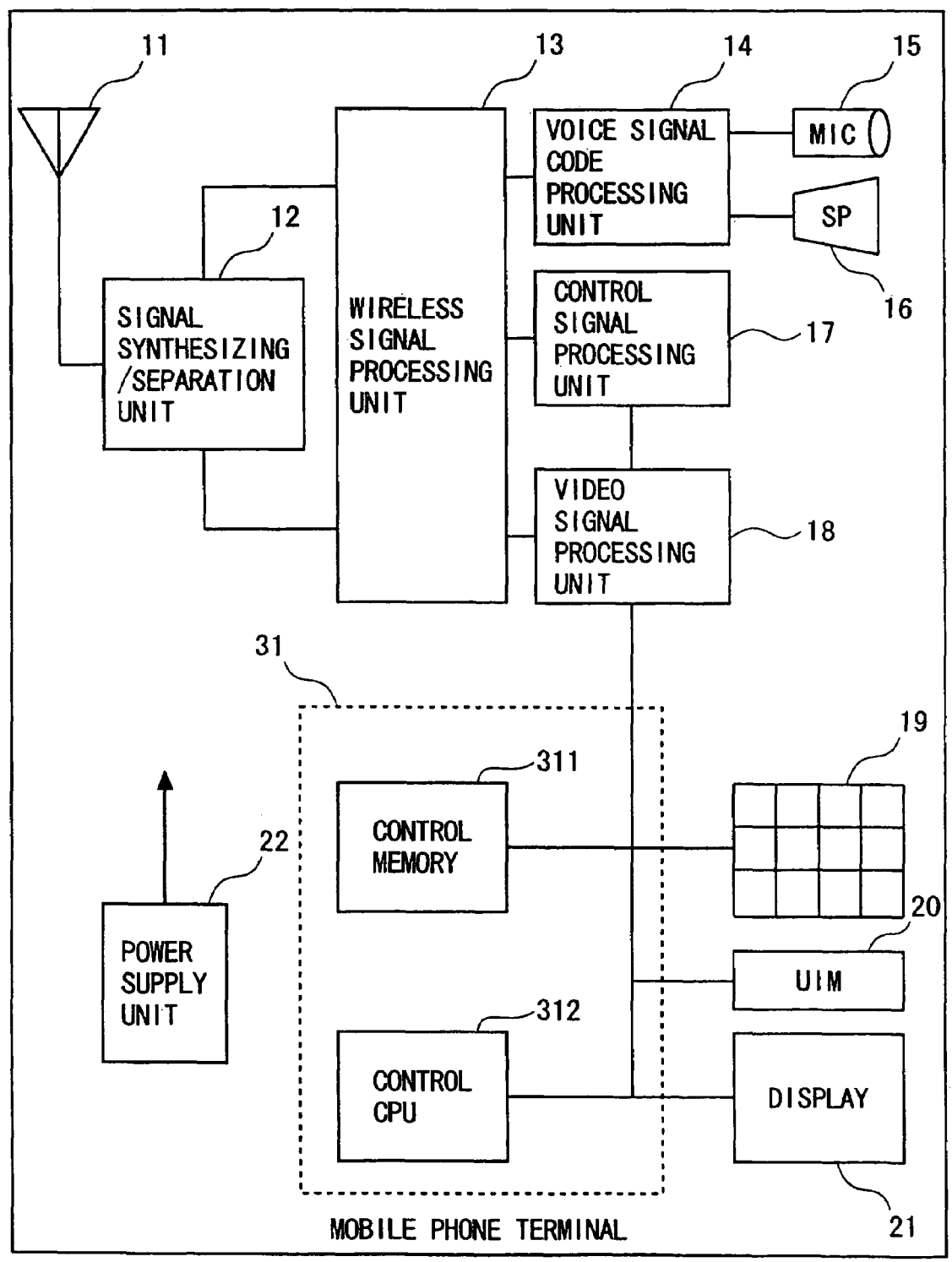
FIG. 74 is a block diagram showing an example of a construction of a terminal device applicable to the third embodiment mode of the present invention.

Next, a concrete construction of a terminal (mobile telephone terminal, for instance) applied to the third embodiment mode will be described. FIG. 74 shows an internal block construction of the mobile telephone terminal. In FIG. 74, reference numeral 11 denotes a transmission/reception antenna, numeral 12 a duplexer (signal synthesizing/separation unit) numeral 13 a wireless signal processing unit, numeral 14 a speech CODEC (voice signal code processing unit), numeral 15 a voice microphone, numeral 16 a voice speaker, numeral 17 a channel CODEC (control signal processing unit), numeral 18 a video CODEC (video signal processing unit), numeral 19 a keypad (input unit of numbers and the like), numeral 20 a UIM (user identifier card corresponding to the SIM card), numeral 21 a display (video/letter display unit), numeral 22 a power supply unit, and numeral 31 a terminal control unit. Reference numerals 311 and 312 respectively denote a control memory (such as a ROM/RAM) and a control CPU provided in the terminal control unit 31.

After a wireless signal is received by the antenna 11, the signal is separated into signals corresponding to respective physical channels (distinguished per wireless frequency or scramble code) and each resultant signal is converted into a bit stream by the wireless signal processing unit 13. A control signal among the signals is converted into control signal data (message data) by the control signal processing unit 17 and is written into the RAM (control memory 311) of the control unit 31.

The control CPU 312 analyzes the message using its built-in software and performs processing. If it is judged as a result of the processing that the message should be transmitted, the control CPU 312 assembles the message and writes it into the control memory (RAM) 311.

The control signal processing unit 17 converts the message written into the control memory 311 into a bit stream and sends it to the wireless signal processing unit 13. A physical channel is selected by the wireless signal processing unit 13 (that is, a scramble code and a wireless frequency are selected) and the stream data is transmitted as a wireless signal from the antenna 11 to a base station.

Stored in the control memory 311 are the cell ID of a personal-use base station, for which the terminal is registered, and a control program for achieving the functions (terminal) described in the third embodiment mode such as the personal area entrance/exit informing function, the personal cell preferentially selecting function, and communication inside the personal area possible/impossible informing function. The control CPU 312 achieves each function described above at the timings described in each operation example of the third embodiment mode by executing the control program.

Figure 75:
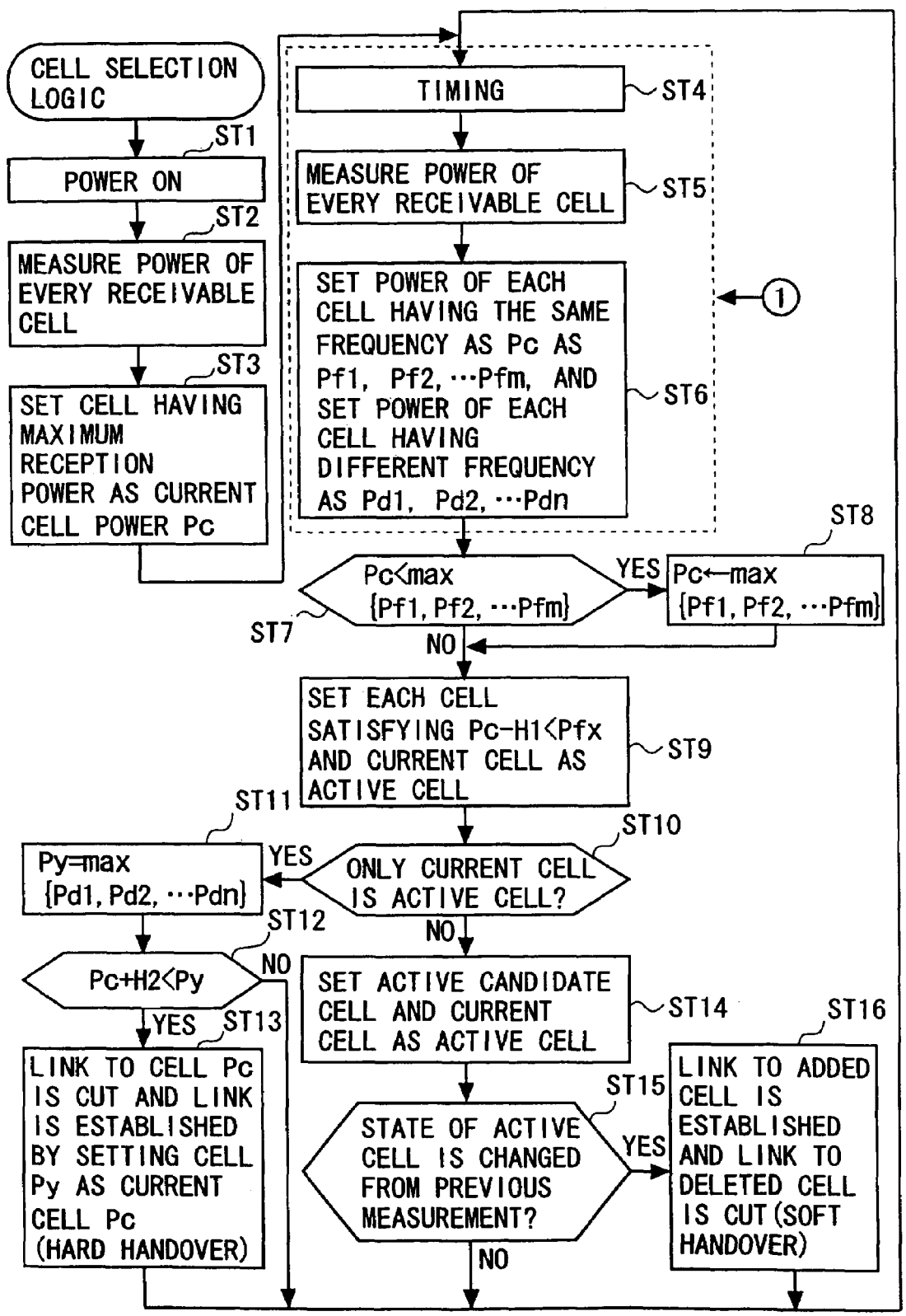
FIG. 75 is a flowchart showing cell selection processing performed by a conventional terminal device.
Figure 76:
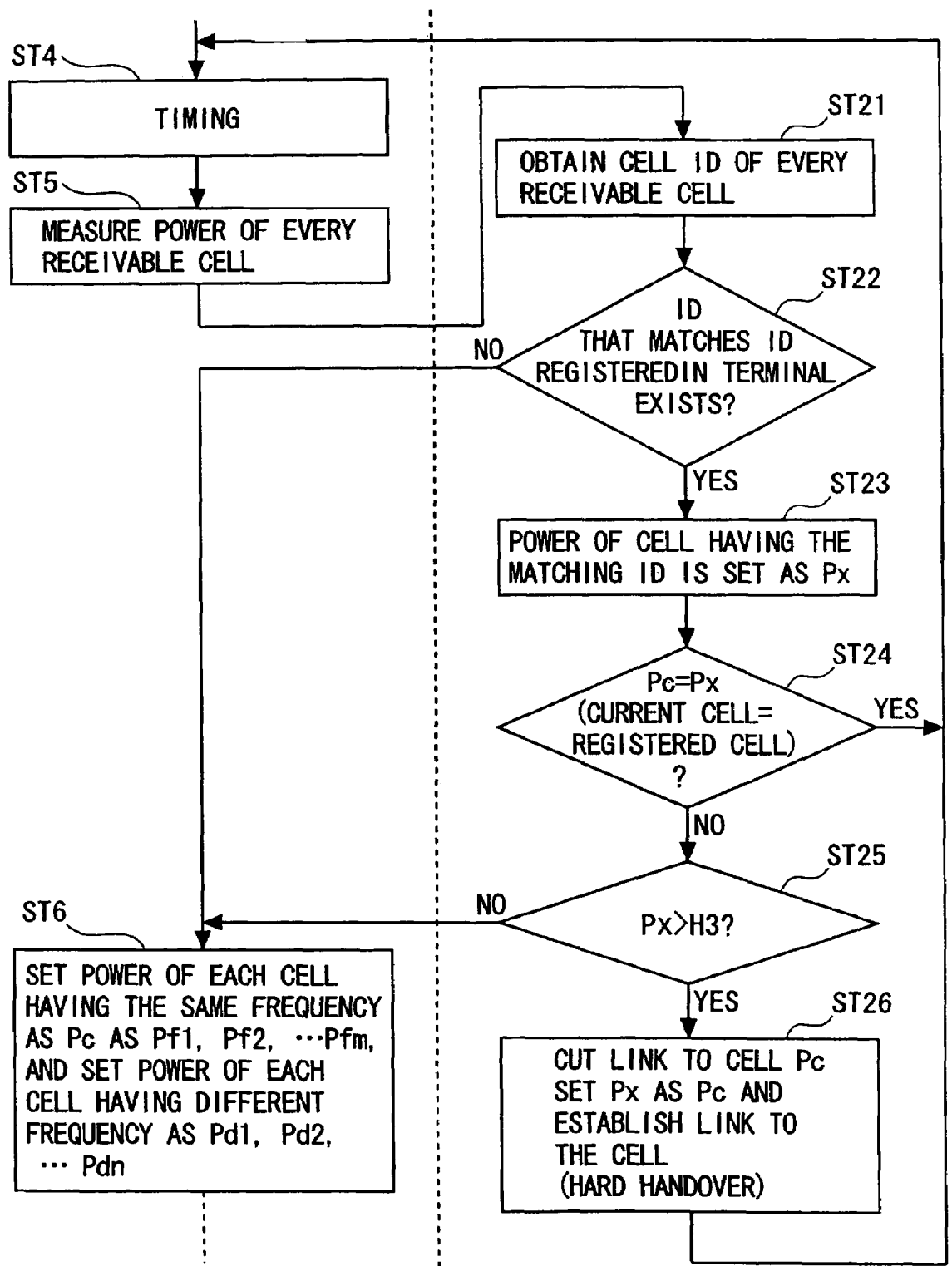
FIG. 76 is a flowchart showing selection processing executed by the terminal device in the third embodiment mode and illustrates a changed portion of the flowchart in FIG. 75.

FIG. 75 is a flowchart showing cell selection processing performed by a current terminal, while FIG. 76 is a flowchart illustrating the cell selection logic according to the third embodiment mode of the present invention. The flowcharts shown in FIGS. 75 and 76 each show processing during communication. During non-communication, a cell, to which it is intended to establish a link by performing processing in the flowchart, is recognized as a cell to be used first at the time of start of communication that may occur afterward.

Also, "max[A1, A2, ... An]" in FIG. 75 indicates a function for, when "n" measured cell powers exit, selecting the maximum power among them. Further, "H1" in FIG. 75 denotes a hysteresis power threshold value for soft handover judgment, and "H2" represents a hysteresis power value for hard handover judgment.

In addition, timing processing (ST4) in FIG. 75 indicates that this cell selection processing is cyclic processing performed at fixed time intervals. Also, the flowchart in FIG. 76 only shows a cell selection operation and does not show informing timing concerning the selection of a cell for which the terminal is registered (corresponding to the "allowed cell" described above) (in usual cases, area entrance displaying is performed at the time when the registration cell is selected and is set as a current cell, and area exit displaying is performed at the time when the current cell is changed from the registration cell to another cell)

Also, in the processing shown in the flowchart in FIG. 76, in order to acquire every cell ID (ST21), it is required to receive broadcast information of every cell and extract its cell ID from the broadcast information. However, this processing is carried out at cycles that are different from those of the processing shown in the flowchart and a result thereof is stored in the control memory 311 of the terminal. Also, "H3" in FIG. 76 denotes a hysteresis value for registration cell selection judgment.

FIG. 75 shows cell selection judgment processing performed by an ordinary terminal with reference to multiple cell reception powers. Such judgment processing is performed by the control CPU 312. When the terminal is powered on (ST1), it measures the power of every receivable cell (ST2) and sets a cell power having the maximum reception power as a current cell power Pc (ST3).

That is, at power-on, the terminal is initialized so as to judge that a cell having the maximum reception power level is a first candidate for communication. This cell is referred to as the "current cell". The cell reception power measurement is performed for every receivable cell at fixed intervals. This is expressed as "TIMING" (ST4) in the flowchart.

After that, when the power measurement of every receivable cell is finished (ST5) and "m (=a natural number)" reception powers of cells using the same frequency as the current cell (that is, using scramble codes that are different from that of the current cell) are found as a result of the power measurement, the powers of these cells are set as "Pf1, Pf2, ... Pfm". Also, if there exist cells using frequencies that are different from that of the current cell, the reception powers thereof are set as "Pd1, Pd2, ... Pdn" (that is, "n (=a natural number)" reception powers exist). These operations are performed in ST6.

Next, the maximum power among the reception powers of the cells using the same frequency as the current cell is selected (ST7 and ST8). At this time, if a power that is higher than the current cell power Pc exists, this power is set as the maximum cell power, and if not, the current cell power Pc is set as the maximum cell power.

Then, every cell satisfying a condition of "Pc-H1<Pfx" and the current cell are each set as an active candidate cell (ST9). That is, a value obtained by subtracting the soft handover hysteresis (H1) from the maximum cell power (Pc) is set as a threshold value and every cell having a power higher than the threshold value is selected (ST9). Each selected cell is set as the active candidate cell. This means that each cell corresponding to the point (2) in FIG. 53 is searched for ("report range" level shown in FIG. 53 corresponds to "H1").

If there exist any active cells other than the current cell, the active candidate cells and the current cell are each set as an active cell and links to respective active cells are established (if communication is being performed) (ST10, ST14).

Such processing is repeated at fixed intervals. Action is taken on the active cell only when the state of the active cell is changed. That is, if a result of judgment in ST15 is positive, the cell having been set as the active cell until now is set as a non-active cell and the link to this cell is cut. On the other hand, for a cell that is set as a new active cell, a link establishment procedure is executed (ST 16). This is a soft handover.

When there exists no active candidate cell other than the current cell (ST10; Y), a cell having a different frequency is set as a handover target candidate for the first time. In this case, a cell having the maximum power among the cells having the different frequencies is set as the candidate (Py). However, unlike in the case of a soft handover, even if its reception power exceeds that of the current cell, a handover is not started immediately. The handover is carried out when a value (Pc+H2) obtained by adding the judgment hysteresis H2 to the power of the current cell falls below the power Py of the candidate cell (ST12; Y). This corresponds to the point (3) in FIG. 52. If communication is currently performed, a hard handover is carried out at this point in time, so that the link to the current cell is cut and a link to the new cell is established at the same time (ST13).

The flowchart in FIG. 76 shows processing according to the present invention. It is possible to realize the cell selection logic (cell selection processing) according to the present invention by replacing a portion of the flowchart in FIG. 75 surrounded by a broken line with the flowchart shown in FIG. 76.

As shown in FIG. 76, with the cell selection logic according to the present invention, after the power measurement of each receivable cell (ST5), the cell ID of every receivable cell is acquired (ST21). After that, it is judged whether there exists a cell ID matching a cell ID registered in the terminal (ST22). If such a matching cell ID does not exist (ST22; N), the processing proceeds to ST6.

On the other hand, if there exists the matching cell ID (ST22; Y), the power of a cell (registration cell) having the matching cell ID is set as Px (ST23) and it is judged whether "Pc=Px (current cell=registration cell)" (ST24). If the current cell is the registration cell (ST24; Y), the processing returns to ST4.

On the other hand, if the current cell is not the registration cell (ST24; N), it is judged whether the power Px of the registration cell exceeds the hysteresis value H3 for registration cell selection judgment (ST25). If Px is equal to or smaller than H3 (S25; N), the processing proceeds to ST6. On the other hand, if Px exceeds H3 (S25; Y), a link to the cell (current cell) Pc is cut, Px (registration cell) is set as Pc (current cell), and a link to the registration cell is established (ST26) (hard handover).

As described above, with the novel processing according to the present invention, the terminal judges whether its registration cell exists among cells, whose reception powers were measured, using cell IDs received through broadcast information and the ID registered in the terminal as well as the cell reception powers. If the registration cell does not exist, the terminal performs the same operation as conventional ones.

On the other hand, if the registration cell exists, the terminal judges whether the registration cell is the current cell. If the registration cell is the current cell, the terminal maintains its status where a link to the registration cell is established. On the other hand, if the registration cell is not the current cell, the terminal judges whether the registration cell should be selected with reference to whether it has a power exceeding the predetermined hysteresis power H3.

If the power of the registration cell does not exceed H3, it is judged that the registration cell is not found and the processing returns to the same operation as conventional ones. On the other hand, if it exceeds H3, the registration cell is newly selected. At this time, if the terminal is performing communication, a hard handover is carried out.

The processing in ST25 corresponds to a judgment as to whether the terminal exists at the point (3) in FIG. 54. Also, the power value "hysteresis A" in FIG. 54 corresponds to H3 described in this embodiment mode.

[Effect of Third Embodiment Mode]

According to the third embodiment mode, it is possible to obtain the following actions and effects.

(1) When a registered terminal enters a personal area, the terminal recognizes it and informs its user of the entrance. As a result, the user becomes capable of recognizing the entrance into the personal area. Also, when the terminal exits the personal area, the terminal recognizes it and informs the user of the exit. As a result, the user becomes capable of recognizing the exit from the personal area.

(2) The terminal captures a cell by assigning a higher priority to the personal area. As a result, even if the radio wave output of a personal-use base station is low, the personal-use base station is capable of performing communication with the registered terminal. Consequently, it becomes possible to use the personal-use base station regardless of the strength of the radio wave of other outside (general) base stations. Also, the radio wave output of the personal-use base station is weak, so that it becomes possible to achieve savings in electricity consumption.

(3) It is possible to separate/distinguish between communication using the personal-use base station and communication using general base stations. As a result, it becomes possible to provide a service where charges for communication using the personal-use base station are discounted, for instance.

(4) Also, the user becomes capable of knowing whether he/she receives a service using the personal-use base station.

In the third embodiment mode, by making changes to the construction of the terminal, it becomes possible to achieve the personal area entrance/exit informing function, the personal area preferentially selecting function, and communication inside the personal area possible/impossible informing function.

Also, by making modifications and changes to the construction of a base station control apparatus, it becomes possible to realize the handover execution judgment function (where handovers to the personal cell are uniformly prohibited or handovers from the registered terminal are only permitted). Note that when the registration table is arranged in a VLR, it is required to make modifications and changes also to the CN.

Except for the points described above, it is possible to construct the mobile telephone network system according to the third embodiment mode using already-existing base stations, base station management apparatuses (RNCs), and CN. Also, already-existing terminals are not registered for the personal-use base station, so that the use of the personal-use base station by the terminals is uniformly prohibited. As a result, it becomes possible to provide a new service without exerting any influences on the already-existing system.

In addition, if changes are also made to the already-existing base station management apparatuses (RNCs) it becomes possible to make a judgment as to whether a handover to the personal-use base station is possible or impossible for each terminal and to carry out a handover between a general base station and the personal-use base station only for the registered terminal.

<Fourth Embodiment Mode>

Next, a fourth embodiment mode of the present invention will be described. In order to carry out the present invention, it is important how to place the small-sized base station (NBTS) in an ordinary people's home and to connect it to the network of a mobile telephone company. Needless to say, it is possible to directly draw a line from the mobile telephone company to the small-sized base station installed in the home. However, it is unrealistic that a line is newly installed in each home. Therefore, we will propose below a more effective method for introducing the small-sized base station.

Figure 77:
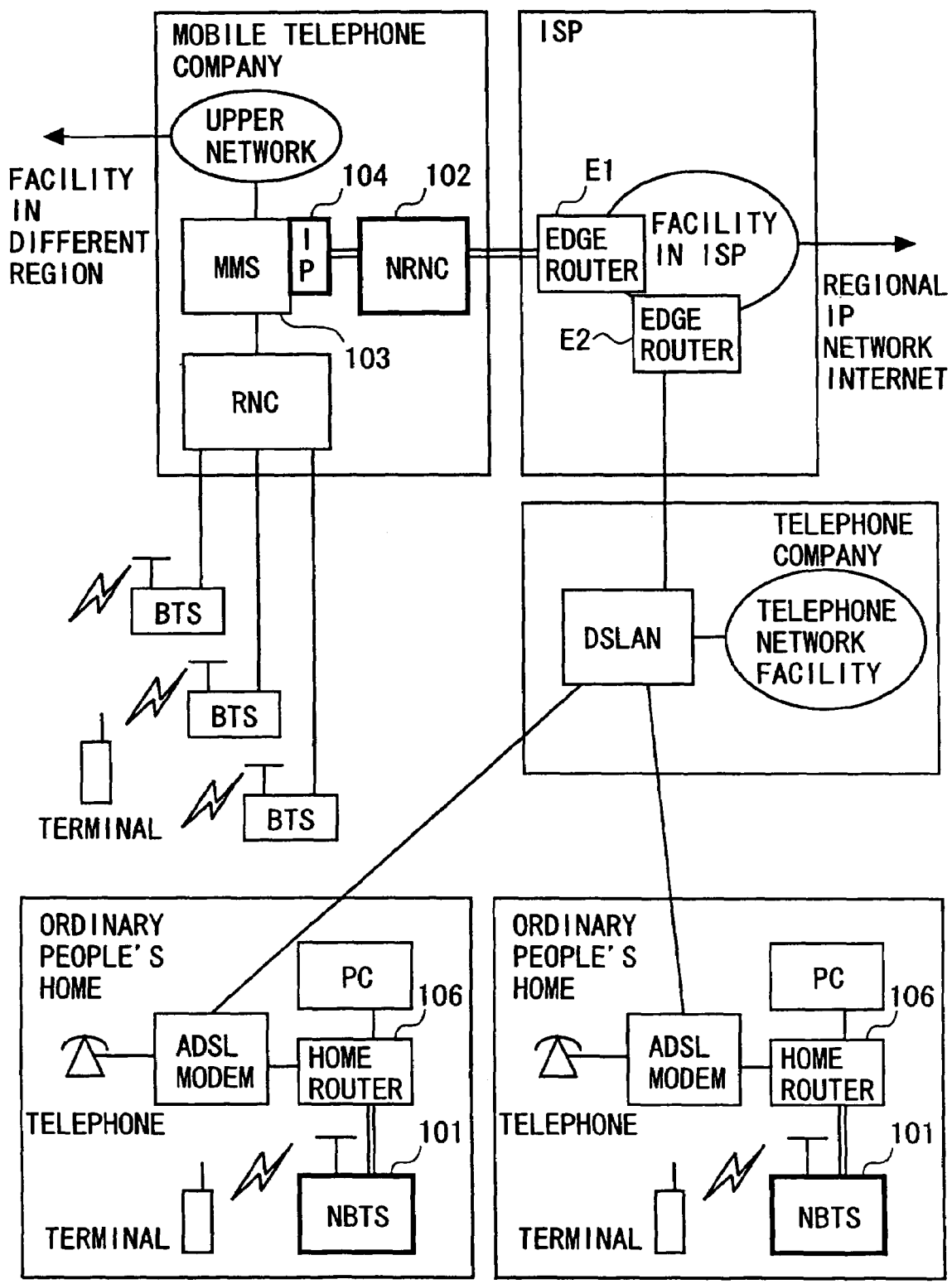
FIG. 77 is a system structure diagram showing a fourth embodiment mode of the present invention.

FIG. 77 shows an example of a method for introducing the small-sized base station system according to the present invention. Recently, broadband lines, such as ADSLs, are introduced into ordinary people's homes in order to perform access to the Internet.

In such homes, an ADSL modem is installed, which is a signal conversion apparatus where a network side is set as the telephone line of a telephone company and a personal computer (PC) side performing the Internet access is set as an IP interface. The ADSL modem is a relay apparatus that connects the PC to the Internet and is capable of transparently performing data communication to an access destination in the case of IP packets.

In order to apply an Internet connection system using such an ADSL modem to the base station system according to the present invention, the small-sized base station (NBTS 101) is given an IP interface and a small-sized base station management apparatus (NRNC 102) is also given an IP interface.

That is, the NBTS 101 and the NRNC 102 are constructed so as to perform message transmission/reception where IP (internet protocol) is used as the protocol in a network layer. Also, a conversion apparatus 104 that performs conversion between the IP interface and an ATM interface applied to a mobile telephone network is provided between the NRNC 102 and a switchboard (MMS 103) of an already-existing mobile telephone network, and the NRNC 102 is connected to the already-existing mobile telephone network through the conversion apparatus 104.

With this structure, a message from the NRNC 102 to the mobile telephone network is converted into an ATM-based message at the conversion apparatus 104 and is transmitted to an upper network (CN) or another base station control apparatus (RNC) via the MMS 103. Also, a message to be transmitted from the MMS 103 to the NRNC 102 is converted into an IP-based message by the conversion apparatus 104. The NRNC 102 transmits (relays) the IP-based message from the conversion apparatus 104 to the NBTS 101, and creates an NBTSIP-based message and transmits it to the NBTS 101.

The NRNC 102 is connected to an Internet service provider (ISP) through a line, thereby enabling communication with the NBTS 101 at an IP packet level. In more detail, the NRNC 102 is connected to one (edge router E1) of edge routers constituting the facility in the ISP (ISP network). On the other hand, the NBTS 101 is connected to an ADSL modem via a router 106 (such as a home router or a SOHO router) in an ordinary people's home, for instance.

The ADSL modem is connected to one (edge router E2) of the ISP edge routers via a line connection apparatus (DSLAM) of a telephone company network. The edge router E2 is connected to the edge router E1. Note that as a network structure from the ADSL modem to the ISP (edge router E2), it is possible to use a conventional ADSL access network structure. In this manner, the NBTS is connected to the ISP network via the routers.

With this structure, the NBTS 101 becomes capable of creating an IP-based message and transmitting it to the NRNC 102 and becomes capable of receiving an IP-based message from the NRNC 102. Also, with this structure, the NBTS 101 is placed under a state where it is always connected to the Internet (ISP), so that it becomes capable of processing each message concerning call termination to and call origination from the terminal at all times.

As described above, the NBTS 101 is given a function (IP interface portion) of creating and transmitting an IP-based message and receiving an IP-based message, and the NRNC 102 is also given a function (IP interface portion) of creating, receiving, and transmitting (relaying) an IP-based message.

With this structure, it becomes possible to realize the base station system using the ISP as relay means. As a result, when the terminal registered for the NBTS 101 performs conversation (including call origination and call termination) using the NBTS 101, IP-based communication is performed between the NBTS 101 and the NRNC 102 via the ISP network. On the other hand, when conversation is performed via another BTS, communication via a conventional ATM-based mobile telephone network is performed. That is, the communication channel is changed depending on whether the terminal uses the BTS or the NBTS.

With the structure described above, there are obtained the following merits. That is, it becomes possible to summarize, in the ISP network, signals from NBTSs installed in multiple homes contracted with the same ISP. Also, by connecting the ISP network and the NRNC to each other using a large capacity line, it becomes possible to accommodate many NBTSs in the same NRNC. Further, on the ISP network side, no change is made to its role in achieving Internet access by allowing IP packets to pass through the network, so that it is not specifically required to install new apparatuses.

Consequently, it is sufficient that (1) the small-sized base station (NBTS) and its management apparatus (NRNC) are each given an IP interface, (2) the conversion apparatus is provided between the IP interface and the ATM interface of the switchboard (MMS) of the already-existing mobile telephone network, and (3) the line connection apparatus (DSLAM) between the ISP and the mobile telephone company is utilized, as shown in FIG. 77. With this structure, it becomes possible to construct a system for introducing the personal-use base station system at low cost.

According to the fourth embodiment mode, in the small-sized base station system, the base station and the base station management apparatus are each given an IP interface, the small-sized base station is connected to the IP interface of an apparatus for converting a telephone line introduced in a home into an Internet access line, and the facility of an Internet access provider (ISP) providing the Internet access line as a service is connected to the network of a mobile telephone company via a line. With this structure, the base station management apparatus is given the IP interface and is connected to the line to the ISP. Also, the apparatus that performs conversion between the IP interface and an ATM interface of a network-side switchboard of the mobile telephone company is inserted between the base station management apparatus and the switchboard and both of them are connected to each other, thereby constructing a network. As a result, it becomes possible to realize an introduction system for the mobile telephone small-sized base station system aimed at accommodating the home-use small-sized base station in a mobile telephone network.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of the invention.

What is claimed is:

1. A terminal status control system comprising:
    a registration table in which information concerning a terminal that is allowed to use a specific base station is registered;
    a judging unit judging whether a terminal that has entered a cell of the specific base station is the terminal registered in the registration table by referring to the registration table; and
    a control unit, if the terminal is the registered terminal, placing the terminal under a communicable status using the specific base station, and if not, placing the terminal under an incommunicable status using the specific base station, wherein the terminal is constructed so as to transmit a location updating request when system broadcast information containing a location area identifier received from a base station is changed due to an inter-cell movement, and the terminal status control system further comprises:

a giving unit giving the specific base station the system broadcast information containing a location area identifier for the specific base station that is different from location area identifiers broadcasted in cells adjacent to the cell of the specific base station as a location area identifier that the specific base station broadcasts in the cell thereof, and wherein the giving unit is provided in a base station control apparatus that manages and controls the specific base station, the base station control apparatus includes a conversion unit converting a location area identifier of a location area, to which the specific base station belongs, the location area identifier being received from a location management apparatus managing the location of each terminal existing in the location area, into a unique location area identifier for the specific base station to make the system broadcast information containing the unique location area identifier, wherein the base station control apparatus includes a conversion table for the conversion unit converting the location area identifier managed by the location management apparatus into the unique location area identifier of the specific base station, and the giving unit gives the broadcast information containing the unique location area identifier converted by the conversion unit to the specific base station; and wherein the conversion unit converts the unique location area identifier for the specific base station contained in the location updating request from the terminal, which the base station control apparatus receives the location updating request from the specific base station, into the original location area identifier of the location area by use of the conversion table, in order to transmit the location updating request containing the original location area identifier to the location management apparatus.

2. A terminal status control system according to claim 1, wherein with reception of a location updating request transmitted from the terminal as a trigger, the judging unit judges whether the terminal is the registered terminal by acquiring base station specifying information for specifying the base station that received the location updating request from the terminal and identification information of the terminal, and judging whether the base station specifying information and the terminal identification information are registered in the registration table, and if the terminal is the registered terminal, the control unit approves the location updating request from the terminal, and if not, rejects the location updating request from the terminal.

3. A terminal status control system according to claim 1, wherein the registration table and the judging unit are provided in the base station control apparatus, and the judging unit acquires the identification information of the specific base station managed by the base station control apparatus as the base station specifying information, and if identification information of the terminal contained in the location updating request received from the specific base station by the base station control apparatus is temporary identification information, acquires identification information unique to the terminal by inquiring of the terminal, and judges whether the base station specifying information and the identification information unique to the terminal are registered in the registration table.

4. A terminal status control system according to claim 3, wherein when the base station control apparatus receives the location updating request from the specific base station, the judging unit performs the judging processing before the location updating request is transmitted to the location management apparatus, and if it is judged as a result of the judgment by the judging unit that use of the specific base station is allowable, the base station control apparatus transmits the location updating request to the location management apparatus, and if not, transmits updating rejection to the terminal with respect to the location updating request.

5. A terminal status control system according to claim 1, wherein the base station control apparatus that controls the specific base station uniformly rejects handover requests from other base station control apparatuses.

6. A terminal status control system according to claim 1, wherein with respect to a handover request from another base station control apparatus, the base station control apparatus that controls the specific base station judges whether a terminal that is a target of the handover request is the terminal allowed to use the specific base station based on registration contents of the registration table, wherein if the target terminal is the allowed terminal, the base station control apparatus approves the handover request, and if not, rejects the handover request.

7. A terminal status control system according to claim 1, further comprising:

an internet protocol (IP) interface portion that is provided between the specific base station and the base station control apparatus that manages and controls the specific base station and performs IP communication therebetween, and an apparatus that is provided between the base station control apparatus and a switchboard of a network including other base station control apparatuses and the location management apparatus, and performs conversion between the IP interface and another interface applied to the switchboard.

8. A terminal status control system according to claim 1, wherein the specific base station is connected to the base station control apparatus via an Internet service provider network.

9. A terminal status control system comprising:

a registration table in which information concerning a terminal that is allowed to use a specific base station is registered;

a judging unit judging whether a terminal that has entered a cell of the specific base station is the terminal registered in the registration table by referring to the registration table; and a control unit, if the terminal is the registered terminal, placing the terminal under a communicable status using the specific base station, and if not, placing the terminal under an incommunicable status using the specific base station wherein the terminal is constructed so as to transmit the location updating request when a location area identifier received from a base station is changed due to an inter-cell movement, and the terminal status control system further comprises:

a giving unit giving the specific base station a location area identifier for the specific base station that is different from location area identifiers broadcasted in cells adjacent to the cell of the specific base station as a location area identifier that the specific base station broadcasts in the cell thereof, and wherein the giving unit is provided in a base station control apparatus that manages and controls the specific base station, the base station control apparatus includes a conversion unit converting a location area identifier of a location area, to which the specific base station belongs, contained in broadcast information, which the base station control apparatus receives from a location management apparatus managing the location of each terminal existing in the location area, to which the specific base station belongs, and transfers to the specific base station, into the location area identifier for the specific base station, wherein the location management apparatus includes a management table for managing identification information unique to each terminal, a location area identifier of a location area in which the terminal exists, and a temporary identification information temporarily allocated to the terminal, and the registration table and the judging unit are provided in the location management apparatus, wherein the base station control apparatus adds identification information of the specific base station to the location registration request received from the specific base station, and transmits the location registration request to the location management apparatus, and the judging unit acquires the identification information of the base station from the location registration request received by the location management apparatus as the base station specifying information, and if terminal identification information contained in the location updating request is the terminal temporary identification information, further acquires corresponding identification information unique to the terminal from the management table and judges whether the base station specifying information and the identification information unique to the terminal are registered in the registration table.

10. A terminal status control system according to claim 9, wherein the location management apparatus judges whether it is possible to approve the location updating request from the terminal, wherein if it is impossible to permit the location updating, the location management apparatus transmits updating rejection to the terminal, and if it is possible to permit the location updating, causes the judging unit to perform the judging processing, wherein if it is judged as a result of the judging processing that use of the specific base station is allowable, permission with respect to the location updating is transmitted to the terminal, and if not, rejection with respect to the location updating is transmitted to the terminal.

11. A terminal status control system comprising:

a registration table in which information concerning a terminal that is allowed to use a specific base station is registered;

a judging unit judging whether a terminal that has entered a cell of the specific base station is the terminal registered in the registration table by referring to the registration table; and a control unit, if the terminal is the registered terminal, placing the terminal under a communicable status using the specific base station, and if not, placing the terminal under an incommunicable status using the specific base station wherein the terminal is constructed so as to transmit the location updating request when a location area identifier received from a base station is changed due to an inter-cell movement, and the terminal status control system further comprises:

a giving unit giving the specific base station a location area identifier for the specific base station that is different from location area identifiers broadcasted in cells adjacent to the cell of the specific base station as a location area identifier that the specific base station broadcasts in the cell thereof, and wherein the giving unit is provided in a base station control apparatus that manages and controls the specific base station, the base station control apparatus includes a conversion unit converting a location area identifier of a location area, to which the specific base station belongs, contained in broadcast information, which the base station control apparatus receives from a location management apparatus managing the location of each terminal existing in the location area, to which the specific base station belongs, and transfers to the specific base station, into the location area identifier for the specific base station, wherein the location management apparatus, when a call termination request to the terminal occurs after the terminal is placed by the control unit under the communicable status using the specific base station, receives an inquiry from a transfer unit of the call termination request concerning a location area corresponding to a transmission destination of the call termination request, acquires the base station specifying information of the specific base station from the registration table, and informs the transfer unit of the identification information of the specific base station along with a corresponding location area identifier, based on the acquired location area identifier and base station specifying information of the specific base station, the transfer unit transmits the call termination request only to the base station control apparatus that controls the specific base station, and the base station control apparatus, when receives the call termination request, transmits the call termination request to each base station that the base station control apparatus controls.

12. A terminal status control system according to claim 11, wherein the transfer unit gives the base station specifying information of the specific base station to the call termination request, and the base station control apparatus, when receives the call termination request, transmits the call termination request only to the specific base station based on the base station specifying information of the specific base station contained in the call termination request.

13. A terminal status control system comprising:

a registration table in which information concerning a terminal that is allowed to use a specific base station is registered;

a judging unit judging whether a terminal that has entered a cell of the specific base station is the terminal registered in the registration table by referring to the registration table; and a control unit, if the terminal is the registered terminal, placing the terminal under a communicable status using the specific base station, and if not, placing the terminal under an incommunicable status using the specific base station wherein the terminal is constructed so as to transmit the location updating request when a location area identifier received from a base station is changed due to an inter-cell movement, and the terminal status control system further comprises:

a giving unit giving the specific base station a location area identifier for the specific base station that is different from location area identifiers broadcasted in cells adjacent to the cell of the specific base station as a location area identifier that the specific base station broadcasts in the cell thereof, and wherein the giving unit is provided in a base station control apparatus that manages and controls the specific base station, the base station control apparatus includes a conversion unit converting a location area identifier of a location area, to which the specific base station belongs, contained in broadcast information, which the base station control apparatus receives from a location management apparatus managing the location of each terminal existing in the location area, to which the specific base station belongs, and transfers to the specific base station, into the location area identifier for the specific base station, wherein the registration table and the judging unit are provided in the base station control apparatus, and the judging unit acquires the identification information of the specific base station managed by the base station control apparatus as the base station specifying information, and if identification information of the terminal contained in the location updating request received from the specific base station by the base station control apparatus is temporary identification information, acquires identification information unique to the terminal by inquiring of the terminal, and judges whether the base station specifying information and the identification information unique to the terminal are registered in the registration table, wherein after the terminal is placed by the control unit under the communicable status using the specific base station, when a call termination request to the terminal is received, the base station control apparatus acquires the base station specifying information of the specific base station corresponding to the identification information of the terminal contained in the call termination request from the conversion table and transmits the call termination request only to the specific base station based on the acquired base station specifying information.

14. A terminal status control system comprising:

a registration table in which information concerning a terminal that is allowed to use a specific base station is registered;

a judging unit judging whether a terminal that has entered a cell of the specific base station is the terminal registered in the registration table by referring to the registration table; and a control unit, if the terminal is the registered terminal, placing the terminal under a communicable status using the specific base station, and if not, placing the terminal under an incommunicable status using the specific base station wherein the terminal is constructed so as to transmit the location updating request when a location area identifier received from a base station is changed due to an inter-cell movement, and the terminal status control system further comprises:

a giving unit giving the specific base station a location area identifier for the specific base station that is different from location area identifiers broadcasted in cells adjacent to the cell of the specific base station as a location area identifier that the specific base station broadcasts in the cell thereof, and wherein the giving unit is provided in a base station control apparatus that manages and controls the specific base station, the base station control apparatus includes a conversion unit converting a location area identifier of a location area, to which the specific base station belongs, contained in broadcast information, which the base station control apparatus receives from a location management apparatus managing the location of each terminal existing in the location area, to which the specific base station belongs, and transfers to the specific base station, into the location area identifier for the specific base station, wherein the respect to a handover request from another base station control apparatus, the base station control apparatus that controls the specific base station judges whether a terminal that is a target of the handover request is the terminal allowed to use the specific base station based on registration contents of the registration table, wherein if the target terminal is the allowed terminal, the base station control apparatus approves the handover request, and if not, rejects the handover request, wherein when call origination from the terminal is received, the another base station control apparatus acquires the identification information unique to the terminal from the terminal, adds the identification information unique to the terminal to the handover request from the terminal, and transmits the handover request to the base station control apparatus that controls the specific base station, and the base station control apparatus controlling the specific base station acquires the identification information unique to the terminal necessary to perform the judging processing from the handover request.

* * * * *